US012395937B2

(12) United States Patent
Zhou et al.

(10) Patent No.: US 12,395,937 B2
(45) Date of Patent: *Aug. 19, 2025

(54) ACTIVATION AND DEACTIVATION OF POWER SAVING OPERATION

(71) Applicant: Comcast Cable Communications, LLC, Philadelphia, PA (US)

(72) Inventors: Hua Zhou, Vienna, VA (US); Esmael Hejazi Dinan, McLean, VA (US); Kyungmin Park, Vienna, VA (US); Ali Cagatay Cirik, Chantilly, VA (US); Alireza Babaei, Fairfax, VA (US); Hyoungsuk Jeon, Centreville, VA (US); Kai Xu, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/640,872

(22) Filed: Apr. 19, 2024

(65) Prior Publication Data

US 2024/0349186 A1    Oct. 17, 2024

Related U.S. Application Data

(63) Continuation of application No. 16/577,847, filed on Sep. 20, 2019, now Pat. No. 12,010,619.
(Continued)

(51) Int. Cl.
*H04W 52/02* (2009.01)
*G06F 1/3209* (2019.01)
(Continued)

(52) U.S. Cl.
CPC ...... *H04W 52/0229* (2013.01); *G06F 1/3209* (2013.01); *H04W 24/02* (2013.01); *H04W 72/23* (2023.01); *H04W 76/20* (2018.02)

(58) Field of Classification Search
USPC ....... 370/229, 230, 236, 241, 252, 311, 328, 370/329, 318, 330, 331, 341
See application file for complete search history.

(56) References Cited

U.S. PATENT DOCUMENTS 9,674,727 B2    6/2017 Damnjanovic et al.
10,595,283 B2   3/2020 Kim et al.
(Continued)

FOREIGN PATENT DOCUMENTS

EP    3525516 A1      8/2019
WO    2017136706 A1   8/2017
(Continued)

OTHER PUBLICATIONS

R1-1718337 3GPP TSG RAN WG1 Meeting #90bis, Prague, Czech Republic, Oct. 9-13, 2017, Source: MediaTek, Inc., Title: Remaining details for CSI reporting.
(Continued)

*Primary Examiner* — Nguyen H Ngo
(74) *Attorney, Agent, or Firm* — Banner & Witcoff, Ltd.

(57) ABSTRACT

Wireless communication techniques using a power saving mode are described. A wireless device may be configured with a plurality of power saving configurations. A base station may transmit an indication of a power saving configuration in the plurality of power saving configurations. The wireless device may monitor a power saving channel based on the indicated power saving configuration.

20 Claims, 52 Drawing Sheets

Related U.S. Application Data

(60) Provisional application No. 62/790,306, filed on Jan. 9, 2019, provisional application No. 62/734,561, filed on Sep. 21, 2018.

(51) Int. Cl.
  *H04W 24/02* (2009.01)
  *H04W 72/23* (2023.01)
  *H04W 76/20* (2018.01)

(56) References Cited

U.S. PATENT DOCUMENTS

| | | |
|---|---|---|
| 10,925,047 B2 | 2/2021 | Islam et al. |
| 2009/0124249 A1 | 5/2009 | Young et al. |
| 2010/0195582 A1 | 8/2010 | Koskinen |
| 2011/0216682 A1 | 9/2011 | Xu et al. |
| 2011/0243278 A1 | 10/2011 | Cheng |
| 2012/0314640 A1 | 12/2012 | Kim et al. |
| 2013/0195025 A1 | 8/2013 | Chatterjee et al. |
| 2014/0044083 A1 | 2/2014 | Kim et al. |
| 2014/0064251 A1 | 3/2014 | Skov et al. |
| 2014/0302855 A1 | 10/2014 | Nory et al. |
| 2015/0189574 A1 | 7/2015 | Ng et al. |
| 2015/0327107 A1 | 11/2015 | Kim et al. |
| 2015/0381255 A1 | 12/2015 | Kuo |
| 2016/0174150 A1 | 6/2016 | Comsa et al. |
| 2016/0295636 A1 | 10/2016 | Yang et al. |
| 2017/0094547 A1 | 3/2017 | Yum et al. |
| 2017/0150454 A1 | 5/2017 | Zhang et al. |
| 2018/0020503 A1 | 1/2018 | Deenoo et al. |
| 2018/0034525 A1 | 2/2018 | Park et al. |
| 2018/0115357 A1 | 4/2018 | Park et al. |
| 2018/0124687 A1 | 5/2018 | Park et al. |
| 2018/0124822 A1 | 5/2018 | Wang et al. |
| 2018/0132266 A1 | 5/2018 | Chen et al. |
| 2018/0139787 A1 | 5/2018 | Islam et al. |
| 2018/0176937 A1 | 6/2018 | Chen et al. |
| 2018/0205516 A1 | 7/2018 | Jung et al. |
| 2018/0227805 A1 | 8/2018 | Jang et al. |
| 2018/0242307 A1 | 8/2018 | Chen et al. |
| 2018/0249460 A1 | 8/2018 | Seo et al. |
| 2018/0255607 A1 | 9/2018 | Nagaraja et al. |
| 2018/0270713 A1 | 9/2018 | Park et al. |
| 2018/0278383 A1 | 9/2018 | Kim et al. |
| 2019/0037498 A1 | 1/2019 | Tseng et al. |
| 2019/0037577 A1 | 1/2019 | Sun et al. |
| 2019/0104477 A1 | 4/2019 | MolavianJazi et al. |
| 2019/0132109 A1 | 5/2019 | Zhou et al. |
| 2019/0132110 A1 | 5/2019 | Zhou et al. |
| 2019/0132882 A1 | 5/2019 | Li et al. |
| 2019/0141546 A1 | 5/2019 | Zhou et al. |
| 2019/0141677 A1 | 5/2019 | Harrison et al. |
| 2019/0150064 A1 | 5/2019 | Chen et al. |
| 2019/0158229 A1 | 5/2019 | Wei et al. |
| 2019/0166529 A1 | 5/2019 | Chen et al. |
| 2019/0173740 A1 | 6/2019 | Zhang et al. |
| 2019/0199477 A1 | 6/2019 | Park et al. |
| 2019/0223164 A1 | 7/2019 | He et al. |
| 2019/0253200 A1 | 8/2019 | Salem et al. |
| 2019/0261405 A1 | 8/2019 | Ang et al. |
| 2019/0297648 A1 | 9/2019 | Nagaraja et al. |
| 2019/0349964 A1 | 11/2019 | Liou |
| 2019/0349983 A1 | 11/2019 | Loehr et al. |
| 2019/0379506 A1 | 12/2019 | Cheng |
| 2020/0037247 A1* | 1/2020 | Liao ............... H04W 52/0216 |
| 2020/0037396 A1 | 1/2020 | Islam et al. |
| 2020/0245395 A1 | 7/2020 | Zhang et al. |
| 2020/0280970 A1 | 9/2020 | Takeda et al. |
| 2020/0288494 A1 | 9/2020 | Heo et al. |
| 2020/0358582 A1 | 11/2020 | Takeda et al. |
| 2021/0091844 A1 | 3/2021 | Koskela et al. |
| 2021/0259044 A1* | 8/2021 | Islam ............... H04W 52/0229 |
| 2021/0360674 A1* | 11/2021 | Lim ............... H04W 52/0216 |

FOREIGN PATENT DOCUMENTS

| | | |
|---|---|---|
| WO | 2017161590 A1 | 9/2017 |
| WO | 2017196243 A1 | 11/2017 |
| WO | 2018029382 A1 | 2/2018 |
| WO | 2018084544 A1 | 5/2018 |
| WO | 2018144155 A1 | 8/2018 |

OTHER PUBLICATIONS

R1-1718432 3GPP TSG RAN WG1 Meeting #90bis, Prague, Czech Republic, Oct. 9-13, 2017, Source: Ericsson, Title: On remaining details of CSI reporting.

R1-1718442 3GPP TSG RAN WG1 Meeting #90bis, Prague, Czech Republic, Oct. 9-13, 2017, Source: Ericsson, Title: On semi-persistent CSI reporting on PUSCH.

R1-1718443 3GPP TSG RAN WG1 Meeting #90bis, Prague, Czech Republic, Oct. 9-13, 2017, Source: Ericsson, Title: On aperiodic and semi-persistent CSI reporting on PUCCH.

R1-1718481 3GPP TSG RAN WG1 Meeting #90bis, Prague, Czech Republic, Oct. 9-13, 2017, Source: InterDigital, Inc., Title: Remaining issues on CSI reporting.

R1-1718510 3GPP TSG RAN WG1 Meeting #90bis, Prague, Czech Republic, Oct. 9-13, 2017, Source: Nokia, Nokia Shanghai Bell, Title: Remaining details on CSI reporting for Type II and Type I codebook.

R1-1718540 3GPP TSG RAN WG1 Meeting #90bis, Prague, Czech Republic, Oct. 9-13, 2017, Source: Qualcomm Incorporated, Title: On Remaining Issues of CSI Reporting.

R1-1718910 3GPP TSG RAN WG1 Meeting #90bis, Prague, Czech Republic, Oct. 9-13, 2017, Source: ZTE, Sanechips, Title: Summary of CSI measurement.

R1-1719142 3GPP TSG RAN WG1 Meeting #90bis, Prague, Czech Republic, Oct. 9-13, 2017, Source: Ericsson, Title: Offline session notes CSI reporting (AI 7.2.2.2).

R1-1719425 3GPP TSG RAN WG1 Meeting #91, Reno, USA, Nov. 27-Dec. 1, 2017, Source: Huawei, HiSilicon, Title: Remaining issues for CSI reporting.

R1-1719434 3GPP TSG RAN WG1 Meeting #91, Reno, USA, Nov. 27-Dec. 1, 2017, Source: Huawei, HiSilicon, Title: Remaining details of UL power control design.

R1-1719435 3GPP TSG RAN WG1 Meeting #91, Reno, USA, Nov. 27-Dec. 1, 2017, Source: Huawei, HiSilicon, Title: Designs on power headroom calculation and reporting.

R1-1719488 3GPP TSG RAN WG1 Meeting #91, Reno, USA, Nov. 27-Dec. 1, 2017, Source: Mitsubishi Electric, Title: UL transmission power control.

R1-1719532 3GPP TSG RAN WG1 Meeting #91, Reno, USA, Nov. 27-Dec. 1, 2017, Source: ZTE, Sanechips, Title: Remaining details on CSI reporting.

R1-1719547 3GPP TSG RAN WG1 Meeting #91, Reno, USA, Nov. 27-Dec. 1, 2017, Source: ZTE, Sanechips, Title: On NR Power Control Framework.

R1-1719564 3GPP TSG RAN WG1 Meeting #91, Reno, USA, Nov. 27-Dec. 1, 2017, Source: MediaTek Inc., Title: Remaining details for CSI reporting.

R1-1719650 3GPP TSG RAN WG1 Meeting #91, Reno, USA, Nov. 27-Dec. 1, 2017, Source: AT&T, Title: Remaining details on bandwidth parts.

R1-1719651 3GPP TSG RAN WG1 Meeting #91, Reno, USA, Nov. 27-Dec. 1, 2017, Source: AT&T, Title: Remaining details on carrier aggregation.

R1-1719653 3GPP TSG RAN WG1 Meeting #91, Reno, USA, Nov. 27-Dec. 1, 2017, Source: AT&T, Title: Dynamic Power Control and Coverage Impact.

R1-1719696 3GPP TSG RAN WG1 Meeting #91, Reno, USA, Nov. 27-Dec. 1, 2017, Source: Spreadtrum Communications, Title: Remaining issues on CSI feedback.

R1-1719768 3GPP TSG RAN WG1 Meeting #91, Reno, USA, Nov. 27-Dec. 1, 2017, Source: vivo, Title: Remaining details on CSI reporting.

(56) References Cited

OTHER PUBLICATIONS

R1-1719779 3GPP TSG RAN WG1 Meeting #91, Reno, USA, Nov. 27-Dec. 1, 2017, Source: vivo, Title: Remaining issues on NR UL power control.
R1-1719820 3GPP TSG RAN WG1 Meeting #91, Reno, USA, Nov. 27-Dec. 1, 2017, Source: Huawei, HiSilicon, Title: Power control design for SUL and LNC.
R1-1719906 3GPP TSG RAN WG1 Meeting #91, Reno, USA, Nov. 27-Dec. 1, 2017, Source: LG Electronics, Title: Discussions on CSI reporting.
R1-1719932 3GPP TSG RAN WG1 Meeting #91, Reno, USA, Nov. 27-Dec. 1, 2017, Source: LG Electronics, Title: Remaining issues on UL data transmission procedure.
R1-1719944 3GPP TSG RAN WG1 Meeting #91, Reno, USA, Nov. 27-Dec. 1, 2017, Source: LG Electronics, Title: Discussion on UL power control for NR non-CA case.
R1-1719968 3GPP TSG RAN WG1 Meeting #91, Reno, USA, Nov. 27-Dec. 1, 2017, Source: OPPO, Title: On uplink power control for NR.
R1-1719989 3GPP TSG RAN WG1 Meeting #91, Reno, USA, Nov. 27-Dec. 1, 2017, Source: OPPO, Title: Discussion on Remaining Issues for LTE-NR Dual Connectivity.
R1-1720070 3GPP TSG RAN WG1 Meeting #91, Reno, USA, Nov. 27-Dec. 1, 2017, Source: Intel Corporation, Title: Remaining issues on CSI reporting.
R1-1720104 3GPP TSG RAN WG1 Meeting #91, Reno, USA, Nov. 27-Dec. 1, 2017, Source: Intel Corporation, Title: Remaining Details On UL Power Control Framework.
R1-1720105 3GPP TSG RAN WG1 Meeting #91, Reno, USA, Nov. 27-Dec. 1, 2017, Source: Intel Corporation, Title: Remaining aspects on power sharing between LTE and NR.
R1-1720181 3GPP TSG RAN WG1 Meeting #91, Reno, USA, Nov. 27-Dec. 1, 2017, Source: CATT, Title: Remaining details on CSI reporting.
R1-1720215 3GPP TSG RAN WG1 Meeting #91, Reno, USA, Nov. 27-Dec. 1, 2017, Source: CATT, Title: Remaining Aspects of NR Power Control.
R1-1720289 3GPP TSG RAN WG1 Meeting #91, Reno, USA, Nov. 27-Dec. 1, 2017, Source: Samsung, Title: CSI reporting and UCI multiplexing.
R1-1720361 3GPP TSG RAN WG1 Meeting #91, Reno, USA, Nov. 27-Dec. 1, 2017, Source: Samsung, Title: Remaining Issues on UL Power Control.
R1-1720363 3GPP TSG RAN WG1 Meeting #91, Reno, USA, Nov. 27-Dec. 1, 2017, Source: Samsung, Title: On PHR Requirements and Calculation.
R1-1720371 3GPP TSG RAN WG1 Meeting #91, Reno, USA, Nov. 27-Dec. 1, 2017, Source: Panasonic, Title: Discussion on NR power control framework.
R1-1720560 3GPP TSG RAN WG1 Meeting #91, Reno, USA, Nov. 27-Dec. 1, 2017, Source: InterDigital, Inc., Title: Power Control for NR DC.
R1-1720595 3GPP TSG RAN WG1 Meeting #91, Reno, USA, Nov. 27-Dec. 1, 2017, Source: CMCC, Title: Power Control for NR DC.
R1-1720612 3GPP TSG RAN WG1 Meeting #91, Reno, USA, Nov. 27-Dec. 1, 2017, Source: Sharp, APT, Title: Power Control for NR DC.
R1-1720628 3GPP TSG RAN WG1 Meeting #91, Reno, USA, Nov. 27-Dec. 1, 2017, Source: InterDigital, Inc., Title: Remaining issues on CSI reporting.
R1-1720646 3GPP TSG RAN WG1 Meeting #91, Reno, USA, Nov. 27-Dec. 1, 2017, Source: HTC, Title: Remaining issues on UL power control for NR.
R1-1720661 3GPP TSG RAN WG1 Meeting #91, Reno, USA, Nov. 27-Dec. 1, 2017, Source: Qualcomm Incorporated, Title: Remaining Details on CSI Reporting.
R1-1720706 3GPP TSG RAN WG1 Meeting #91, Reno, USA, Nov. 27-Dec. 1, 2017, Source: Qualcomm Incorporated, Title: Remaining Issues on Power Control for NR.
R1-1720711 3GPP TSG RAN WG1 Meeting #91, Reno, USA, Nov. 27-Dec. 1, 2017, Source: InterDigital, Inc., Title: Consideration for UL Power Control Framework.
R1-1720734 3GPP TSG RAN WG1 Meeting #91, Reno, USA, Nov. 27-Dec. 1, 2017, Source: Ericsson, Title: On remaining details of CSI reporting.
R1-1720746 3GPP TSG RAN WG1 Meeting #91, Reno, USA, Nov. 27-Dec. 1, 2017, Source: Ericsson, Title: On semi-persistent CSI reporting on PUSCH.
R1-1720802 3GPP TSG RAN WG1 Meeting #91, Reno, USA, Nov. 27-Dec. 1, 2017, Source: NTT Docomo, Inc., Title: Remaining Issues on CSI reporting.
R1-1720832 3GPP TSG RAN WG1 Meeting #91, Reno, USA, Nov. 27-Dec. 1, 2017, Source: NTT Docomo, Inc., Title: Remaining details on LTE-NR power sharing.
R1-1720889 3GPP TSG RAN WG1 Meeting #91, Reno, USA, Nov. 27-Dec. 1, 2017, Source: Nokia, Nokia Shanghai Bell, Title: Remaining details on CSI reporting.
R2-1814940 3GPP TSG RAN WG2 Meeting #103bis, Chengdu, China, Oct. 8-12, 2018, Source: Nokia, Nokia Shanghai Bell, Title: Correction to preamble power ramping.
R2-1815281 3GPP TSG RAN WG2 Meeting #103bis, Chengdu, China, Oct. 8-12, 2018, Source: LG Electronics Inc., Title: Remaining issue with Power Ramping Counter.
RP-181463 3GPP TSG RAN Meeting #80, La Jolla, USA, Jun. 11-14, 2018, Source: CATT, CMCC, vivo, CATR, Qualcomm, MediaTek, Title: New SID: Study on UE Power Saving in NR.
R1-1709016 3GPP TSG RAN WG1 Meeting #89, Hangzhou, China, May 15-19, 2017, Source: InterDigital Inc., Title: Control Channels Monitoring with Multiple CORESETs.
R1-1714117 3GPP TSG RAN WG1 Meeting #90, Prague, Czech Republic, Aug. 21-25, 2017, Source: InterDigital Inc., Title: Remaining details of BWP.
R2-1802001 3GPP TSG RAN WG2 Meeting #101, Athens, Greece, Feb. 26-Mar. 2, 2018, Source: vivo, Title: Restart Scell inactive timer due to configuration grant.
R1-142925 3GPP TSG RAN WG1 Meeting #78, Dresden, Germany, Aug. 18-22, 2014, Source: Fujitsu, Title: Discussion of on/off transitions and related procedures.
Oct. 18, 2019—European Extended Search Report—EP 19187310.8.
Jan. 17, 2020—European Extended Search Report—EP 19198650.4.
Apr. 22, 2021—European Search Report—EP 19198650.4.
Apr. 29, 2022—European Office Action—EP 19198650.4.
May 13, 2019—European Search Report—19151142.7.
Huawei et al: "Independent and joint control of CSI-RS transmission and CSI reporting for NR MIMO", Jan. 16, 2017.
Huawei Hisilicon: "Independent and joint control of CSI-RS transmission and CSI reporting for NR MIMO", Nov. 13, 2016.
Mar. 25, 2019—European Search Report—EP 19150331.7.
Jan. 1, 2018—3GPP Standard; 3GPP TS 38.331—3rd Generation Partnership Project; Technical Specification Group Radio Access Network; NR; Radio Resource Control (RRC) Protocol specific (Release 15).
Sep. 17, 2017 3GPP TSG-RAN WG1 NR Ad Hoc #3—Ericsson "On semi-persistent CSI reporting on PUSCH".
3GPP TS 36.211 V14.4.0 (Sep. 2017), Technical Specification, 3rd Generation Partnership Project; Technical Specification Group Radio Access Network; Evolved Universal Terrestrial Radio Access (E-UTRA); Physical Channels and Modulation (Release 14).
3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding (Release 14).
3GPP TS 36.212 V14.4.0 (Sep. 2017), Technical Specification, 3rd Generation Partnership Project; Technical Specification Group Radio Access Network; Evolved Universal Terrestrial Radio Access (E-UTRA); Multiplexing and Channel Coding (Release 14).
3GPP TS 36.213 V14.4.0 (Sep. 2017), Technical Specification, 3rd Generation Partnership Project; Technical Specification Group Radio Access Network; Evolved Universal Terrestrial Radio Access (E-UTRA); Physical Layer Procedures (Release 14).

(56) References Cited

OTHER PUBLICATIONS

3GPP TS 36.300 V14.4.0 (Sep. 2017), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14).
3GPP TS 36.321 V14.4.0 (Sep. 2017), Technical Specification, 3rd Generation Partnership Project; Technical Specification Group Radio Access Network; Evolved Universal Terrestrial Radio Access (E-UTRA); Medium Access Control (MAC) protocol Specification (Release 14).
3GPP TS 38.212 V15.0.0 (Dec. 2017), Technical Specification, 3rd Generation Partnership Project; Technical Specification Group Radio Access Network; NT; Multiplexing and Channel Coding (Release 15).
3GPP TS 38.213 V2.0.0 (Dec. 2017), Technical Specification, 3rd Generation Partnership Project; Technical Specification Group Radio Access Network; NR; Physical Layer Procedures for Control (Release 15).
3GPP TS 38.300 V2.0.0 (Dec. 2017), Technical Specification, 3rd Generation Partnership Project; Technical Specification Group Radio Access Network; NR; NR and NG-RAN Overall Description; Stage 2 (Release 15).
3GPP TS 38.321 V2.0.0 (Dec. 2017), Technical Specification, 3rd Generation Partnership Project; Technical Specification Group Radio Access Network; NR; Medium Access Control (MAC) Protocol Specification (Release 15).
3GPP TS 38.331 V15.0.0 (Dec. 2017), Technical Specification, 3rd Generation Partnership Project; Technical Specification Group Radio Access Network; NR; Radio Resource Control (RRC) Protocol Specification (Release 15).
3GPP TSG RAN WG1 Meeting #90bis, Prague, Czech Republic, Oct. 9-13, 2017, Title: RAN1 Chairman's Notes.
3GPP TS 38.213 V1.2.1 (Dec. 2017), Technical Specification, 3rd Generation Partnership Project; Technical Specification Group Radio Access Network; NR; Physical Layer Procedures for Control (Release 15).
3GPP TS 38.214 V1.2.1 (Dec. 2017), Technical Specification, 3rd Generation Partnership Project; Technical Specification Group Radio Access Network; NR; Physical Layer Procedures for Data (Release 15).
R2-180xxxx 3GPP TSG RAN WG2 Meeting #101, Sanya, China, Apr. 16-20, 2018, Source: Nokia, Nokia Shanghai Bell, Title: Running MAC CR for euCA.
R1-1803571 3GPP TSG RAN WG1 Meeting #92bis, Sanya, China, Apr. 16-20, 2018, Source: MCC Support, Title: Final Report of 3GPP TSG RAN WG1 #92 v1.0.0.
R1-1721510 3GPP TSG RAN WG1 Meeting #91, Reno, USA, Nov. 27-Dec. 1, 2017, Source: NTT Docomo, Inc., Title: Offline summary for AI 7.3.3.4 UL data transmission procedure.
R1-1709907 3GPP TSG-RAN WG1 NR Ad Hoc, Qingdao, China, Jun. 27-30, 2017, Source: Xinwei, Title: Discussion on Beam Failure Recovery.
R1-1709929 3GPP TSG-RAN WG1 NR Ad Hoc, Qingdao, China, Jun. 27-30, 2017, Source: Huawei, HiSilicon, Title: General views on beam failure recovery.
R1-1710058 3GPP TSG-RAN WG1 NR Ad Hoc, Qingdao, China, Jun. 27-30, 2017, Source: CATT, Title: Considerations on DL beam failure and recovery.
R1-1710283 3GPP TSG-RAN WG1 NR Ad Hoc, Qingdao, China, Jun. 27-30, 2017, Source: LG Electronics, Title: Discussion on beam failure recovery.
R1-1710400 3GPP TSG-RAN WG1 NR Ad Hoc, Qingdao, China, Jun. 27-30, 2017, Source: vivo, Title: Beam failure recovery procedure.
R1-1710596 3GPP TSG-RAN WG1 NR Ad Hoc, Qingdao, China, Jun. 27-30, 2017, Source: Lenovo, Motorola Mobility, Title: Discussion of beam recovery procedure.
R1-1710810 3GPP TSG-RAN WG1 NR Ad Hoc, Qingdao, China, Jun. 27-30, 2017, Source: MediaTek Inc., Title: Mechanism for flexible beam failure recovery.
R1-1710926 3GPP TSG-RAN WG1 NR Ad Hoc, Qingdao, China, Jun. 27-30, 2017, Source: InterDigital, Inc., Title: On Remaining Details of Beam Failure Recovery.
R1-1711017 3GPP TSG-RAN WG1 NR Ad Hoc, Qingdao, China, Jun. 27-30, 2017, Source: Ericsson, Title: Mechanism to recover from beam failure.
R1-1711291 3GPP TSG-RAN WG1 NR Ad Hoc, Qingdao, China, Jun. 27-30, 2017, Source: Nokia, Alcatel-Lucent Shanghai Bell, Title: Beam Recovery.
R1-1712153 3GPP TSG RAN WG1 Meeting #90, Prague, Czech Republic, Aug. 21-25, 2017, Source: Huawei, HiSilicon, Title: Overview of bandwidth part.
R1-1713204 3GPP TSG RAN WG1 Meeting #90, Prague, Czech Republic, Aug. 21-25, 2017, Source: LG Electronics, Title: Further remaining details on wider bandwidth operation.
R1-1713978 3GPP TSG RAN WG1 Meeting #90, Prague, Czech Republic, Aug. 21-25, 2017, Source: MediaTek Inc., Title: Further Details on Bandwidth Part Operation in NR.
R1-1715439 3GPP TSG RAN WG1 Meeting NR Ad Hoc, Nagoya, Japan, Sep. 18-21, 2017, Source: ZTE, Sanechips, Title: Remaining details on CSI reporting.
R1-1715858 3GPP TSG RAN WG1 Meeting NR Ad Hoc, Nagoya, Japan, Sep. 18-21, 2017, Source: LG Electronics, Title: Discussions on CSI reporting.
R1-1715939 3GPP TSG RAN WG1 Meeting NR Ad Hoc, Nagoya, Japan, Sep. 18-21, 2017, Source: Samsung, Title: CSI reporting and UCI multiplexing.
R1-1716349 3GPP TSG RAN WG1 Meeting NR Ad Hoc, Nagoya, Japan, Sep. 18-21, 2017, Source: Ericsson, Title: On CSI reporting.
R1-1716357 3GPP TSG RAN WG1 Meeting NR Ad Hoc, Nagoya, Japan, Sep. 18-21, 2017, Source: Ericsson, Title: On semi-persistent CSI reporting on PUSCH.
R1-1716901 3GPP TSG RAN WG1 Meeting NR Ad Hoc, Nagoya, Japan, Sep. 18-21, 2017, Source: Samsung, Ericsson, Huawei, HiSilicon, ZTE, Sanechips, Mediatek, NTT Docomo, Nokia, Nokia Shanghai Bell, KDDI, Vodafone, CEWiT, IITH, IITM, Tejas Networks, Verizon, Deutsche Telekom, Softbank, CHTTL, NEC, WILUS, Sharp, China Unicom, ITL, KRRI, CMCC, ASTRI, KT Corporation, BT, Sprint, LG Electronics, AT&T, Title: WF for Open Issues on CSI Reporting.
R1-1717300 3GPP TSG RAN WG1 Meeting #90bis, Prague, Czech Republic, Oct. 9-13, 2017, Source: Huawei, HiSilicon, Title: Details of CSI reporting on PUCCH/PUSCH.
R1-1717367 3GPP TSG RAN WG1 Meeting #90bis, Prague, Czech Republic, Oct. 9-13, 2017, Source: Intel Corporation, Title: Remaining issues on CSI reporting.
R1-1717423 3GPP TSG RAN WG1 Meeting #90bis, Prague, Czech Republic, Oct. 9-13, 2017, Source: ZTE, Sanechips, Title: Remaining details on CSI reporting.
R1-1717471 3GPP TSG RAN WG1 Meeting #90bis, Prague, Czech Republic, Oct. 9-13, 2017, Source: vivo, Title: Discussion on CSI reporting.
R1-1717604 3GPP TSG RAN WG1 Meeting #90bis, Prague, Czech Republic, Oct. 9-13, 2017, Source: Samsung, Title: CSI reporting and UCI multiplexing.
R1-1717811 3GPP TSG RAN WG1 Meeting #90bis, Prague, Czech Republic, Oct. 9-13, 2017, Source: CATT, Title: Remaining issues on CSI reporting.
R1-1717940 3GPP TSG RAN WG1 Meeting #90bis, Prague, Czech Republic, Oct. 9-13, 2017, Source: LG Electronics, Title: Discussions on CSI reporting.
R1-1718191 3GPP TSG RAN WG1 Meeting #90bis, Prague, Czech Republic, Oct. 9-13, 2017, Source: NTT Docomo, Inc., Title: Remaining Issues on Feedback Design for CSI Type I and Type II.
R1-1720903 3GPP TSG RAN WG1 Meeting #91, Reno, USA, Nov. 27-Dec. 1, 2017, Source: ASUSTeK, Title: Power control on SRS for beam management.
R1-1720915 3GPP TSG RAN WG1 Meeting #91, Reno, USA, Nov. 27-Dec. 1, 2017, Source: China Telecom, Title: Discussion on Power Offset for SUL.

(56) References Cited

OTHER PUBLICATIONS

R1-1720928 3GPP TSG RAN WG1 Meeting #91, Reno, USA, Nov. 27-Dec. 1, 2017, Source: Motorola Mobility, Lenovo, Title: On non-CA NR UL power control.
R1-1721027 3GPP TSG RAN WG1 Meeting #91, Reno, USA, Nov. 27-Dec. 1, 2017, Source: Ericsson, Title: On Carrier aggregation related aspects.
R1-1721028 3GPP TSG RAN WG1 Meeting #91, Reno, USA, Nov. 27-Dec. 1, 2017, Source: Ericsson, Title: Remaining issues for NR power control framework.
R1-1721030 3GPP TSG RAN WG1 Meeting #91, Reno, USA, Nov. 27-Dec. 1, 2017, Source: Ericsson, Title: Power headroom reporting.
R1-1721031 3GPP TSG RAN WG1 Meeting #91, Reno, USA, Nov. 27-Dec. 1, 2017, Source: Ericsson, Title: Remaining issues of closed loop power control in NR.
R1-1721032 3GPP TSG RAN WG1 Meeting #91, Reno, USA, Nov. 27-Dec. 1, 2017, Source: Ericsson, Title: Remaining issues of PUSCH power control.
R1-1721033 3GPP TSG RAN WG1 Meeting #91, Reno, USA, Nov. 27-Dec. 1, 2017, Source: Ericsson, Title: Remaining issues of PUCCH power control.
R1-1721034 3GPP TSG RAN WG1 Meeting #91, Reno, USA, Nov. 27-Dec. 1, 2017, Source: Ericsson, Title: Remaining issues of SRS power control.
R1-1721038 3GPP TSG RAN WG1 Meeting #91, Reno, USA, Nov. 27-Dec. 1, 2017, Source: Nokia, Nokia Shanghai Bell, Title: Remaining details on NR power control framework.
3GPP TS 38.212 V1.2.1 (Dec. 2017), Technical Specification, 3rd Generation Partnership Project; Technical Specification Group Radio Access Network; NR; Multiplexing and Channel Coding (Release 15).
R1-1721371 3GPP TSG RAN WG1 Meeting #91, Reno, USA, Nov. 27-Dec. 1, 2017, Source: ZTE, Sanechips, Title: Summary of remaining issues on CSI measurement.
R1-1721451 3GPP TSG RAN WG1 Meeting #91, Reno, USA, Nov. 27-Dec. 1, 2017, Source: Ericsson, Title: Summary of views on CSI reporting.
R1-1800879 3GPP TSG RAN WG1 NR Ad Hoc, Vancouver, Canada, Jan. 22-26, 2018, Source: Qualcomm Incorporated, Title: Remaining Issues on BWP.
R1-1803301 3GPP TSG RAN WG1 Meeting #92, Athens, Greece, Feb. 26-Mar. 2, 2018, Source: Ericsson, Title: Summary of CSI reporting v3.
R2-1706680 3GPP TSG-RAN WG2 NR Ad Hoc, Qingdao, China, Jun. 27-30, 2017, Source: AT&T, Title: Beam Failure Recovery Mechanism and RLF.
R2-1713170 3GPP TSG RAN WG2 Meeting #100, Reno, USA, Nov. 27-Dec. 1, 2017, Source: Nokia (rapporteur), Title: Report of [99bis#32][LTE/euCA] Faster activation for Scells (Nokia).
R2-1714289 3GPP TSG RAN WG2 Meeting #100, Reno, USA, Nov. 27-Dec. 1, 2017, Source: Nokia, Nokia Shanghai Bell, Title: Running CR for euCA Stage-2.
R2-1801432 3GPP TSG RAN WG2 NR Ad Hoc, Vancouver, Canada, Jan. 22-26, 2018, Source: Qualcomm Incorporated, Title: Dormant BWP for fast SCell activation.
R2-1802756 3GPP TSG RAN WG2 Meeting #101, Athens, Greece, Feb. 26-Mar. 2, 2018, Source: Nokia, Nokia Shanghai Bell, Title: Remaining details on temporary CQI reporting during activation.
R2-1803564 3GPP TSG RAN WG2 Meeting #101, Athens, Greece, Feb. 26-Mar. 2, 2018, Source: Qualcomm Incorporated, Title: Dormant BWP for fast SCell activation.
R2-1806774 3GPP TSG RAN WG2 Meeting #102, Busan, Korea, May 21-25, 2018, Source: Nokia, Nokia Shanghai Bell, Title: Finalization of dormant Scell state.
R2-1806924 3GPP TSG RAN WG2 Meeting #102, Busan, Korea, May 21-25, 2018, Source: Qualcomm Incorporated, Title: SCell Dormant State Transitions based on New Timers & MAC-CEs.
R2-1807481 3GPP TSG RAN WG2 Meeting #102, Busan, Korea, May 21-25, 2018, Source: Huawei, HiSilicon, Title: Remaining issues of temporary CQI reporting.
R2-1808570 3GPP TSG RAN WG2 Meeting #102, Busan, Korea, May 21-25, 2018, Source: Qualcomm Incorporated, Title: Dormant BWP for fast SCell activation.
R2-1808809 3GPP TSG RAN WG2 Meeting #102, Busan, Korea, May 21-25, 2018, Source: Ericsson, Title: CR on Dormat SCell state transition MAC CE.
R2-1810063 3GPP TSG RAN WG2 NR Ad Hoc, Busan, Korea, Jul. 2-6, 2018, Source: Ericsson, Title: Dormant SCell state in NR.
3GPP TSG-RAN WG2 NR Ad Hoc, Qingdao, China, Jun. 27-30, 2017, Source: RAN2 Chairman (Intel), Title: Chairman Notes.
3GPP TS 38.211 V2.0.0 (Dec. 2017), Technical Specification, 3rd Generation Partnership Project; Technical Specification Group Radio Access Network; NR; Physical Channels and Modulation (Release 15).
3GPP TS 38.214 V2.0.0 (Dec. 2017), Technical Specification, 3rd Generation Partnership Project; Technical Specification Group Radio Access Network; NR; Physical Layer Procedures for Data (Release 15).
3GPP TS 38.331 V1.0.0 (Dec. 2017), Technical Specification, 3rd Generation Partnership Project; Technical Specification Group Radio Access Network; NR; Radio Resource Control (RRC) Protocol Specification (Release 15).
RP-181344 3GPP TSG RAN Meeting #80, La Jolla, USA, Jun. 11-14, 2018, Source: Ericsson, Nokia, Nokia Shanghai Bell, Huawei, Title: New WID on MR-DC enhancements (NR_MRDC_Enh).
3GPP TS 38.331 V0.4.0 (Dec. 2017), Technical Specification, 3rd Generation Partnership Project; Technical Specification Group Radio Access Network; NR; Radio Resource Control (RRC) Protocol Specification (Release 15).
R1-18xxxx 3GPP TSG RAN WG1 Meeting #95, Spokane, USA, Nov. 12-16, 2018, Source: OPPO, Title: Summary of RAN1#95 Tdocs on UCI enhancements for URLLC.
3GPP TS 38.213 V15.2.0 (Jun. 2018), Technical Specification, 3rd Generation Partnership Project; Technical Specification Group Radio Access Network; NR; Physical layer procedures for control (Release 15).
3GPP TS 38.321 V15.2.0 (Jun. 2018), Technical Specification, 3rd Generation Partnership Project; Technical Specification Group Radio Access Network; NR; Medium Access Control (MAC) protocol specification (Release 15).
3GPP TS 38.331 V15.2.1 (Jun. 2018), Technical Specification, 3rd Generation Partnership Project; Technical Specification Group Radio Access Network; NR; Radio Resource Control (RRC) protocol specification (Release 15).
Lagent, et al., "New Radio Beam-Based Access to Unlicensed Spectrum: Design Challenges and Solutions," InterDigital Communications, Inc., Melville, New York, USA, Sep. 27, 2018.
R1-1701260 3GPP TSG RAN WG1 NR Ad Hoc, Spokane, USA, Jan. 16-20, 2017, Source: ZTE, ZTE Microelectronics, Title: WF on 2-step RACH.
R1-1613547 3GPP TSG RAN WG1 Metting #87, Reno, USA, Nov. 14-18, 2016, Source: Nokia, InterDigital, Title: Way Forward on Two-Step RACH Fallback.
R1-1613548 3GPP TSG RAN WG1 Metting #87, Reno, USA, Nov. 14-18, 2016, Source: Nokia, Title: Way Forward on Two-Step RACH Procedure.
R1-1613685 3GPP TSG RAN WG1 Metting #87, Reno, USA, Nov. 14-18, 2016, Source: Nokia, ASB, MediaTek, Ericson, Title: Way Forward on Two-Step RACH Procedure.
R1-1611274 3GPP TSG RAN WG1 Metting #87, Reno, USA, Nov. 14-18, 2016, Source: ZTE Corporation, ZTE Microelectronics, Title: On 2-Step RACH Procedure in NR.
R1-1611694 3GPP TSG RAN WG1 Metting #87, Reno, USA, Nov. 14-18, 2016, Source: Huawei, HiSilicon, Title: Considerations on NR RACH Preamble and Channel Design.
R1-1612033 3GPP TSG RAN WG1 Metting #87, Reno, USA, Nov. 14-18, 2016, Source: Qualcomm Incorporated, Title: 2 step and 4 step RACH.

(56) References Cited

OTHER PUBLICATIONS

R1-1612068 3GPP TSG RAN WG1 Metting #87, Reno, USA, Nov. 14-18, 2016, Source: Qualcomm Incorporated, Title: UE Power Evaluation for DRX with Wake-Up Signaling.
R1-1612142 3GPP TSG RAN WG1 Metting #87, Reno, USA, Nov. 14-18, 2016, Source: MediaTek Inc., Title: Considerations on 2-step RACH physical channel design.
R1-1612218 3GPP TSG RAN WG1 Metting #87, Reno, USA, Nov. 14-18, 2016, Source: ETRI, Title: On 2-step RACH procedure for high speed train scenario for NR.
R1-1612299 3GPP TSG RAN WG1 Metting #87, Reno, USA, Nov. 14-18, 2016, Source: Nokia, Alcatel-Lucent Shanghai Bell, Title: Random access principles for new radio.
R1-1808612 3GPP TSG RAN WG1 Meeting #94, Gothenburg, Sweden, Aug. 20-24, 2018, Source: Apple Inc., Title: On DL Signals and Channels for NR-U.
R1-1808683 3GPP TSG RAN WG1 Meeting #94, Gothenburg, Sweden, Aug. 20-24, 2018, Source: Intel Corporation, Title: Enhancements to NR DL signals and channels for unlicensed operation.
R1-1809477 3GPP TSG RAN WG1 Meeting #94, Gothenburg, Sweden, Aug. 20-24, 2018, Source: Qualcomm Incorporated, Title: DL signals and channels for NR-U.
R1-1810154 3GPP TSG RAN WG1 Meeting #94bis, Chengdu, China, Oct. 8-12, 2018, Source: Huawei, HiSilicon, Title: Power consumption reduction based on time/frequency/antenna adaptation.
R1-1810338 3GPP TSG RAN WG1 Meeting #94bis, Chengdu, China, Oct. 8-12, 2018, Source: ZTE, Title: Consideration on UE adaptation to the traffic and UE power consumption characteristics.
R1-1810413 3GPP TSG RAN WG1 Meeting #94bis, Chengdu, China, Oct. 8-12, 2018, Source: vivo, Title: Techniques on UE adaptation to the traffic and UE power consumption characteristics.
R1-1810448 3GPP TSG RAN WG1 Meeting #94bis, Chengdu, China, Oct. 8-12, 2018, Source: MediaTek Inc., Title: UE adaptation to the traffic and UE power consumption characteristics.
R1-1810468 3GPP TSG RAN WG1 Meeting #94bis, Chengdu, China, Oct. 8-12, 2018, Source: Panasonic, Title: Discussion on UE traffic adaptation and power consumption characteristics.
R1-1810562 3GPP TSG RAN WG1 Meeting #94bis, Chengdu, China, Oct. 8-12, 2018, Source: CATT, Title: UE Power Saving Scheme with Multi-dimensional Adaptation.
R1-1810795 3GPP TSG RAN WG1 Meeting #94bis, Chengdu, China, Oct. 8-12, 2018, Source: Intel Corporation, Title: UE Adaptation to the traffic and UE power consumption characteristics.
R1-1810892 3GPP TSG RAN WG1 Meeting #94bis, Chengdu, China, Oct. 8-12, 2018, Source: Samsung, Title: Discussion on UE adaptation schemes.
R1-1811050 3GPP TSG RAN WG1 Meeting #94bis, Chengdu, China, Oct. 8-12, 2018, Source: CMCC, Title: Considerations for UE power saving.
R1-1811127 3GPP TSG RAN WG1 Meeting #94bis, Chengdu, China, Oct. 8-12, 2018, Source: Apple Inc., Title: Network-indication based Approaches for UE Power Saving.
R1-1812232 3GPP TSG RAN WG1 Meeting #95, Spokane, USA, Nov. 12-16, 2018, Source: Huawei, HiSilicon, Title: Design of power saving signal.
R1-1812331 3GPP TSG RAN WG1 Meeting #95, Spokane, USA, Nov. 12-16, 2018, Source: vivo, Title: Discussion on triggering adaptation of UE power consumption characteristics.
R1-1812362 3GPP TSG RAN WG1 Meeting #95, Spokane, USA, Nov. 12-16, 2018, Source: MediaTek Inc., Title: Triggering adaptation for UE power saving.
R1-1812422 3GPP TSG RAN WG1 Meeting #95, Spokane, USA, Nov. 12-16, 2018, Source: ZTE, Title: Considerations on triggering for UE power saving.
R1-1812514 3GPP TSG RAN WG1 Meeting #95, Spokane, USA, Nov. 12-16, 2018, Source: Intel Corporation, Title: Triggering UE adaptation to power consumption characteristics.
R1-1812591 3GPP TSG RAN WG1 Meeting #95, Spokane, USA, Nov. 12-16, 2018, Source: LG Electronics, Title: Discussion on power saving for CA operation.
R1-1812642 3GPP TSG RAN WG1 Meeting #95, Spokane, USA, Nov. 12-16, 2018, Source: CATT, Title: UE Power saving schemes with power saving signal/channel/procedures.
R1-1812750 3GPP TSG RAN WG1 Meeting #95, Spokane, USA, Nov. 12-16, 2018, Source: Sony, Title: Conditions and procedures for adaptation of power consumption characteristics.
R1-1812825 3GPP TSG RAN WG1 Meeting #95, Spokane, USA, Nov. 12-16, 2018, Source: OPPO, Title: Triggering Adaptation of UE Power Consumption Characteristics.
R1-1812890 3GPP TSG RAN WG1 Meeting #95, Spokane, USA, Nov. 12-16, 2018, Source: CMCC, Title: Considerations on power saving signal design.
R1-1812926 3GPP TSG RAN WG1 Meeting #95, Spokane, USA, Nov. 12-16, 2018, Source: Apple Inc., Title: Power Saving Techniques based on Explicit Indication.
R1-1813012 3GPP TSG RAN WG1 Meeting #95, Spokane, USA, Nov. 12-16, 2018, Source: Samsung, Title: Triggering adaptation schemes.
R1-1813076 3GPP TSG RAN WG1 Meeting #95, Spokane, USA, Nov. 12-16, 2018, Source: Spreadtrum Communications, Title: Discussion on triggering adaptation for UE power saving.
R1-1813183 3GPP TSG RAN WG1 Meeting #95, Spokane, USA, Nov. 12-16, 2018, Source: Ericsson, Title: Triggers of NR UE power saving.
R1-1813244 3GPP TSG RAN WG1 Meeting #95, Spokane, USA, Nov. 12-16, 2018, Source: InterDigital, Inc., Title: Discussion on Triggering of Power Mode Adaptation.
R1-1813448 3GPP TSG RAN WG1 Meeting #95, Spokane, USA, Nov. 12-16, 2018, Source: Qualcomm Incorporated, Title: Triggering Adaptation of UE Power Consumption Characteristics.
R1-1813495 3GPP TSG RAN WG1 Meeting #95, Spokane, USA, Nov. 12-16, 2018, Source: Panasonic, Title: Discussion on UE traffic adaptation procedures.
R1-1813516 3GPP TSG RAN WG1 Meeting #95, Spokane, USA, Nov. 12-16, 2018, Source: ASUSTeK, Title: Triggering adaptation of UE power consumption.
R1-1813621 3GPP TSG RAN WG1 Meeting #95, Spokane, USA, Nov. 12-16, 2018, Source: Nokia, Nokia Shanghai Bell, Title: On UE Power Saving Triggering Mechanisms.
R1-1813625 3GPP TSG RAN WG1 Meeting #95, Spokane, USA, Nov. 12-16, 2018, Source: Convida Wireless, Title: Triggering Adaptation of UE Power Consumption Characteristics.
R2-1700019 3GPP TSG RAN WG2 NR Ad Hoc, Spokane, USA, Jan. 17-19, 2017, Source: Samsung, Title: Random Access in NR—Flexible UE Bandwidth Aspects.
R2-1700023 3GPP TSG RAN WG2 NR Ad Hoc, Spokane, USA, Jan. 17-19, 2017, Source: ASUSTeK, Title: Consideration on use cases of 2-step RACH procedure.
R2-1700024 3GPP TSG RAN WG2 NR Ad Hoc, Spokane, USA, Jan. 17-19, 2017, Source: ASUSTeK, Title: Consideration on fallback of 2-step RACH procedure.
R2-1700089 3GPP TSG RAN WG2 NR Ad Hoc, Spokane, USA, Jan. 17-19, 2017, Source: Huawei, HiSilicon, Title: Considerations on RACH procedure in NR.
R2-1700103 3GPP TSG RAN WG2 NR Ad Hoc, Spokane, USA, Jan. 17-19, 2017, Source: National Instruments, Title: Considerations on the Random-Access Procedure in Massive MIMO NR.
R2-1700137 3GPP TSG RAN WG2 NR Ad Hoc, Spokane, USA, Jan. 17-19, 2017, Source: Sony, Title: 2-step RACH to 4-step RACH fallback.
R2-1700155 3GPP TSG RAN WG2 NR Ad Hoc, Spokane, USA, Jan. 17-19, 2017, Source: ZTE, ZTE Microelectronics, Title: Consideration on the two-step RACH in NR.
R2-1700202 3GPP TSG RAN WG2 NR Ad Hoc, Spokane, USA, Jan. 17-19, 2017, Source: CATT, Title: Design principles for random access procedure in NR.
R2-1700203 3GPP TSG RAN WG2 NR Ad Hoc, Spokane, USA, Jan. 17-19, 2017, Source: CATT, Title: Random access procedure in NR.

(56) References Cited

OTHER PUBLICATIONS

R2-1700204 3GPP TSG RAN WG2 NR Ad Hoc, Spokane, USA, Jan. 17-19, 2017, Source: CATT, Title: Impact of NR physical layer design on RA.
R2-1700205 3GPP TSG RAN WG2 NR Ad Hoc, Spokane, USA, Jan. 17-19, 2017, Source: CATT, Title: Consideration on 2-step RA.
R2-1700237 3GPP TSG RAN WG2 NR Ad Hoc, Spokane, USA, Jan. 17-19, 2017, Source: InterDigital Communications, Title: 2-Step Random Access Procedure in NR.
R2-1700335 3GPP TSG RAN WG2 NR Ad Hoc, Spokane, USA, Jan. 17-19, 2017, Source: Intel Corporation, Title: Further considerations of random access in NR.
R2-1700355 3GPP TSG RAN WG2 NR Ad Hoc, Spokane, USA, Jan. 17-19, 2017, Source: ASUSTeK, Title: Discussion on latency of random access in NR.
R2-1700356 3GPP TSG RAN WG2 NR Ad Hoc, Spokane, USA, Jan. 17-19, 2017, Source: ASUSTeK, MediaTek Inc., Title: Consideration on use cases of 2-step RACH procedure.
R2-1700357 3GPP TSG RAN WG2 NR Ad Hoc, Spokane, USA, Jan. 17-19, 2017, Source: Samsung, Title: Consideration on 2-step RACH.
R2-1700619 3GPP TSG RAN WG2 NR Ad Hoc, Spokane, USA, Jan. 17-19, 2017, Source: NTT Docomo, Inc., Title: Remaining RAN2 aspects on random access procedure for NR.
R1-1700035 3GPP TSG RAN WG1 NR Ad Hoc, Spokane, USA, Jan. 16-20, 2017, Source: Huawei, HiSilicon, Title: Further Consideration on two-step RACH.
R1-1700105 3GPP TSG RAN WG1 NR Ad Hoc, Spokane, USA, Jan. 16-20, 2017, Source: ZTE, ZTE Microelectronics, Title: 2-step Random Access Procedure.
R1-1700172 3GPP TSG RAN WG1 NR Ad Hoc, Spokane, USA, Jan. 16-20, 2017, Source: MediaTek Inc., Title: On 2-step random access procedure and physical channel in NR.
R1-1700186 3GPP TSG RAN WG1 NR Ad Hoc, Spokane, USA, Jan. 16-20, 2017, Source: CATT, Title: Further considerations on a 2-step RA Procedure.
R1-1700300 3GPP TSG RAN WG1 NR Ad Hoc, Spokane, USA, Jan. 16-20, 2017, Source: Ericsson, Title: NR two-step random access procedure.
R1-1700311 3GPP TSG RAN WG1 NR Ad Hoc, Spokane, USA, Jan. 16-20, 2017, Source: AT&T, Title: 2-Step RA Procedure for NR.
R1-1700426 3GPP TSG RAN WG1 NR Ad Hoc, Spokane, USA, Jan. 16-20, 2017, Source: ITRI, Title: Discussion on 2-step RA procedure issues.
R1-1700464 3GPP TSG RAN WG1 NR Ad Hoc, Spokane, USA, Jan. 16-20, 2017, Source: LG Electronics, Title: Discussion on 2 step RACH.
R1-1700577 3GPP TSG RAN WG1 NR Ad Hoc, Spokane, USA, Jan. 16-20, 2017, Source: ETRI, Title: On 2-step RA procedure for NR.
R1-1700587 3GPP TSG RAN WG1 NR Ad Hoc, Spokane, USA, Jan. 16-20, 2017, Source: HTC, Title: Design considerations for 2-step RACH.
R1-1700652 3GPP TSG RAN WG1 NR Ad Hoc, Spokane, USA, Jan. 16-20, 2017, Source: Nokia, Alcatel-Lucent Shanghai Bell, Title: On 2-step Random Access Procedure.
R1-1700668 3GPP TSG RAN WG1 NR Ad Hoc, Spokane, USA, Jan. 16-20, 2017, Source: Sony, Title: Discussions on 2 Steps RACH Procedure.
R1-1700703 3GPP TSG RAN WG1 NR Ad Hoc, Spokane, USA, Jan. 16-20, 2017, Source: InterDigital Communications, Title: 2-step random access procedure.
R1-1700792 3GPP TSG RAN WG1 NR Ad Hoc, Spokane, USA, Jan. 16-20, 2017, Source: Qualcomm Incorporated, Title: 2-step RACH procedure consideration.
R1-1700880 3GPP TSG RAN WG1 NR Ad Hoc, Spokane, USA, Jan. 16-20, 2017, Source: Motorola Mobility, Title: Physical channel design for 2-step RACH.
R1-1700892 3GPP TSG RAN WG1 NR Ad Hoc, Spokane, USA, Jan. 16-20, 2017, Source: Samsung, Title: NR 2-step random access procedure.
R1-1701275 3GPP TSG RAN WG1 NR Ad Hoc, Spokane, USA, Jan. 16-20, 2017, Source: ZTE, ZTE Microelectronics, MediaTek, Title: WF on 2-Step RACH.
R1-1703139 3GPP TSG RAN WG1 Meeting #88, Athens, Greece, Feb. 13-17, 2017, Source: Sony, Title: Wake Up Radio for NR.
R1-1704282 3GPP TSG RAN WG1 Meeting #88bis, Spokane, USA, Apr. 3-7, 2017, Source: Huawei, HiSilicon, Title: Considerations on 'wake-up signal' for eFeMTC.
R1-1704290 3GPP TSG RAN WG1 Meeting #88bis, Spokane, USA, Apr. 3-7, 2017, Source: Huawei, HiSilicon, Title: On 'wake-up signal' for paging and connected-mode DRX.
R1-1704531 3GPP TSG RAN WG1 Meeting #88bis, Spokane, USA, Apr. 3-7, 2017, Source: CATT, Title: UE Wakeup Mechanism and On-Demand Access for efeMTC UE Power Saving.
R1-1704532 3GPP TSG RAN WG1 Meeting #88bis, Spokane, USA, Apr. 3-7, 2017, Source: CATT, Title: UE Wakeup Mechanism and On-Demand Access for fNB-IoT UE Power Saving.
R1-1704693 3GPP TSG RAN WG1 Meeting #88bis, Spokane, USA, Apr. 3-7, 2017, Source: Intel Corporation, Title: DL Power Consumption Reduction for efeMTC.
R1-1704698 3GPP TSG RAN WG1 Meeting #88bis, Spokane, USA, Apr. 3-7, 2017, Source: Intel Corporation, Title: DL Power Consumption Reduction for feNB-IoT.
R1-1704845 3GPP TSG RAN WG1 Meeting #88bis, Spokane, USA, Apr. 3-7, 2017, Source: LG Electronics, Title: UE power consumption reduction by new physical channel in MTC.
R1-1704847 3GPP TSG RAN WG1 Meeting #88bis, Spokane, USA, Apr. 3-7, 2017, Source: LG Electronics, Title: UE power consumption reduction by new physical channel in NB-IoT.
R1-1705012 3GPP TSG RAN WG1 Meeting #88bis, Spokane, USA, Apr. 3-7, 2017, Source: Qualcomm Incorporated, Title: Efficient monitoring of DL control channels.
R1-1705017 3GPP TSG RAN WG1 Meeting #88bis, Spokane, USA, Apr. 3-7, 2017, Source: Qualcomm Incorporated, Title: Efficient monitoring of DL control channels.
R1-1705038 3GPP TSG RAN WG1 Meeting #88bis, Spokane, USA, Apr. 3-7, 2017, Source: Nokia, Alcatel-Lucent Shanghai Bell, Title: Signalling for efficient decoding of physical channels.
R1-1705043 3GPP TSG RAN WG1 Meeting #88bis, Spokane, USA, Apr. 3-7, 2017, Source: Nokia, Alcatel-Lucent Shanghai Bell, Title: Signalling for efficient decoding of physical channels.
R1-1705182 3GPP TSG RAN WG1 Meeting #88bis, Spokane, USA, Apr. 3-7, 2017, Source: Ericsson, Title: Power consumption reduction for paging and connected-mode DRX.
R1-1705192 3GPP TSG RAN WG1 Meeting #88bis, Spokane, USA, Apr. 3-7, 2017, Source: Ericsson, Title: Power consumption reduction for paging and connected-mode DRX.
R1-1705204 3GPP TSG RAN WG1 Meeting #88bis, Spokane, USA, Apr. 3-7, 2017, Source: Sony, Title: MTC UE Power Consumption Reduction in Idle Mode Paging.
R1-1705305 3GPP TSG RAN WG1 Meeting #88bis, Spokane, USA, Apr. 3-7, 2017, Source: Samsung, Title: Power consumption reduction for paging and connected-mode DRX for eMTC.
R1-1705309 3GPP TSG RAN WG1 Meeting #88bis, Spokane, USA, Apr. 3-7, 2017, Source: Samsung, Title: Power consumption reduction for paging and connected-mode DRX for NB-IOT.
R1-1705494 3GPP TSG RAN WG1 Meeting #88bis, Spokane, USA, Apr. 3-7, 2017, Source: ZTE, ZTE Microelectronics, Title: Power consumption reduction for physical channels for MTC.
R1-1705495 3GPP TSG RAN WG1 Meeting #88bis, Spokane, USA, Apr. 3-7, 2017, Source: ZTE, ZTE Microelectronics, Title: Power consumption reduction for physical channels for NB-IoT.
R1-1706882 3GPP TSG RAN WG1 Meeting #89, Hangzhou, P.R. China, May 15-19, 2017, Source: Ericsson, Title: Downlink channel power efficiency for MTC.
R1-1707018 3GPP TSG RAN WG1 Meeting #89, Hangzhou, P.R. China, May 15-19, 2017, Source: Huawei, HiSilicon, Title: On 'wake-up signal' for eFeMTC.

(56) References Cited

OTHER PUBLICATIONS

R1-1707101 3GPP TSG RAN WG1 Meeting #89, Hangzhou, P.R. China, May 15-19, 2017, Source: ZTE, Title: Power consumption reduction for physical channels for MTC.

R1-1707315 3GPP TSG RAN WG1 Meeting #89, Hangzhou, P.R. China, May 15-19, 2017, Source: Intel Corporation, Title: Analysis of impact of Wake-up signaling on power consumption and resource efficiency for efeMTC.

R1-1707455 3GPP TSG RAN WG1 Meeting #89, Hangzhou, P.R. China, May 15-19, 2017, Source: CATT, Title: UE Wakeup Mechanism and On-Demand Access for efeMTC UE Power Saving.

R1-1707568 3GPP TSG RAN WG1 Meeting #89, Hangzhou, P.R. China, May 15-19, 2017, Source: LG Electronics, Title: UE power consumption reduction by new physical signal/channel in MTC.

R1-1707862 3GPP TSG RAN WG1 Meeting #89, Hangzhou, P.R. China, May 15-19, 2017, Source: Nokia, Alcatel-Lucent Shanghai Bell, Title: Signalling for efficient decoding of physical channels.

R1-1708311 3GPP TSG RAN WG1 Meeting #89, Hangzhou, P.R. China, May 15-19, 2017, Source: Sierra Wireless, Title: Idle Mode Power Efficiency Reduction.

R1-1708796 3GPP TSG RAN WG1 Meeting #89, Hangzhou, P.R. China, May 15-19, 2017, Source: Qualcomm Incorporated, Title: Efficient monitoring of DL control channels.

R1-1712106 3GPP TSG RAN WG1 Meeting #90, Prague, Czech Republic, Aug. 21-25, 2017, Source: Huawei, HiSilicon, Title: On power-saving signal for eFeMTC.

R1-1804405 3GPP TSG RAN WG1 Meeting #92, Sanya, China, Apr. 16-20, 2018, Source: Samsung, Title: Potential physical layer procedures for NR-U.

R1-1808272 3GPP TSG RAN WG1 Meeting #94, Gothenburg, Sweden, Aug. 20-24, 2018, Source: MediaTek Inc., Title: On downlink transmission detection in NR-U.

R1-1808319 3GPP TSG RAN WG1 Meeting #94, Gothenburg, Sweden, Aug. 20-24, 2018, Source: ZTE, Title: Considerations on DL reference signals and channels design for NR-U.

\* cited by examiner

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 18

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 19

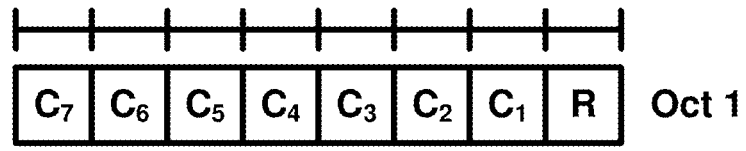
FIG. 21A
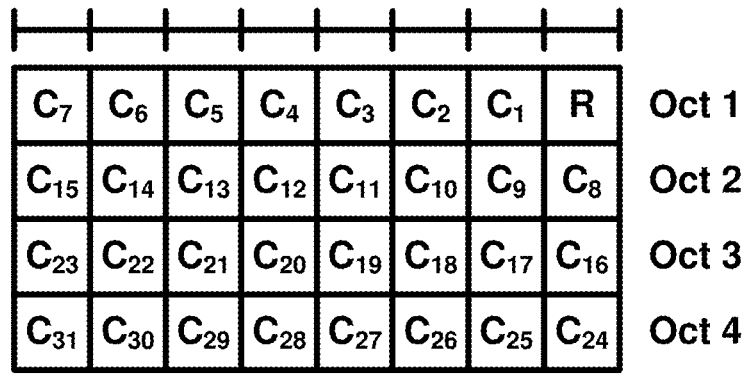
FIG. 21B
| Hibernation MAC CE $C_i$ | Activation/ Deactivation MAC CE $C_i$ | SCell may be |
|---|---|---|
| 0 | 0 | Deactivated |
| 0 | 1 | Activated |
| 1 | 0 | Reserved MAC CE combination |
| 1 | 1 | Dormant |
FIG. 21C

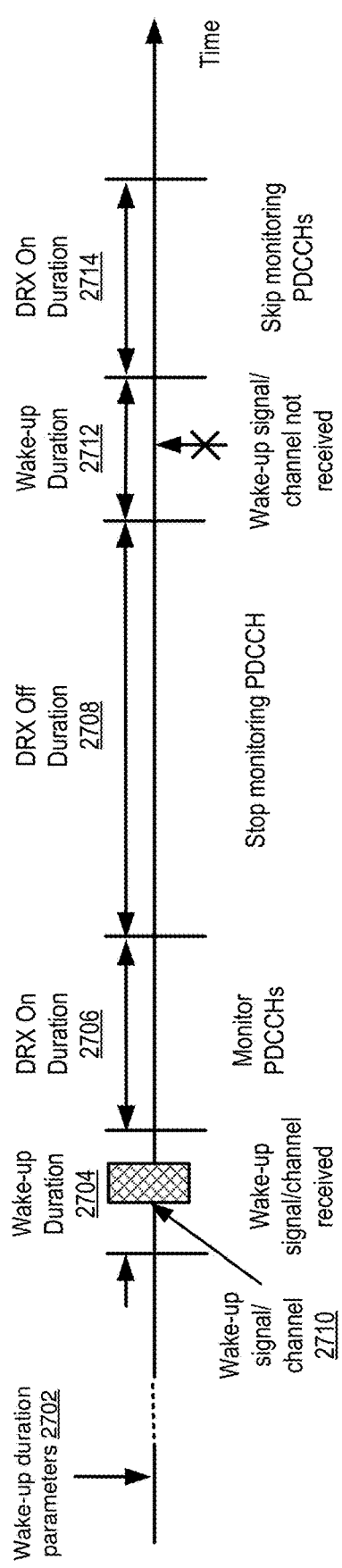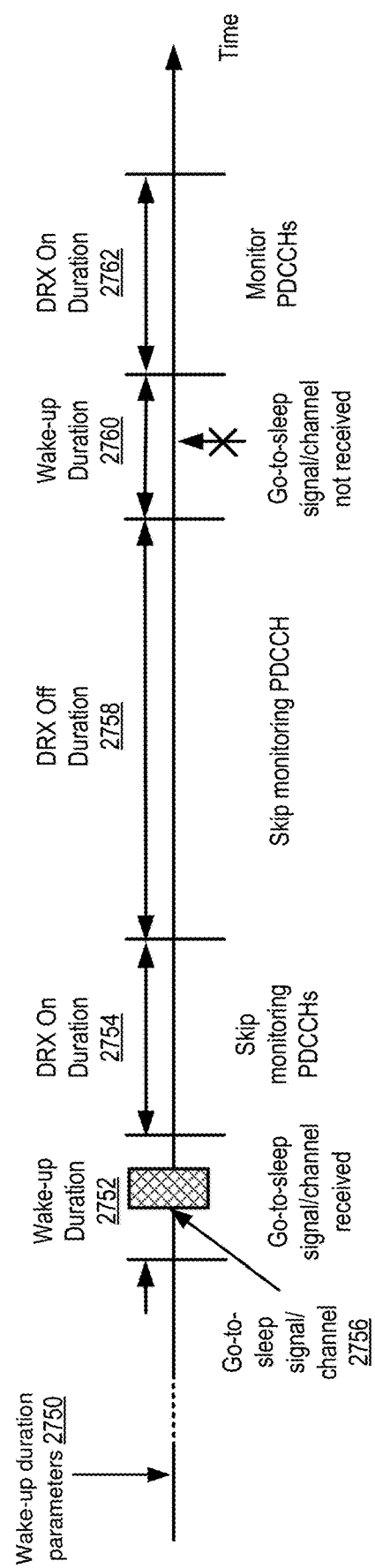

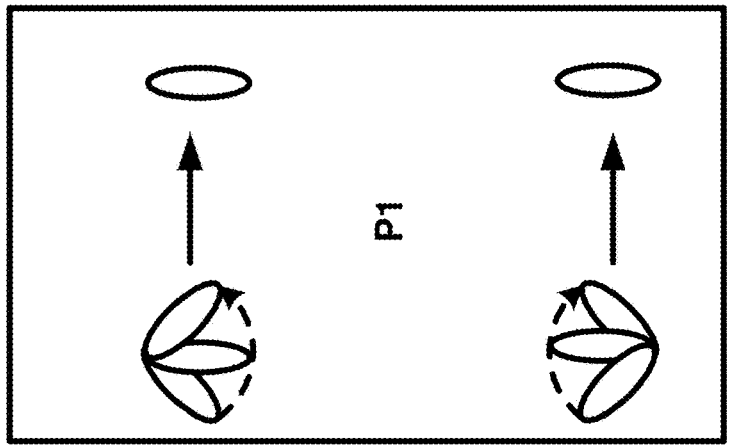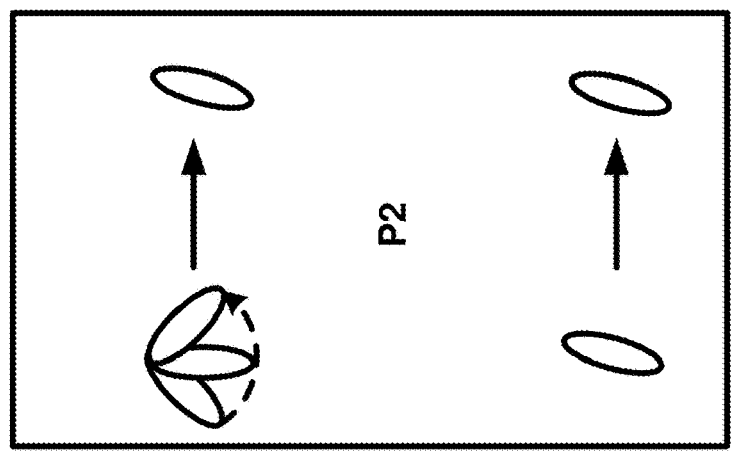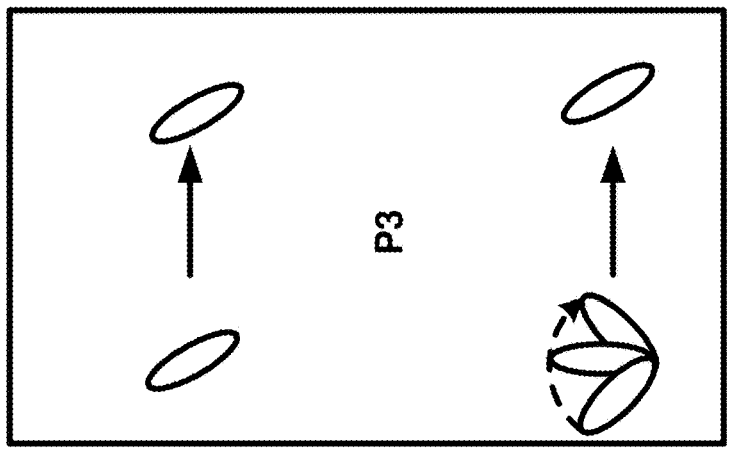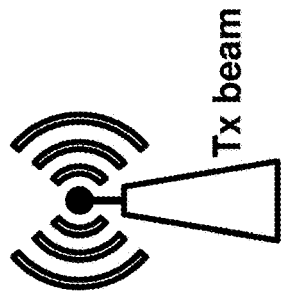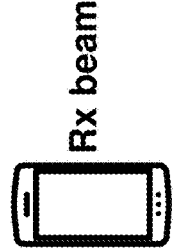
FIG. 36

| | DCI format | Example size (Bits) | Usage |
|---|---|---|---|
| Uplink | 0 | 45 | Uplink scheduling grant |
| | 4 | 53 | Uplink scheduling grant with spatial multiplexing |
| | 6-0A, 6-0B | 46, 36 | Uplink scheduling grant for eMTC devices |
| Downlink | 1C | 31 | Special purpose compact assignment |
| | 1A | 45 | Contiguous allocation only |
| | 1B | 46 | Codebook-based beamforming using CRS |
| | 1D | 46 | MU-MIMO using CRS |
| | 1 | 55 | Flexible allocations |
| | 2A | 64 | Open-loop spatial multiplexing using CRS |
| | 2B | 64 | Dual-layer transmission using DM-RS (TM8) |
| | 2C | 66 | Multi-layer transmission using DM-RS (TM9) |
| | 2D | 68 | Multi-layer transmission using DM-RS (TM9) |
| | 2 | 67 | Closed-loop spatial multiplexing using CRS |
| | 6-1A, 6-1B | 46, 36 | Downlink scheduling grants for eMTC devices |
| Special | 3, 3A | 45 | Power control commands |
| | 5 | | Sidelink operation |
| | 6-2 | | Paging/direct indication for eMTC devices |

FIG. 39

ACTIVATION AND DEACTIVATION OF POWER SAVING OPERATION

CROSS-REFERENCE TO RELATED APPLICATIONS

This application is a continuation of and claims priority to U.S. patent application Ser. No. 16/577,847, filed Sep. 20, 2019, which claims the benefit of U.S. Provisional Application No. 62/734,561 filed Sep. 21, 2018, and U.S. Provisional Application No. 62/790,306, filed Jan. 9, 2019. Each of the above-referenced applications is hereby incorporated by reference in its entirety.

BACKGROUND

Wireless communication protocols may use power saving mechanisms for power conservation. A device and/or a system may switch between a power saving mode and an active mode for different types of services. Switching between different modes may require additional consumption of resources (e.g., frequency resources, time resources, energy resources) at the communication device. This may lead system inefficiencies.

SUMMARY

The following summary presents a simplified summary of certain features. The summary is not an extensive overview and is not intended to identify key or critical elements.

A first communication device (e.g., a wireless device) may switch between an active state (e.g., active mode) and one or more power saving states (e.g., power saving mode). The first communication device may switch between the different power saving states and/or the active state, for example, based on data service and/or data traffic. The first communication device may receive, from a second communication device (e.g., a base station), one or more first messages comprising one or more power saving configurations. The first communication device may receive, from the second communication device, a second message indicating a power saving configuration of the one or more power saving configurations. Based on receiving the second message, the first communication device may switch between an active state to a power saving state and/or monitor a power saving channel in the power saving mode. The first communication device may receive (e.g., from the second communication device) a wake-up indication via the power saving channel. Using the second message to indicate a switch to the power saving state may improve resource utilization in a communication system.

BRIEF DESCRIPTION OF THE DRAWINGS

Some features are shown by way of example, and not by limitation, in the accompanying drawings. In the drawings, like numerals reference similar elements.

FIG. 18 shows an example of LCIDs for DL-SCH.

FIG. 19 shows an example of LCIDs for UL-SCH.

FIG. 21A shows an example of an SCell hibernation MAC control element (CE).

FIG. 21B shows an example of an SCell hibernation MAC CE.

FIG. 21C shows an example of MAC CEs for SCell state transitions.

FIG. 27A shows an example of a wake-up signal/channel based power saving operation.

FIG. 27B shows an example of a go-to-sleep signal/channel based power saving operation.

FIG. 36 shows an example of various beam management procedures.

FIG. 39 shows an example of DCI formats.

DETAILED DESCRIPTION

Figure 1:
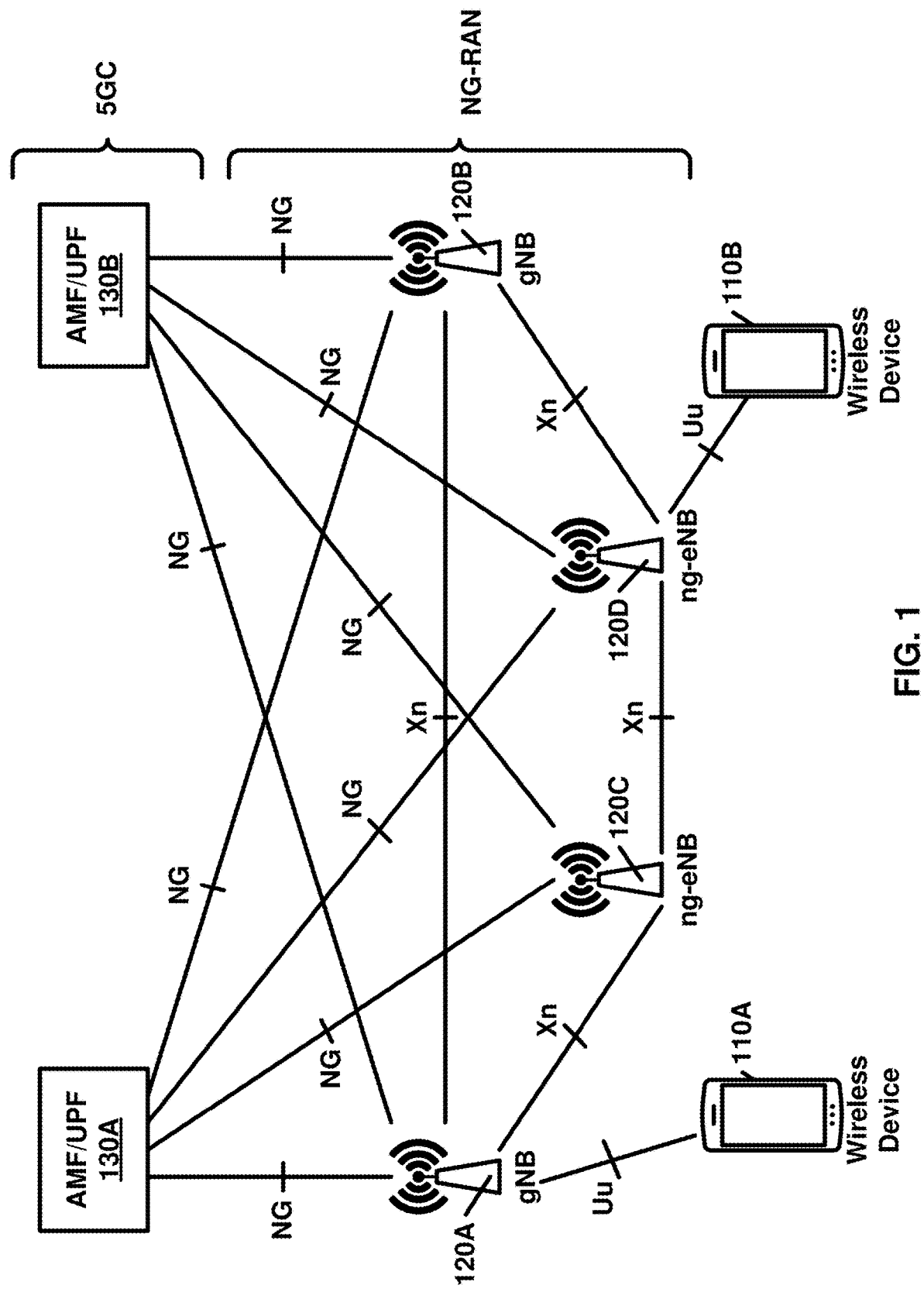
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to resource management for wireless communications.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CE Control Element
CN Core Network
CORESET Control Resource Set
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CRI CSI-RS resource indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LI Layer Indicator
LTE Long Term Evolution
MAC Medium Access Control
MCG Master Cell Group
MCS Modulation and Coding Scheme
MeNB Master evolved Node B
MIB Master Information Block
MME Mobility Management Entity
MN Master Node j
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QCLed Quasi-Co-Located
QCL Quasi-Co-Location
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RLM Radio Link Monitoring
RNTI Radio Network Temporary Identifier
RRC Radio Resource Control
RRM Radio Resource Management
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SINR Signal-to-Interference-plus-Noise Ratio
SMF Session Management Function
SN Secondary Node
SpCell Special Cell
SRB Signaling Radio Bearer
SRS Sounding Reference Signal
SS Synchronization Signal
SSB Synchronization Signal Block
SSBRI Synchronization Signal Block Resource Indicator
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TCI Transmission Configuration Indication
TDD Time Division Duplex
TDMA Time Division Multiple Access
TRP Transmission Reception Point
TTI Transmission Time Interval
UCI Uplink Control Information
UE User Equipment
UL Uplink
UL-SCH Uplink Shared CHannel
UPF User Plane Function
UPGW User Plane Gateway
URLLC Ultra-Reliable Low-Latency Communication
V2X Vehicle-to-everything
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
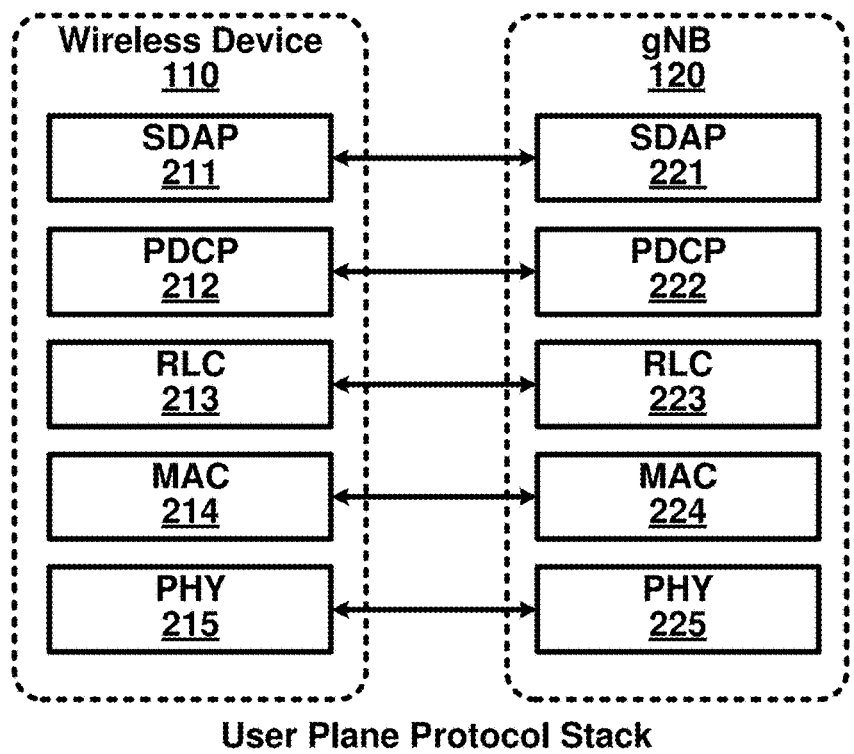
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Medium Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
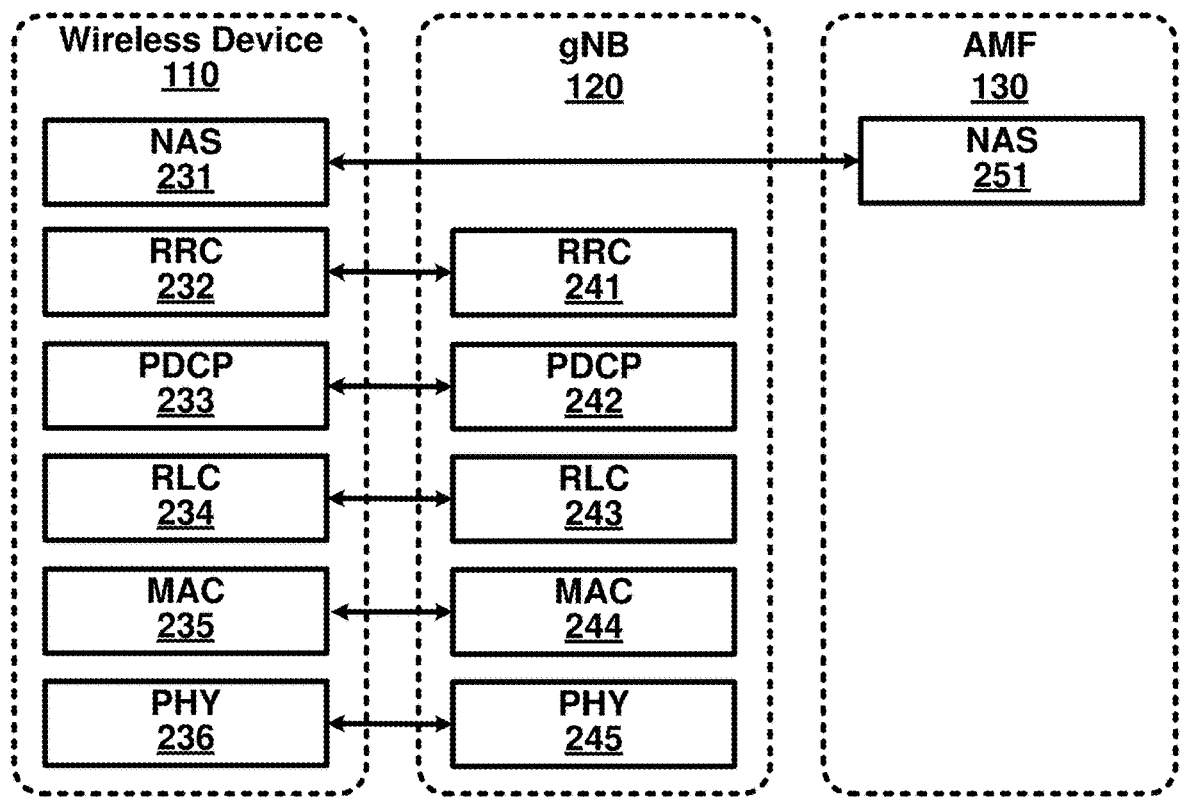
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs indicating one or more timing advance values for one or more Timing Advance Groups (TAGs).

Figure 3:
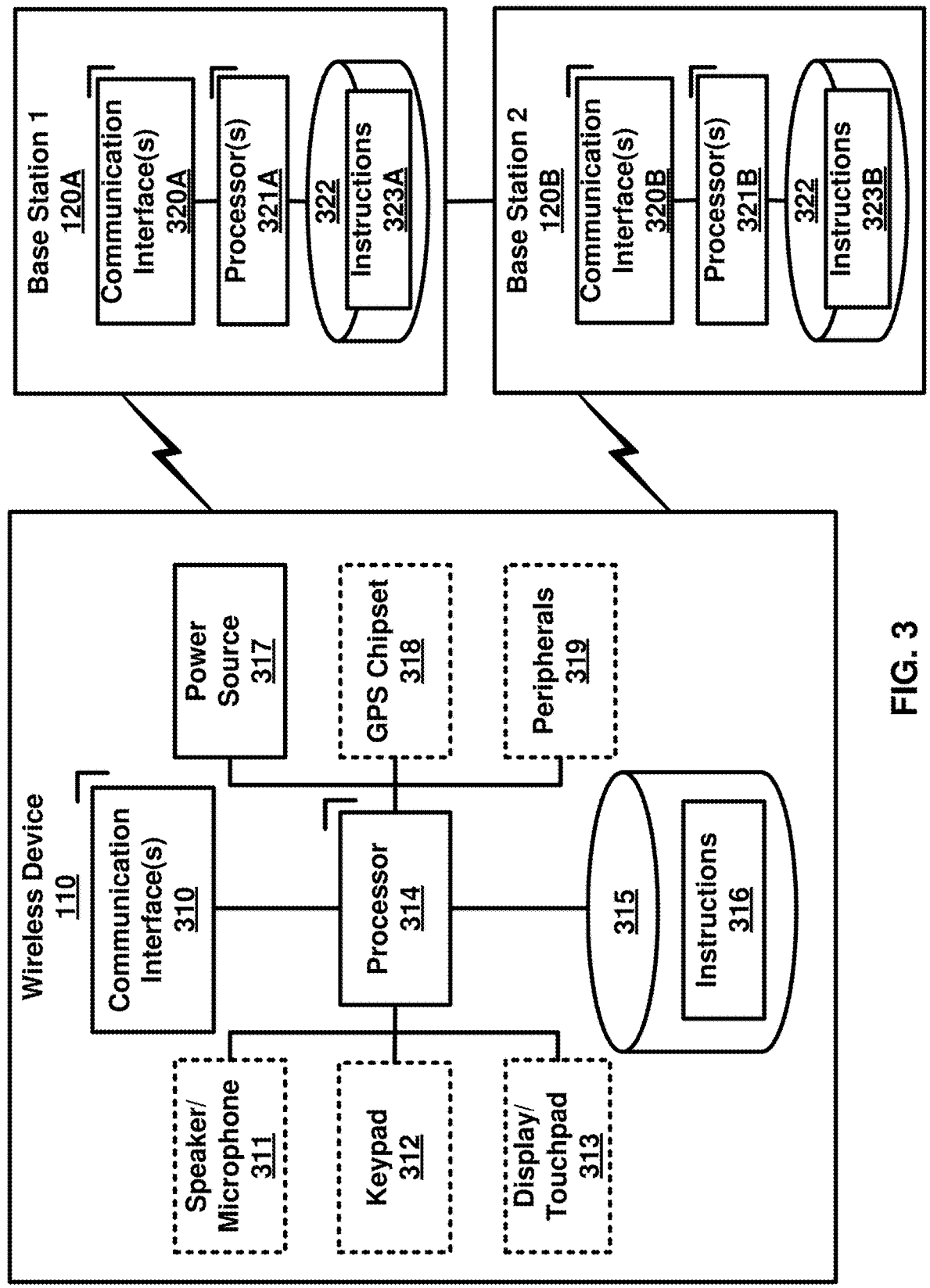
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterInformationBlock and SystemInformationBlockType1). Another SI may be transmitted via SystemInformationBlockType2. For a wireless device in an RRC_Connected state, dedicated RRC signaling may be used for the request and delivery of the other SI. For the wireless device in the RRC_Idle state and/or in the RRC_Inactive state, the request may trigger a random access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g. AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

Figure 4A:
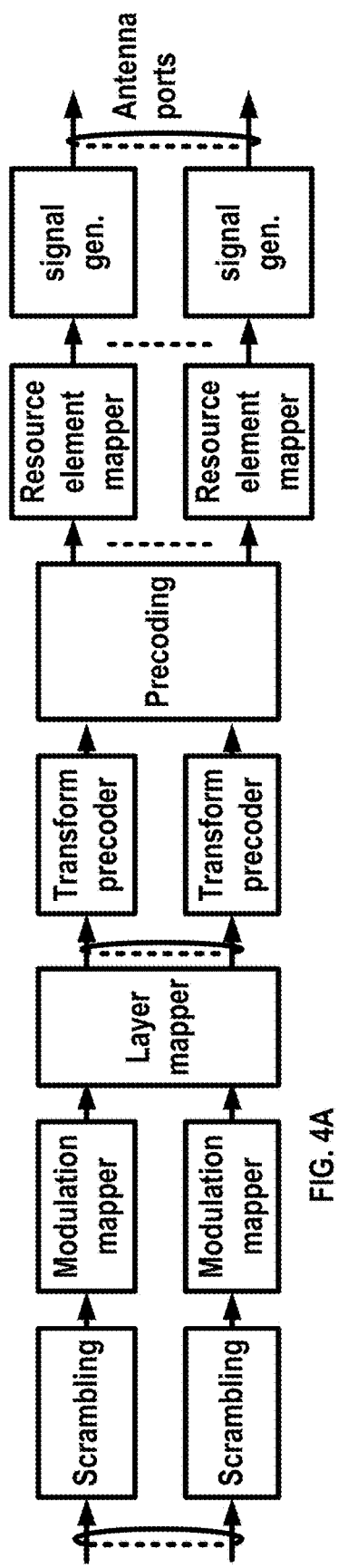
FIG. 4A, FIG. 4B, FIG. 4C, and FIG. 4D show examples of uplink and downlink signal transmission.

FIG. 4A, FIG. 4B, FIG. 4C and FIG. 4D show examples of uplink and downlink signal transmission. FIG. 4A shows an example uplink transmitter for at least one physical channel. A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

Figure 4B:
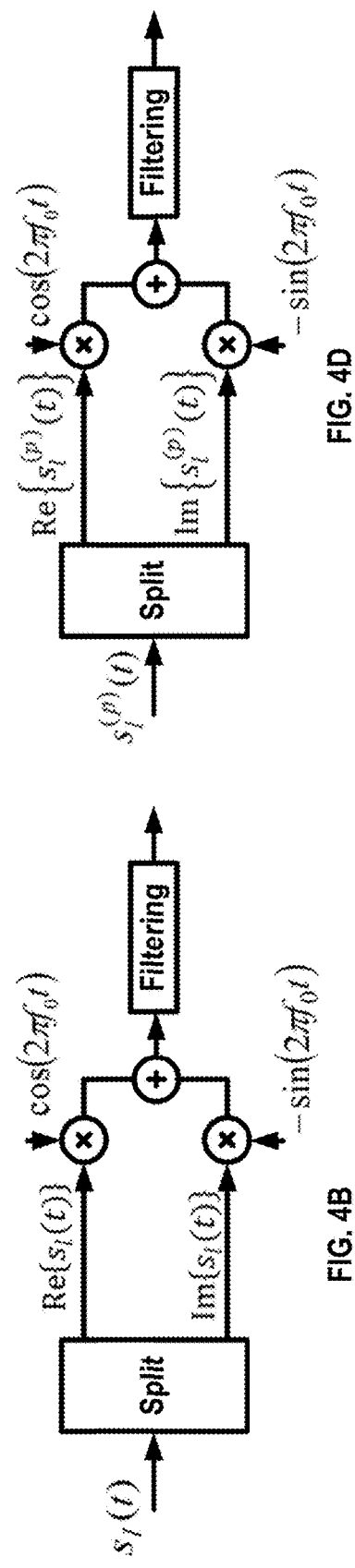

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

Figure 4D:
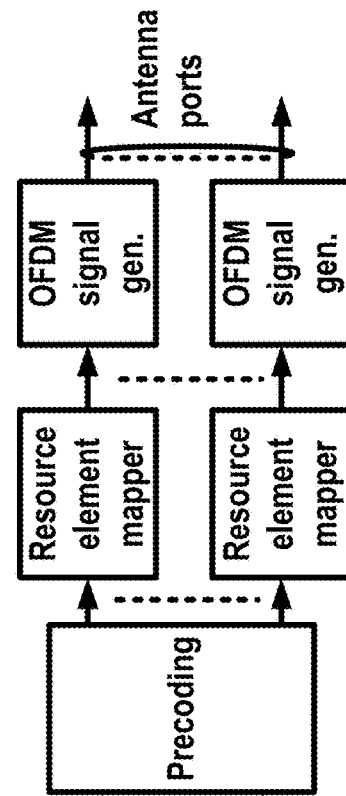
Figure 4C:
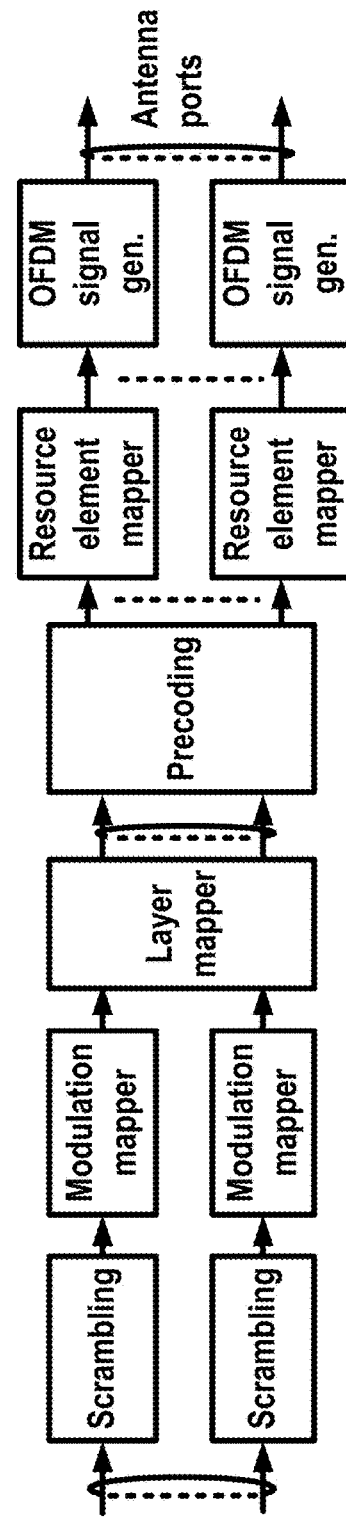

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
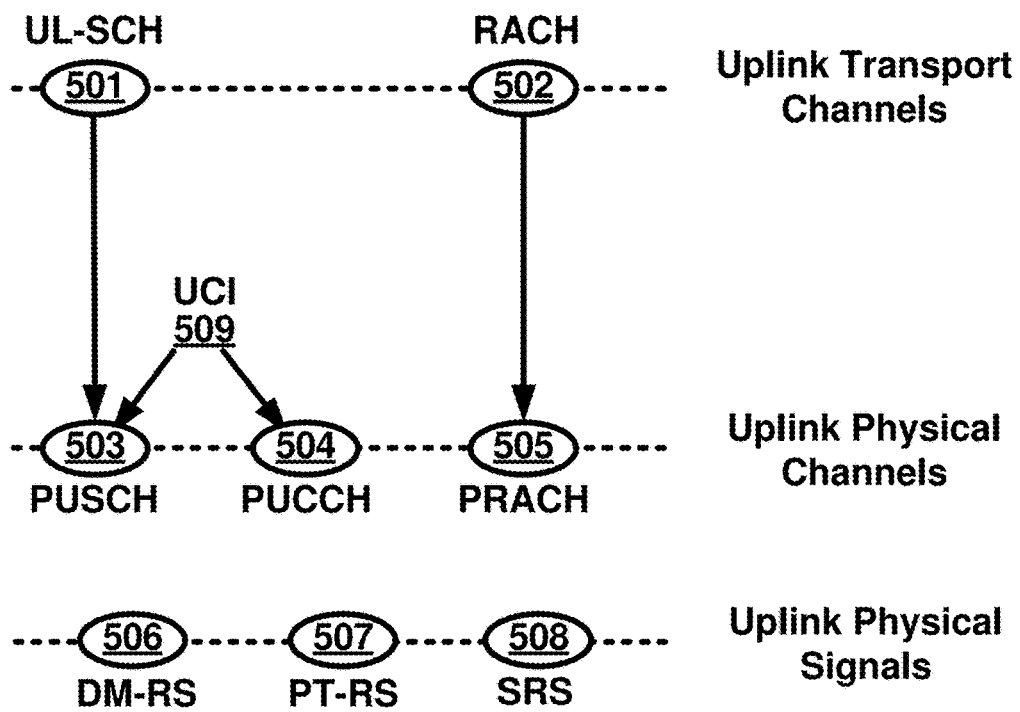
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
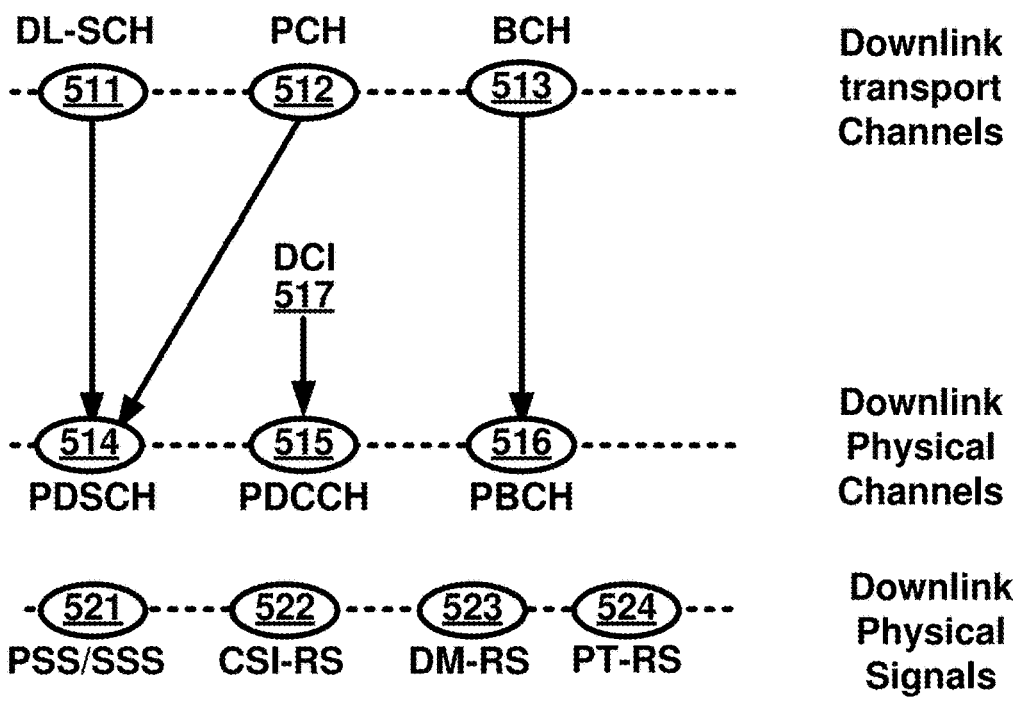
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SS/PBCH blocks, for example, if the downlink CSI-RS 522 and SS/PBCH blocks are spatially quasi co-located and resource elements associated with the downlink CSI-RS 522 are outside of the PRBs configured for the SS/PBCH blocks.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. ADM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
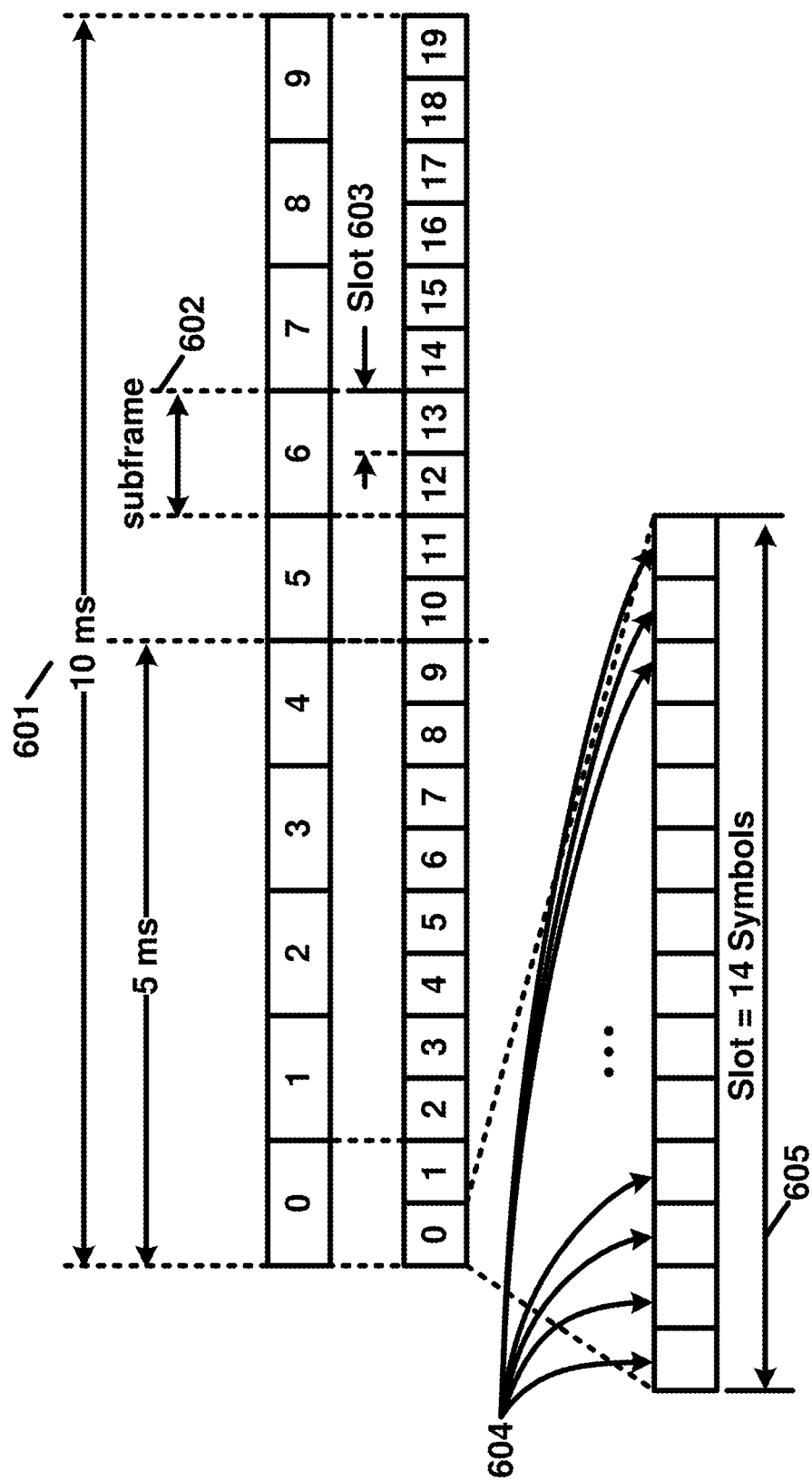
FIG. 6 shows an example transmission time and/or reception time for a carrier.

FIG. 6 shows an example transmission time and reception time for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
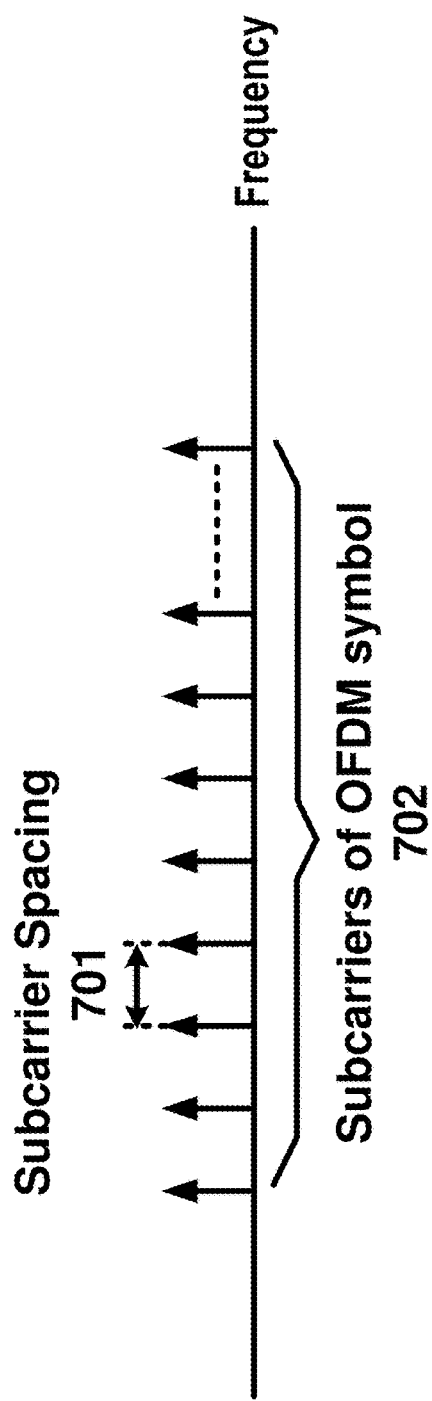
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
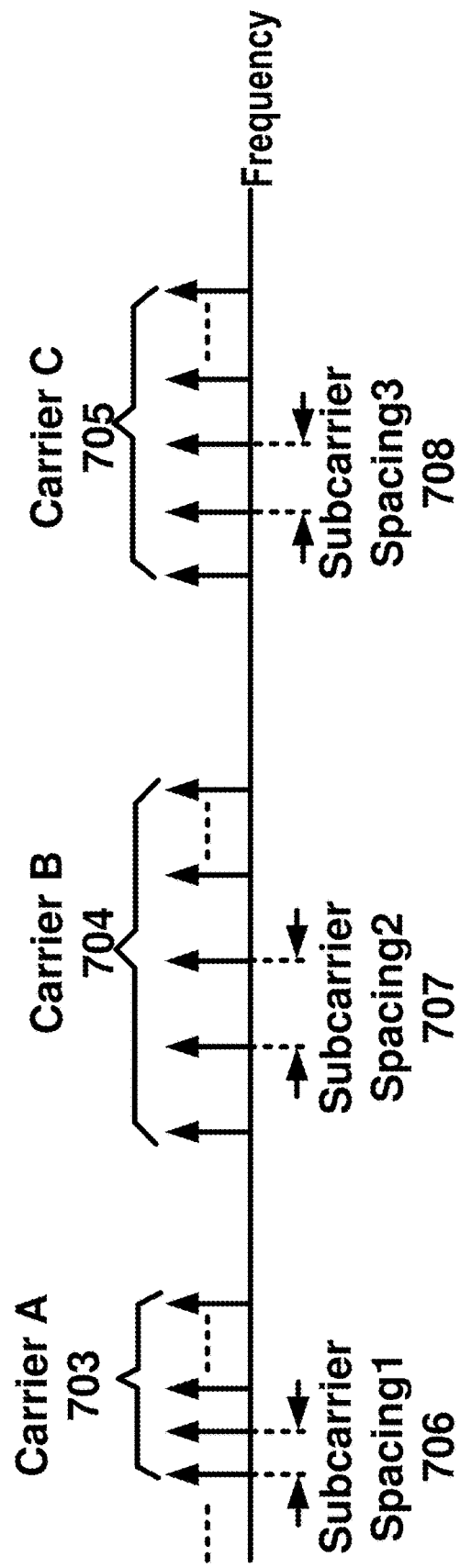

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
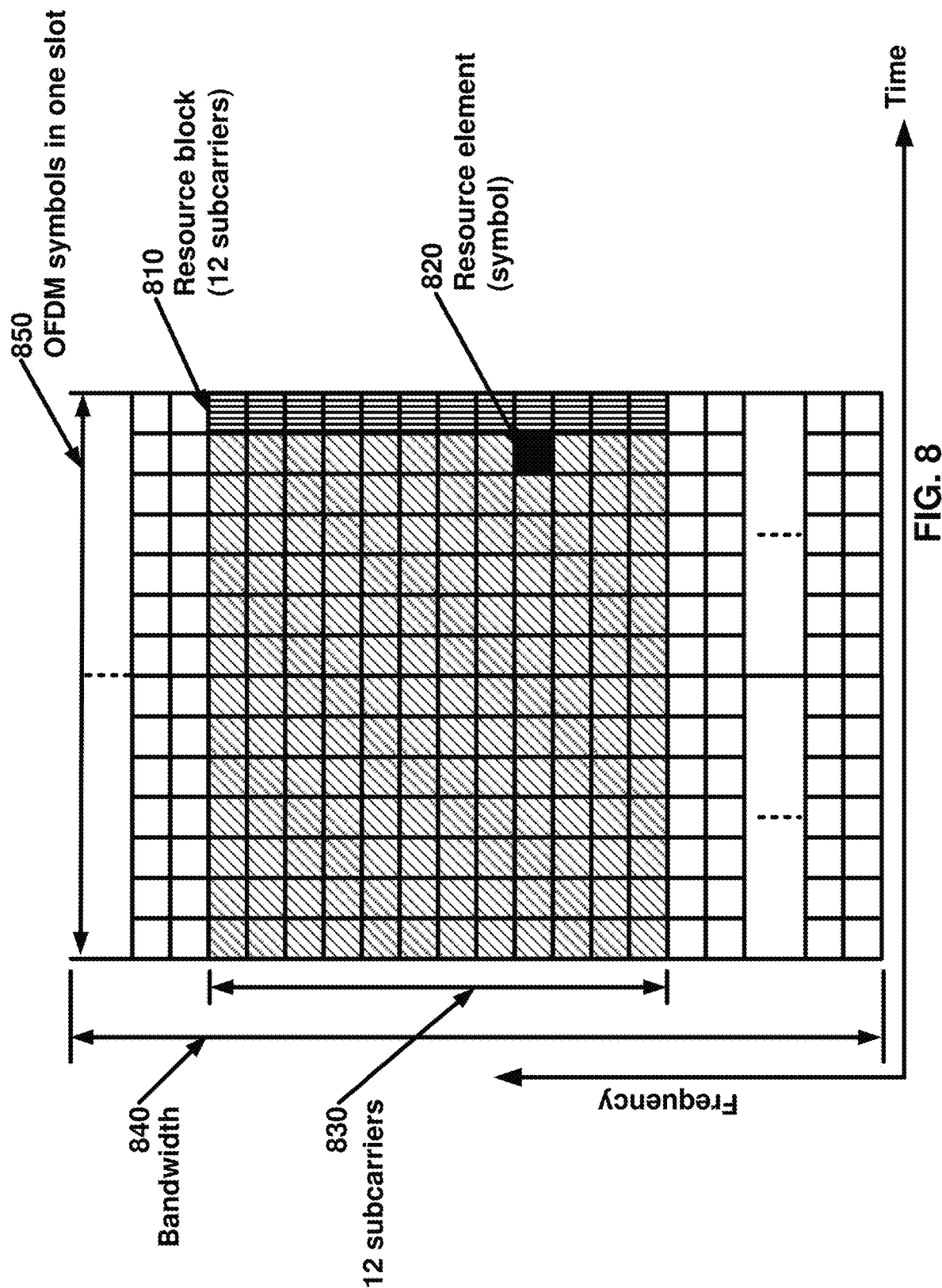
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
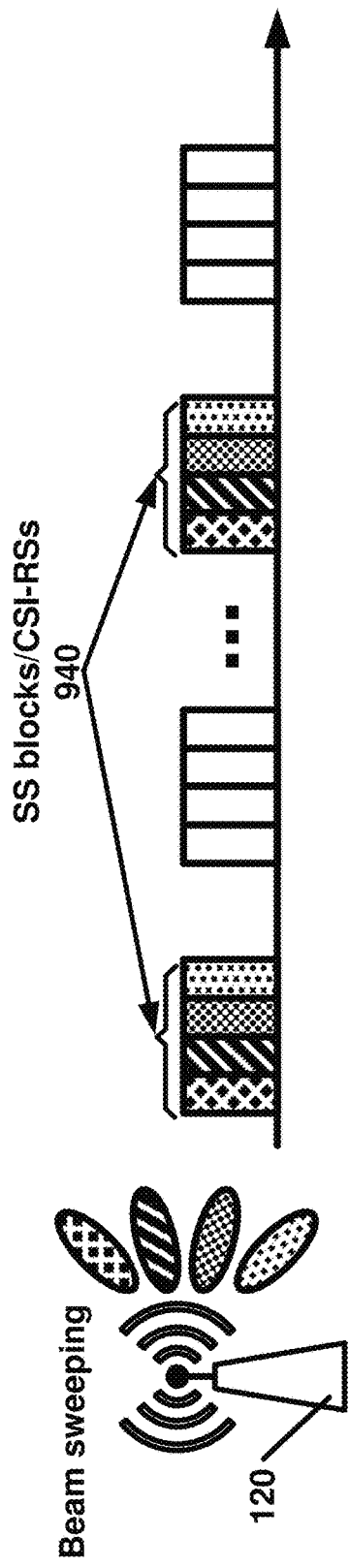
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
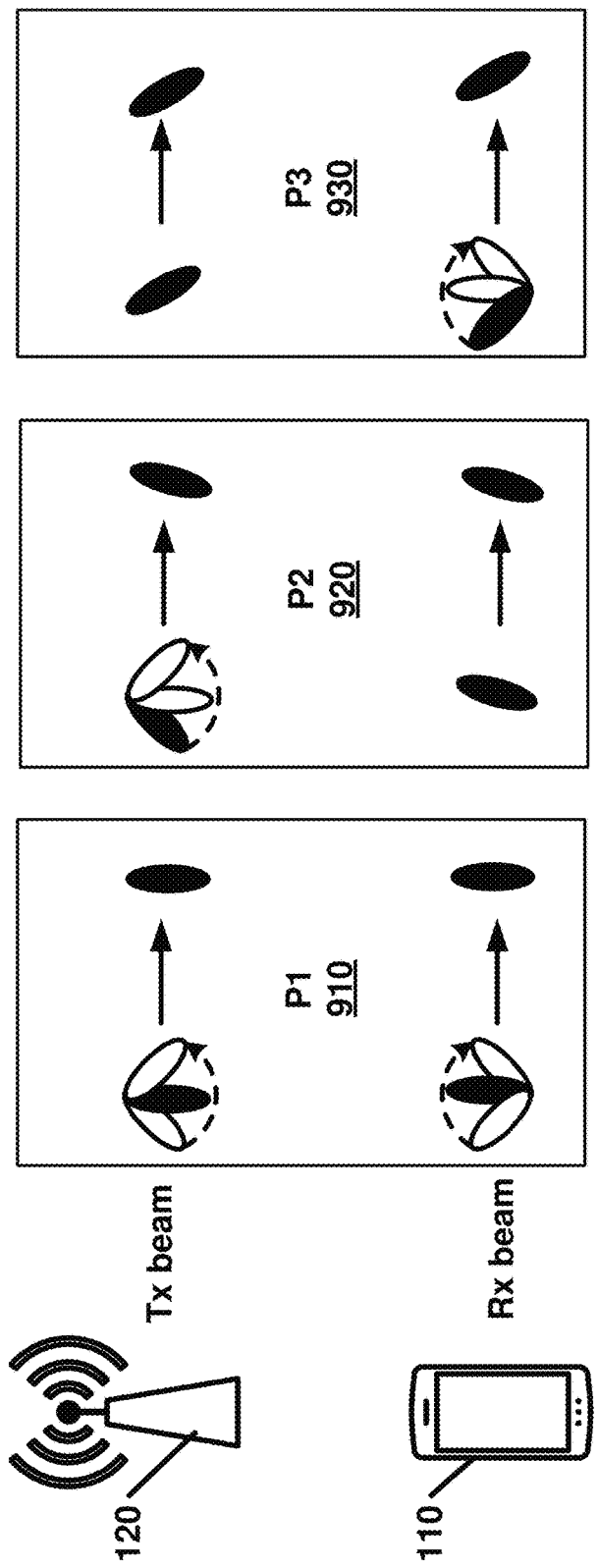
FIG. 9B shows an example downlink beam management procedure.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth (s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
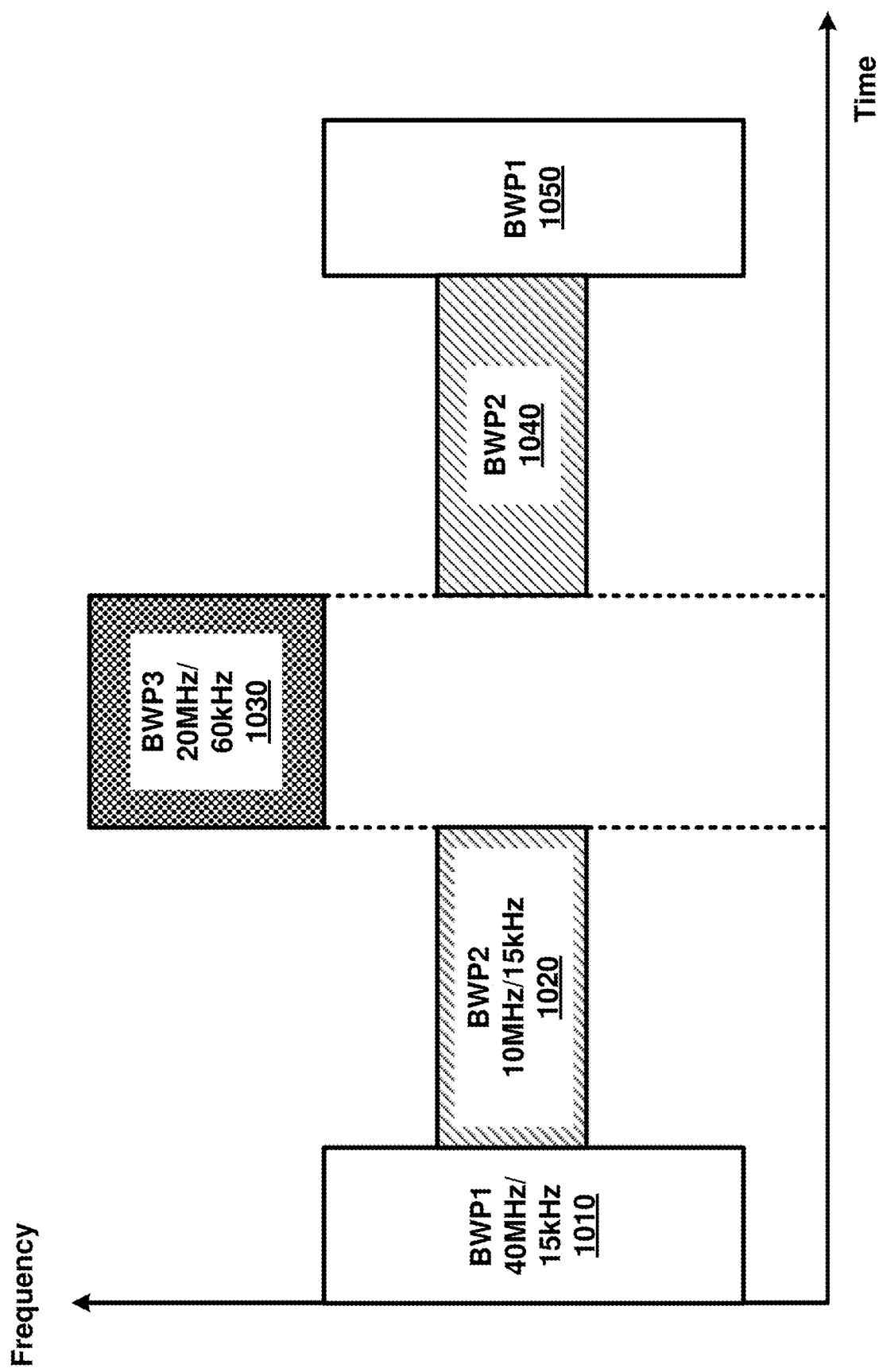
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP. BWPs are described as example resources. Any wireless resource may be applicable to one or more procedures described herein.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a control resource set for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may refrain from configuring a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided with a default DL BWP, a default BWP may be an initial active DL BWP. A default BWP may not be configured for one or more wireless devices. A first (or initial) BWP may serve as a default BWP, for example, if a default BWP is not configured.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
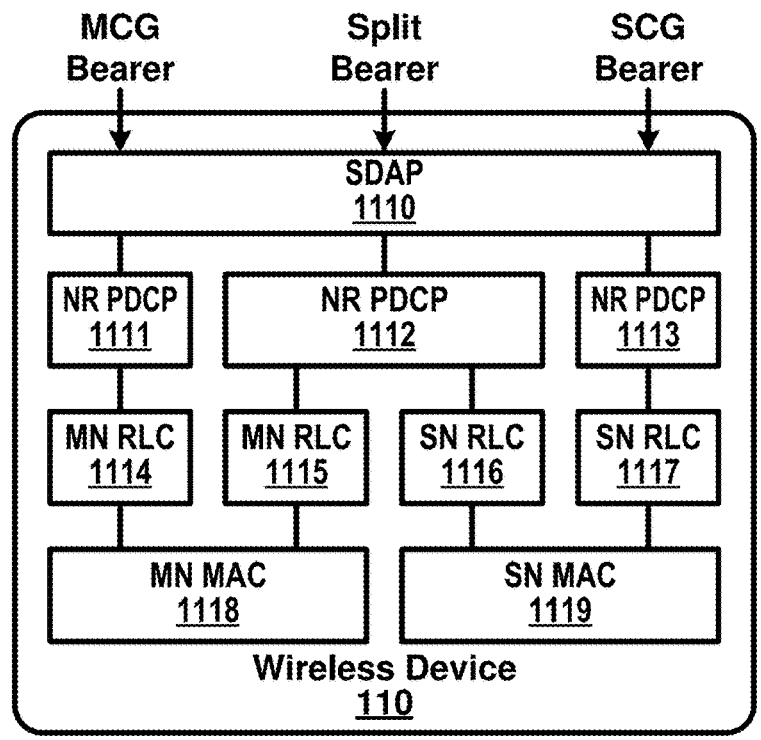
FIG. 11A and FIG. 11B show examples of multi connectivity.
Figure 11B:
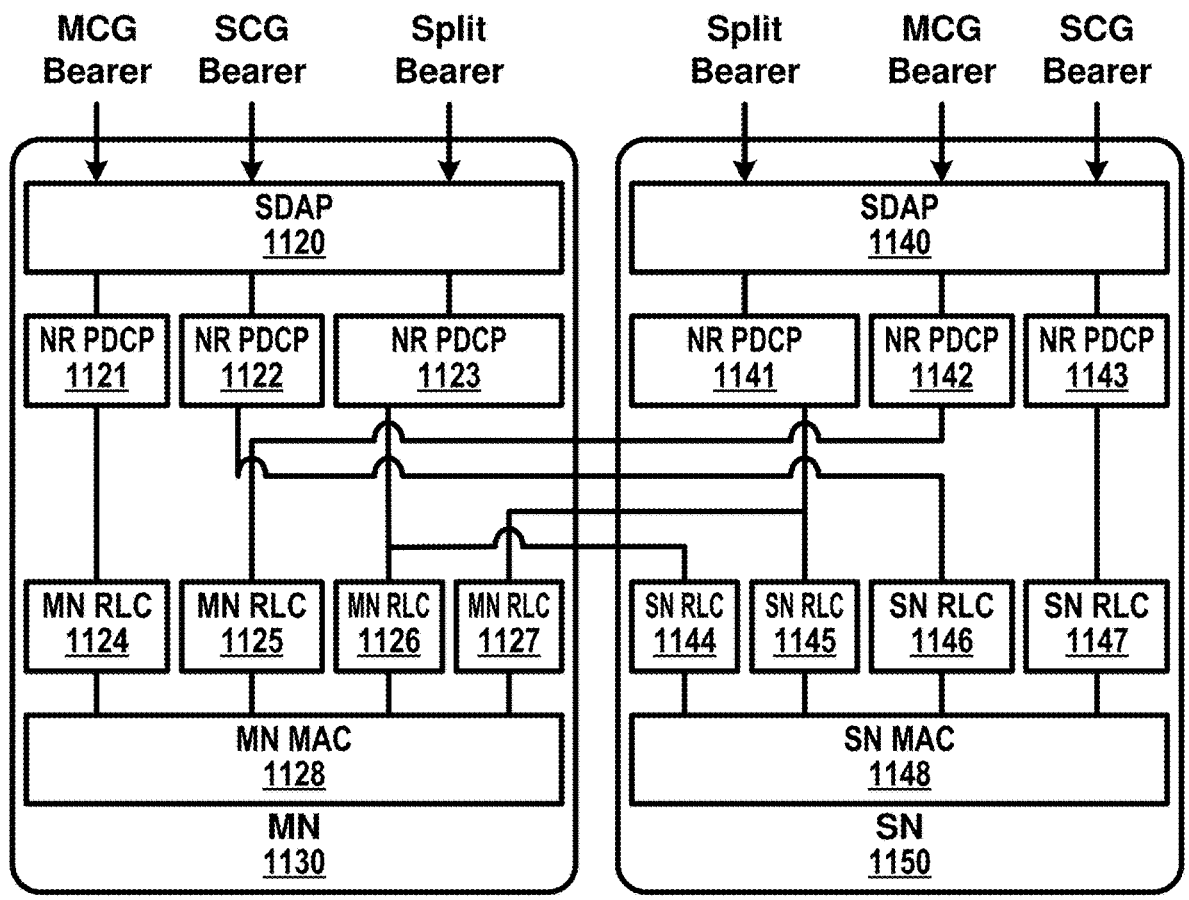

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain Radio Resource Management (RRM) measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
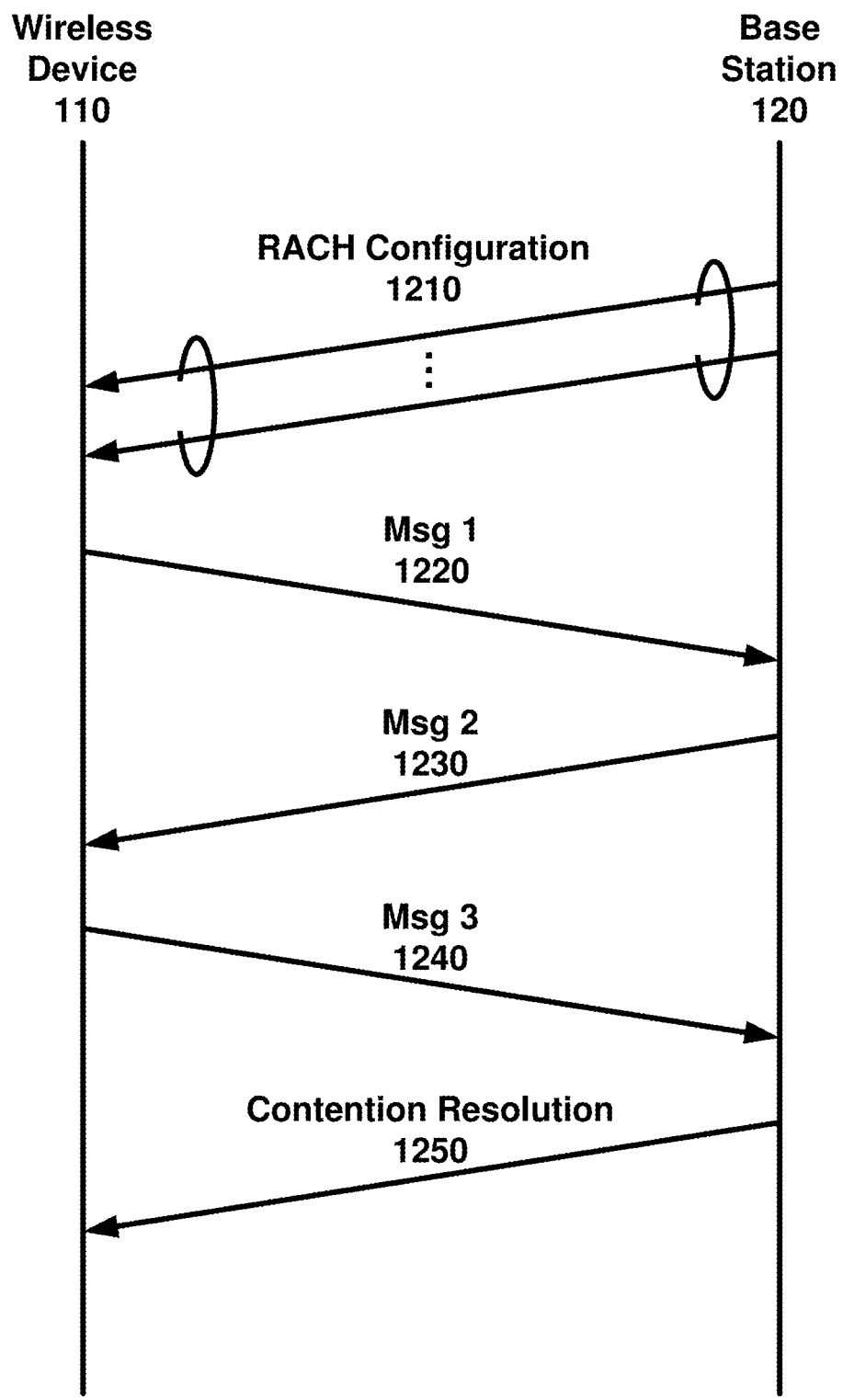
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a beam failure recovery procedure and corresponding PRACH resource(s) (e.g., if any), a time window to monitor RA response(s), a time window to monitor response(s) on a beam failure recovery procedure, and/or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a beam failure recovery procedure associated with at least one of SS blocks and/or CSI-RSs. A wireless device may select a random access preamble index corresponding to a selected SS block or a CSI-RS from a set of one or more random access preambles for a beam failure recovery procedure, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery procedure. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-ResponseWindow) to monitor a random access response. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the random access procedure is successfully completed.

Figure 13:
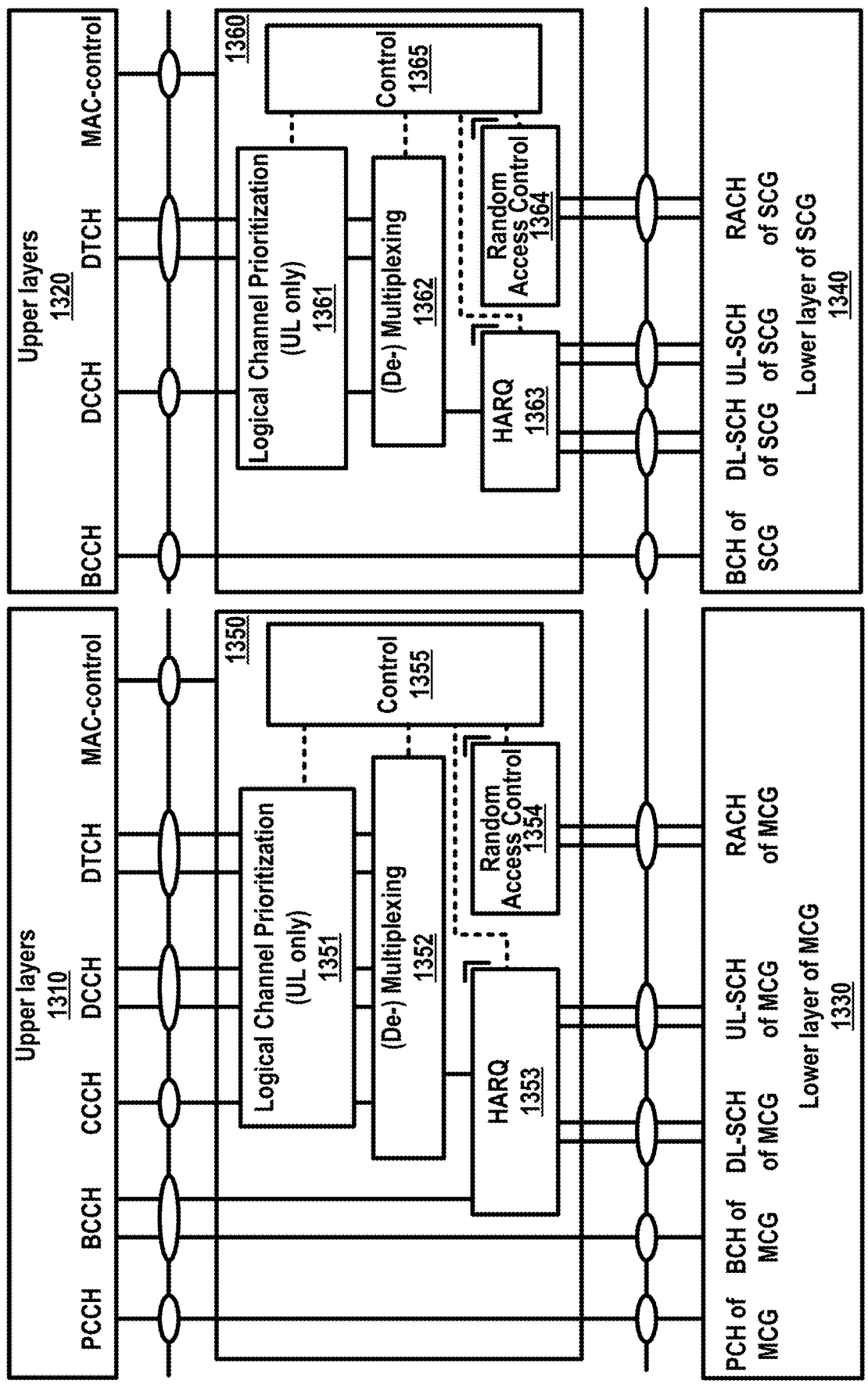
FIG. 13 shows example medium access control (MAC) entities.

FIG. 13 shows an example structure for MAC entities. A wireless device may be configured to operate in a multi-connectivity mode. A wireless device in RRC_CON- NECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
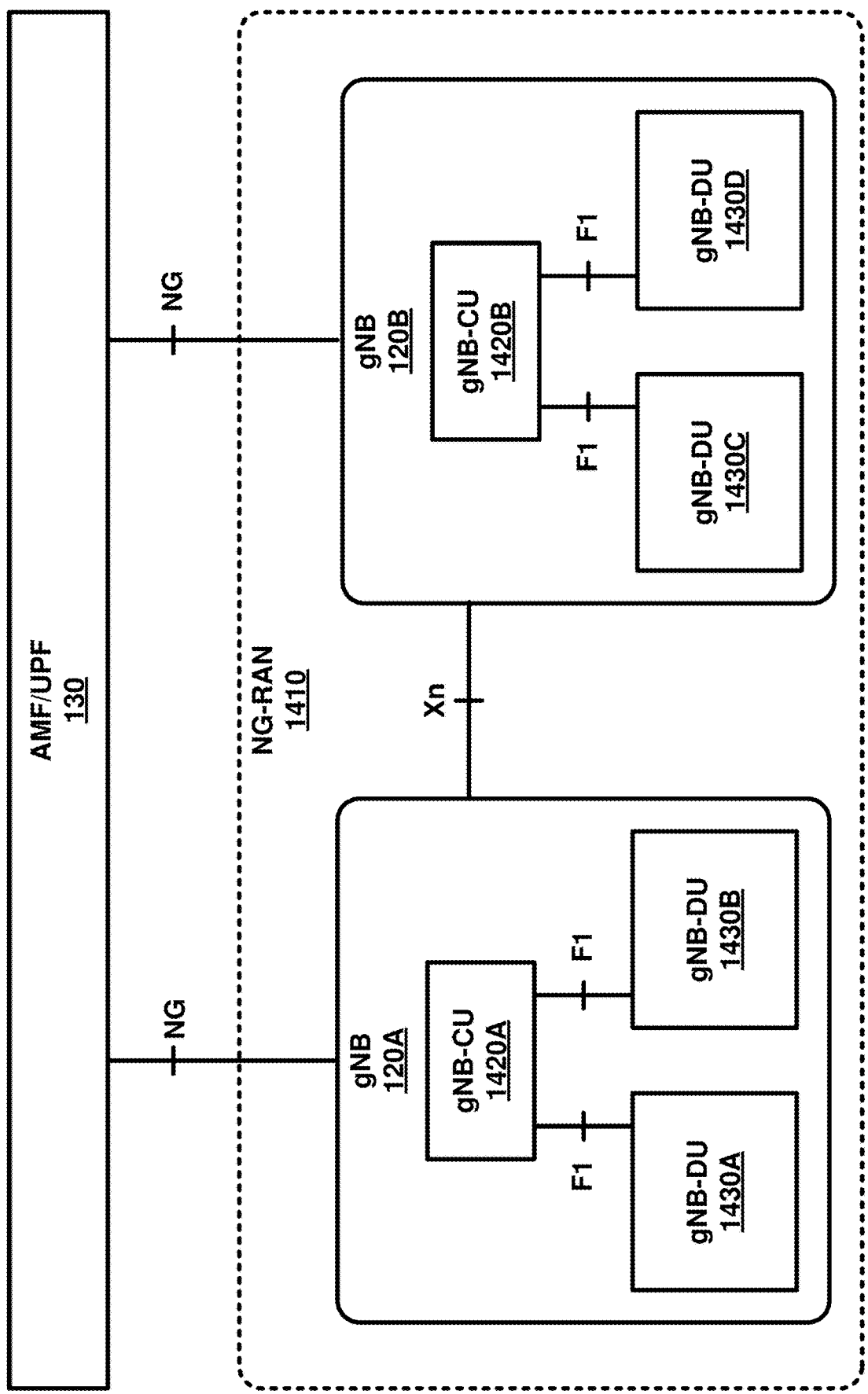
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
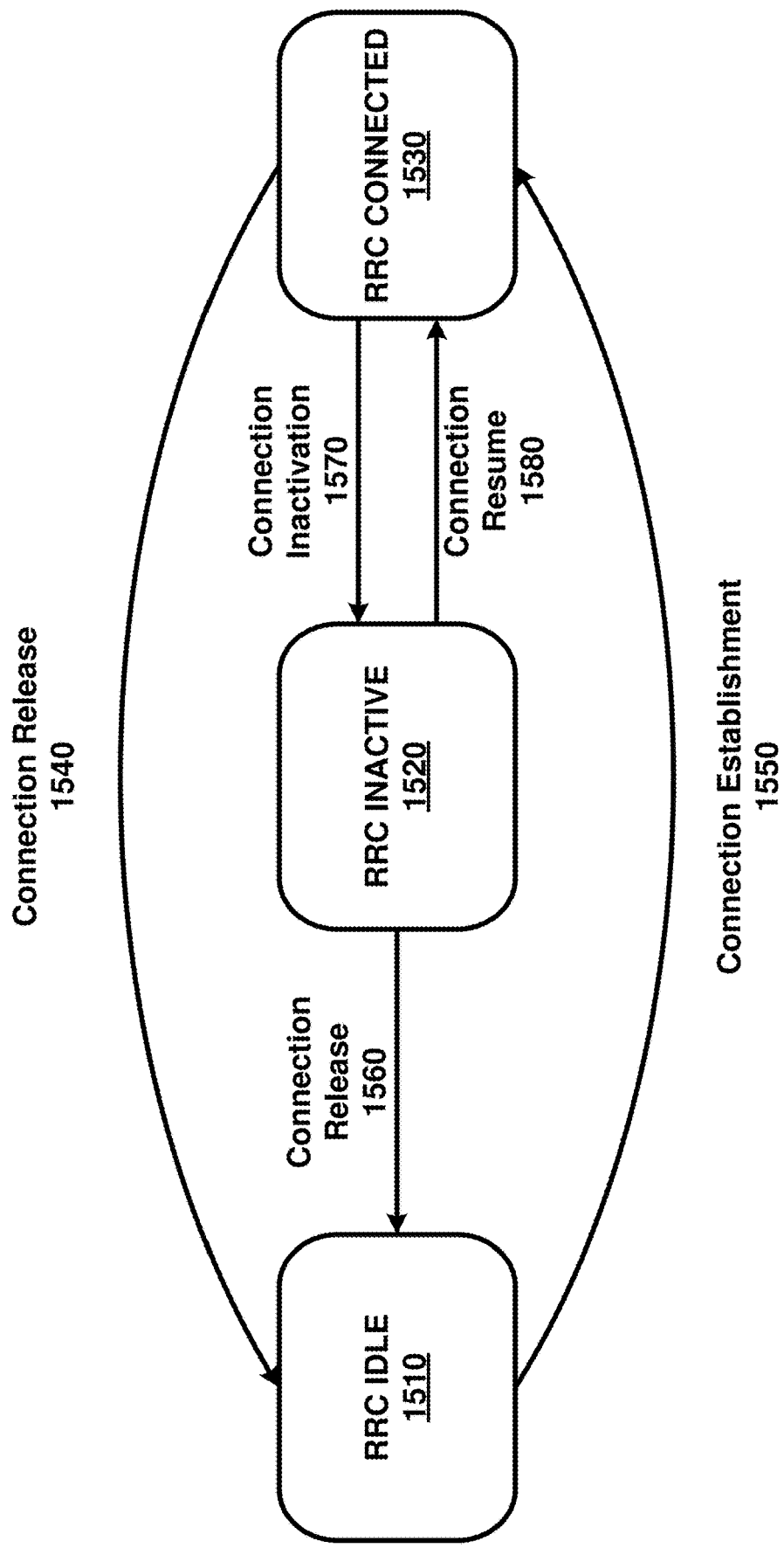
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device via a wireless network using one or more technologies, such as new radio technologies (e.g., NR, 5G, etc.). The one or more radio technologies may comprise at least one of: multiple technologies related to physical layer; multiple technologies related to medium access control layer; and/or multiple technologies related to radio resource control layer. Enhancing the one or more radio technologies may improve performance of a wireless network. System throughput, and/or data rate of transmission, may be increased. Battery consumption of a wireless device may be reduced. Latency of data transmission between a base station and a wireless device may be improved. Network coverage of a wireless network may be improved. Transmission efficiency of a wireless network may be improved.

A base station may send (e.g., transmit) DCI via a PDCCH for at least one of: a scheduling assignment and/or grant; a slot format notification; a preemption indication; and/or a power-control command. The DCI may comprise at least one of: an identifier of a DCI format; a downlink scheduling assignment(s); an uplink scheduling grant(s); a slot format indicator; a preemption indication; a power-control for PUCCH/PUSCH; and/or a power-control for SRS.

A downlink scheduling assignment DCI may comprise parameters indicating at least one of: an identifier of a DCI format; a PDSCH resource indication; a transport format; HARQ information; control information related to multiple antenna schemes; and/or a command for power control of the PUCCH. An uplink scheduling grant DCI may comprise parameters indicating at least one of: an identifier of a DCI format; a PUSCH resource indication; a transport format; HARQ related information; and/or a power control command of the PUSCH.

Different types of control information may correspond to different DCI message sizes. Supporting multiple beams, spatial multiplexing in the spatial domain, and/or noncontiguous allocation of RBs in the frequency domain, may require a larger scheduling message, in comparison with an uplink grant allowing for frequency-contiguous allocation. DCI may be categorized into different DCI formats. A DCI format may correspond to a certain message size and/or usage.

A wireless device may monitor (e.g., in common search space or wireless device-specific search space) one or more PDCCH for detecting one or more DCI with one or more DCI format. A wireless device may monitor a PDCCH with a limited set of DCI formats, for example, which may reduce power consumption. The more DCI formats that are to be detected, the more power may be consumed by the wireless device.

The information in the DCI formats for downlink scheduling may comprise at least one of: an identifier of a DCI format; a carrier indicator; an RB allocation; a time resource allocation; a bandwidth part indicator; a HARQ process number; one or more MCS; one or more NDI; one or more RV; MIMO related information; a downlink assignment index (DAI); a TPC for PUCCH; an SRS request; and/or padding (e.g., if necessary). The MIMO related information may comprise at least one of: a PMI; precoding information; a transport block swap flag; a power offset between PDSCH and a reference signal; a reference-signal scrambling sequence; a number of layers; antenna ports for the transmission; and/or a transmission configuration indication (TCI).

The information in the DCI formats used for uplink scheduling may comprise at least one of: an identifier of a DCI format; a carrier indicator; a bandwidth part indication; a resource allocation type; an RB allocation; a time resource allocation; an MCS; an NDI; a phase rotation of the uplink DMRS; precoding information; a CSI request; an SRS request; an uplink index/DAI; a TPC for PUSCH; and/or padding (e.g., if necessary).

A base station may perform CRC scrambling for DCI, for example, before transmitting the DCI via a PDCCH. The base station may perform CRC scrambling by binarily adding multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, and/or TPC-SRS-RNTI) on the CRC bits of the DCI. The wireless device may check the CRC bits of the DCI, for example, if detecting the DCI. The wireless device may receive the DCI, for example, if the CRC is scrambled by a sequence of bits that is the same as the at least one wireless device identifier.

A base station may send (e.g., transmit) one or more PDCCH in different CORESETs, for example, to support a wide bandwidth operation. A base station may transmit one or more RRC messages comprising configuration parameters of one or more CORESETs. A CORESET, of one or more CORESETs, may comprise at least one of: a first OFDM symbol; a number of consecutive OFDM symbols; a set of resource blocks; and/or a CCE-to-REG mapping. A base station may send (e.g., transmit) a PDCCH in a dedicated CORESET for particular purpose, for example, for beam failure recovery confirmation. A wireless device may monitor a PDCCH for detecting DCI in one or more configured CORESETs, for example, to reduce the power consumption.

A base station may send (e.g., transmit) one or more MAC PDUs to a wireless device. A MAC PDU may comprise a bit string that may be byte aligned (e.g., multiple of eight bits) in length. Bit strings may be represented by tables in which the most significant bit is the leftmost bit of the first line of the table, and the least significant bit is the rightmost bit on the last line of the table. The bit string may be read from the left to right, and then, in the reading order of the lines. The bit order of a parameter field within a MAC PDU may be represented with the first and most significant bit in the leftmost bit, and with the last and least significant bit in the rightmost bit.

A MAC SDU may comprise a bit string that is byte aligned (e.g., multiple of eight bits) in length. A MAC SDU may be included in a MAC PDU, for example, from the first bit onward. In an example, a MAC CE may be a bit string that is byte aligned (e.g., multiple of eight bits) in length. A MAC subheader may be a bit string that is byte aligned (e.g., multiple of eight bits) in length. A MAC subheader may be placed immediately in front of the corresponding MAC SDU, MAC CE, and/or padding. A MAC entity may ignore a value of reserved bits in a DL MAC PDU.

A MAC PDU may comprise one or more MAC subPDUs. A MAC subPDU of the one or more MAC subPDUs may comprise at least one of: a MAC subheader only (e.g., including padding); a MAC subheader and a MAC SDU; a MAC subheader and a MAC CE; and/or a MAC subheader and padding. The MAC SDU may be of variable size. A MAC subheader may correspond to a MAC SDU, a MAC CE, and/or padding.

A MAC subheader may comprise: an R field comprising one bit; an F field with one bit in length; an LCID field with multiple bits in length; an L field with multiple bits in length, for example, if the MAC subheader corresponds to a MAC SDU, a variable-sized MAC CE, and/or padding.

Figure 16A:
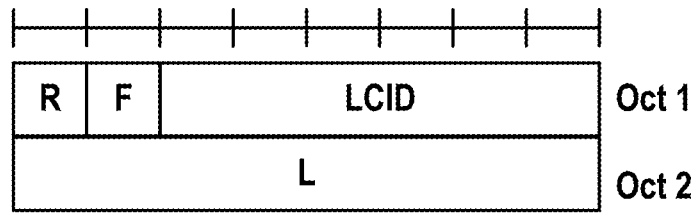
FIG. 16A, FIG. 16B and FIG. 16C show examples of MAC subheaders.

FIG. 16A shows an example of a MAC subheader comprising an eight-bit L field. The LCID field may have six bits in length. The L field may have eight bits in length.

Figure 16B:
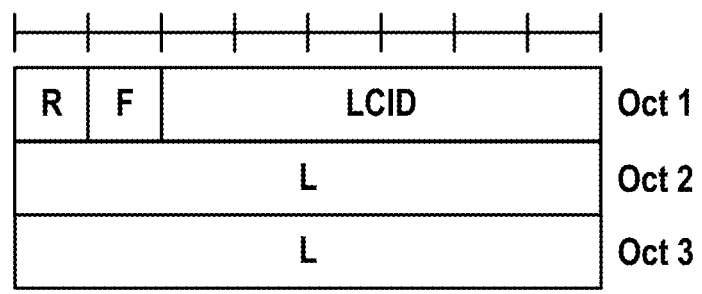

FIG. 16B shows an example of a MAC subheader with a sixteen-bit L field. The LCID field may have six bits in length. The L field may have sixteen bits in length. A MAC subheader may comprise: a R field comprising two bits in length; and an LCID field comprising multiple bits in length (e.g., if the MAC subheader corresponds to a fixed sized MAC CE), and/or padding.

Figure 16C:
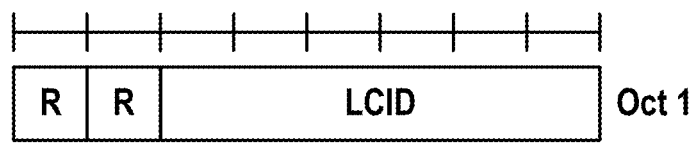

FIG. 16C shows an example of the MAC subheader. The LCID field may comprise six bits in length, and the R field may comprise two bits in length.

Figure 17A:
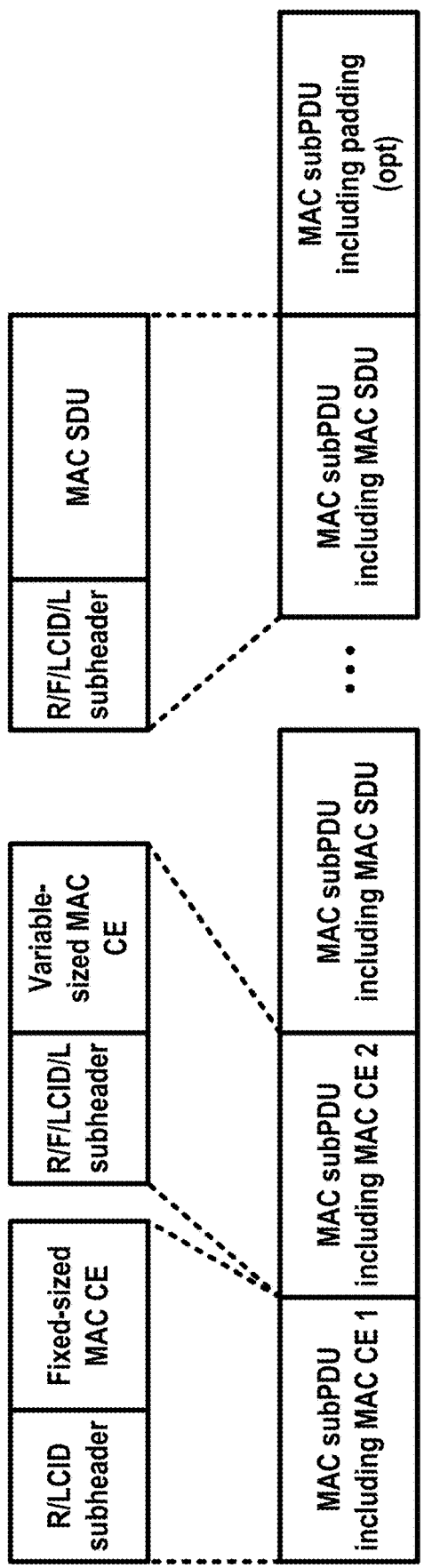
FIG. 17A and FIG. 17B show examples of MAC PDUs.

FIG. 17A shows an example of a DL MAC PDU. Multiple MAC CEs may be placed together. A MAC subPDU comprising MAC CE may be placed before any MAC subPDU comprising a MAC SDU, and/or before a MAC subPDU comprising padding.

Figure 17B:
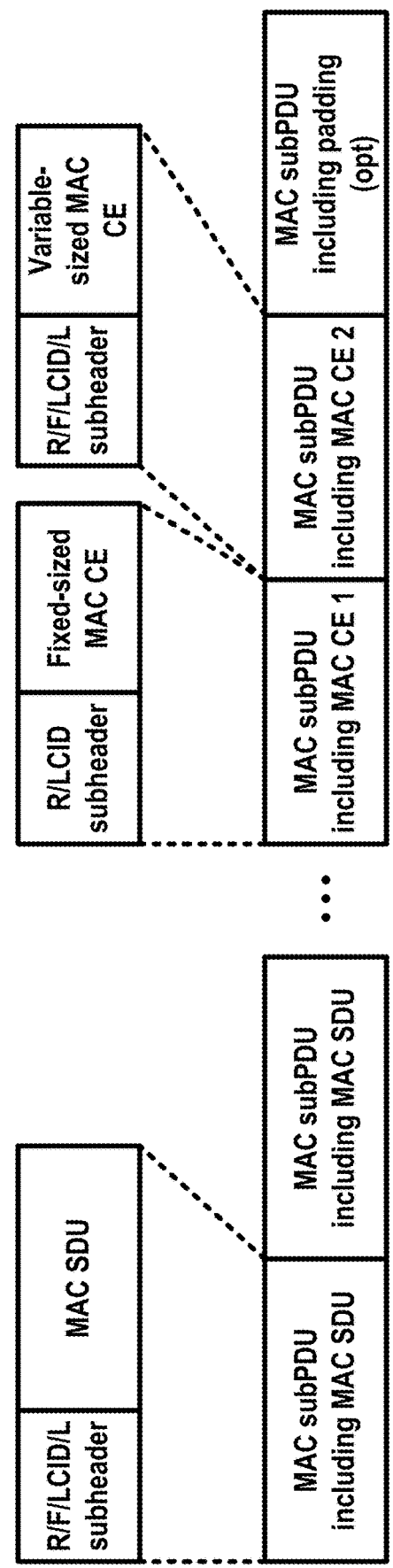

FIG. 17B shows an example of a UL MAC PDU. Multiple MAC CEs may be placed together. A MAC subPDU comprising a MAC CE may be placed after all MAC subPDU comprising a MAC SDU. The MAC subPDU may be placed before a MAC subPDU comprising padding.

FIG. 18 shows first examples of LCIDs. FIG. 19 shows second examples of LCIDs. In each of FIG. 18 and FIG. 19, the left columns comprise indices, and the right columns comprises corresponding LCID values for each index.

FIG. 18 shows an example of an LCID that may be associated with the one or more MAC CEs. A MAC entity of a base station may send (e.g., transmit) to a MAC entity of a wireless device one or more MAC CEs. The one or more MAC CEs may comprise at least one of: an SP ZP CSI-RS Resource Set Activation/Deactivation MAC CE; a PUCCH spatial relation Activation/Deactivation MAC CE; a SP SRS Activation/Deactivation MAC CE; a SP CSI reporting on PUCCH Activation/Deactivation MAC CE; a TCI State Indication for UE-specific PDCCH MAC CE; a TCI State Indication for UE-specific PDSCH MAC CE; an Aperiodic CSI Trigger State Subselection MAC CE; a SP CSI-RS/CSI-IM Resource Set Activation/Deactivation MAC CE; a wireless device (e.g., UE) contention resolution identity MAC CE; a timing advance command MAC CE; a DRX command MAC CE; a long DRX command MAC CE; an SCell activation and/or deactivation MAC CE (e.g., 1 Octet); an SCell activation and/or deactivation MAC CE (e.g., 4 Octet); and/or a duplication activation and/or deactivation MAC CE. A MAC CE may comprise an LCID in the corresponding MAC subheader. Different MAC CEs may have different LCID in the corresponding MAC subheader. An LCID with 111011 in a MAC subheader may indicate that a MAC CE associated with the MAC subheader is a long DRX command MAC CE.

FIG. 19 shows further examples of LCIDs associated with one or more MAC CEs. The MAC entity of the wireless device may send (e.g., transmit), to the MAC entity of the base station, one or more MAC CEs. The one or more MAC CEs may comprise at least one of: a short buffer status report (BSR) MAC CE; a long BSR MAC CE; a C-RNTI MAC CE; a configured grant confirmation MAC CE; a single entry power headroom report (PHR) MAC CE; a multiple entry PHR MAC CE; a short truncated BSR; and/or a long truncated BSR. A MAC CE may comprise an LCID in the corresponding MAC subheader. Different MAC CEs may have different LCIDs in the corresponding MAC subheader. The LCID with 111011 in a MAC subheader may indicate that a MAC CE associated with the MAC subheader is a short-truncated command MAC CE.

Two or more component carriers (CCs) may be aggregated, for example, in a carrier aggregation (CA). A wireless device may simultaneously receive and/or transmit on one or more CCs, for example, depending on capabilities of the wireless device. The CA may be supported for contiguous CCs. The CA may be supported for non-contiguous CCs.

A wireless device may have one RRC connection with a network, for example, if configured with CA. At (e.g., during) an RRC connection establishment, re-establishment and/or handover, a cell providing a NAS mobility information may be a serving cell. At (e.g., during) an RRC connection re-establishment and/or handover procedure, a cell providing a security input may be a serving cell. The serving cell may be referred to as a primary cell (PCell). A base station may send (e.g., transmit), to a wireless device, one or more messages comprising configuration parameters of a plurality of one or more secondary cells (SCells), for example, depending on capabilities of the wireless device.

A base station and/or a wireless device may use an activation and/or deactivation mechanism of an SCell for an efficient battery consumption, for example, if the base station and/or the wireless device is configured with CA. A base station may activate or deactivate at least one of the one or more SCells, for example, if the wireless device is configured with one or more SCells. The SCell may be deactivated, for example, after or upon configuration of an SCell.

A wireless device may activate and/or deactivate an SCell, for example, after or in response to receiving an SCell activation and/or deactivation MAC CE. A base station may send (e.g., transmit), to a wireless device, one or more messages comprising an sCellDeactivationTimer timer. The wireless device may deactivate an SCell, for example, after or in response to an expiry of the sCellDeactivationTimer timer.

A wireless device may activate an SCell, for example, if the wireless device receives an SCell activation/deactivation MAC CE activating an SCell. The wireless device may perform operations (e.g., after or in response to the activating the SCell) that may comprise: SRS transmissions on the SCell; CQI, PMI, RI, and/or CRI reporting for the SCell on a PCell; PDCCH monitoring on the SCell; PDCCH monitoring for the SCell on the PCell; and/or PUCCH transmissions on the SCell.

The wireless device may start and/or restart a timer (e.g., an sCellDeactivationTimer timer) associated with the SCell, for example, after or in response to activating the SCell. The wireless device may start the timer (e.g., sCellDeactivationTimer timer) in the slot, for example, if the SCell activation/deactivation MAC CE has been received. The wireless device may initialize and/or re-initialize one or more suspended configured uplink grants of a configured grant Type 1 associated with the SCell according to a stored configuration, for example, after or in response to activating the SCell. The wireless device may trigger a PHR, for example, after or in response to activating the SCell.

The wireless device may deactivate the activated SCell, for example, if the wireless device receives an SCell activation/deactivation MAC CE deactivating an activated SCell. The wireless device may deactivate the activated SCell, for example, if a timer (e.g., an sCellDeactivationTimer timer) associated with an activated SCell expires. The wireless device may stop the timer (e.g., sCellDeactivationTimer timer) associated with the activated SCell, for example, after or in response to deactivating the activated SCell. The wireless device may clear one or more configured downlink assignments and/or one or more configured uplink grant Type 2 associated with the activated SCell, for example, after or in response to the deactivating the activated SCell. The wireless device may suspend one or more configured uplink grant Type 1 associated with the activated SCell, and/or flush HARQ buffers associated with the activated SCell, for example, after or in response to deactivating the activated SCell.

A wireless device may refrain from performing certain operations, for example, if an SCell is deactivated. The wireless device may refrain from performing one or more of the following operations if an SCell is deactivated: transmitting SRS on the SCell; reporting CQI, PMI, RI, and/or CRI for the SCell on a PCell; transmitting on UL-SCH on the SCell; transmitting on a RACH on the SCell; monitoring at least one first PDCCH on the SCell; monitoring at least one second PDCCH for the SCell on the PCell; and/or transmitting a PUCCH on the SCell.

A wireless device may restart a timer (e.g., an sCellDeactivationTimer timer) associated with the activated SCell, for example, if at least one first PDCCH on an activated SCell indicates an uplink grant or a downlink assignment. A wireless device may restart a timer (e.g., an sCellDeactivationTimer timer) associated with the activated SCell, for example, if at least one second PDCCH on a serving cell (e.g. a PCell or an SCell configured with PUCCH, such as a PUCCH SCell) scheduling the activated SCell indicates an uplink grant and/or a downlink assignment for the activated SCell. A wireless device may abort the ongoing random access procedure on the SCell, for example, if an SCell is deactivated and/or if there is an ongoing random access procedure on the SCell.

Figure 20A:
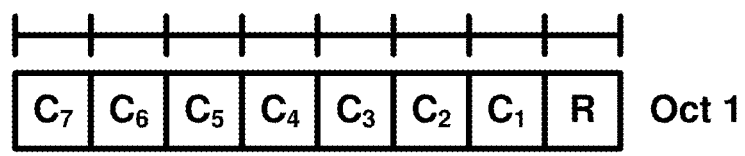
FIG. 20A and FIG. 20B show examples of secondary cell (SCell) Activation/Deactivation MAC CE.

FIG. 20A shows an example of an SCell activation/deactivation MAC CE that may comprise one octet. A first MAC PDU subheader comprising a first LCID may identify the SCell activation/deactivation MAC CE of one octet. An SCell activation/deactivation MAC CE of one octet may have a fixed size. The SCell activation/deactivation MAC CE of one octet may comprise a single octet. The single octet may comprise a first number of C-fields (e.g., seven) and a second number of R-fields (e.g., one).

Figure 20B:
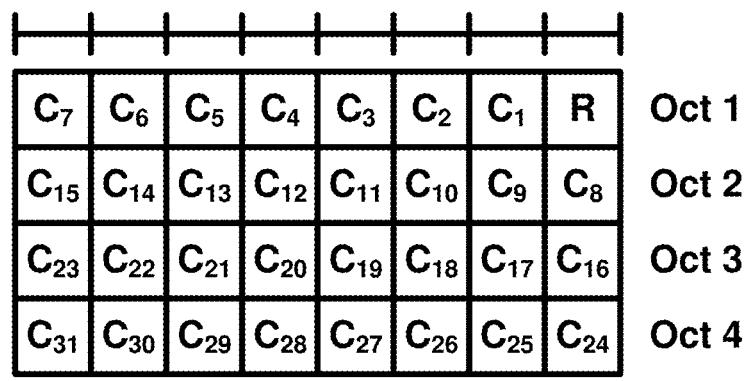

FIG. 20B shows an example of an SCell Activation/Deactivation MAC CE of four octets. A second MAC PDU subheader with a second LCID may identify the SCell Activation/Deactivation MAC CE of four octets. An SCell activation/deactivation MAC CE of four octets may have a fixed size. The SCell activation/deactivation MAC CE of four octets may comprise four octets. The four octets may comprise a third number of C-fields (e.g., 31) and a fourth number of R-fields (e.g., 1). A $C_i$ field may indicate an activation/deactivation status of an SCell with an SCell index i, for example, if an SCell with SCell index i is configured. An SCell with an SCell index i may be activated, for example, if the $C_i$ field is set to one. An SCell with an SCell index i may be deactivated, for example, if the $C_i$ field is set to zero. The wireless device may ignore the $C_i$ field, for example, if there is no SCell configured with SCell index i. An R field may indicate a reserved bit. The R field may be set to zero.

A base station and/or a wireless device may use a power saving mechanism (e.g., hibernation mechanism) for an SCell, for example, if CA is configured. A power saving mechanism may improve battery performance (e.g., runtimes), reduce power consumption of the wireless device, and/or to improve latency of SCell activation and/or SCell addition. The SCell may be transitioned (e.g., switched and/or adjusted) to a dormant state if the wireless device initiates a power saving state for (e.g., hibernates) the SCell. The wireless device may, for example, if the SCell is transitioned to a dormant state: stop transmitting SRS on the SCell, report CQI/PMI/RI/PTI/CRI for the SCell according to or based on a periodicity configured for the SCell in a dormant state, not transmit on an UL-SCH on the SCell, not transmit on a RACH on the SCell, not monitor the PDCCH on the SCell, not monitor the PDCCH for the SCell, and/or not transmit PUCCH on the SCell. Not transmitting, not monitoring, not receiving, and/or not performing an action may comprise, for example, refraining from transmitting, refraining from monitoring, refraining from receiving, and/or refraining from performing an action, respectively. Reporting CSI for an SCell, that has been transitioned to a dormant state, and not monitoring the PDCCH on/for the SCell, may provide the base station an "always-updated" CSI for the SCell. The base station may use a quick and/or accurate channel adaptive scheduling on the SCell, based on the always-updated CSI, if the SCell is transitioned back to active state. Using the always-updated CSI may speed up an activation procedure of the SCell. Reporting CSI for the SCell and not monitoring the PDCCH on and/or for the SCell (e.g., that may have been transitioned to a dormant state), may provide advantages such as increased battery efficiency, reduced power consumption of the wireless device, and/or increased timeliness and/or accuracy of channel feedback information feedback. A PCell/PSCell and/or a PUCCH SCell, for example, may not be configured or transitioned to a dormant state.

A base station may activate, hibernate, or deactivate at least one of one or more configured SCells. A base station may send (e.g., transmit) to a wireless device, for example, one or more messages comprising parameters indicating at least one SCell being set to an active state, a dormant state, or an inactive state. A base station may transmit, for example, one or more RRC messages comprising parameters indicating at least one SCell being set to an active state, a dormant state, or an inactive state. A base station may transmit, for example, one or more MAC control elements (CEs) comprising parameters indicating at least one SCell being set to an active state, a dormant state, or an inactive state.

The wireless device may perform (e.g., if the SCell is in an active state): SRS transmissions on the SCell, CQI/PMI/RI/CRI reporting for the SCell, PDCCH monitoring on the SCell, PDCCH monitoring for the SCell, and/or PUCCH/SPUCCH transmissions on the SCell. The wireless device may (e.g., if the SCell is in an inactive state): not transmit SRS on the SCell, not report CQI/PMI/RI/CRI for the SCell, not transmit on an UL-SCH on the SCell, not transmit on a RACH on the SCell, not monitor PDCCH on the SCell, not monitor a PDCCH for the SCell; and/or not transmit a PUCCH/SPUCCH on the SCell. The wireless device may (e.g., if the SCell is in a dormant state): not transmit SRS on the SCell, report CQI/PMI/RI/CRI for the SCell, not transmit on a UL-SCH on the SCell, not transmit on a RACH on the SCell, not monitor a PDCCH on the SCell, not monitor a PDCCH for the SCell, and/or not transmit a PUCCH/SPUCCH on the SCell.

A base station may send (e.g., transmit), for example, a first MAC CE (e.g., an activation/deactivation MAC CE). The first MAC CE may indicate, to a wireless device, activation or deactivation of at least one SCell. A $C_i$ field may indicate an activation/deactivation status of an SCell with an SCell index i, for example, if an SCell with SCell index i is configured. An SCell with an SCell index i may be activated, for example, if the $C_i$ field is set to one. An SCell with an SCell index i may be deactivated, for example, if the $C_i$ field is set to zero. A wireless device receiving a MAC CE may ignore the $C_i$ field, for example, if there is no SCell configured with SCell index i. An R field may indicate a reserved bit. The R field may be set to zero.

A base station may transmit a MAC CE (e.g., a hibernation MAC CE) that may generally be referred to herein as a second MAC CE. The second MAC CE may be the same as or different from other MAC CEs described herein, but is generally referred to herein as the second MAC CE. The second MAC CE may indicate activation and/or hibernation of at least one SCell to a wireless device. The second MAC CE may be associated with, for example, a second LCID different from a first LCID of the first MAC CE (e.g., the activation/deactivation MAC CE). The second MAC CE may have a fixed size. The second MAC CE may comprise a single octet comprising seven C-fields and one R-field.

FIG. 21A shows an example of a MAC CE (e.g., the second MAC CE referenced above) comprising a single octet. The second MAC CE may comprise four octets comprising 31 C-fields and one R-field. FIG. 21B shows an example of the second MAC CE comprising four octets. A second MAC CE (e.g., comprising four octets) may be associated with a third LCID. The third LCID may be different from the second LCID for the second MAC CE and/or the first LCID for activation/deactivation MAC CE. The second MAC CE (e.g., comprising one octet) may be used, for example, if there is no SCell with a serving cell index greater than a value (e.g., 7 or any other value). The second MAC CE (e.g., comprising four octets) may be used, for example, if there is an SCell with a serving cell index greater than a value (e.g., 7 or any other value). A second MAC CE may indicate a dormant/activated status of an SCell, for example, if a second MAC CE is received and a first MAC CE is not received. The $C_i$ field of the second MAC CE may indicate a dormant/activated status of an SCell with SCell index i if there is an SCell configured with SCell index i, otherwise the MAC entity may ignore the $C_i$ field. A wireless device may transition an SCell associated with SCell index i into a dormant state, for example, if $C_i$ of the second MAC CE is set to "1". The wireless device may activate an SCell associated with SCell index i, for example, if $C_i$ of the second MAC CE is set to "0". The wireless device may activate the SCell with SCell index i, for example, if $C_i$ of the second MAC CE is set to "0" and the SCell with SCell index i is in a dormant state. The wireless device may ignore the $C_i$ field of the second MAC CE, for example, if the $C_i$ field is set to "0" and the SCell with SCell index i is not in a dormant state.

FIG. 21C shows example configurations of a field of the first MAC CE. The field may comprise, for example, a $C_i$ field of the first MAC CE (e.g., an activation/deactivation MAC CE), a $C_i$ field of the second MAC CE (e.g., a hibernation MAC CE), and corresponding resulting SCell status (e.g., activated/deactivated/dormant). The wireless device may deactivate an SCell associated with SCell index i, for example, if $C_i$ of hibernation MAC CE is set to 0, and $C_i$ of the activation/deactivation MAC CE is set to 0. The wireless device may activate an SCell associated with SCell index i, for example, if $C_i$ of hibernation MAC CE is set to 0, and $C_i$ of the activation/deactivation MAC CE is set to 1. The wireless device may ignore the hibernation MAC CE and the activation/deactivation MAC CE, for example, if $C_i$ of hibernation MAC CE is set to 1, and $C_i$ of the activation/deactivation MAC CE is set to 0. The wireless device may transition an SCell associated with SCell index I to a dormant state, for example, if $C_i$ of hibernation MAC CE is set to 1, and $C_i$ of the activation/deactivation MAC CE is set to 1.

Figure 22:
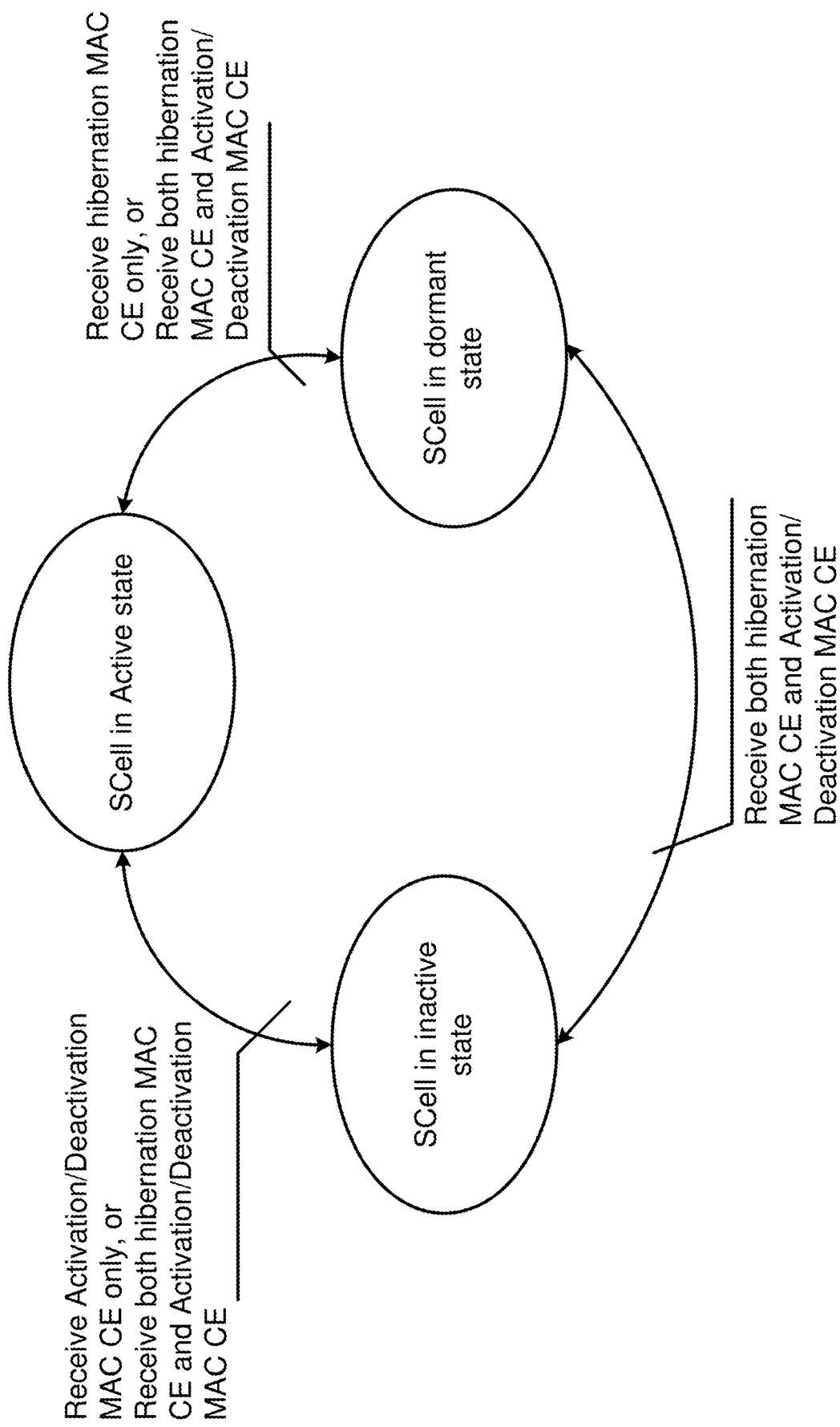
FIG. 22 shows an example for SCell state transition.

FIG. 22 shows an example of SCell state transitions. The SCell state transitions may be based on an activation/deactivation MAC CE and/or a hibernation MAC CE. A first MAC CE (e.g., activation/deactivation MAC CE) and a second MAC CE (e.g., hibernation MAC CE) may indicate possible state transitions of the SCell with SCell index i if there is an SCell configured with SCell index i, and if both the first MAC CE and the second MAC CE are received, otherwise the MAC entity may ignore the $C_i$ fields. The $C_i$ fields of the two MAC CEs may be interpreted according to FIG. 21C. A first MAC CE (e.g., activation/deactivation MAC CE) or a second MAC CE (e.g., hibernation MAC CE) may indicate possible state transitions of the SCell with SCell index i, for example, if there is an SCell configured with SCell index i, and if one of the first MAC CE and the second MAC CE is received. A MAC entity of a wireless device may, for example, deactivate an SCell, for example, if the MAC entity receives a MAC CE(s) (e.g., activation/deactivation MAC CE) indicating deactivation of an SCell. The MAC entity may, based on the MAC CE(s): deactivate the SCell, stop an SCell deactivation timer associated with the SCell, and/or flush all HARQ buffers associated with the SCell.

A base station may activate, hibernate, and/or deactivate at least one of one or more SCells, for example, if the base station is configured with the one or more SCells. A MAC entity of a base station and/or a wireless device may maintain an SCell deactivation timer (e.g., sCellDeactivationTimer), for example, per a configured SCell and/or except for an SCell configured with PUCCH/SPUCCH, if any. The MAC entity of the base station and/or the wireless device may deactivate an associated SCell, for example, if an SCell deactivation timer expires. A MAC entity of a base station and/or a wireless device may maintain dormant SCell deactivation timer (e.g., dormantSCellDeactivationTimer), for example, per a configured SCell and/or except for an SCell configured with PUCCH/SPUCCH, if any. The MAC entity of the base station and/or the wireless device may deactivate an associated SCell, for example, if the dormant SCell deactivation timer expires (e.g., if the SCell is in dormant state).

A MAC entity of a base station and/or a wireless device may, for example, maintain an SCell hibernation timer (e.g., sCellHibernationTimer), for example, per a configured SCell and/or except for an SCell configured with PUCCH/SPUCCH, if any. The MAC entity of the base station and/or the wireless device may hibernate an associated SCell, for example, if the SCell hibernation timer expires (e.g., if the SCell is in active state). The SCell hibernation timer may take priority over the SCell deactivation timer, for example, if both the SCell deactivation timer and the SCell hibernation timer are configured. A base station and/or a wireless device may ignore the SCell deactivation timer regardless of the SCell deactivation timer expiry, for example, if both the SCell deactivation timer and the SCell hibernation timer are configured.

Figure 23:
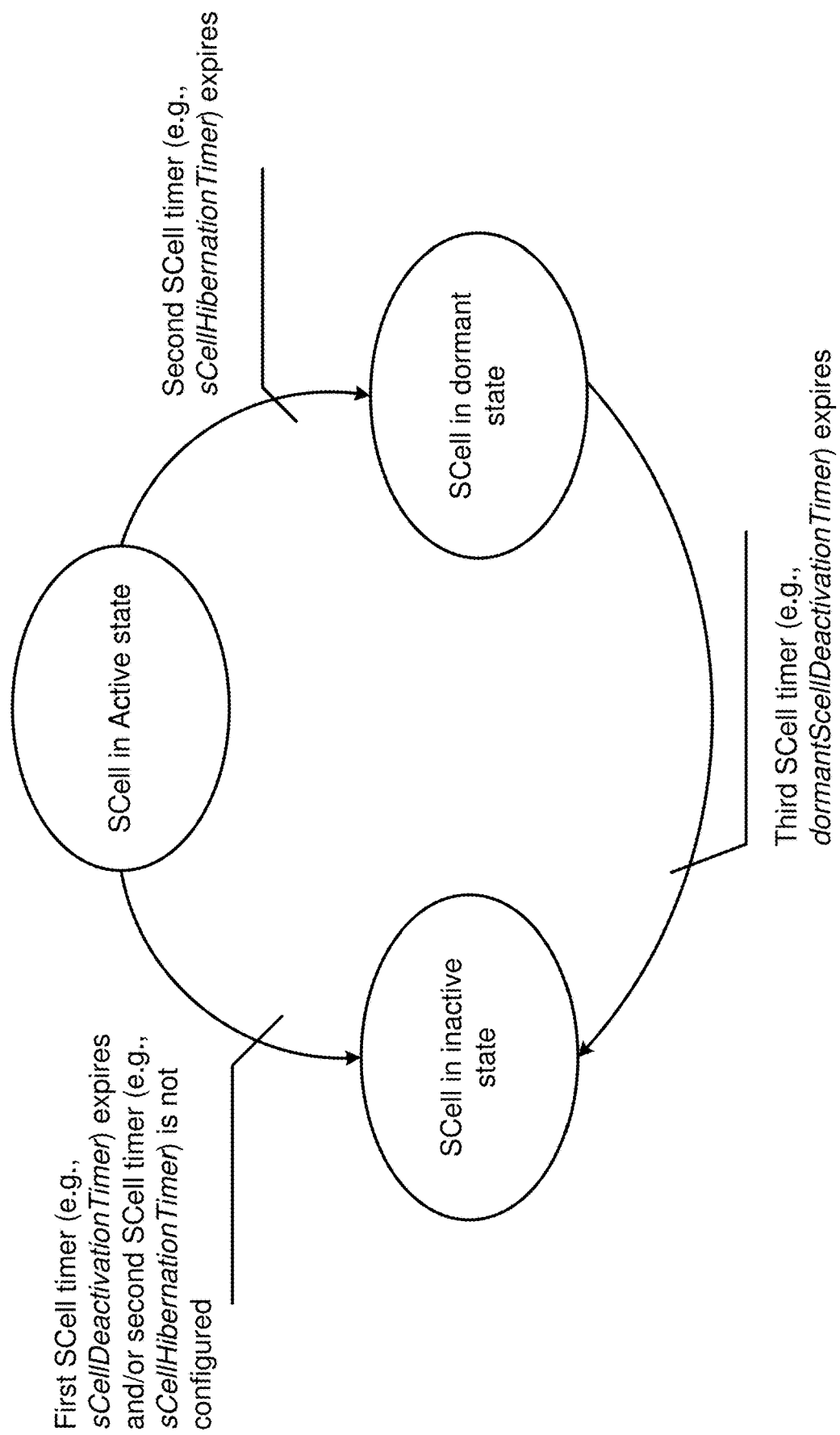
FIG. 23 shows an example for SCell state transition.

FIG. 23 shows an example of SCell states (e.g., state transitions, state switching, etc.). The SCell state transitions may be based on, for example, a first SCell timer (e.g., an SCell deactivation timer or sCellDeactivationTimer), a second SCell timer (e.g., an SCell hibernation timer or sCellHibernationTimer), and/or a third SCell timer (e.g., a dormant SCell deactivation timer or dormantSCellDeactivationTimer). A base station (e.g., a MAC entity of a base station) and/or a wireless device (e.g., a MAC entity of a wireless device) may, for example, implement the SCell state transitions based on expiration of the first SCell timer, the second SCell timer, and/or the third SCell. The base station and/or the wireless device may, for example, implement the SCell state transitions based on whether or not a timer (e.g., the second SCell timer) is configured. A base station (e.g., a MAC entity of a base station) and/or a wireless device (e.g., a MAC entity of a wireless device) may (e.g., if an SCell deactivation timer expires and an SCell hibernation timer is not configured): deactivate an SCell, stop the SCell deactivation timer associated with the SCell, and/or flush all HARQ buffers associated with the SCell.

A wireless device (e.g., MAC entity of a wireless device) may activate an SCell, for example, if the MAC entity is configured with an activated SCell at SCell configuration. A wireless device (e.g., MAC entity of a wireless device) may activate an SCell, for example, if the wireless device receives a MAC CE(s) activating the SCell. The wireless device (e.g., MAC entity of a wireless device) may start or restart an SCell deactivation timer associated with an SCell, for example, based on or in response to activating the SCell. The wireless device (e.g., MAC entity of a wireless device) may start or restart an SCell hibernation timer (e.g., if configured) associated with an SCell, for example, based on or in response to activating the SCell. A wireless device (e.g., MAC entity of a wireless device) may trigger a PHR procedure, for example, based on or in response to activating an SCell.

A wireless device (e.g., MAC entity of a wireless device) and/or a base station (e.g., a MAC entity of a base station) may (e.g., if a first PDCCH on an SCell indicates an uplink grant or downlink assignment, or a second PDCCH on a serving cell scheduling the SCell indicates an uplink grant or a downlink assignment for the SCell, or a MAC PDU is transmitted in a configured uplink grant or received in a configured downlink assignment) restart an SCell deactivation timer associated with an activated SCell and/or restart an SCell hibernation timer (e.g., if configured) associated with the SCell. An ongoing random access (RA) procedure on an SCell may be aborted, for example, if, the SCell is deactivated.

A wireless device (e.g., MAC entity of a wireless device) and/or a base station (e.g., a MAC entity of a base station) may (e.g., if configured with an SCell associated with an SCell state set to dormant state upon the SCell configuration, or if receiving MAC CE(s) indicating transitioning the SCell to a dormant state): set (e.g., transition) the SCell to a dormant state, transmit one or more CSI reports for the SCell, stop an SCell deactivation timer associated with the SCell, stop an SCell hibernation timer (if configured) associated with the SCell, start or restart a dormant SCell deactivation timer associated with the SCell, and/or flush all HARQ buffers associated with the SCell. The wireless device (e.g., MAC entity of a wireless device) and/or a base station (e.g., a MAC entity of a base station) may (e.g., if the SCell hibernation timer associated with the activated SCell expires): hibernate the SCell, stop the SCell deactivation timer associated with the SCell, stop the SCell hibernation timer associated with the SCell, and/or flush all HARQ buffers associated with the SCell. The wireless device (e.g., MAC entity of a wireless device) and/or a base station (e.g., a MAC entity of a base station) may (e.g., if a dormant SCell deactivation timer associated with a dormant SCell expires): deactivate the SCell and/or stop the dormant SCell deactivation timer associated with the SCell. Ongoing RA procedure on an SCell may be aborted, for example, if the SCell is in dormant state.

A base station (e.g., a gNB) may configure a wireless device (e.g., a UE) with UL BWPs and DL BWPs to enable BA on a PCell. The base station may further configure the wireless device with at least DL BWP(s) (e.g., there may be no UL BWPs in the UL) to enable BA on an SCell, if CA is configured. An initial active BWP may be a first BWP used for initial access, for example, for the PCell. A first active BWP may be a second BWP configured for the wireless device to operate on the SCell, upon the SCell being activated. A base station and/or a wireless device may independently switch a DL BWP and an UL BWP, for example, if operating in a paired spectrum (e.g., FDD). A base station and/or a wireless device may simultaneously switch a DL BWP and an UL BWP, for example, if operating in an unpaired spectrum (e.g., TDD).

A base station and/or a wireless device may switch a BWP between configured BWPs, for example, based on a DCI or a BWP inactivity timer. A base station and/or a wireless device may switch an active BWP to a default BWP, for example, based on or in response to an expiry of a BWP inactivity timer, if configured, associated with a serving cell. The default BWP may be configured by the network.

One UL BWP for each uplink carrier and one DL BWP, for example, may be active at a time in an active serving cell, for example, for FDD systems that are configured with BA. One DL/UL BWP pair, for example, may be active at a time in an active serving cell, for example, for TDD systems. Operating on the one UL BWP and the one DL BWP (or the one DL/UL BWP pair) may, for example, improve wireless device battery consumption. BWPs other than the one active UL BWP and the one active DL BWP that the wireless device may work on may be deactivated. On deactivated BWPs, the wireless device may: not monitor PDCCH and/or not transmit on a PUCCH, PRACH, and/or UL-SCH.

A serving cell may be configured with any number of BWPs (e.g., up to four, or up to any other number of BWPs). There may be, for example, one or any other number of active BWPs at any point in time for an activated serving cell.

BWP switching for a serving cell may be used, for example, to activate an inactive BWP and/or deactivate an active BWP (e.g., at a time t). The BWP switching may be controlled, for example, by a PDCCH indicating a downlink assignment and/or an uplink grant. The BWP switching may be controlled, for example, by a BWP inactivity timer (e.g., bwp-InactivityTimer). The BWP switching may be controlled, for example, by a MAC entity based on or in response to initiating an RA procedure. One or more BWPs may be initially active, without receiving a PDCCH indicating a downlink assignment or an uplink grant, for example, if an SpCell is added or an SCell is activated. The active BWP for a serving cell may be indicated by RRC message and/or PDCCH. A DL BWP may be paired with an UL BWP, and BWP switching may be common for both UL and DL, for example, for unpaired spectrum.

Figure 24:
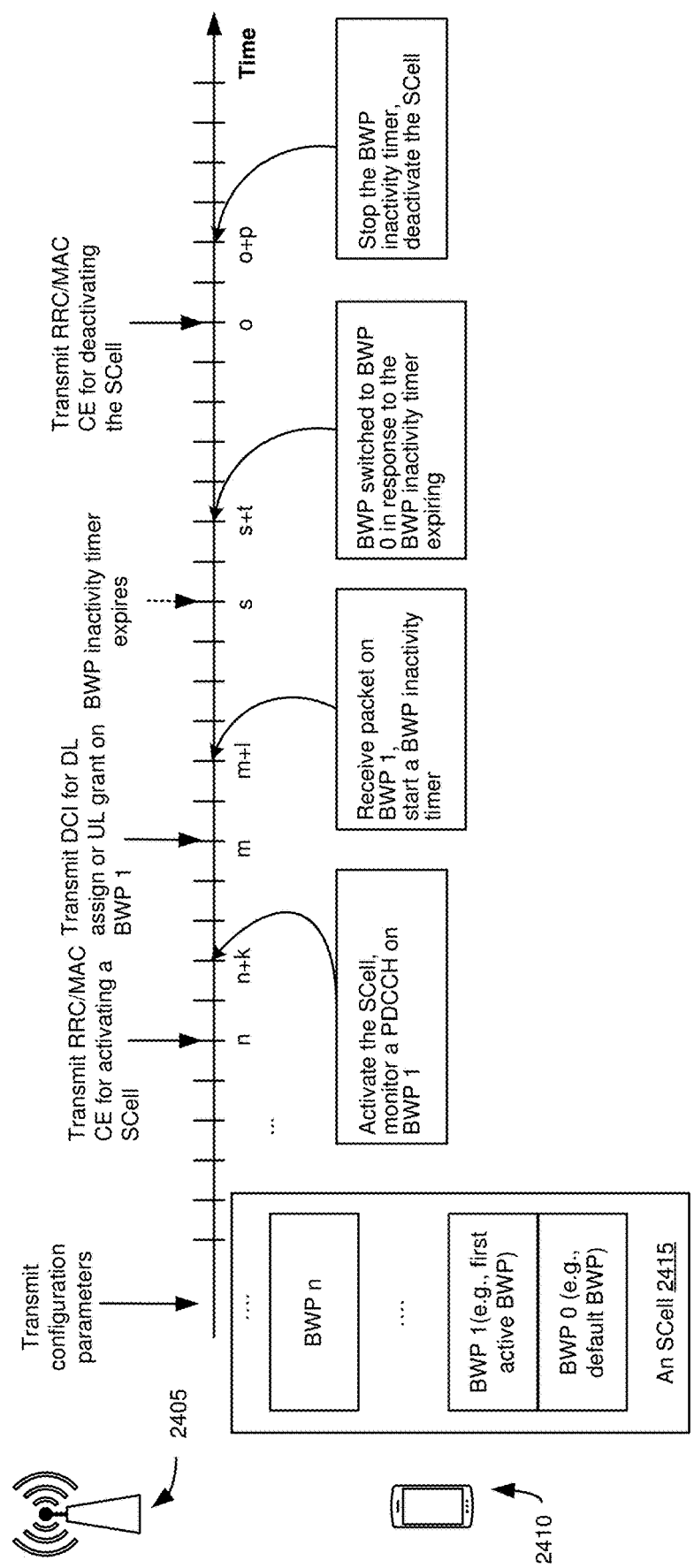
FIG. 24 shows an example of BWP switching for an SCell.

FIG. 24 shows an example of BWP switching for an SCell. A base station 2405 may send (e.g., transmit) one or more messages, to a wireless device 2410. The one or more messages may be for configuring BWPs corresponding to the SCell 2415. The one or more messages may comprise, for example, one or more RRC messages (e.g., RRC connection reconfiguration message, and/or RRC connection reestablishment message, and/or RRC connection setup message). The configured BWPs may comprise BWP 0, BWP 1, . . . BWP n. The BWP 0 may be configured as a default BWP. The BWP 1 may be configured as a first active BWP. At time n, the base station 2405 may send (e.g., transmit) an RRC message and/or a MAC CE for activating the SCell. At or after time n+k, and based on the reception of the RRC message and/or the MAC CE, the wireless device 2410 may activate the SCell and start monitoring a PDCCH on the BWP 1 (e.g., the first active BWP). At or after time m, the base station 2405 may send (e.g., transmit) DCI for DL assignment or UL grant on the BWP 1. At or after time m+l, the wireless device 2410 may receive a packet on the BWP 1 and may start a BWP inactivity timer (e.g., bwp-InactivityTimer). At time s, the BWP inactivity timer may expire. At or after time s+t, a BWP may switch to BWP 0 based on expiration of the BWP inactivity timer. BWP switching may comprise, for example, activating the BWP 0 and deactivating the BWP 1. At time o, the base station 2405 may send (e.g., transmit) an RRC message and/or a MAC CE for deactivating an SCell. At or after time o+p, the wireless device 2410 may stop the BWP inactivity timer and deactivate the SCell 2415.

A wireless device may receive RRC message comprising parameters of a SCell and one or more BWP configuration associated with the SCell. The RRC message may comprise: RRC connection reconfiguration message (e.g., RRCReconfiguration); RRC connection reestablishment message (e.g., RRCRestablishment); and/or RRC connection setup message (e.g., RRCSetup). Among the one or more BWPs, at least one BWP may be configured as the first active BWP (e.g., BWP 1 in FIG. 24), one BWP as the default BWP (e.g., BWP 0 in FIG. 24). The wireless device may receive a MAC CE to activate the SCell at $n^{th}$ slot. The wireless device may start a SCell deactivation timer (e.g., sCellDeactivation-Timer), and start CSI related actions for the SCell, and/or start CSI related actions for the first active BWP of the SCell. The wireless device may start monitoring a PDCCH on BWP 1 in response to activating the SCell.

The wireless device may start restart a BWP inactivity timer (e.g., bwp-InactivityTimer) at $m^{th}$ slot in response to receiving a DCI indicating DL assignment on BWP 1. The wireless device may switch back to the default BWP (e.g., BWP 0) as an active BWP when the BWP inactivity timer expires, at $s^{th}$ slot. The wireless device may deactivate the SCell and/or stop the BWP inactivity timer when the sCell-DeactivationTimer expires.

Employing the BWP inactivity timer may further reduce a wireless device's power consumption when the wireless device is configured with multiple cells with each cell having wide bandwidth (e.g., 1 GHz). The wireless device may only transmit on or receive from a narrow-bandwidth BWP (e.g., 5 MHz) on the PCell or SCell when there is no activity on an active BWP.

A MAC entity may perform operations, on an active BWP for an activated serving cell (e.g., configured with a BWP), comprising: transmitting on an UL-SCH; transmitting on a RACH, monitoring a PDCCH, transmitting on a PUCCH, receiving DL-SCH, and/or (re-) initializing any suspended configured uplink grants of configured grant Type 1 according to a stored configuration, if any. On an inactive BWP for each activated serving cell configured with a BWP, a MAC entity may, for example: not transmit on an UL-SCH, not transmit on a RACH, not monitor a PDCCH, not transmit on a PUCCH, not transmit a SRS, not receive a DL-SCH, clear any configured downlink assignment and configured uplink grant of configured grant Type 2, and/or suspend any configured uplink grant of configured Type 1. A wireless device may perform the BWP switching to a BWP indicated by the PDCCH, for example, if a MAC entity receives a PDCCH for a BWP switching of a serving cell and a RA procedure associated with this serving cell is not ongoing.

A bandwidth part indicator field value may indicate an active DL BWP, from a configured DL BWP set, for DL receptions for example, if the bandwidth part indicator field is configured in DCI format 1_1. A bandwidth part indicator field value, may indicate an active UL BWP, from a configured UL BWP set, for UL transmissions, for example, if the bandwidth part indicator field is configured in DCI format 0_1.

A wireless device may be provided by a higher layer parameter a timer value corresponding to a BWP inactivity timer for the PCell (e.g., bwp-InactivityTimer). The wireless device may increment the timer, if running, for example, every interval of 1 millisecond (or any other first duration) for frequency range 1 (or any other first frequency range) or every 0.5 milliseconds (or any other second duration) for frequency range 2 (or any other second frequency range), for example, if: the wireless device does not detect DCI format 1_1 for paired spectrum operation, or the wireless device does not detect DCI format 1_1 or DCI format 0_1 for unpaired spectrum operation, during the interval.

Wireless device procedures on an SCell may be similar to or the same as procedures on a PCell, for example, if the wireless device is configured for the SCell with a higher layer parameter indicating a default DL BWP among configured DL BWPs (e.g., Default-DL-BWP), and/or if the wireless device is configured with a higher layer parameter indicating a timer value (e.g., bwp-InactivityTimer). The wireless device procedures on the SCell may use the timer value for the SCell and the default DL BWP for the SCell. The wireless device may use, as first active DL BWP and first active UL BWP on the SCell or secondary cell, an indicated DL BWP and an indicated UL BWP on the SCell, respectively, if a wireless device is configured, for example, by a higher layer parameter for the DL BWP (e.g., active-BWP-DL-SCell), and/or by a higher layer parameter for the UL BWP on the SCell or secondary cell (e.g., active-BWP-UL-SCell).

A wireless device may transmit one or more uplink control information (UCI) via one or more PUCCH resources to a base station. The wireless device may transmit the one or more UCI, for example, as part of a discontinuous reception (DRX) operation. The one or more UCI may comprise at least one of: HARQ-ACK information; scheduling request (SR); and/or CSI report. A PUCCH resource may be identified by at least: frequency location (e.g., starting PRB); and/or a PUCCH format associated with initial cyclic shift of a base sequence and time domain location (e.g., starting symbol index). A PUCCH format may be PUCCH format 0, PUCCH format 1, PUCCH format 2, PUCCH format 3, or PUCCH format 4. A PUCCH format 0 may have a length of 1 or 2 OFDM symbols and be less than or equal to 2 bits. A PUCCH format 1 may occupy a number between 4 and 14 of OFDM symbols and be less than or equal to 2 bits. A PUCCH format 2 may occupy 1 or 2 OFDM symbols and be greater than 2 bits. A PUCCH format 3 may occupy a number between 4 and 14 of OFDM symbols and be greater than 2 bits. A PUCCH format 4 may occupy a number between 4 and 14 of OFDM symbols and be greater than 2 bits. The PUCCH resource may be configured on a PCell, or a PUCCH secondary cell.

If configured with multiple uplink BWPs, a base station may transmit to a wireless device, one or more RRC messages comprising configuration parameters of one or more PUCCH resource sets (e.g., at most 4 sets) on an uplink BWP of the multiple uplink BWPs. Each PUCCH resource set may be configured with a PUCCH resource set index, a list of PUCCH resources with each PUCCH resource being identified by a PUCCH resource identifier (e.g., pucch-Resourceid), and/or a maximum number of UCI information bits a wireless device may transmit using one of the plurality of PUCCH resources in the PUCCH resource set.

If configured with one or more PUCCH resource sets, a wireless device may select one of the one or more PUCCH resource sets based on a total bit length of UCI information bits (e.g., HARQ-ARQ bits, SR, and/or CSI) the wireless device will transmit. In an example, when the total bit length of UCI information bits is less than or equal to 2, the wireless device may select a first PUCCH resource set with the PUCCH resource set index equal to "0". When the total bit length of UCI information bits is greater than 2 and less than or equal to a first configured value, the wireless device may select a second PUCCH resource set with the PUCCH resource set index equal to "1". When the total bit length of UCI information bits is greater than the first configured value and less than or equal to a second configured value, the wireless device may select a third PUCCH resource set with the PUCCH resource set index equal to "2". When the total bit length of UCI information bits is greater than the second configured value and less than or equal to a third value (e.g., 1706), the wireless device may select a fourth PUCCH resource set with the PUCCH resource set index equal to "3".

A wireless device may determine, based on a number of uplink symbols of UCI transmission and a number of UCI bits, a PUCCH format from a plurality of PUCCH formats comprising PUCCH format 0, PUCCH format 1, PUCCH format 2, PUCCH format 3 and/or PUCCH format 4. The wireless device may transmit UCI in a PUCCH using PUCCH format 0 if the transmission is over 1 symbol or 2 symbols and the number of HARQ-ACK information bits with positive or negative SR (HARQ-ACK/SR bits) is 1 or 2. The wireless device may transmit UCI in a PUCCH using PUCCH format 1 if the transmission is over 4 or more symbols and the number of HARQ-ACK/SR bits is 1 or 2. The wireless device may transmit UCI in a PUCCH using PUCCH format 2 if the transmission is over 1 symbol or 2 symbols and the number of UCI bits is more than 2. The wireless device may transmit UCI in a PUCCH using PUCCH format 3 if the transmission is over 4 or more symbols, the number of UCI bits is more than 2 and PUCCH resource does not include an orthogonal cover code. The wireless device may transmit UCI in a PUCCH using PUCCH format 4 if the transmission is over 4 or more symbols, the number of UCI bits is more than 2 and the PUCCH resource includes an orthogonal cover code.

In order to transmit HARQ-ACK information on a PUCCH resource, a wireless device may determine the PUCCH resource from a PUCCH resource set. The PUCCH resource set may be determined as mentioned above. The wireless device may determine the PUCCH resource based on a PUCCH resource indicator field in a DCI (e.g., with a DCI format 1_0 or DCI for 1_1) received on a PDCCH. A 3-bit PUCCH resource indicator field in the DCI may indicate one of eight PUCCH resources in the PUCCH resource set. The wireless device may transmit the HARQ-ACK information in a PUCCH resource indicated by the 3-bit PUCCH resource indicator field in the DCI.

The wireless device may transmit one or more UCI bits via a PUCCH resource of an active uplink BWP of a PCell or a PUCCH secondary cell. Since at most one active uplink BWP in a cell is supported for a wireless device, the PUCCH resource indicated in the DCI is naturally a PUCCH resource on the active uplink BWP of the cell.

Discontinuous reception (DRX) operation may be used by a wireless device, for example, to reduce power consumption, resource consumption (e.g., frequency and/or time resources), and/or improve battery lifetime of the wireless device. A wireless device may discontinuously monitor downlink control channel (e.g., PDCCH or EPDCCH), for example, if the wireless device is operating using DRX. The base station may configure DRX operation with a set of DRX parameters. The base station may configure the DRX operation using an RRC configuration. The set of DRX parameters may be selected (e.g., by the base station) based on a network use case. A wireless device may receive data packets over an extended delay, based on the configured DRX operation. The configured DRX may be used such that a base station may wait, at least until the wireless device transitions to a DRX ON state, to receive data packets. The wireless device may be in a DRX Sleep/OFF state, for example, if not receiving any data packets. The base station may select the DRX parameters, based on a consideration of a tradeoff between packet delay and power/resource conservation.

A wireless device that is configured with a DRX operation may power down at least some (or most) of its circuitry, for example, if there are no packets to be received. The wireless device may monitor PDCCH discontinuously, for example, if DRX operation is configured. The wireless device may monitor the PDCCH continuously, for example, if a DRX operation is not configured. The wireless device may listen to and/or monitor DL channels (e.g., PDCCHs) in a DRX active state, for example, if DRX is configured. The wireless device may not listen to and/or monitor the DL channels (e.g., the PDCCHs) in a DRX Sleep state, for example, if DRX is configured.

Figure 25:
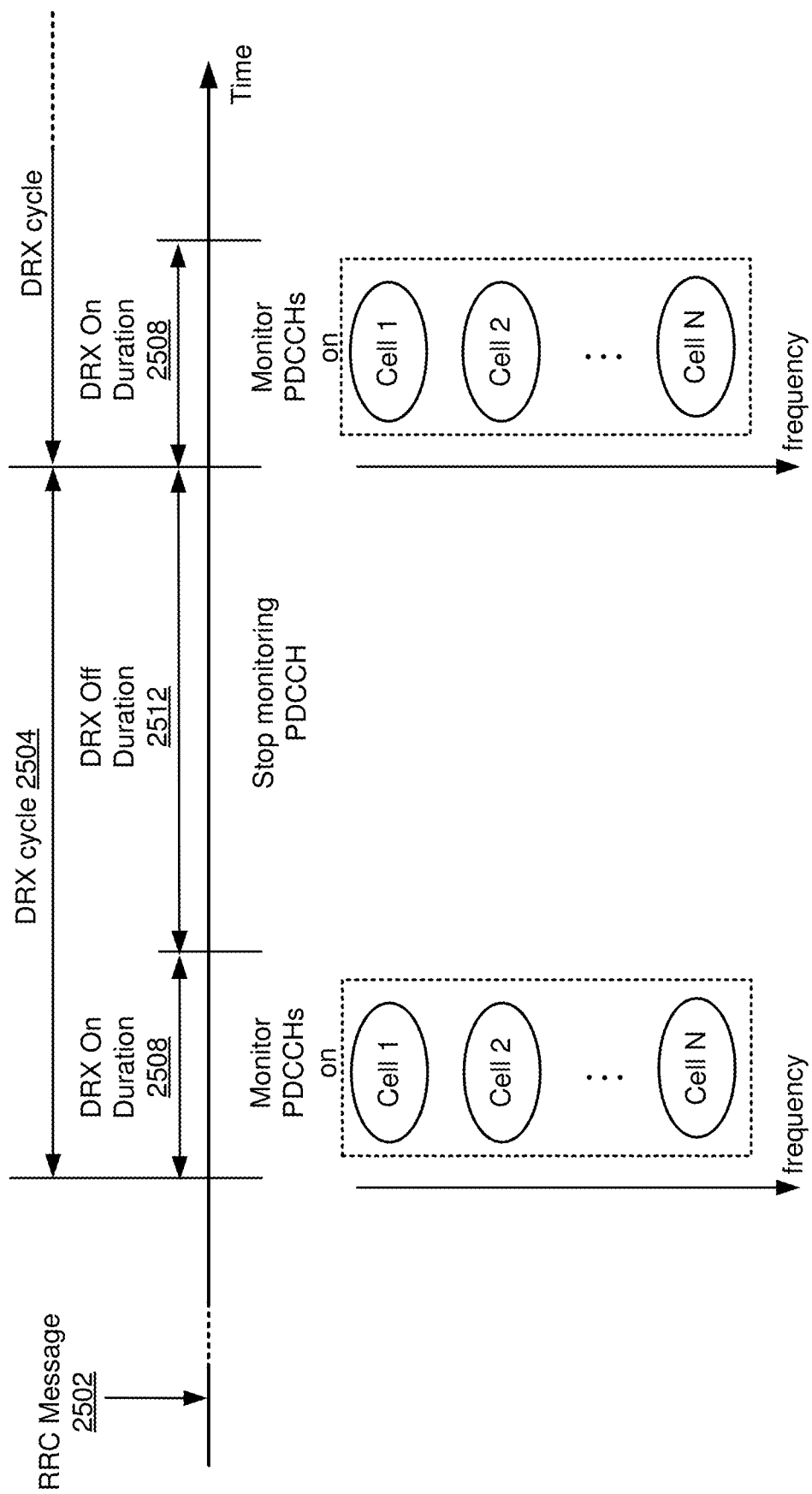
FIG. 25 shows an example of discontinuous reception (DRX) operation.

FIG. 25 shows an example of a DRX operation. A base station (e.g., a gNB) may transmit an RRC message 2502 comprising, for example, one or more DRX parameters of a DRX cycle 2504. The RRC message may comprise: RRC connection reconfiguration message (e.g., RRCReconfiguration); RRC connection reestablishment message (e.g., RRCRestablishment); and/or RRC connection setup message (e.g., RRCSetup). The one or more parameters may comprise, for example, a first parameter and/or a second parameter. The first parameter may indicate a first time value of a DRX active state (e.g., DRX active/on duration 2508) of the DRX cycle 2504. The second parameter may indicate a second time of a DRX sleep state (e.g., DRX sleep/off duration 2512) of the DRX cycle 2504. The one or more parameters may further comprise, for example, a time duration of the DRX cycle 2504.

The wireless device may monitor PDCCHs, for detecting one or more DCIs on a serving cell, for example, if the wireless device is in the DRX active state. The wireless device may stop monitoring PDCCHs on the serving cell, for example, if the wireless device is in the DRX sleep state. The wireless device may monitor all PDCCHs on (or for) multiple cells that are in an active state, for example, if the wireless device is in the DRX active state. The wireless device may stop monitoring all PDCCH on (or for) the multiple cells, for example, if the wireless device is in the DRX sleep state. The wireless device may repeat the DRX operations according to the one or more DRX parameters.

DRX operation may be beneficial to a base station. A wireless device may transmit periodic CSI and/or SRS frequently (e.g., based on a configuration), for example, if DRX is not configured. The wireless device may not transmit periodic CSI and/or SRS in a DRX off period, for example, if DRX is not configured. The base station may assign resources in DRX off period, that would otherwise be used for transmitting periodic CSI and/or SRS, to the other wireless devices, for example, to improve resource utilization efficiency.

A wireless device (e.g., a MAC entity of the wireless device) may be configured by RRC with a DRX functionality that controls downlink control channel (e.g., PDCCH) monitoring activity, of the wireless device, for a plurality of RNTIs for the wireless device. The plurality of RNTIs may comprise, for example, at least one of: C-RNTI, CS-RNTI, INT-RNTI, SP-CSI-RNTI, SFI-RNTI, TPC-PUCCH-RNTI, TPC-PUSCH-RNTI, Semi-Persistent Scheduling C-RNTI, eIMTA-RNTI, SL-RNTI, SL-V-RNTI, CC-RNTI, and/or SRS-TPC-RNTI. The wireless device (e.g., based on the wireless device being RRC_CONNECTED) may monitor the PDCCH discontinuously using a DRX operation, for example, if DRX is configured. The wireless device (e.g., the MAC entity of the wireless device) may monitor the PDCCH continuously, for example, if DRX is not configured.

RRC may control DRX operation, for example, by configuring a plurality of timers. The plurality of timers may comprise, for example: a DRX On duration timer (e.g., drx-onDurationTimer), a DRX inactivity timer (e.g., drx-InactivityTimer), a downlink DRX HARQ RTT timer (e.g., drx-HARQ-RTT-TimerDL), an uplink DRX HARQ RTT Timer (e.g., drx-HARQ-RTT-TimerUL), a downlink retransmission timer (e.g., drx-RetransmissionTimerDL), an uplink retransmission timer (e.g., drx-RetransmissionTimerUL), one or more parameters of a short DRX configuration (e.g., drx-ShortCycle and/or drx-ShortCycleTimer)), and/or one or more parameters of a long DRX configuration (e.g., drx-LongCycle). Time granularity for DRX timers may be defined in terms of PDCCH subframes (e.g., indicated as psf in DRX configurations), or in terms of milliseconds.

An active time of a DRX cycle may include a time duration/period in which at least one timer is running. The at least one timer may comprise drx-onDurationTimer, drx-InactivityTimer, drx-RetransmissionTimerDL, drx-RetransmissionTimerUL, or mac-ContentionResolutionTimer.

A drx-Inactivity-Timer may specify a time duration/period for which the wireless device may be active based on successfully decoding a PDCCH indicating a new transmission (UL or DL or SL). The drx-Inactivity-Timer may be restarted upon receiving PDCCH for a new transmission (UL or DL or SL). The wireless device may transition to a DRX mode (e.g., using a short DRX cycle or a long DRX cycle), for example, based on the expiry of the drx-Inactivity-Timer.

A drx-ShortCycle may be a first type of DRX cycle (e.g., if configured) that may be followed, for example, if a wireless device enters DRX mode. A DRX-Config IE may indicate a length of the short cycle. A drx-ShortCycleTimer may be expressed as multiples of shortDRX-Cycle. The timer may indicate a number of initial DRX cycles to follow the short DRX cycle before entering a long DRX cycle.

A drx-onDurationTimer may specify, for example, a time duration at the beginning of a DRX Cycle (e.g., DRX ON). The drx-onDurationTimer may indicate, for example, a time duration before entering a sleep mode (e.g., DRX OFF).

A drx-HARQ-RTT-TimerDL may specify a minimum duration between a time at which a new transmission (e.g., a packet) is received and a time at which the wireless device may expect a retransmission (e.g., of the packet). The drx-HARQ-RTT-TimerDL may be, for example, fixed and not configurable by RRC. A drx-RetransmissionTimerDL may indicate a maximum duration for which a wireless device may monitor PDCCH, for example, if a retransmission from a base station is expected by the wireless device.

An active time of a configured DRX cycle may comprise, for example, a time at which a scheduling request (e.g., sent on PUCCH) is pending. An active time of a configured DXR cycle may comprise, for example, a time in which an uplink grant for a pending HARQ retransmission may occur, and in which data is present in a corresponding HARQ buffer for a synchronous HARQ process. An active time of a configured DRX cycle may comprise, for example, a time in which a PDCCH indicating a new transmission, addressed to the C-RNTI of the wireless device (e.g., a MAC entity of the wireless device), has not been received at the wireless device (e.g., after a successful reception of an RA response at the wireless device). The RA response may correspond to, for example, a response to a preamble that is not selected by the wireless device, (e.g., the MAC entity of the wireless device).

A DL HARQ RTT timer may expire in a subframe and data of a corresponding HARQ process may not be successfully decoded, for example, at a wireless device configured for DRX. A wireless device (e.g., a MAC entity of the wireless device) may start the drx-RetransmissionTimerDL for the corresponding HARQ process. An UL HARQ RTT timer may expire in a subframe, for example, at a wireless device configured for DRX. A wireless device (e.g., a MAC entity of the wireless device) may start the drx-RetransmissionTimerUL for a corresponding HARQ process. A DRX command MAC CE or a long DRX command MAC CE may be received, for example, at a wireless device configured for DRX. A wireless device (e.g., a MAC entity of the wireless device) may stop the drx-onDurationTimer and stop the drx-InactivityTimer.

A drx-InactivityTimer may expire or a DRX command MAC CE may be received in a subframe, for example, at a wireless device configured for DRX. A wireless device (e.g., a MAC entity of the wireless device) may start or restart drx-ShortCycleTimer and may use a Short DRX Cycle, for example, if the Short DRX cycle is configured. The wireless device (e.g., the MAC entity of the wireless device) may use a Long DRX cycle, if the long DRX cycle is configured.

A drx-ShortCycleTimer may expire in a subframe, for example, at a wireless device configured for DRX. A wireless device (e.g., a MAC entity of the wireless device) may use the long DRX cycle (e.g., based on expiration of the drx-ShortCycleTimer). A long DRX command MAC CE may be received. The wireless device (e.g., the MAC entity of the wireless device) may stop a drx-ShortCycleTimer and may use the long DRX cycle (e.g., based on reception of the long DRX command MAC CE).

A wireless device that is configured for DRX operation may start a drx-onDurationTimer, for example, if the short DRX cycle is used and if [(SFN*10)+subframe number] modulo (drx-ShortCycle)=(drxStartOffset) modulo (drx-ShortCycle). A wireless device that is configured for DRX operation may start a drx-onDurationTimer, for example, if the Long DRX Cycle is used and if [(SFN*10)+subframe number] modulo (drx-longCycle)=drxStartOffset.

Figure 26:
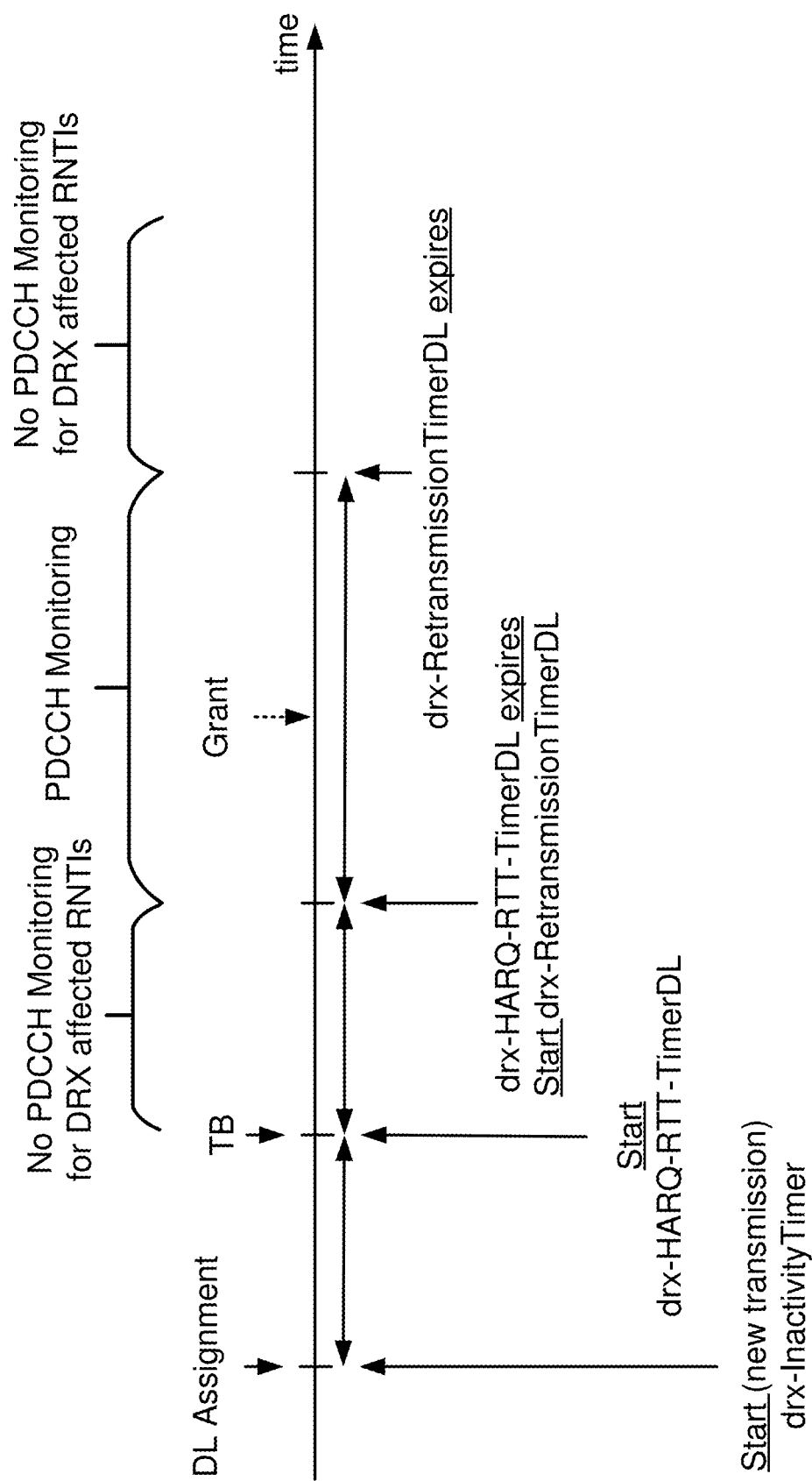
FIG. 26 shows an example of DRX operation.

FIG. 26 shows example of DRX operation. A base station may send (e.g., transmit) an RRC message to a wireless device. The RRC message may comprise configuration parameters of DRX operation. The base station may send (e.g., transmit), via a PDCCH, DCI for downlink resource allocation, to the wireless device. The wireless device may start a drx-InactivityTimer and may monitor the PDCCH. The wireless device may receive a transmission block (TB), for example, while the drx-InactivityTimer is running. The wireless device may start a HARQ RTT timer (e.g., drx-HARQ-RTT-TimerDL), and may stop monitoring the PDCCH, for example, based on receiving the TB. The wireless device may transmit a NACK to the base station, for example, if the wireless device fails to receive the TB. The wireless device may monitor the PDCCH and start a HARQ retransmission timer (e.g., drx-RetransmissionTimerDL), for example, based on an expiration of the HARQ RTT Timer. The wireless device may receive second DCI, for example, while the HARQ retransmission timer is running. The second DCI may indicate, for example, a DL grant for a retransmission of the TB. The wireless device may stop monitoring the PDCCH, for example, if the wireless device fails to receive a second DCI before an expiration of the HARQ retransmission timer.

A wireless device may monitor PDCCH to detect DCI (e.g., one or more DCI messages) during a DRX active time of a DRX cycle, for example, if the wireless device is configured with DRX operation. The wireless device may stop monitoring PDCCH during the DRX sleep/off time of the DRX cycle, for example, to reduce power consumption. DCI (e.g., one or more DCI messages) during a DRX active time of a DRX cycle may be addressed to other communication devices, different from the wireless device, for example, in at least some DRX operations. The wireless device may consume power, for example, if the wireless device monitors the PDCCH during the DRX active time of the DRX cycle, but the DCI (e.g., the one or more DCI messages) is addressed to the other communication devices. In at least some communication systems, the wireless device may be, for example, an ultra-reliable low-latency communication (URLLC) wireless device, a narrowband internet of things (NB-IoT) wireless device, or a machine-type communication (MTC) wireless device. The wireless device may not always have data to be received from a base station. Waking up to monitor PDCCH in the DRX active time may result in wasted power consumption, for example, if there is no data to be received from the base station. A wake-up mechanism may be combined with DRX operation, for example, to further reduce power consumption in a DRX active time. The wake-up mechanism may be used to selectively activate the wireless device, for example, to be operational for a particular DRX cycle. The wireless device may wake-up and monitor PDCCH to detect DCI (e.g., one or more DCI messages) during a DRX active time of the particular DRX cycle.

In at least some communication systems, a wireless device may not be configured for DRX operation. The wake-up mechanism may be used to selectively activate the wireless device, for example, to be operational for a particular time period. The wake-up mechanism may be used to selectively activate the wireless device to continuously monitor PDCCH in a particular time period.

FIG. 27A and FIG. 27B show examples of a wake-up mechanism. In FIG. 27A, a base station may send (e.g., transmit) one or more messages 2702 (e.g., RRC messages) comprising parameters of a wake-up duration 2704 (or a power saving duration), to a wireless device. The wake-up duration may be a number of slots (or symbols) before a DRX On duration 2706 of a DRX cycle. The number of slots (or symbols), or a gap, between the wake-up duration 2704 (e.g., an end of the wake-up duration) and the DRX On duration 2706, may be configured in one or more RRC messages, or may be a fixed and predefined value. The gap may be used for at least one of: synchronization with the base station, measurement of reference signals, and/or retuning of RF parameters. The gap may be determined based on capabilities of the wireless device and/or the base station. The wake-up mechanism may be based on a wake-up signal. The parameters of the wake-up duration 2704 may comprise at least one of: a wake-up signal format (e.g., numerology, sequence length, sequence code, etc.), a periodicity of the wake-up signal, a time duration value of the wake-up duration, and/or a frequency location of the wake-up signal.

A wake-up signal for paging may comprise a signal sequence (e.g., a Zadoff-Chu sequence) that is generated based on a cell identification (e.g., cell ID). The signal sequence may be, for example:

$$w(m) = \theta_{n_f,n_s}(m) \cdot e^{-\frac{j\pi un(n+1)}{131}},$$

wherein m=0, 1, ..., 132M−1, n=m mod 132, $$\theta_{n_f,n_s}(m) = \begin{cases} 1, & \text{if } c_{n_f,n_s}(2m) = 0 \text{ and } c_{n_f,n_s}(2m+1) = 0 \\ -1, & \text{if } c_{n_f,n_s}(2m) = 0 \text{ and } c_{n_f,n_s}(2m+1) = 1 \\ j, & \text{if } c_{n_f,n_s}(2m) = 1 \text{ and } c_{n_f,n_s}(2m+1) = 0 \\ -j, & \text{if } c_{n_f,n_s}(2m) = 1 \text{ and } c_{n_f,n_s}(2m+1) = 1 \end{cases},$$

$$\text{and } u = \left(N_{ID}^{cell} \bmod 126\right) + 3.$$

$N_{ID}^{cell}$ may be a cell ID of the serving cell. M may be a number of subframes in which the wake-up signal may be transmitted. M may be bounded by a parameter, $M_{WUSmax}$, such that $1 \leq M \leq M_{WUSmax}$. $M_{WUSmax}$ may be the maximum number of subframes in which the wake-up signal may be transmitted. $c_{n_f,n_s}(i)$, i=0, 1, ..., 2·132M−1 may be a scrambling sequence (e.g., a length-31 Gold sequence). The scrambling sequence may be initialized at a start of transmission of the wake-up with:

$$c_{init\_WUS} = \left(N_{ID}^{cell} + 1\right)\left(\left(10 n_{f\_start\_PO} + \left\lfloor \frac{n_{s\_start\_PO}}{2} \right\rfloor\right) \bmod 2048 + 1\right) 2^9 + N_{ID}^{cell},$$

where $n_{f\_start\_PO}$ may be a first frame of a first paging occasion to which the wake-up signal is associated, and $n_{s\_start\_PO}$ may be a first slot of the first paging occasion to which the wake-up signal is associated.

The parameters of the wake-up duration may be, for example, pre-defined without RRC configuration. The wake-up mechanism may be based on a wake-up channel (e.g., a PDCCH, or DCI). The parameters of the wake-up duration may comprise at least one of: a wake-up channel format (e.g., numerology, DCI format, PDCCH format), a periodicity of the wake-up channel, a control resource set, and/or a search space of the wake-up channel.

A wireless device may monitor a wake-up signal or a wake-up channel within the wake-up duration 2704 (e.g., as configured using one or more messages 2702, or as pre-defined). The wireless device may wake-up to monitor PDCCHs according to the DRX configuration, for example, based on receiving a wake-up signal 2710 (e.g., via a wake-up channel) in the wake-up duration 2704. The wireless device may monitor PDCCHs in the DRX On duration 2706, for example, based on receiving the wake-up signal 2710. A drx-onDurationTimer may be running in the DRX On duration 2706. The wireless device may go to sleep if the wireless device fails to receive PDCCHs in the DRX On duration 2706. The wireless device may be in a sleep state in a DRX Off duration 2708 of the DRX cycle. The wireless device may fail to receive a wake-up signal in a wake-up duration 2712. The wireless device may skip monitoring (e.g., refrain from monitoring) PDCCHs in the DRX On duration 2714, for example, if the wireless device fails to receive a wake-up signal in the wake-up duration 2712. Skipping PDCCH monitoring, in the DRX On duration 2714, may reduce power consumption at the wireless device.

The wireless device may monitor the wake-up signal/channel only, for example, in the wake-up duration 2704 or in the wake-up duration 2712. The wireless device may stop monitoring PDCCHs and the wake-up signal, for example, in the DRX Off duration 2708. The wireless device may monitor PDCCHs in the DRX On duration 2706, for example, if the wireless device receives the wake-up signal 2710 in the wake-up duration 2704. The wireless device may skip monitoring (e.g., refrain from monitoring) PDCCHs in the DRX On duration 2714, for example, if the wireless device does not receive a wake-up signal in the wake-up duration 2712. The base station and/or the wireless device may apply the wake-up mechanism in paging operation, for example, if the wireless device is in an RRC_idle state or an RRC_inactive state. The base station and/or the wireless device may apply the wake-up mechanism in paging operation, for example, in a connected DRX operation (C-DRX) if the wireless device is in an RRC_CONNECTED state.

A wake-up mechanism may be based on a go-to-sleep signal/channel. In FIG. 27B, a base station may send (e.g., transmit) one or more messages 2750 (e.g., RRC messages). The one or more RRC messages may comprising parameter of a wake-up duration 2752 (or a power saving duration), to a wireless device. The one or more messages may comprise at least one RRC message. The at least one RRC message may comprise one or more cell-specific or cell-common RRC messages (e.g., ServingCellConfig IE, ServingCellConfigCommon IE, MAC-CellGroupConfig IE). The at least one RRC message may comprise: RRC connection reconfiguration message (e.g., RRCReconfiguration); RRC connection reestablishment message (e.g., RRCRestablishment); and/or RRC connection setup message (e.g., RRCSetup). The wake-up duration 2752 may be located a number of slots (or symbols) before a DRX On duration 2754 of a DRX cycle. The number of slots (or symbols) may be configured in one or more RRC messages, or may be a fixed and predefined value. The wake-up mechanism may be based on a go-to-sleep signal. The parameters of the wake-up duration 2752 may comprise at least one of: a go-to-sleep signal format (e.g., numerology, sequence length, sequence code, etc.), a periodicity of the go-to-sleep signal, a time duration value of the wake-up duration, and/or a frequency location of the go-to-sleep signal. The wake-up mechanism may be based on a go-to-sleep channel (e.g., a PDCCH, or DCI). The parameters of the wake-up duration may comprise at least one of: a go-to-sleep channel format (e.g., numerology, DCI format, PDCCH format), a periodicity of the go-to-sleep channel, and/or a control resource set and/or a search space of the go-to-sleep channel.

The wireless device may monitor the go-to-sleep signal or the go-to-sleep channel during the wake-up duration 2752, for example, if the wireless device is configured with the parameters of the wake-up duration 2752. The wireless device may go to sleep and skip monitoring (e.g., refrain from monitoring) PDCCHs in the DRX On duration 2754, for example, if the wireless device receives the go-to-sleep signal 2756 (e.g., via the go-to-sleep channel). The wireless device may be in a sleep state in a DRX Off duration 2758, and may skip monitoring PDCCHs in the DRX Off duration 2758. The wireless device may monitor PDCCHs in a DRX On duration 2762, for example, if the wireless device fails to receive a go-to-sleep signal in a wake-up duration 2760. Refraining from PDCCH monitoring, in the DRX On duration 2754, may reduce power consumption at the wireless device.

In at least some communication systems, a go-to-sleep signal-based wake-up mechanism may be more robust to detection error, for example, as compared to a wake-up signal-based wake-up mechanism. A wireless device may miss DCI which may be addressed to the wireless device, for example, if the wireless device fails to detect a wake-up signal in a wake-up signal-based wake-up mechanism. Missing the DCI may result in interruption of communication, for example, between the wireless device and a base station. A wireless device may wrongly start monitoring PDCCH, for example, if the wireless device fails to detect a go-to-sleep signal in the go-to-sleep signal-based wake-up mechanism. Wrongful monitoring of PDCCH may result in extra power consumption at the wireless device, but communication may still be maintained between the wireless device and a base station. In at least some communication systems (e.g., URLLC services or vehicle-to-everything, V2X, services), extra power consumption may be more acceptable than interruption of communication between the wireless device and/or the base station.

In at least some systems, a base station and/or a wireless device may perform a wake-up operation for power saving purpose. The base station and/or the wireless device may use wake-up protocols, for example, if the base station and/or the wireless device are implementing communication technologies corresponding machine-type-communication (e.g., MTC) and/or narrow band internet of things (e.g., NB-IoT). A wake-up operation may be applicable for a system operating on a single carrier (e.g., wherein communication occurs on the single carrier), or for a system operating on a plurality of carriers (e.g., wherein communication occurs on the plurality of carriers). A wake-up operation may comprise, for example, at least one of: transmitting, from a base station and in a configured/predefined time and frequency resource, a wake-up signal; monitoring, by a wireless device, the wake-up signal; monitoring, by the wireless device, PDCCH if the wireless device receives the wake-up signal; or the wireless device skipping monitoring the PDCCH if the wireless device fails to receive the wake-up signal. The wake-up signal may comprise a signal sequence (e.g., a Zadoff-Chu sequence, or an M sequence) that may be generated based on a cell ID of a serving cell. The base station may transmit the wake-up signal with a same antenna port as a CRS (Cell-specific Reference signal) port, for example, if a single CRS port is configured by the base station.

In at least some communication systems (e.g., a first communication system), a base station and/or a wireless device may not perform a wake-up operation for power saving purposes. The base station and/or a wireless device may not perform a wake-up operation for example, if the wireless device is not an MTC-capable and/or NB-IoT-capable wireless device. In at least some communication systems (e.g., the first communication system), a base station and/or a wireless device may not perform a wake-up operation for power saving purposes, for example, if the wireless device communicates with the base station on multiple active cells in a carrier aggregation mode.

In at least some communication systems, a wireless device that is configured with multiple cells may spend higher power consumption and more flexible operation than a wireless device operating in the first communication system. The wireless device may communicate with a base station on cells using high frequency bands (e.g., 6 GHz, 30

GHz, or 70 GHz), with higher power consumption than wireless devices operating in lower frequencies (e.g., <=6 GHz). In at least some communication systems, a base station may transmit to, and/or receive from a wireless device, data packets corresponding to a plurality of data services (e.g., web browsing, video streaming, industry IoT, and/or communication services for automation in a variety of vertical domains). The plurality of data services may have different data traffic patterns. Data traffic for different data services may be periodic or aperiodic. Data arrival patterns may be different for different data services. Different data services may use different event-triggers and/or data sizes. Some data services may transmit using burst-type data traffic and some data services transmit using continuous data traffic.

A first data service may use, for example, a predicable/periodic traffic pattern that is suitable for power-saving based communication (e.g., wake-up signaling and/or DRX-based operation). A second data service may use, for example, a continuous/non-predicable traffic pattern that is not suitable for power-saving based communication. Using RRC signaling to switch between a power saving-based communication for the first data service (e.g., power saving mode/state) and non-power saving-based communication for a second data service (e.g., normal access mode/state) may not be flexible or dynamic. Using RRC signaling to switch between the power saving-based communication and the non-power saving-based communication may result in, for example, increased latency and higher power consumption (e.g., at a wireless device). A mechanism to semi-statically and/or dynamically switch between a power saving based communication and a non-power-saving based communication may be beneficial for improved communication services (e.g., faster data transfer speeds, reduced power consumption at a wireless device).

In at least some communication systems, different services with corresponding different service requirements may be supported. One or more power saving configurations may be used corresponding to the different service requirements. Different power saving configurations (e.g., power saving operation configurations) may be used, for example, at a wireless device for the different services/service requirements. Using RRC signaling to support the different power saving operation configurations and/or to enable/disable power saving-based communication may not be flexible or dynamic. Using RRC signaling to switch between the different power saving operation configurations may result in, for example, increased latency and higher power consumption (e.g., at a wireless device). A mechanism to support the different power saving operation configurations, and/or to semi-statically/dynamically switch between the different power saving based operation configurations and/or non-power-saving based communication may be beneficial for improved communication services (e.g., faster data transfer speeds, reduced power consumption at a wireless device).

In at least some communication systems, one or more power saving operation configurations may be used. The one or more power saving operation configurations may comprise configurations corresponding to at least one power saving mode (e.g., state). A wireless device may switch between a normal access mode and a power saving mode. The wireless device in a power saving mode may, for example, use a power saving operation configuration in the one or more of power saving operation configurations. The wireless device in a normal access mode may, for example, disable the use of a power saving operation configuration. A power saving operation may be performed based on parameters of a power saving operation configuration. The parameters of a power saving operation configuration may comprise at least one of: a duration of the power saving operation, radio resources of transmission of a wake-up signal for the power saving operation, and/or one or more timer values of one or more timers of the power saving operation. The parameters of a power saving operation configuration may comprise at least one of: a PDCCH monitoring periodicity, one or more configuration parameters of a power saving channel of the power saving operation configuration, an indication to cease PUSCH transmission(s), an indication to cease PUCCH transmission(s), an indication to cease SRS transmission(s), an indication to cease an RACH procedure, and/or an indication to continue RRM/CSI/beam reporting. The one or more configuration parameters of the power saving channel may indicate at least one of: a timing window for monitoring the power saving channel, a control resource set for the power saving channel, and/or a RNTI for monitoring the power saving channel.

At least one power saving operation configuration, of a plurality of power saving operation configurations, may be activated/deactivated for transmission and/or reception of data corresponding to an ongoing data service. An activation/deactivation procedure of the at least one power saving operation configuration may comprise at least one of: transmission/reception of an activation/deactivation command of a power saving operation configuration and/or configuration of a power saving timer.

A base station may transmit a command (e.g., DCI or a MAC CE) indicating a power saving operation configuration of a plurality of power saving operation configurations that will be activated. The command may indicate a cell, of a plurality of cells, where the power saving operation configuration is activated. A wireless device may apply parameters of the power saving operation configuration on the cell indicated by the command, for example, based on receiving the command. The wireless device, based on the parameters, may reduce/increase PDCCH monitoring duration, stop/perform uplink transmission, therefore improve power consumption, or data transmission latency.

Figure 28:
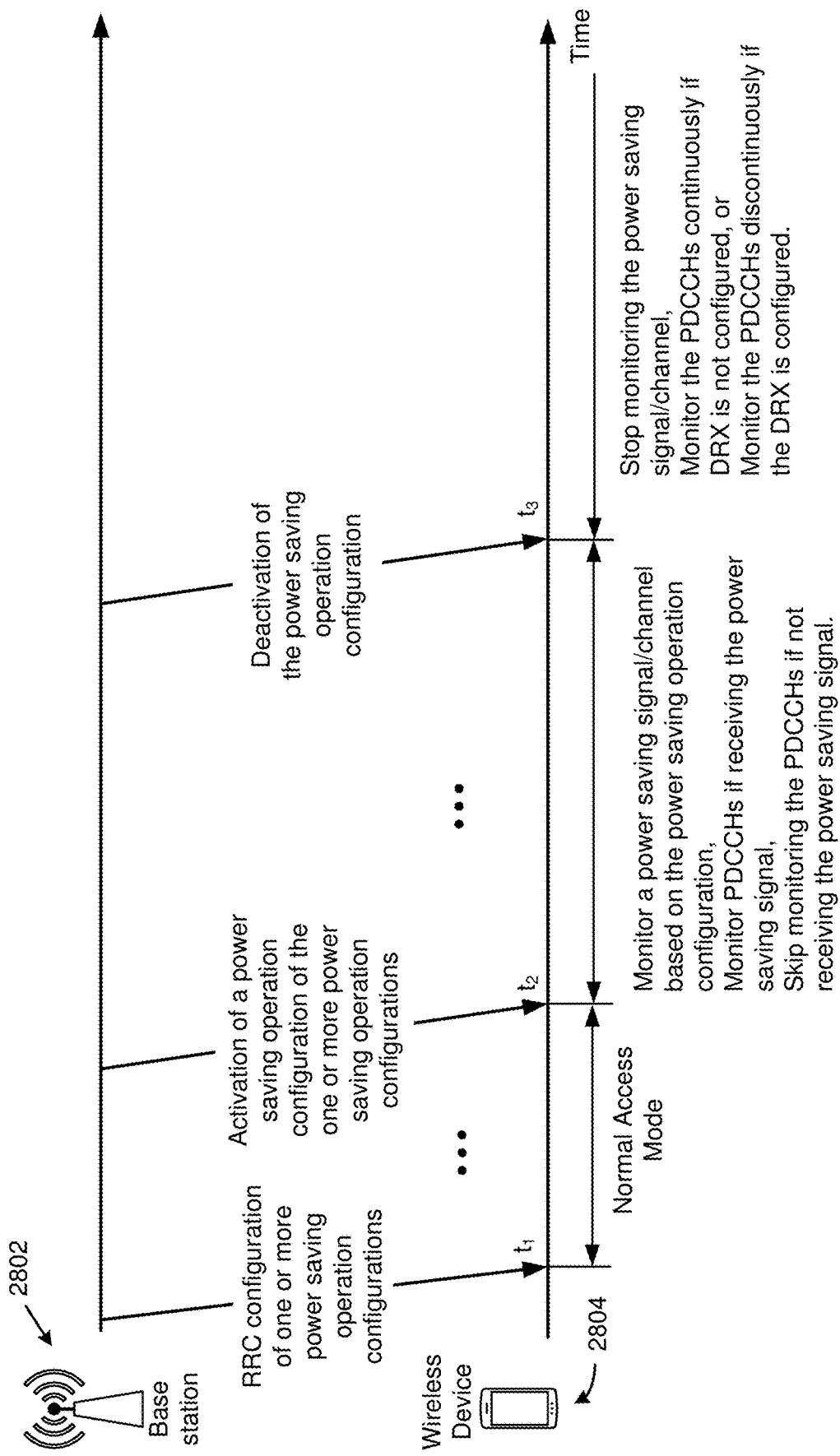
FIG. 28 shows an example of activation/deactivation of a power saving operation.

FIG. 28 shows an example of an activation/deactivation of a power saving operation configuration of one or more power saving operation configurations. A base station 2802 may send (e.g., transmit), to a wireless device 2804, one or more RRC messages. The one or more RRC messages may comprise configuration parameters of one or more cells. The wireless device 2804 may receive the one or more RRC messages at time $t_1$. The one or more RRC messages may comprise, for example, one or more cell-specific or cell-common RRC messages (e.g., ServingCellConfig IE, ServingCellConfigCommon IE, MAC-CellGroupConfig IE, etc.). The cell may be a primary cell (e.g., PCell), a PUCCH secondary cell (e.g., if secondary PUCCH group is configured), or a PSCell (e.g., if dual connectivity is configured). The cell may be associated with (e.g., indicated by) a cell specific identity (e.g., a cell ID). The configuration parameters may comprise parameters of at least one power saving operation (e.g., procedure, mode, and/or state) configuration on the cell. Each power saving operation configuration of the at least one power saving operation configuration may be identified by a power saving configuration identifier (e.g., an index, an indicator, or an ID).

A power saving operation corresponding to a power saving operation configuration may be based on a power saving signal (e.g., the wake-up signal 2710 as shown in FIG. 27A, and/or a go-to-sleep 2756 as shown in FIG. 27B). The parameters of a power saving signal-based power saving operation configuration may comprise, for example, at least one of: a signal format (e.g., numerology) of the power saving signal, sequence generation parameters (e.g., a cell ID, a virtual cell ID, SS block index, and/or an orthogonal code index) for generating the power saving signal, a window size of a time window indicating a duration in which the power saving signal may be transmitted, a value of a periodicity of the transmission of the power saving signal, a time resource on which the power saving signal may be transmitted, a frequency resource on which the power saving signal may be transmitted, a BWP on which the wireless device 2804 may monitor the power saving signal, and/or a cell on which the wireless device 2804 may monitor the power saving signal. The power saving signal may comprise, for example, at least one of: an SS block, a CSI-RS, a DMRS, and/or a signal sequence (e.g., a Zadoff-Chu, an M sequence, or a Gold sequence). A first power saving signal-based power saving operation configuration for a first service (or an application such as enhanced Mobile Broadband, eMBB) may be different from a second power saving signal-based power saving operation configuration for a second service (or an application such as massive MTC, mMTC).

A power saving operation may be based on a power saving channel (e.g., a wake-up channel (WUCH)). The power saving channel may comprise a downlink control channel (e.g., a PDCCH) dedicated for the power saving operation. The parameters of a power saving channel-based power saving operation configuration may comprise, for example, at least one of: a time window indicating a duration in which the base station 2802 may transmit power saving information (e.g., a wake-up information, or a go-to-sleep information) via the power saving channel, parameters of a control resource set (e.g., time, frequency resource and/or TCI state indication of the power saving channel), a periodicity of the transmission of the power saving channel, a DCI format of the power saving information, a BWP on which the wireless device 2804 may monitor the power saving channel, and/or a cell on which the wireless device 2804 may monitor the power saving channel. A first power saving channel-based power saving operation configuration for a first service may be different from a second power saving channel-based power saving operation configuration for a second service. The one or more RRC messages may further comprise one or more DRX parameters of a DRX operation. The one or more DRX parameters may comprise, for example, at least one of: parameters of a short DRX cycle, parameters of a long DRX cycle, and/or one or more DRX timer values for one or more DRX timers (e.g., drx-onDurationTimer, drx-InactivityTimer, drxRetransmissionTimerDL, drxRetransmissionTimerUL, drx-HARQ-RTT-TimerDL, and/or drx-HARQ-RTT-TimerUL).

The wireless device (e.g., based on an RRC configuration) may communicate with a base station in a normal (e.g., full) access mode (e.g., state), for example, based on an RRC configuration. The wireless device 2804 may communicate with the base station 2802 in the normal access mode, for example, based on the received one or more RRC messages. The wireless device may monitor PDCCHs continuously, for example, if a DRX operation is not configured for the wireless device in the normal access mode. The wireless device may monitor the PDCCHs discontinuously by applying one or more DRX parameters of a DRX operation, for example, if the DRX operation is configured (e.g., as shown in FIG. 25) for the wireless device in a normal access mode. The wireless device may (e.g., in the normal access mode): transmit an SRS, transmit via a RACH, transmit via a UL-SCH, and/or receive via a DL-SCH.

The base station 2802 may trigger the wireless device 2804 (e.g., using one or more messages, such as DCI messages and/or MAC CE messages) to switch to a power saving mode (or a power efficient mode) from the normal access mode. The base station 2802 may trigger the wireless device 2804 to switch to the power saving mode, for example, if a data service that is suitable for the power saving mode is launched. The wireless device 2804 may switch to the power saving mode, from the normal access mode, for power conservation. The wireless device 2804 may (e.g., in the power saving mode): monitor for a power saving signal/channel; not transmit (e.g., refrain from transmitting) PUCCH, PUSCH, SRS, and/or PRACH without detecting/receiving the power saving signal; not receive PDSCH without detecting/receiving the power saving signal; not monitor (e.g., refrain from monitoring) PDCCH without detecting/receiving the power saving signal; and/or start monitoring the PDCCHs based on detecting/receiving the power saving signal/channel.

The wireless device 2804 may send (e.g., transmit) one or more indicators to the base station 2802 indicating a mode (e.g., the power saving mode, or the normal access mode), and/or mode switching, for example, to align the base station 2802 and the wireless device 2804 regarding a mode of the wireless device 2804. The wireless device 2804 may transmit one or more indicators to the base station 2802 indicating if a mode (e.g., the power saving mode, or the normal access mode) is supported, and/or if mode switching is supported by the wireless device 2804. The one or more indicators may indicate, for example, at least one of: if the wireless device 2804 supports a power saving mode in an RRC idle state, if the wireless device 2804 supports a power saving mode in an RRC inactive state, and/or if the wireless device 2804 supports a power saving mode in an RRC connected state. The one or more indicators may indicate that a power saving mode is triggered (e.g., activated and/or enabled). The one or more indicators may comprise at least one of: an indicator of a power saving operation configuration of a plurality of power saving operation configurations that is triggered (or activated/enabled), and one or more parameters (e.g., QoS, and/or traffic type) of a service of the wireless device 2804. The one or more indicators may be contained in an RRC message, a MAC CE, and/or DCI. The one or more indicators may be contained, for example, in a wireless device-capability message (e.g., UE-NR-Capability IE, or UE-MRDC-Capability IE, and/or Phy-Parameters IE).

The base station 2802 may send (e.g., transmit), to the wireless device 2804, an activation/deactivation command indicating an activation/deactivation of a power saving operation configuration of the at least one power saving operation configuration. The activation/deactivation command may be contained in a MAC CE that is indicated (e.g., identified) by a MAC subheader with an LCID value. The LCID value may be different from an LCID value listed in FIG. 18A first MAC CE for activation/deactivation of a power saving operation configuration may be different, for example, from a second MAC CE for a DRX operation. A first LCID value of the first MAC CE may be different from a second LCID value (e.g., "111011" or "111100" as listed in FIG. 18) of the second MAC CE. The MAC CE for activation/deactivation of a power saving operation configuration may comprise, for example, at least one of: a power saving configuration identifier (e.g., an index, an indicator, or an ID) indicating the power saving operation configuration, of the at least one power saving operation configurations, that may be activated/deactivated; a cell ID indicating an identity of a cell for which the power saving operation configuration may apply; and/or a BWP ID indicating a downlink BWP for which the power saving operation configuration may apply. A MAC CE for activation/deactivation of the power saving operation configuration may have, for example, a size of zero bits, one bit, two bits, or any other quantity of bits. The MAC CE for activation/deactivation of the power saving operation configuration may have a fixed size of zero bit, for example, if the one or more RRC messages comprise configuration parameters of at most one power saving operation configuration.

The activation/deactivation command may be contained in DCI transmitted with a DCI format. The DCI may comprise at least one of: a power saving configuration identifier indicating the power saving operation configuration of the at least one power saving operation configuration that may be activated/deactivated, a cell ID indicating an identity of a cell for which the power saving operation configuration may apply, and/or a BWP ID indicating a downlink BWP for which the power saving operation configuration may apply.

At time $t_2$, the wireless device 2804 may receive the activation/deactivation command indicating the activation of the power saving operation configuration of the at least one power saving operation configuration. The wireless device 2804 may switch from the normal access mode to a power saving mode by applying parameters of the power saving operation configuration of the at least one power saving operation configuration. The power saving operation configuration may be indicated by a power saving configuration index in the activation/deactivation command. The wireless device 2804 may monitor a power saving signal/channel corresponding to the power saving operation configuration, based on receiving the activation/deactivation command. The wireless device 2804 may monitor at most one power saving signal/channel for the power saving operation, for example, if at most one power saving operation configuration is comprised in the one or more RRC messages.

The wireless device 2804 may monitor the power saving signal/channel in a time window with a periodicity associated with the power saving operation configuration of the at least one power saving operation configuration. The wireless device 2804 may monitor the power saving signal/channel in a frequency resource associated with the power saving operation configuration of the at least one power saving operation configuration. The wireless device 2804 may monitor, the power saving channel, in a control resource set and/or a search space associated with the power saving operation configuration of the at least one power saving operation configuration. The wireless device 2804 may monitor the power saving signal/channel on a BWP of a cell, wherein the BWP and/or the cell may be indicated in the activation/deactivation command and/or the power saving operation configuration of the at least one power saving operation configuration.

The wireless device 2804 may receive a power saving signal (e.g., via a power saving channel). The wireless device 2804 may receive the power saving signal based on the monitoring of the channel (e.g., in a time window associated with the power saving operation configuration, in a frequency resource associated with the power saving operation configuration, and/or in a control resource set and/or a search space associated with the power saving operation configuration, etc.). The wireless device 2804 may monitor PDCCHs based on (e.g., after or in response to) receiving the power saving signal. The wireless device 2804 may monitor PDCCHs continuously based on receiving the power saving signal, for example, if a DRX operation is not configured. The wireless device 2804 may monitor PDCCHs discontinuously based on receiving the power saving signal, for example, if the DRX operation is configured. The wireless device 2804 may transmit data packets to and/or receive data packets from the base station 2802, for example, if the wireless device 2804 receives, via the PDCCHs, DCI indicating an uplink grant, and/or DCI indicating a downlink assignment. The wireless device 2804 may not monitor (e.g., refrain from monitoring) PDCCHs, for example, if the wireless device 2804 fails to receive the power saving signal, regardless of whether the DRX operation is configured or not.

The base station 2802 may trigger the wireless device 2804 to switch from the power saving mode to the normal access mode. The base station 2802 may trigger the wireless device 2804 to switch, for example, if a data service (e.g., not suitable for the power saving mode) is launched. The base station 2802 may send (e.g., transmit), to the wireless device 2804, an activation/deactivation command indicating a deactivation of the power saving operation configuration. At $t_3$, the wireless device 2804 may receive the activation/deactivation command indicating the deactivation of the power saving operation configuration. The wireless device 2804 may switch from the power saving mode to the normal access mode, for example, based on receiving the activation/deactivation command for deactivation of the power saving operation. The wireless device 2804 may stop monitoring the power saving signal/channel, for example, based on receiving the activation/deactivation command for deactivation of the power saving operation. The wireless device 2804 may (e.g., based on switching to the normal access mode) monitor PDCCHs continuously if a DRX operation is not configured, and/or monitor the PDCCHs discontinuously if a DRX operation is configured.

A base station and/or a wireless device may switch to a power saving mode, for example, based on a determination (e.g., at the base station and/or the wireless device) that an on-going data service is suitable for a power saving operation. The base station and/or the wireless device may switch to a normal access mode, for example, based on a determination (e.g., at the base station and/or the wireless device) that an on-going data service is not suitable for a power saving operation. The wireless device and/or the base station may switch between the power saving mode and the normal access mode, for example, based on one or more operations described herein.

Figure 29:
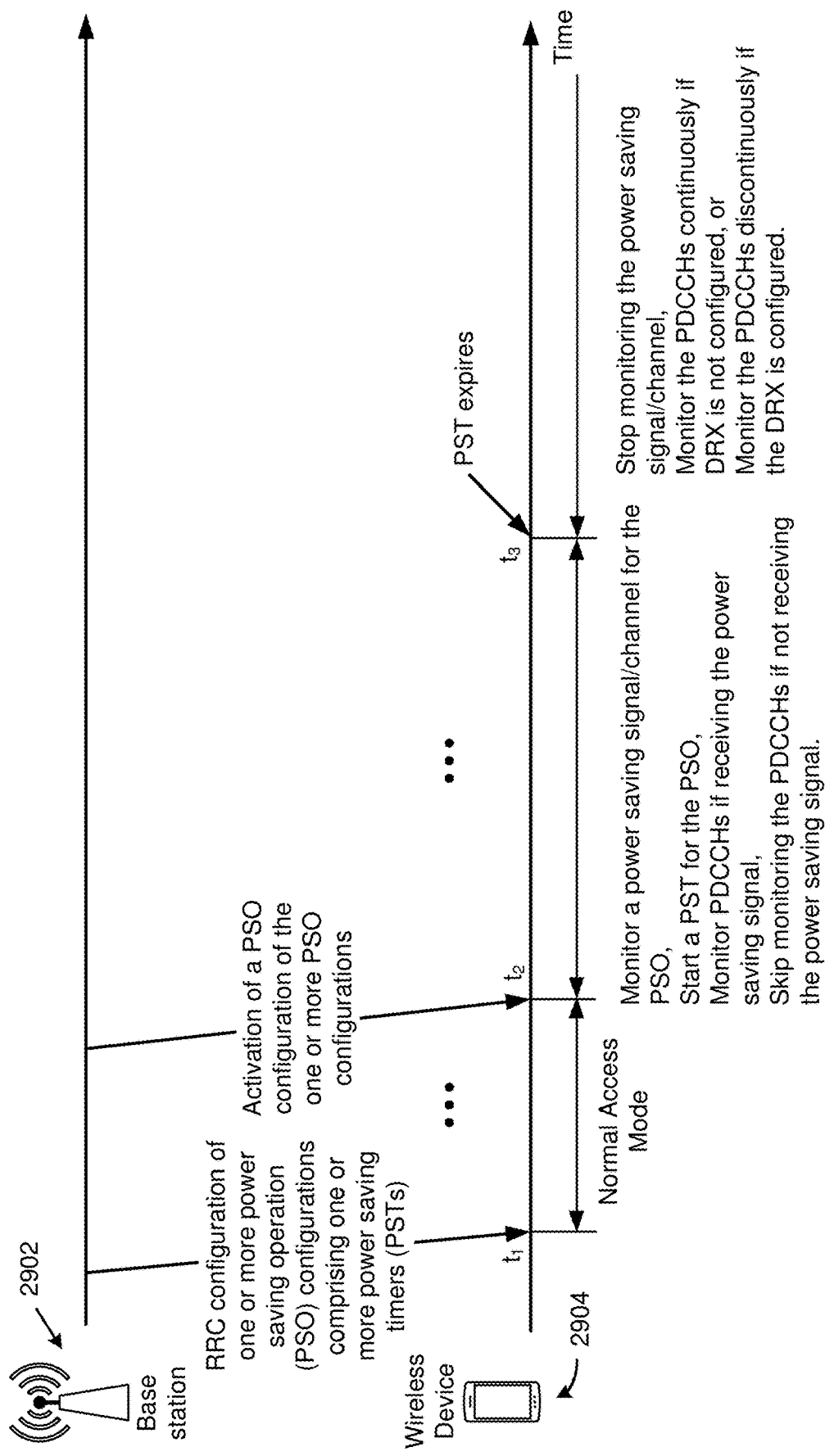
FIG. 29 shows an example of activation/deactivation of a power saving operation.

FIG. 29 shows an example of a command-based activation and a timer-based deactivation of a power saving operation. A base station 2902 may send (e.g., transmit), to a wireless device 2904, one or more RRC messages. The wireless device 2904 may receive the one or more RRC messages at or after time $t_1$. The one or more RRC messages may comprise parameters of one or more power saving operation configurations. A power saving operation configuration may be indicated (e.g., identified) by a power saving operation configuration index. Parameters of a power saving operation configuration may comprise, for example, at least one of: a signal format of a power saving signal, a time window in which a power saving signal may be transmitted, power saving signal sequence generation parameters, a value of a periodicity of the transmission of the power saving signal, a time resource/frequency resource on which the power saving signal may be transmitted, parameters of a control resource set (e.g., time and/or frequency resource of the power saving channel), a DCI format, and/or a BWP of a cell on which the wireless device 2904 may monitor the power saving signal/channel. The parameters of the power saving operation configuration may comprise a power saving timer value of a power saving timer. The power saving timer value may indicate a duration for which the power saving operation may apply. The one or more RRC messages may further comprise one or more parameters described with reference to FIG. 28.

The base station 2902 may transmit, to the wireless device 2904, an activation/deactivation command indicating an activation of a power saving operation configuration of the one or more power saving operation configurations. The wireless device 2904 may receive the activation/deactivation command at time $t_2$. The activation/deactivation command may be in a MAC CE or DCI. The wireless device 2904 may switch from a normal access mode to a power saving mode, based on receiving the activation/deactivation command indicating an activation of the power saving operation configuration. The wireless device 2904 may switch from the normal access mode to the power saving mode, based on (e.g., after) a configured/predefined switch gap following the reception of the activation/deactivation command. The wireless device 2904 may monitor a power saving signal/channel based on the power saving operation configuration. The wireless device 2904 may start a power saving timer based on the power saving timer value (e.g., after or in response to receiving the activation/deactivation command indicating the activation of the power saving operation configuration).

The wireless device 2904 may receive a power saving signal (e.g., via a power saving channel). The wireless device 2904 may receive the power saving signal, for example, based on the monitoring of the power saving signal/channel (e.g., based on a periodicity indicated in the power saving operation configuration, in a time window associated with the power saving operation configuration, in a frequency resource associated with the power saving operation configuration, and/or in a control resource set and/or a search space associated with the power saving operation configuration, etc.). The wireless device 2904 may monitor PDCCHs based on receiving the power saving signal. The wireless device 2904 may monitor PDCCHs continuously, for example, if a DRX operation is not configured. The wireless device 2904 may monitor the PDCCHs discontinuously, for example, if the DRX operation is configured. The wireless device may fail to receive the power saving signal based on the monitoring of the power saving signal/channel. The wireless device 2904 may not monitor (e.g., refrain from monitoring) the PDCCHs, for example, if the wireless device 2904 fails to receive the power saving signal. The wireless device 2904 may not monitor (e.g., refrain from monitoring) the PDCCHs regardless of whether a DRX operation is configured or not. The wireless device 2904 may repeat monitoring the power saving signal/channel with a periodicity indicated in the power saving operation configuration, for example, if the power saving timer is running and has not expired.

At time $t_3$, the power saving timer may expire. The wireless device 2904 may switch from the power saving mode to the normal access mode, for example, based on the expiration of the power saving timer. The wireless device may stop monitoring the power saving signal/channel, for example, based on the expiration of the power saving timer. The wireless device may (e.g., based on switching to the normal access mode) monitor PDCCHs continuously if a DRX operation is not configured, or monitor the PDCCHs discontinuously if the DRX operation is configured. The base station 2902 may need not send an activation/deactivation command indicating a deactivation of the power saving operation configuration to facilitate a switch, at the wireless device 2904, from the power saving mode to the normal mode. This may result in improved spectrum efficiency within a communication network.

A wireless device (e.g., the wireless device 2804 or the wireless device 2904) may monitor PDCCHs discontinuously, by applying parameters of one of one or more DRX cycles. The parameters of a DRX cycle may comprise a value of a DRX On duration and a value of a duration of the DRX cycle. The one or more DRX cycles may comprise at least a first DRX cycle and a second DRX cycle. A first duration of the first DRX cycle may be shorter than a second duration of the second DRX cycle. A first DRX On duration of the first DRX cycle may be shorter than a second DRX On duration of the second DRX cycle. The wireless device may monitor the PDCCHs discontinuously by applying parameters of the first DRX cycle of the one or more DRX cycles, for example, based on an expiration of the power saving timer. The wireless device may monitor the PDCCHs discontinuously by applying parameters of the second DRX cycle of the one or more DRX cycles, for example, based on an expiration of the power saving timer.

A wireless device may receive an activation/deactivation command indicating an activation of the power saving operation configuration, for example, at a time in which the wireless device is transmitting one or more uplink transmissions. The one or more uplink transmissions may comprise, for example, at least one of: a preamble transmission of a random access procedure (e.g., uplink synchronization, or beam failure recovery), SRS transmission, and/or PUSCH/PUCCH transmission. The wireless device may abort (or stop, or refrain from transmitting) the one or more uplink transmissions and may apply the power saving operation configuration, for example, based on receiving the activation command/deactivation command indicating an activation of the of the power saving operation configuration. This may result in an interruption in the one or more uplink transmissions and/or any procedures associated with the uplink transmissions (e.g., an uplink synchronization procedure, a beam failure recovery procedure, etc.).

A wireless device may ignore an activation/deactivation command indicating an activation of a power saving operation, for example, if the wireless device receives the activation/deactivation command at a time in which an uplink transmission (e.g., corresponding to a RA procedure, a beam failure recovery procedure, and/or an SRS transmission) is ongoing (e.g., on an PCell). The wireless device may successfully finish the uplink transmission by ignoring the activation/deactivation command. The wireless device may ignore the activation/deactivation command by not applying the power saving operation configuration and/or may continue performing one or more uplink transmissions, for example, based on receiving the activation command/deactivation command indicating an activation of the of the power saving operation configuration. The wireless device may perform the one or more uplink transmissions, for example, after or in response to receiving a power saving signal.

A wireless device may continue a beam failure recovery procedure (e.g., continue an uplink transmission corresponding to a beam failure recovery procedure) on a PCell, for example, if the wireless device receives an activation/deactivation command at a time in which the beam failure recovery procedure is ongoing. A wireless device may stop a beam failure recovery procedure (e.g., stop/abort an uplink transmission corresponding to a beam failure recovery procedure) on an SCell, for example, if the wireless device receives an activation/deactivation command at a time in which the beam failure recovery procedure is ongoing. By ignoring an activation/deactivation command (e.g., continuing a beam failure recovery procedure) (e.g., on a PCell), a wireless device may increase the likelihood of a successful procedure (e.g., beam failure recovery procedure) occurring with reduced latency, such as by avoiding interruption(s) of one or more uplink transmissions and/or procedures associated with the uplink transmissions (e.g., an uplink synchronization procedure, a beam failure recovery procedure, etc.). By stopping a beam failure recovery procedure, based on or in response to an activation/deactivation command (e.g., on an SCell), a wireless device may reduce signaling overhead such as avoiding transmissions in a beam failure recovery procedure that may be unsuccessful.

Figure 30:
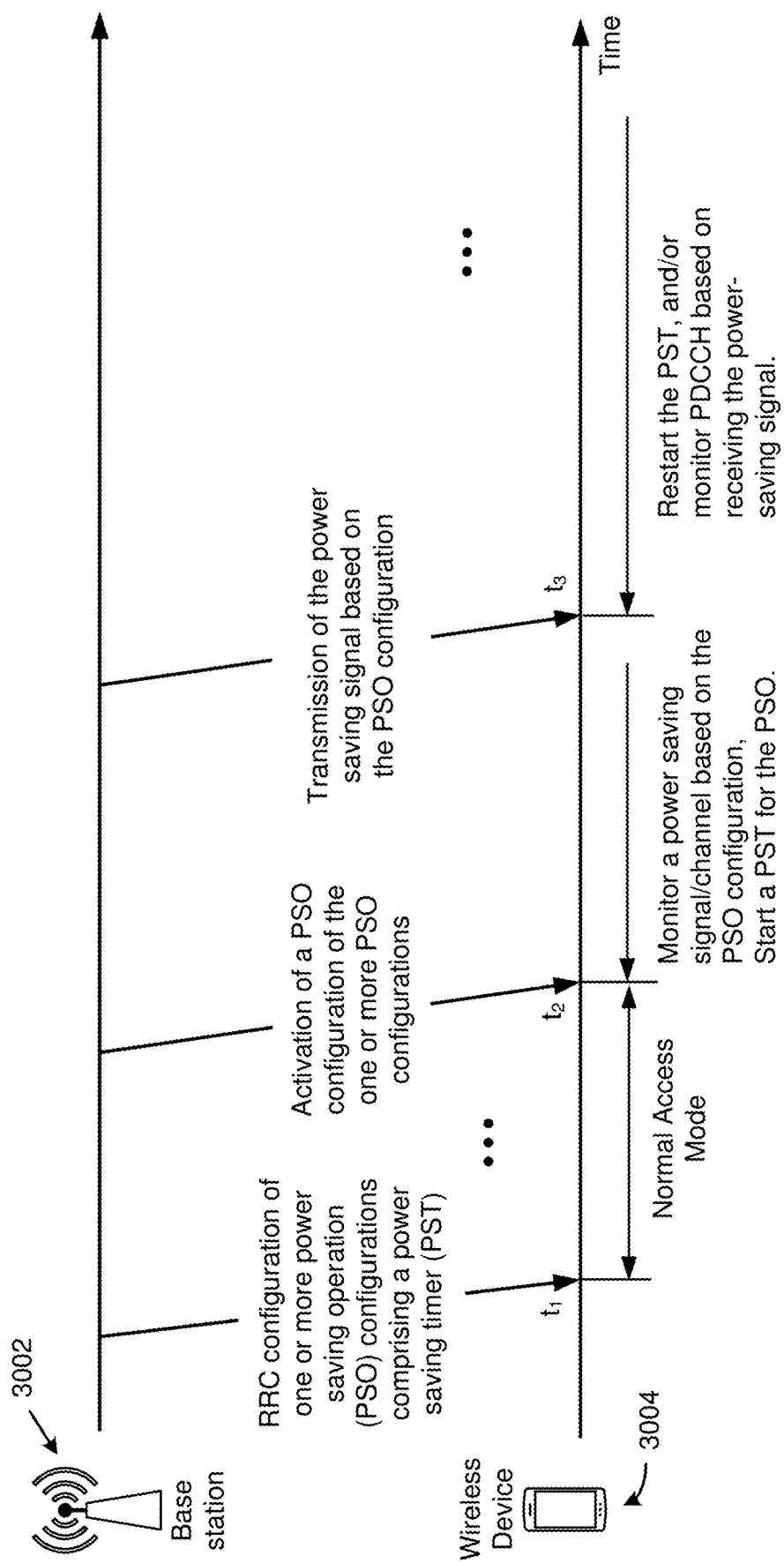
FIG. 30 shows an example of activation/deactivation of a power saving operation.

FIG. 30 shows an example of a command-based activation and a timer-based deactivation of a power saving operation. A base station 3002 may send (e.g., transmit) to a wireless device 3004, one or more configuration messages (e.g., RRC messages). The wireless device 3004 may receive the one or more RRC messages at or after time $t_1$. The one or more RRC messages may comprise parameters of one or more power saving operation configurations. The one or more RRC messages may comprise a power saving timer value of a power saving timer. The one or more power saving operation configurations may comprise, for example, corresponding values of a power saving timer. The one or more RRC messages may further comprise one or more parameters described with reference to FIGS. 28 and 29.

The base station 3002 may transmit, to the wireless device 3004, an activation/deactivation command indicating an activation of a power saving operation configuration. The activation/deactivation command may be in a MAC CE and/or DCI. At time $t_2$, the wireless device 3004 may receive the activation/deactivation command indicating an activation of the power saving operation configuration. The wireless device 3004 may switch from a normal access mode to a power saving mode, for example, based on receiving the activation/deactivation command indicating an activation of the power saving operation configuration. The wireless device 3004 may monitor a power saving signal/channel based on the power saving operation configuration (e.g., after or in response to receiving the activation/deactivation command indicating the activation of the power saving operation configuration). The wireless device 3004 may start the power saving timer based on the power saving timer value (e.g., after or in response to receiving the activation/deactivation command indicating the activation of the power saving operation configuration).

At time $t_3$, the wireless device 3004 may receive the power saving signal (e.g., via the power saving channel). The wireless device 3004 may receive the power saving signal, for example, based on the monitoring of the power saving signal (e.g., based on a periodicity indicated in the power saving operation configuration, in a time window associated with the power saving operation configuration, in a frequency resource associated with the power saving operation configuration, and/or in a control resource set and/or a search space associated with the power saving operation configuration, etc.). The wireless device 3004 may (re-)start the power saving timer, for example, based on (e.g., after or in response to) receiving the power saving signal. The (re-)starting the power saving timer may comprise resetting the value of the power saving timer to the power saving timer value (as received in the one or more RRC messages) and/or restarting the power saving timer with the power saving timer value.

The wireless device 3004 may monitor PDCCHs based on (e.g., after or in response to) receiving a power saving signal. The wireless device 3004 may monitor the PDCCHs continuously, for example, if a DRX operation is not configured. The wireless device 3004 may monitor the PDCCHs discontinuously, for example, if the DRX operation is configured. The wireless device 3004 may fail to receive the power saving signal based on the monitoring the power saving signal/channel. The wireless device 3004 may not monitor (e.g., refrain from monitoring) the PDCCHs, regardless of whether a DRX operation is configured or not, for example, if the wireless device 3004 fails to receive the power saving signal. The wireless device 3004 may repeat monitoring the power saving signal/channel with a periodicity indicated in the power saving operation configuration, for example if the power saving timer is running and/or has not expired.

Figure 31:
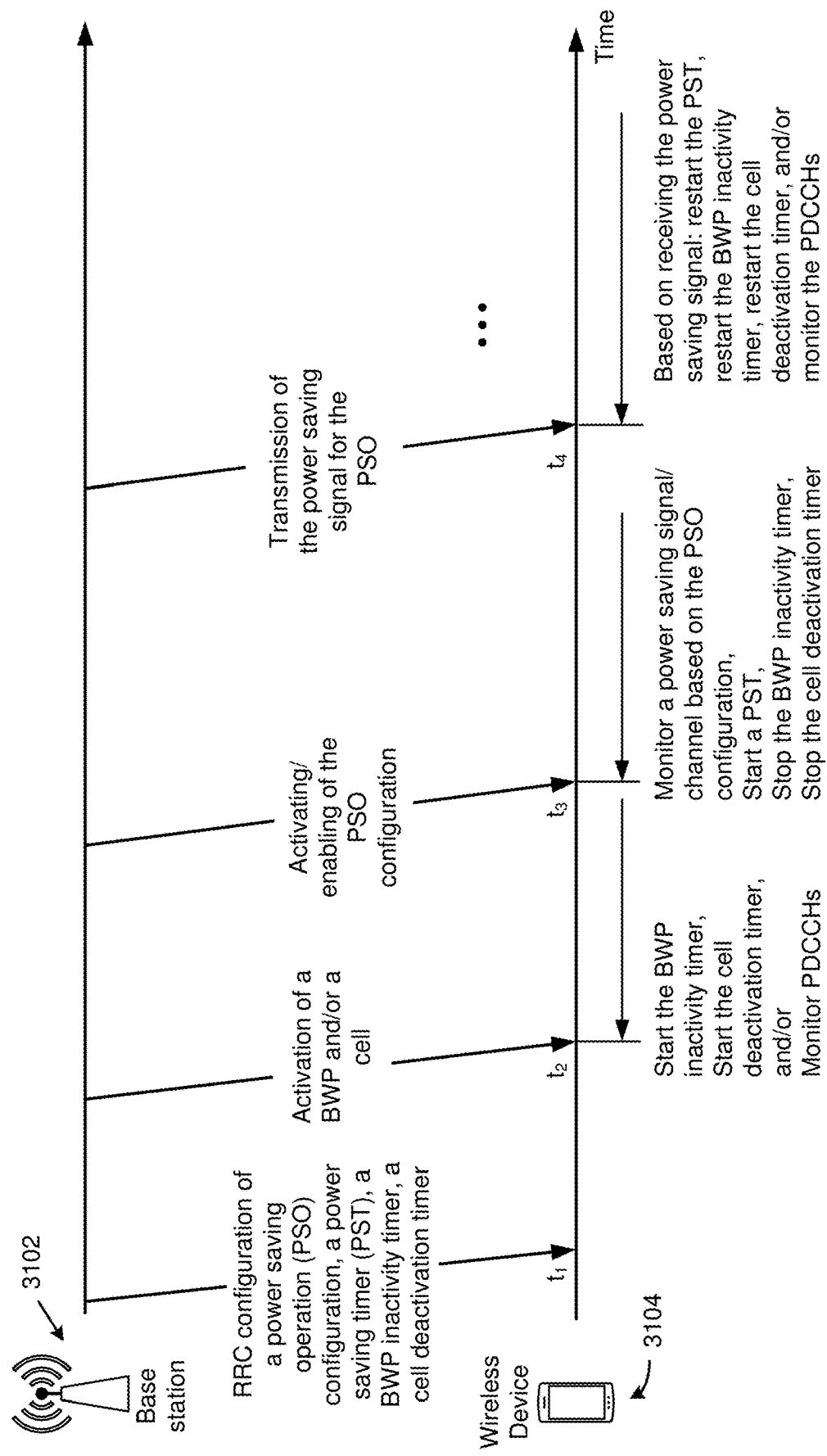
FIG. 31 shows an example of activation/deactivation of a power saving operation.

FIG. 31 shows an example of activation/deactivation of a power saving operation. FIG. 31 further shows management of timer(s) in a power saving operation. A base station 3102 may send (e.g., transmit), to a wireless device 3104, one or more configuration messages (e.g., RRC messages). The wireless device 3104 may receive the one or more RRC messages at or after time $t_1$. The one or more RRC messages may comprise respective configuration parameters corresponding to a plurality of cells. Configuration parameters of a cell, in the plurality of cells, may comprise, for example, at least one of: one or more BWPs, a BWP inactivity timer value of a BWP inactivity timer, a cell deactivation timer value of a cell deactivation timer, a power saving timer value of a power saving timer, and/or configuration parameters of a power saving operation configuration. The one or more RRC messages may further comprise one or more parameters described with references FIGS. 28-30.

At or after time $t_2$, the wireless device may receive one or more RRC messages, MAC CE(s), and/or DCI. The wireless device 3104 may activate a cell of the plurality of cells, for example, based on receiving an RRC message that indicates an activation of the cell, and/or MAC CE(s) that indicates an activation of the cell. The wireless device 3104 may activate a BWP of the one or more BWPs, for example, based on receiving an RRC message that indicates an activation of the BWP, and/or DCI that indicates an activation of the BWP. The wireless device 3104 may (e.g., based on activation of the BWP, and/or activation of the cell): start a BWP inactivity timer based on a BWP inactivity timer value corresponding to the cell, start a cell deactivation timer based on a cell deactivation timer value corresponding to the cell, and/or monitor PDCCHs as required. The wireless device 3104 may restart the BWP inactivity timer and/or the cell deactivation timer based on receiving DCI (e.g., in the PDCCHs) indicating a downlink assignment or an uplink grant.

At $t_3$, the wireless device 3104 may receive, from the base station 3102, an activation (or enabling) command indicating an activation of the power saving operation configuration. The wireless device 3104 may activate the power saving operation configuration based on receiving the activation command. The activation (or enabling) command may be in a MAC CE and/or DCI. The wireless device 3104 may (e.g., based on receiving the activation command for the power saving operation configuration): monitor a power saving signal/channel based on the power saving operation configuration, start the power saving timer based on the power saving timer value, stop the BWP inactivity timer, and/or stop the cell deactivation timer. Stopping the BWP inactivity timer and/or the cell deactivation timer (e.g., based on the activation of a power saving operation configuration) may avoid misalignment of a state of a BWP, and/or a cell, between the base station 3102 and the wireless device 3104.

At time $t_4$, the wireless device 3104 may receive the power saving signal (e.g., via the power saving channel) based on the monitoring the power saving signal/channel. The wireless device 3104 may (re-)start the power saving timer, for example, based on receiving the power saving signal. The wireless device 3104 may (e.g., based on receiving the power saving signal): (re-)start the BWP inactivity timer, and/or (re-)start the cell deactivation timer. The (re-)starting the BWP inactivity timer may comprise resetting the value of the BWP inactivity timer to the BWP inactivity timer value and restarting the BWP inactivity timer with the BWP inactivity timer value. The (re-)starting the cell deactivation timer may comprise resetting the value of the cell deactivation timer to the cell deactivation timer value and/or restarting the cell deactivation timer with the cell deactivation timer value.

The wireless 3104 device may monitor PDCCHs based on receiving the power saving signal. The wireless device 3104 may monitor the PDCCHs continuously, for example, if a DRX operation is not configured. The wireless device 3104 may monitor the PDCCH discontinuously, for example, if the DRX operation is configured. The wireless device 3104 may fail to receive the power saving signal based on the monitoring the power saving signal/channel. The wireless device 3104 may not monitor (e.g., refrain from monitoring) the PDCCHs, for example, if the wireless device 3104 fails to receive the power saving signal. The wireless device 3104 may not monitor (e.g., refrain from monitoring) the PDCCHs regardless of whether a DRX operation is configured or not. The wireless device 3104 may repeat monitoring the power saving signal/channel with a periodicity indicated in the power saving operation configuration, for example, if the power saving timer is running and has not expired.

The wireless device 3104 may deactivate the power saving operation based on an expiration of the power saving timer. The wireless device 3104 may switch from the power saving operation to a normal access mode, for example, based on the expiration of the power saving timer. The wireless device 3104 may (e.g., based on the expiration of the power saving timer): stop the power saving timer, (re-)start the BWP inactivity timer (re-)start the cell deactivation timer, and/or monitor PDCCHs as required.

Figure 32:
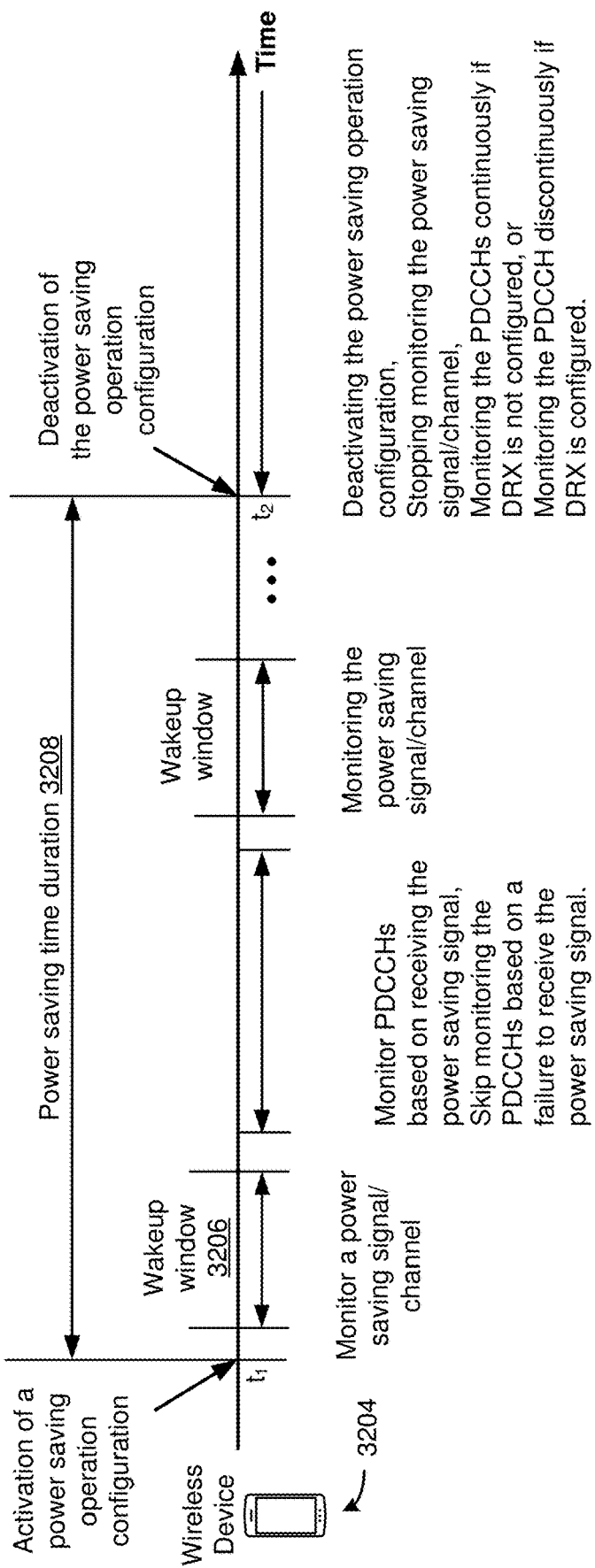
FIG. 32 shows an example of a power saving operation.

FIG. 32 shows an example of an activation/deactivation-based power saving operation. At time $t_1$, a wireless device 3204 may receive an activation command of a power saving operation configuration. Parameters of the power saving operation configuration may comprise at least one of: a length of a wake-up window, time/frequency radio resources of a transmission of a power saving signal (e.g., in the wakeup window), a periodicity of the wake-up window, a power saving time duration 3208 for applying the power saving operation configuration, etc. The wireless device 3204 may perform a power saving operation, for example, based on receiving the activation command of the power saving operation configuration. The wireless device 3204 may perform a power saving operation, for example, based on the parameters of power saving operation configuration. The wireless device 3204 may perform the power saving operation in the power saving time duration 3208 (e.g., as indicated by the parameters of the power saving operation configuration). The wireless device 3204 may (e.g., in the power saving time duration 3208): monitor the power saving signal/channel in the time/frequency radio resources of the wake-up window (e.g., a wake-up window 3206), monitor PDCCHs based on (e.g., after or in response to) receiving the power saving signal, and/or skip monitoring (e.g., refrain from monitoring) the PDCCHs based on not receiving the power saving signal. The wireless device 3204 may monitor the power saving signal/channel with the periodicity indicated by the parameters of the power saving operation configuration The wireless device 3204 may monitor the PDCCHs, in the power saving time duration 3208, based on receiving a power saving signal in the wakeup window 3206. The wireless device 3204 may monitor the PDCCHs continuously, for example, if a DRX operation is not configured. The wireless device may monitor the PDCCHs discontinuously, for example, if the DRX operation is configured. The wireless device 3204 may skip monitoring (e.g., refrain from monitoring) the PDCCHs, in the power saving time duration 3208, for example, if the wireless device 3204 fails to receive the power saving signal. The wireless device 3204 may skip monitoring the PDCCHs regardless of whether a DRX operation is configured or not. The wireless device 3204 may repeat (e.g., in the power saving time duration 3208): monitoring the power saving signal/channel in the time/frequency radio resources of a wake-up window, monitoring PDCCHs based on (e.g., after or in response to) receiving the power saving signal, and/or skipping monitoring the PDCCHs based on not receiving the power saving signal.

At time $t_2$, the wireless device 3204 may receive a deactivation command of the power saving operation configuration. At time $t_2$, a power saving timer may expire. The wireless device 3204 may deactivate the power saving operation configuration based on (e.g., after or in response to) receiving the deactivation command, and/or an expiration of the power saving timer. The wireless device 3204 may (e.g., based on deactivating the power saving operation configuration): stop monitoring the power saving signal/channel, and/or start monitoring the PDCCHs. The wireless device 3204 may monitor the PDCCHs continuously, for example, if a DRX operation is not configured. The wireless device may monitor the PDCCHs discontinuously, for example, if the DRX operation is configured.

Figure 33:
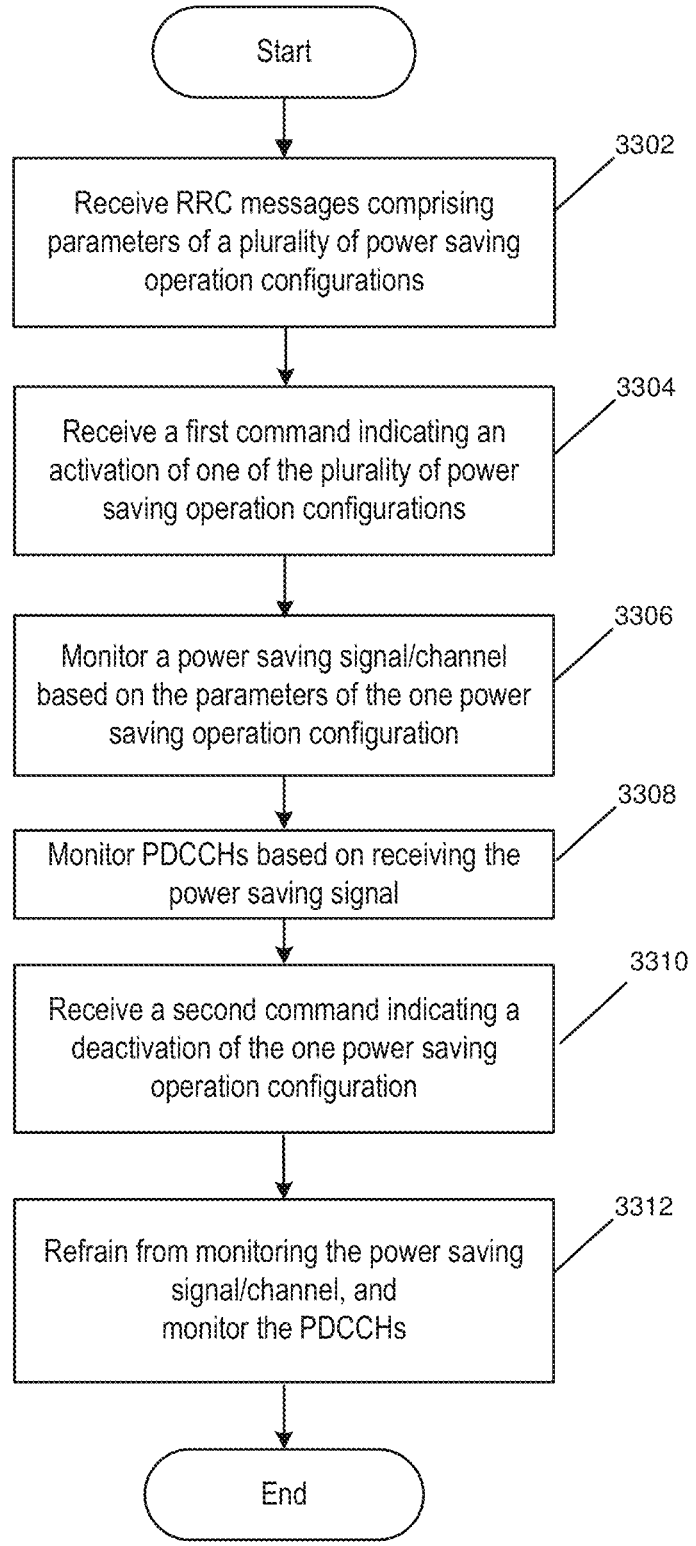
FIG. 33 shows an example method of a power saving operation.

FIG. 33 shows an example method of a power saving operation. At step 3302, a wireless device may receive one or more RRC messages. The one or more RRC messages may comprise parameters of a plurality of power saving operation configurations. The one or more RRC messages may also comprise second parameters of a DRX operation, for example, if the wireless device is to be configured for the DRX operation. At step 3304, the wireless device may receive a first command indicating an activation of a power saving operation configuration of the plurality of power saving operation configurations. At step 3306, the wireless device may monitor a power saving signal/channel, for example, based on parameters of the power saving operation configuration and based on a reception of the first command. The wireless device may receive a power saving signal, for example, based on the monitoring of the power saving signal/channel. At step 3308, the wireless device may start monitoring PDCCH based on a reception of the power saving signal. The wireless device may start monitoring PDCCH discontinuously based on the second parameter of the DRX operation, for example, if the DRX operation is configured. The wireless device may start monitoring PDCCH continuously, for example, if the DRX operation is not configured. The wireless device may fail to receive the power saving signal, for example, based on the monitoring of the power saving signal/channel. The wireless device may not monitor (e.g., refrain from monitoring) the PDCCHs, regardless of whether the DRX operation is configured or not, for example, if the wireless device fails to receive the power saving signal. The wireless device may repeat one or more of the steps 3306 and 3308. At step 3310, the wireless device may receive a second command that indicates a deactivation of the power saving operation configuration. At step 3312, the wireless device may stop monitoring (e.g., refrain from monitoring) the power saving signal/channel, for example, based on receiving the second command. The wireless device may monitor the PDCCHs based on receiving the second command. The wireless device may monitor the PDCCHs discontinuously, for example, if the DRX operation is configured. The wireless device may monitor the PDCCHs continuously, for example, if the DRX operation is not configured. The wireless device may transmit to and/or receive from a base station, one or more data packets, for example, based on receiving DCI (e.g., one or more DCI messages) in the PDCCHs (e.g., at step 3308 and/or step 3312). The DCI may indicate a downlink assignment or an uplink grant.

Figure 34:
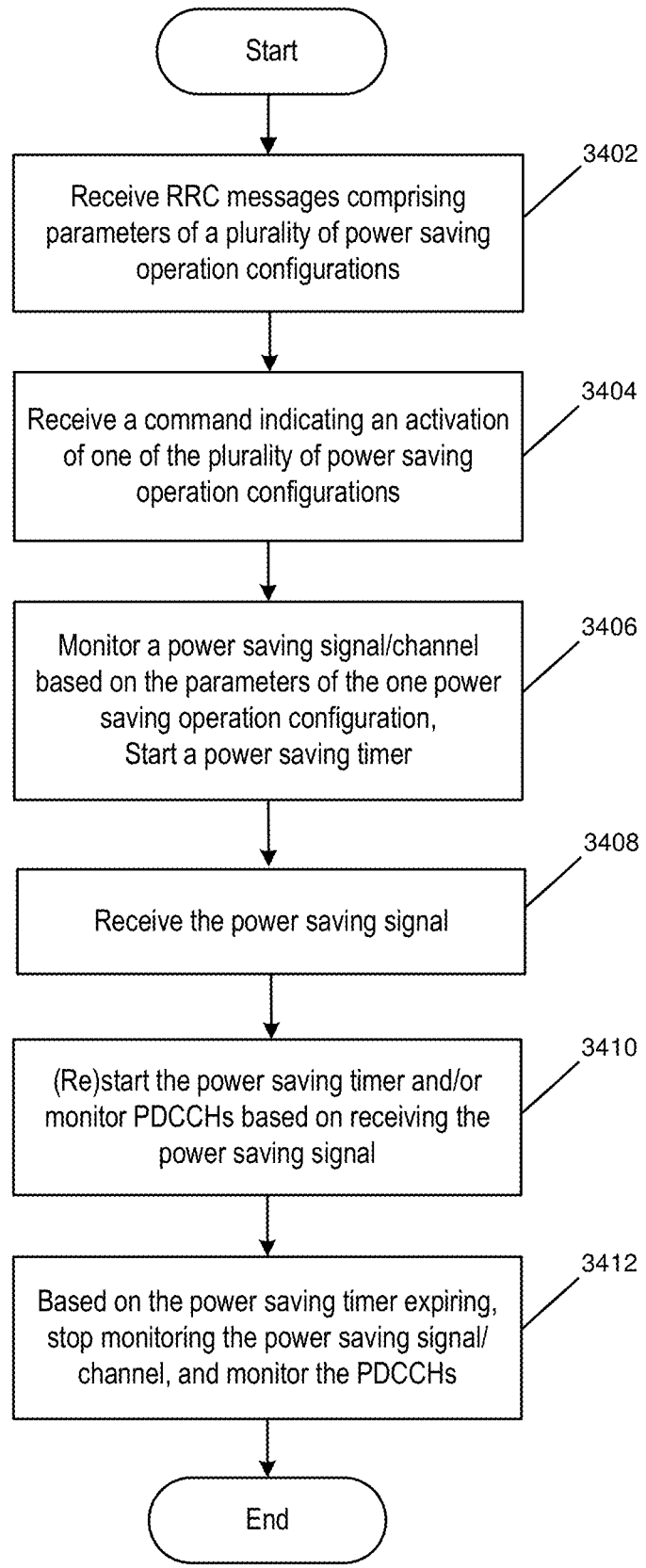
FIG. 34 shows an example of method of a power saving operation.

FIG. 34 shows an example method of a power saving operation. At step 3402, a wireless device may receive one or more RRC messages. The one or more RRC messages may comprise parameters of a plurality of power saving operation configurations. The one or more RRC messages may further comprise a power saving timer value of a power saving timer. At step 3404, the wireless device may receive a command indicating an activation of a power saving operation configuration of the plurality of power saving operation configurations. At step 3606, the wireless device may monitor a power saving signal/channel, for example, based on a reception of the command and/or based on parameters of the power saving operation configuration. The wireless device may start the power saving timer based on the reception of the command. At step 3408, the wireless device may receive the power saving signal. At step 3410, the wireless device may (re-)start the power saving timer, for example, based on a reception of the power saving signal. The wireless device may start monitoring PDCCHs, for example, continuously if a DRX is not configured, or discontinuously if the DRX operation is configured. The wireless device may fail to receive the power saving signal. The wireless device may not monitor (e.g., refrain from monitoring) the PDCCHs, regardless of whether the DRX operation is configured or not, for example, if the wireless device fails to receive the power saving signal. The wireless device may repeat one or more of the steps 3406, 3408 and 3410. The power saving timer may expire. At step 3412, the wireless device may stop monitoring (e.g., refrain from monitoring) the power saving signal/channel, for example, based on an expiration of the power saving timer. The wireless device may start monitoring the PDCCHs, for example, based on the expiration of the power saving timer. The wireless device may monitor the PDCCHs, for example, continuously if a DRX is not configured, or discontinuously if the DRX operation is configured. The wireless device may transmit to and/or receive from the base station, one or more data packets based on receiving DCI (e.g., one or more DCI messages) in the PDCCHs (e.g., at step 3410 and/or step 3412). The DCI may indicate a downlink assignment or an uplink grant.

A wireless device may monitor a downlink control channel based on the wireless device being in a first state. The wireless device may receive (e.g., during the monitoring) a first MAC CE that indicates a transition from the first state to a second state. The first MAC CE may comprise, for example, one or more first fields that indicate a cell and/or a bandwidth part, and/or a second field that indicates activation/deactivation of the second state. The wireless device may transition from the first state into the second state, for example, based on the first MAC CE. The wireless device may stop monitoring the downlink control channel, for example, based on transitioning from the first state to the second state. The wireless device may monitor a downlink radio resource for receiving a wake-up signal, for example, based on transitioning from the first state to the second state. The wireless device may receive the wake-up signal, for example, in the downlink radio resource. The wireless device may transition from the second state into the first state, for example, based on receiving the wake-up signal. The wireless device may receive DCI, for example, if the wireless device is in the first state. The wireless device may receive data packets based on receiving the DCI. The wireless device may fail to receive the wake-up signal. The wireless device may stay in the second state, for example, if the wireless device does fails to receive the wake-up signal. The wireless device may repeat monitoring the at least downlink radio resource, for detecting one or more wake-up signals.

A wireless device may receive a MAC PDU comprising a MAC CE and a MAC subheader. The MAC CE may indicate a transition to a power saving state. The MAC subheader may comprise an LCID value that corresponds to an activation/deactivation command of a power saving operation configuration. The wireless device may transition to the power saving state, for example, based on receiving the MAC PDU. The wireless device may monitor a downlink radio resource, for example, based on transitioning to the power saving state. The wireless device may receive a wake-up signal in the downlink radio resource.

A wireless device may receive one or more messages that comprise configuration parameters of a wake-up signal corresponding to a cell. The configuration parameters may comprise, for example, a first timer value of a wake-up timer and a second timer value of a go-to-sleep timer. The wireless device may (e.g., based on the wireless device transitioning to a first state): start the wake-up timer based on the first timer value, start the go-to-sleep timer based on the second timer value, and/or monitor the wake-up signal. The wireless device may (re-)start the wake-up timer and/or the go-to-sleep timer, for example, based on receiving the wake-up signal. The wireless device may (e.g., based on an expiration of the wake-up timer): transition from the first mode to a second mode, and/or monitor a PDCCH of the cell. The wireless device may (e.g., based on an expiration of the go-to-sleep timer): transition from the first state to a third state, and/or skip monitoring the PDCCH of the cell.

A wireless device may perform a method comprising multiple operations. The wireless device may receive one or more first messages comprising information (e.g., configuration parameters) associated with a plurality of power saving configurations of a cell of a plurality of cells. The wireless device may receive a second message comprising: a first field that indicates a first power saving configuration of the plurality of power saving configurations, and a second field that indicates the cell. The wireless device may monitor, based on the first power saving configuration, a power saving channel. The wireless device may receive, via the power saving channel, a wake-up indication. The wireless device may monitor, based on the receiving the wake-up indication, a downlink control channel of the cell.

The wireless device may also perform one or more additional operations or include additional elements in conjunction with the described method. The second message may further comprise a third field that indicates a bandwidth part of the cell. The monitoring the power saving channel may comprise monitoring the power saving channel on the bandwidth part of the cell. The one or more first messages may comprise configuration parameters of the first power saving configuration. The configuration parameters of the first power saving configuration comprise at least one of a periodicity of the power saving channel, a duration of the power saving channel, a number of resource blocks in a frequency domain, a bandwidth part indicator indicating a bandwidth of the cell, a search space set, or a control resource set. The monitoring the power saving channel may be based on at least one of the configuration parameters of the first power saving configuration. The wireless device may determine, based on receiving a third message, that a beam failure recovery procedure is ongoing on the cell. The wireless device may, based on the determining that a beam failure recovery procedure is ongoing on the cell: continue the beam failure recovery procedure, and delaying adjusting the cell into a power saving state. The wireless device may receive, via the monitored downlink control channel, a downlink assignment. The wireless device may receive, via the downlink assignment, downlink transport blocks. The wireless device may receive, via the monitored downlink control channel, an uplink grant. The wireless device may transmit, based on the uplink grant, uplink transport blocks. The second message may comprise at least one of: a medium access control (MAC) control element (CE), or downlink control information (DCI). The wireless device may receive a third message. The third message may indicate a second power saving configuration of the plurality of power saving configurations. The second power saving configuration may comprise at least one configuration parameter that is different from a corresponding configuration parameter of the first power saving configuration. The wireless device may stop a secondary cell deactivation timer of the cell based on receiving the second message. The wireless device may stop a bandwidth part inactivity timer of an active bandwidth part of the cell based on receiving the second message. The monitoring the downlink control channel may comprise discontinuously monitoring the downlink control channel based on a discontinuous reception (DRX) configuration. The discontinuously monitoring the downlink control channel may comprise at least one of: monitoring the downlink control channel in a DRX active time of the DRX configuration, and skipping monitoring the downlink control channel in a DRX inactive time of the DRX configuration. The wireless device may start a power saving timer based on receiving the second message. The wireless device may, based on an expiration of the power saving timer, stop the monitoring of the power saving channel. The method of any one of claims 1 to 13, wherein the cell comprises a primary cell. The wireless device may activate the cell and starting a secondary cell deactivation timer of the cell. The wireless device may skip monitoring the downlink control channel based on not receiving the wake-up indication. The one or more first messages may further comprise configuration parameters of the downlink control channel. The configuration parameters of the downlink control channel may comprise at least one of: a periodicity of the downlink control channel, a duration of the downlink control channel, a number of resource blocks in frequency domain, at least a search space set, or at least a control resource set. Monitoring the downlink control channel may comprise continuously monitoring the downlink control channel if a discontinuous reception (DRX) operation is not configured. Continuously monitoring the downlink control channel may comprise monitoring the downlink control channel in one or more downlink control channel monitoring occasions configured by a base station. The wake-up indication may indicate monitoring the downlink control channel of the cell. The wake-up indication may further indicate at least one of: transmitting on uplink control channel of the cell, transmitting on uplink shared channel of the cell, or receiving on a downlink shared channel of the cell. The wireless device may receive a third message comprising: the first field that indicates a second power state configuration of the plurality of power saving configurations, and the second field that indicates the cell. The wireless device may stop a secondary cell deactivation timer of the cell based on receiving the third message. The wireless device may stop a bandwidth part inactivity timer of an active bandwidth part of the cell based on receiving the third message.

Systems, devices and media may be configured with the method. A computing device may comprise one or more processors; and memory storing instructions that, when executed, cause the computing device to perform the described method, additional operations and/or include the additional elements. A system may comprise a first computing device configured to perform the described method, additional operations and/or include the additional elements; and a second computing device configured to send the one or more first messages. A computer-readable medium may store instructions that, when executed, cause performance of the described method, additional operations and/or include the additional elements.

A wireless device may perform a method comprising multiple operations. The wireless device may receive one or more first messages comprising information (e.g., configuration parameters) associated with a plurality of power saving configurations. The wireless device may monitor, based on a first field that indicates a first power saving configuration of the plurality of power saving configurations, a power saving channel. The wireless device may receive, via the power saving channel, a wake-up indication of a cell. The wireless device may, based on receiving the wake-up indication, monitor, for a downlink assignment or an uplink grant, a downlink control channel of the cell.

The wireless device may also perform one or more additional operations or include additional elements in conjunction with the described method. The wireless device may receive a second message. The second message may comprise the first field that indicates the first power saving configuration of the plurality of power saving configurations, and a second field that indicates the cell. The second message may comprise at least one of a medium access control (MAC) control element (CE), or downlink control information (DCI). The one or more first messages may comprise information (e.g., configuration parameters) associated with the first power saving configuration. The information associated with the first power saving configuration comprise at least one of: a periodicity of the power saving channel, a duration of the power saving channel, a number of resource blocks in a frequency domain, a bandwidth part indicator indicating a bandwidth of the cell, a search space set, or a control resource set. The monitoring the power saving channel may be based on at least one of the information associated with the first power saving configuration. The wireless device may determine, based on receiving a third message, that a beam failure recovery procedure is ongoing on the cell. The wireless device may, based on the determining that a beam failure recovery procedure is ongoing on the cell continue the beam failure recovery procedure, and delay adjusting the cell into a power saving state. The wireless device may receive the downlink assignment. The wireless device may receive, based on the downlink assignment, downlink transport blocks. The wireless device may receive the uplink grant. The wireless device may transmit, based on the uplink grant, uplink transport blocks.

Systems, devices and media may be configured with the method. A computing device may comprise one or more processors; and memory storing instructions that, when executed, cause the computing device to perform the described method, additional operations and/or include the additional elements. A system may comprise a first computing device configured to perform the described method, additional operations and/or include the additional elements; and a second computing device configured to send the one or more first messages. A computer-readable medium may store instructions that, when executed, cause performance of the described method, additional operations and/or include the additional elements.

A wireless device may perform a method comprising multiple operations. The wireless device may receive one or more first messages comprising information (e.g., configuration parameters) associated with a beam failure recovery procedure of a cell, and information (e.g., configuration parameters) associated with a plurality of power saving configurations of the cell. The wireless device may receive a second message. The second message may indicates adjusting the cell into a power saving state, and a first power saving configuration of the plurality of power saving configurations. The wireless device may determine, based on receiving the second message, that a beam failure recovery procedure is ongoing on the cell. The wireless device may, based on the determining that the beam failure recovery procedure is ongoing on the cell: continue the beam failure recovery procedure, and delay adjusting the cell into the power saving state.

The wireless device may also perform one or more additional operations or include additional elements in conjunction with the described method. The wireless device may, based on determining that the beam failure recovery procedure is not ongoing on the cell: adjusting the cell into the power saving state; monitor, based on the first power saving configuration, a power saving channel; receive, via the power saving channel, a wake-up indication of the cell; and monitor, based on the receiving the wake-up indication, a downlink control channel of the cell. The one or more first messages may comprise information (e.g., configuration parameters) associated with the first power saving configuration. The information associated with the first power saving configuration may comprise at least one of: a periodicity of the power saving channel, a duration of the power saving channel, a number of resource blocks in a frequency domain, a bandwidth part indicator indicating a bandwidth of the cell, a search space set, or a control resource set. The monitoring the power saving channel may be based on at least one of the information associated with the first power saving configuration. The wireless device may receive a third message. The third message may indicate a second power saving configuration of the plurality of power saving configurations. The second power saving configuration may comprise at least one configuration parameter that is different from a corresponding configuration parameter of the first power saving configuration. The wireless device may, based on receiving the second message, at least one of: stop a secondary cell deactivation timer of the cell, or stop a bandwidth part inactivity timer of an active bandwidth part of the cell. The second message may comprise at least one of a medium access control (MAC) control element (CE), or downlink control information (DCI).

Systems, devices and media may be configured with the method. A computing device may comprise one or more processors; and memory storing instructions that, when executed, cause the computing device to perform the described method, additional operations and/or include the additional elements. A system may comprise a first computing device configured to perform the described method, additional operations and/or include the additional elements; and a second computing device configured to send the one or more first messages. A computer-readable medium may store instructions that, when executed, cause performance of the described method, additional operations and/or include the additional elements.

Figure 35:
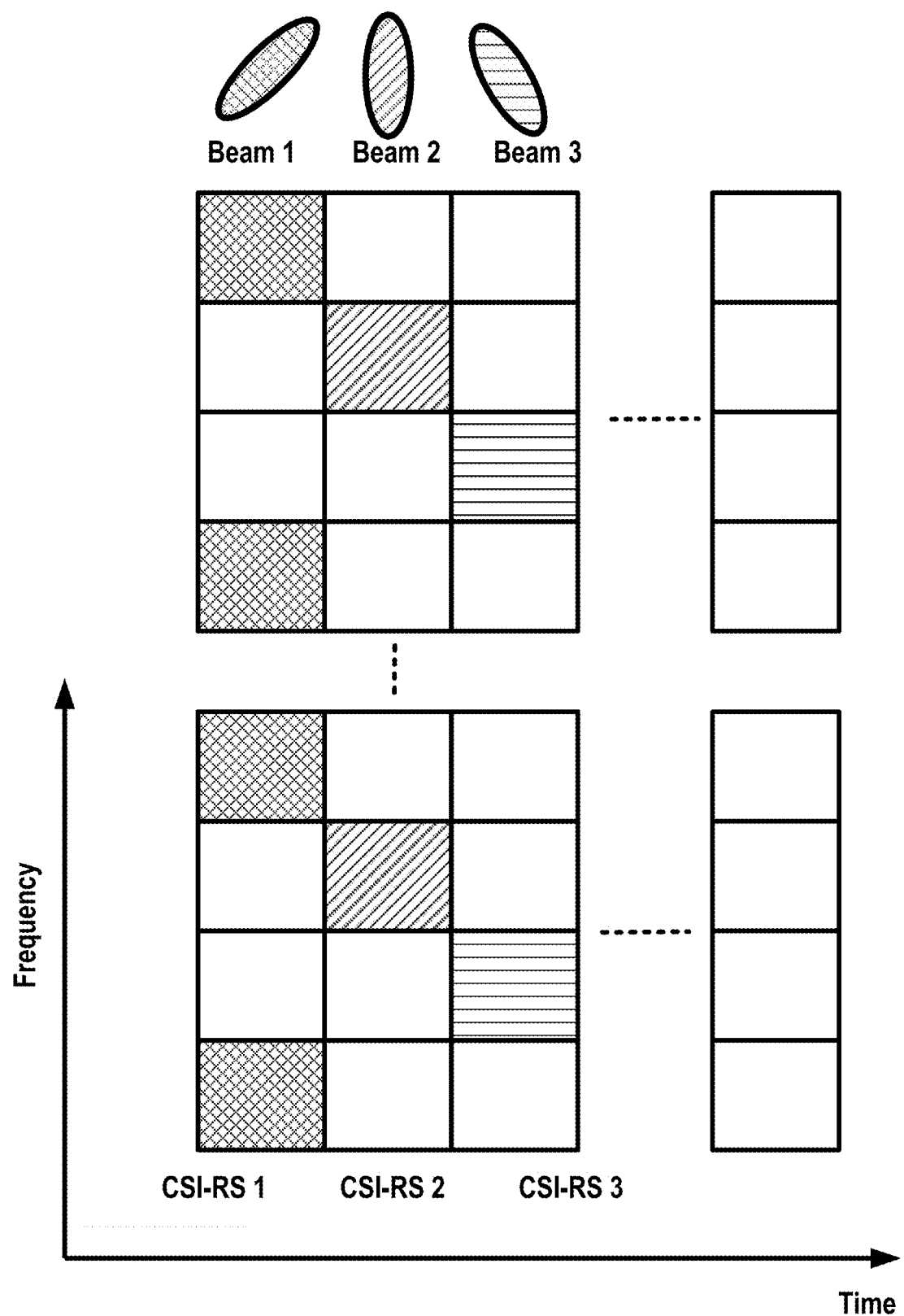
FIG. 35 shows an example of CSI RS transmission with multiple beams.

FIG. 35 shows an example of a CSI-RS that may be mapped in time and frequency domains. Each square shown in FIG. 35 may represent a resource block within a bandwidth of a cell. Each resource block may comprise a number of subcarriers. A cell may have a bandwidth comprising a number of resource blocks. A base station (e.g., a gNB in NR) may transmit one or more Radio Resource Control (RRC) messages comprising CSI-RS resource configuration parameters for one or more CSI-RS. One or more of the following parameters may be configured by higher layer signaling for each CSI-RS resource configuration: CSI-RS resource configuration identity, number of CSI-RS ports, CSI-RS configuration (e.g., symbol and RE locations in a subframe), CSI-RS subframe configuration (e.g., subframe location, offset, and periodicity in a radio frame), CSI-RS power parameter, CSI-RS sequence parameter, CDM type parameter, frequency density, transmission comb, QCL parameters (e.g., QCL-scramblingidentity, crs-portscount, mbsfn-subframeconfiglist, csi-rs-configZPid, qcl-csi-rs-configNZPid), and/or other radio resource parameters.

FIG. 35 shows three beams that may be configured for a wireless device, for example, in a wireless device-specific configuration. Any number of additional beams (e.g., represented by the column of blank squares) or fewer beams may be included. Beam 1 may be allocated with CSI-RS 1 that may be transmitted in some subcarriers in a resource block (RB) of a first symbol. Beam 2 may be allocated with CSI-RS 2 that may be transmitted in some subcarriers in an RB of a second symbol. Beam 3 may be allocated with CSI-RS 3 that may be transmitted in some subcarriers in an RB of a third symbol. All subcarriers in an RB may not necessarily be used for transmitting a particular CSI-RS (e.g., CSI-RS 1) on an associated beam (e.g., beam 1) for that CSI-RS. By using frequency division multiplexing (FDM), other subcarriers, not used for beam 1 for the wireless device in the same RB, may be used for other CSI-RS transmissions associated with a different beam for other wireless devices. Additionally or alternatively, by using time domain multiplexing (TDM), beams used for a wireless device may be configured such that different beams (e.g., beam 1, beam 2, and beam 3) for the wireless device may be transmitted using some symbols different from beams of other wireless devices.

Beam management may use a device-specific configured CSI-RS. In a beam management procedure, a wireless device may monitor a channel quality of a beam pair link comprising a transmitting beam by a base station (e.g., a gNB in NR) and a receiving beam by the wireless device (e.g., a UE). If multiple CSI-RSs associated with multiple beams are configured, a wireless device may monitor multiple beam pair links between the base station and the wireless device.

A wireless device may transmit one or more beam management reports to a base station. A beam management report may indicate one or more beam pair quality parameters, comprising, for example, one or more beam identifications, RSRP, PMI, CQI, and/or RI, of a subset of configured beams.

Figure 37A:
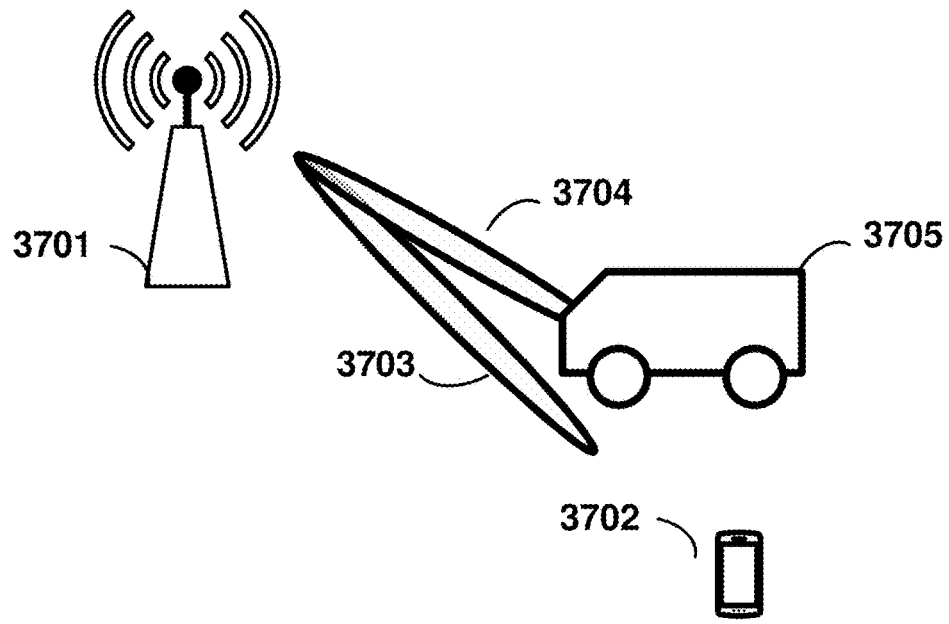
FIG. 37A and FIG. 37B show examples of beam failure.
Figure 37B:
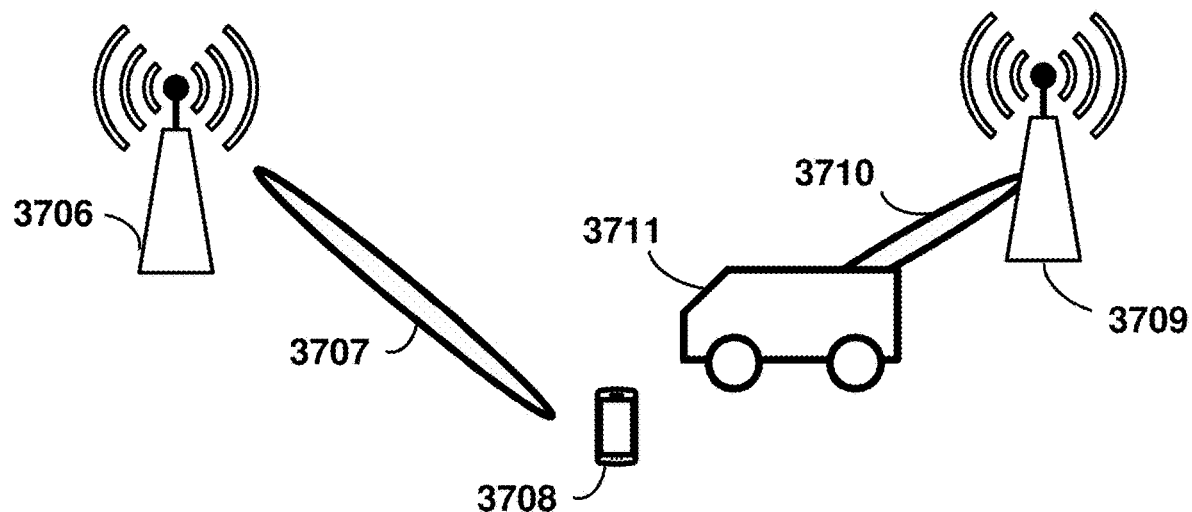

A base station and/or a wireless device may perform a downlink L1/L2 beam management procedure. One or more downlink L1/L2 beam management procedures may be performed within one or multiple transmission and receiving points (TRPs), such as shown in FIG. 37A and FIG. 37B, respectively.

FIG. 36 shows examples of three beam management procedures, P1, P2, and P3. Procedure P1 may be used to enable a wireless device measurement on different transmit (Tx) beams of a TRP (or multiple TRPs), for example, to support a selection of Tx beams and/or wireless device receive (Rx) beam(s) (shown as ovals in the top row and bottom row, respectively, of P1). Beamforming at a TRP (or multiple TRPs) may include, for example, an intra-TRP and/or inter-TRP Tx beam sweep from a set of different beams (shown, in the top rows of P1 and P2, as ovals rotated in a counter-clockwise direction indicated by the dashed arrow). Beamforming at a wireless device (e.g., 3601 in FIG. 36), may include, for example, a wireless device Rx beam sweep from a set of different beams (shown, in the bottom rows of P1 and P3, as ovals rotated in a clockwise direction indicated by the dashed arrow). Procedure P2 may be used to enable a wireless device measurement on different Tx beams of a TRP (or multiple TRPs) (shown, in the top row of P2, as ovals rotated in a counter-clockwise direction indicated by the dashed arrow), for example, which may change inter-TRP and/or intra-TRP Tx beam(s). Procedure P2 may be performed, for example, on a smaller set of beams for beam refinement than in procedure P1. P2 may be a particular example of P1. Procedure P3 may be used to enable a wireless device measurement on the same Tx beam (shown as oval in P3), for example, to change a wireless device Rx beam if the wireless device uses beamforming.

A wireless device (e.g., 3601 in FIG. 36) and/or a base station (e.g., 3602 in FIG. 36) may trigger a beam failure recovery mechanism. The wireless device may trigger a beam failure recovery (BFR) request transmission, for example, if a beam failure event occurs. A beam failure event may include, for example, a determination that a quality of beam pair link(s) of an associated control channel is unsatisfactory. A determination of an unsatisfactory quality of beam pair link(s) of an associated channel may be based on the quality falling below a threshold and/or an expiration of a timer.

The wireless device may measure a quality of beam pair link(s) using one or more reference signals (RS). One or more SS blocks, one or more CSI-RS resources, and/or one or more demodulation reference signals (DM-RSs) of a PBCH may be used as a RS for measuring a quality of a beam pair link. Each of the one or more CSI-RS resources may be associated with a CSI-RS resource index (CRI). A quality of a beam pair link may be based on one or more of an RSRP value, reference signal received quality (RSRQ) value, and/or CSI value measured on RS resources. The base station may indicate that an RS resource, for example, that may be used for measuring a beam pair link quality, is quasi-co-located (QCLed) with one or more DM-RSs of a control channel. The RS resource and the DM-RSs of the control channel may be QCLed when the channel characteristics from a transmission via an RS to the wireless device, and the channel characteristics from a transmission via a control channel to the wireless device, are similar or the same under a configured criterion.

FIG. 37A shows an example of a beam failure event involving a single TRP. A single TRP such as at a base station 3701 may transmit, to a wireless device 3702, a first beam 3703 and a second beam 3704. A beam failure event may occur if, for example, a serving beam, such as the second beam 3704, is blocked by a moving vehicle 3705 or other obstruction (e.g., building, tree, land, or any object) and configured beams (e.g., the first beam 3703 and/or the second beam 3704), including the serving beam, are received from the single TRP. The wireless device 3702 may trigger a mechanism to recover from beam failure when a beam failure occurs.

FIG. 37B shows an example of a beam failure event involving multiple TRPs. Multiple TRPs, such as at a first base station 3706 and at a second base station 3709, may transmit, to a wireless device 3708, a first beam 3707 (e.g., from the first base station 3706) and a second beam 3710 (e.g., from the second base station 3709). A beam failure event may occur when, for example, a serving beam, such as the second beam 3710, is blocked by a moving vehicle 3711 or other obstruction (e.g., building, tree, land, or any object) and configured beams (e.g., the first beam 3707 and/or the second beam 3710) are received from multiple TRPs. The wireless device 3608 may trigger a mechanism to recover from beam failure when a beam failure occurs.

A wireless device may monitor a PDCCH, such as a New Radio PDCCH (NR-PDCCH), on M beam pair links simultaneously, where M≥1 and the maximum value of M may depend at least on the wireless device capability. Such monitoring may increase robustness against beam pair link blocking. A base station may transmit, and the wireless device may receive, one or more messages configured to cause the wireless device to monitor NR-PDCCH on different beam pair link(s) and/or in different NR-PDCCH OFDM symbol.

A base station may transmit higher layer signaling, and/or a MAC control element (MAC CE), that may comprise parameters related to a wireless device Rx beam setting for monitoring NR-PDCCH on multiple beam pair links. A base station may transmit one or more indications of a spatial QCL assumption between a first DL RS antenna port(s) and a second DL RS antenna port(s). The first DL RS antenna port(s) may be for one or more of a cell-specific CSI-RS, device-specific CSI-RS, SS block, PBCH with DM-RSs of PBCH, and/or PBCH without DM-RSs of PBCH. The second DL RS antenna port(s) may be for demodulation of a DL control channel. Signaling for a beam indication for a NR-PDCCH (e.g., configuration to monitor NR-PDCCH) may be via MAC CE signaling, RRC signaling, DCI signaling, or specification-transparent and/or an implicit method, and any combination thereof.

For reception of unicast DL data channel, a base station may indicate spatial QCL parameters between DL RS antenna port(s) and DM-RS antenna port(s) of DL data channel. A base station may transmit DCI (e.g., downlink grants) comprising information indicating the RS antenna port(s). The information may indicate the RS antenna port(s) which may be QCLed with DM-RS antenna port(s). A different set of DM-RS antenna port(s) for the DL data channel may be indicated as a QCL with a different set of RS antenna port(s).

If a base station transmits a signal indicating a spatial QCL parameters between CSI-RS and DM-RS for PDCCH, a wireless device may use CSI-RSs QCLed with DM-RS for a PDCCH to monitor beam pair link quality. If a beam failure event occurs, the wireless device may transmit a beam failure recovery request, such as by a determined configuration.

If a wireless device transmits a beam failure recovery request, for example, via an uplink physical channel or signal, a base station may detect that there is a beam failure event, for the wireless device, by monitoring the uplink physical channel or signal. The base station may initiate a beam recovery mechanism to recover the beam pair link for transmitting PDCCH between the base station and the wireless device. The base station may transmit one or more control signals, to the wireless device, for example, after or in response to receiving the beam failure recovery request. A beam recovery mechanism may be, for example, an L1 scheme, or a higher layer scheme.

A base station may transmit one or more messages comprising, for example, configuration parameters of an uplink physical channel and/or a signal for transmitting a beam failure recovery request. The uplink physical channel and/or signal may be based on at least one of the following: a non-contention based PRACH (e.g., a beam failure recovery PRACH or BFR-PRACH), which may use a resource orthogonal to resources of other PRACH transmissions; a PUCCH (e.g., beam failure recovery PUCCH or BFR-PUCCH); and/or a contention-based PRACH resource. Combinations of these candidate signal and/or channels may be configured by a base station.

A base station may respond a confirmation message to a wireless device after receiving one or multiple BFR request. The confirmation message may include the CRI associated with the candidate beam the wireless device indicates in the one or multiple BFR request. The confirmation message may be a L1 control information.

Figure 38:
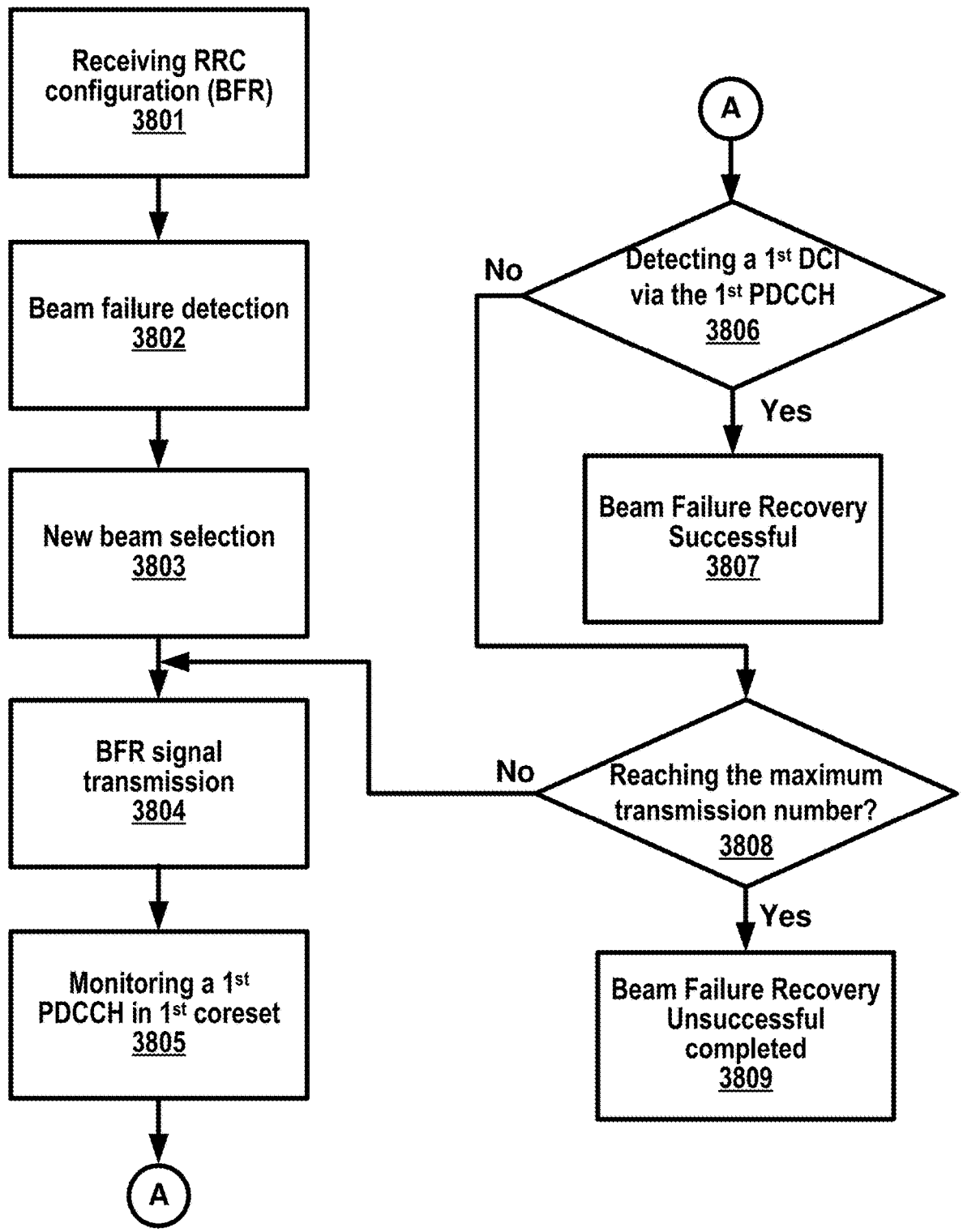
FIG. 38 shows an example of a beam failure recovery procedure.

FIG. 38 shows example of a BFR procedure. A wireless device may receive one or more RRC messages comprising BFR parameters 3801. The one or more RRC messages may comprise an RRC message (e.g. RRC connection reconfiguration message, or RRC connection reestablishment message, or RRC connection setup message). The wireless device may detect at least one beam failure 3802 according to at least one of BFR parameters. The wireless device may start a first timer if configured in response to detecting the at least one beam failure. The wireless device may select a selected beam 3803 in response to detecting the at least one beam failure. The selected beam may be a beam with good channel quality (e.g., RSRP, SINR, or BLER) from a set of candidate beams. The candidate beams may be identified by a set of reference signals (e.g., SSBs, or CSI-RSs). The wireless device may transmit at least a first BFR signal 3804 to a base station in response to the selecting the selected beam. The at least first BFR signal may be associated with the selected beam. The at least first BFR signal may be a preamble transmitted on a PRACH resource, or a SR signal transmitted on a PUCCH resource, or a beam indication transmitted on a PUCCH/PUSCH resource. The wireless device may transmit the at least first BFR signal with a transmission beam corresponding to a receiving beam associated with the selected beam. The wireless device may start a response window in response to transmitting the at least first BFR signal. The response window may be a timer with a value configured by the base station. If the response window is running, the wireless device may monitor a PDCCH in a first coreset 3805. The first coreset may be associated with the BFR procedure. The wireless device may monitor the PDCCH in the first coreset in condition of transmitting the at least first BFR signal. The wireless device may receive first DCI via the PDCCH in the first coreset 3806 if the response window is running. The wireless device may consider the BFR procedure successfully completed 3807 if receiving the first DCI via the PDCCH in the first coreset before the response window expires. The wireless device may stop the first timer if configured in response to the BFR procedure successfully being completed. The wireless device may stop the response window in response to the BFR procedure successfully being completed.

If the response window expires, and the wireless device does not receive the DCI, the wireless device may increment a transmission number, wherein, the transmission number is initialized to a first number (e.g., 0) before the BFR procedure is triggered. If the transmission number indicates a number less than the configured maximum transmission number 3808, the wireless device may repeat one or more actions comprising at least one of: a BFR signal transmission; starting the response window; monitoring the PDCCH; incrementing the transmission number if no response received during the response window is running. If the transmission number indicates a number equal or greater than the configured maximum transmission number, the wireless device may declare the BFR procedure is unsuccessfully completed 3809.

FIG. 39 shows DCI formats for an example of 20 MHz FDD operation with 2 Tx antennas at the base station and no carrier aggregation in a long term evolution (LTE)/long term evolution-advanced (LTE-A) system. As shown in FIG. 37, the DCI formats in the LTE/LTE-A system may comprise at least one of: DCI format 0; 1; 1A; 1B; 1C; 1D; 2; 2A; 2B; 2C; 2D; 3; 3A; 4; 5; 6-0A; 6-0B; 6-1A; 6-1B; and/or 6-2. In an NR system, the DCI formats may comprise at least one of: DCI format 0_0/0_1 indicating scheduling of PUSCH in a cell; DCI format 1_0/1_1 indicating scheduling of PDSCH in a cell; DCI format 2_0 notifying a group of UEs of slot format; DCI format 2_1 notifying a group of UEs of PRB(s) and OFDM symbol(s) where a wireless device may assume no transmission is intended for the wireless device; DCI format 2_2 indicating transmission of TPC commands for PUCCH and PUSCH; and/or DCI format 2_3 indicating transmission of a group of TPC commands for SRS transmission by one or more wireless devices.

A base station may transmit DCI via a PDCCH for scheduling decision and power-control commends. More specifically, the DCI may comprise at least one of: downlink scheduling assignments, uplink scheduling grants, power-control commands. The downlink scheduling assignments may comprise at least one of: PDSCH resource indication, transport format, HARQ information, and control information related to multiple antenna schemes, a command for power control of the PUCCH used for transmission of ACK/NACK in response to downlink scheduling assignments. The uplink scheduling grants may comprise at least one of: PUSCH resource indication, transport format, and HARQ related information, a power control command of the PUSCH.

The different types of control information correspond to different DCI message sizes. For example, supporting spatial multiplexing with noncontiguous allocation of RBs in the frequency domain may require a larger scheduling message in comparison with an uplink grant allowing for frequency-contiguous allocation only. The DCI may be categorized into different DCI formats, where a format corresponds to a certain message size and usage.

A wireless device may monitor one or more PDCCH candidates to detect one or more DCI with one or more DCI format. The one or more PDCCH may be transmitted in common search space or wireless device-specific search space. A wireless device may monitor PDCCH with only a limited set of DCI format, to save power consumption. For example, a normal UE may not be required to detect a DCI with DCI format 6 which is used for an eMTC UE. The more DCI format to be detected, the more power be consumed at the UE.

The one or more PDCCH candidates that a wireless device monitors may be defined in terms of PDCCH UE-specific search spaces. A PDCCH UE-specific search space at CCE aggregation level L∈{1, 2, 4, 8} may be defined by a set of PDCCH candidates for CCE aggregation level L. For a DCI format, a wireless device may be configured per serving cell by one or more higher layer parameters a number of PDCCH candidates per CCE aggregation level L.

In non-DRX mode operation, a wireless device may monitor one or more PDCCH candidate in control resource set q according to a periodicity of $W_{PDCCH,q}$ symbols that may be configured by one or more higher layer parameters for control resource set q.

The information in the DCI formats used for downlink scheduling may be organized into different groups, with the field present varying between the DCI formats, including at least one of: resource information, consisting of: carrier indicator (0 or 3 bits), RB allocation; HARQ process number; MCS, NDI, and RV (for the first TB); MCS, NDI and RV (for the second TB); MIMO related information; PDSCH resource-element mapping and QCI; Downlink assignment index (DAI); TPC for PUCCH; SRS request (e.g., 1 bit), triggering one-shot SRS transmission; ACK/NACK offset; DCI format 0/1A indication, used to differentiate between DCI format 1A and 0; and padding if necessary. The MIMO related information may comprise at least one of: PMI, precoding information, transport block swap flag, power offset between PDSCH and reference signal, reference-signal scrambling sequence, number of layers, and/or antenna ports for the transmission.

The information in the DCI formats used for uplink scheduling may be organized into different groups, with the field present varying between the DCI formats, including at least one of: resource information, comprising: carrier indicator, resource allocation type, RB allocation; MCS, NDI (for the first TB); MCS, NDI (for the second TB); phase rotation of the uplink DMRS; precoding information; CSI request, requesting an aperiodic CSI report; SRS request (2 bit), used to trigger aperiodic SRS transmission using one of up to three preconfigured settings; uplink index/DAI; TPC for PUSCH; DCI format 0/1A indication; and padding if necessary.

A base station may perform cyclic redundancy check (CRC) scrambling for a DCI, before transmitting the DCI via a PDCCH. The base station may perform CRC scrambling by bit-wise addition (or Modulo-2 addition or exclusive OR (XOR) operation) of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, SRS-TPC-RNTI, INT-RNTI, SFI-RNTI, P-RNTI, SI-RNTI, RA-RNTI, and/or MCS-C-RNTI) with the CRC bits of the DCI. The wireless device may check the CRC bits of the DCI, when detecting the DCI. The wireless device may receive the DCI when the CRC is scrambled by a sequence of bits that is the same as the at least one wireless device identifier. Otherwise, the wireless device may consider the DCI is detected with non-matching CRC and/or may ignore the DCI.

In an NR system or other systems, in order to support wide bandwidth operation, a base station may transmit one or more PDCCH in different control resource sets. A base station may transmit one or more RRC message comprising configuration parameters of one or more control resource sets. At least one of the one or more control resource sets may comprise at least one of: a first OFDM symbol; a number of consecutive OFDM symbols; a set of resource blocks; a CCE-to-REG mapping; and a REG bundle size, in case of interleaved CCE-to-REG mapping.

A base station (e.g., gNB) may configure a wireless device (e.g., a UE) with uplink (UL) bandwidth parts (BWPs) and downlink (DL) BWPs to enable bandwidth adaptation (BA) on a PCell. If carrier aggregation is configured, the base station may further configure the wireless device with at least DL BWP(s) (i.e., there may be no UL BWPs in the UL) to enable BA on an SCell. For the PCell, an initial active BWP may be a first BWP used for initial access. For the SCell, a first active BWP may be a second BWP configured for the wireless device to operate on the SCell upon the SCell being activated.

In paired spectrum (e.g. FDD), a base station and/or a wireless device may independently switch a DL BWP and an UL BWP. In unpaired spectrum (e.g. TDD), a gNB and/or a wireless device may simultaneously switch a DL BWP and an UL BWP.

A base station and/or a wireless device may switch a BWP between configured BWPs by means of a DCI or a BWP inactivity timer. If the BWP inactivity timer is configured for a serving cell, the base station and/or the wireless device may switch an active BWP to a default BWP in response to an expiry of the BWP inactivity timer associated with the serving cell. The default BWP may be configured by the network.

For FDD systems, if configured with BA, one UL BWP for each uplink carrier and one DL BWP may be active at a time in an active serving cell. For TDD systems, one DL/UL BWP pair may be active at a time in an active serving cell. Operating on the one UL BWP and the one DL BWP (or the one DL/UL pair) may improve wireless device battery consumption. BWPs other than the one active UL BWP and the one active DL BWP that the UE may work on may be deactivated. On deactivated BWPs, the wireless device may: not monitor PDCCH; and/or not transmit on PUCCH, PRACH, and UL-SCH.

A serving cell may be configured with at most a first number (e.g., four) of BWPs. For an activated serving cell, there may be one active BWP at any point in time.

A BWP switching for a serving cell may be used to activate an inactive BWP and deactivate an active BWP at a time. The BWP switching may be controlled by a PDCCH indicating a downlink assignment or an uplink grant. The BWP switching may be controlled by a BWP inactivity timer (e.g., bwp-InactivityTimer). The BWP switching may be controlled by a MAC entity in response to initiating a Random Access procedure. Upon addition of an SpCell or activation of an SCell, one BWP may be initially active without receiving a PDCCH indicating a downlink assignment or an uplink grant. The active BWP for a serving cell may be indicated by RRC and/or PDCCH. In an example, for unpaired spectrum, a DL BWP may be paired with a UL BWP, and BWP switching may be common for both UL and DL.

A wireless device may perform a first beam failure recovery on a PCell (e.g., in FR1) and a second beam failure recovery on a SCell (e.g., in FR2). If the wireless device switches to a power saving state from a full power state, performing the beam failure recovery for both PCell and SCell may not be power efficient. On the other hand, simply stopping the beam failure recovery for both a PCell and an SCell may cause beam pair link failure and/or radio link failure. Beam failure recovery for carrier aggregation in a power saving state may be improved, for example, by continuing a beam failure recovery procedure. For example, a wireless device, in response to switching to a power saving state from a full power state, may continue a first beam failure recovery on a PCell and stop (e.g., abort) a second beam failure recovery on an SCell. By doing so, the wireless device may maintain a beam pair link with a base station (e.g., via the PCell), which may prevent beam pair link failure and/or radio link failure. The wireless device may (e.g., additionally) improve power consumption in the power saving state.

A wireless device may perform a beam failure recovery on a cell, for example, if the wireless device is in a full power state. The wireless device may monitor a downlink control channel on a control resource set for receiving a response for a beam failure recovery request. The wireless device may switch to a power saving state from the full power state. Keeping monitoring the downlink control channel on the control resource set may not be power efficient. Stopping monitoring the downlink control channel may cause beam pair link failure and/or radio link failure. Beam failure recovery in a power saving state may be improved, for example, by using different CORESETS. For example, a wireless device may be configured with two CORESETS for beam failure recovery, for example: a first CORESET for a full power state, and a second CORESET for a power saving state. If the wireless device in the full power state, the wireless device may monitor a downlink control channel, on the first CORESET configured for the full power state, for receiving a response for the beam failure recovery request. If the wireless device switches to the power saving state, the wireless device may monitor the downlink control channel, on the second CORESET configured for the power saving state, for receiving the response for the beam failure recovery request. By configuring two CORESETs for beam failure recovery (e.g., a first having large resources for a full power state, and a second having smaller resources for a power saving state), the wireless device may reduce power consumption for beam failure recovery in the power saving state and/or reduce possibility of beam pair link failure and/or radio link failure. Additionally or alternatively, the wireless device may be configured with two reference signals for beam failure recovery, for example: a first reference signal for the full power state, and a second reference signal for the power saving state. The wireless device may detect beam failure instances on the first reference signal configured for the full power state. If switching to the power saving state, the wireless device may continue the beam failure detection based on the second reference signal configured for the power saving state. By using multiple reference signals as described, the wireless device may determine whether a beam failure occurs, and/or trigger a beam failure recovery procedure, more quickly than if multiple reference signals were not used.

A wireless device may perform a beam failure recovery on a cell, for example, if the wireless device is in a full power state. The wireless device may monitor a downlink control channel for receiving a response for a beam failure recovery request. The wireless device may receive a command indicating switching to a power saving state from the full power state. Stop monitoring the downlink control channel may cause beam pair link failure and/or radio link failure. On the other hand, ignoring the command may increase power consumption of the wireless device. Beam failure recovery in a power saving state may be improved, for example, by delaying the switching to a different power state. For example, A wireless device, after receiving a command indicating switching from a full power state to a power saving state, may continue monitoring a downlink control channel for receiving a response for a beam failure recovery request. The wireless device, in response to receiving the response for the beam failure recovery request, may switch from the full power state to the power saving state. By the wireless device delaying switching to the power saving state if performing a beam failure recovery and receiving a power saving command in overlapped time duration, power consumption by the wireless device may be reduced and/or a beam failure recovery may be completed by the wireless device more quickly than if the wireless device does not delay the switching. Additionally or alternatively, the wireless device may be operating in a power saving state. If the wireless device is in the power saving state, the wireless device may trigger a beam failure recovery procedure. Based on or in response to triggering the beam failure recovery procedure, the wireless device may switch automatically from the power saving state to a full power state. In the full power state, the wireless device may monitor a downlink control channel for receiving a response for a beam failure recovery request.

Figure 40:
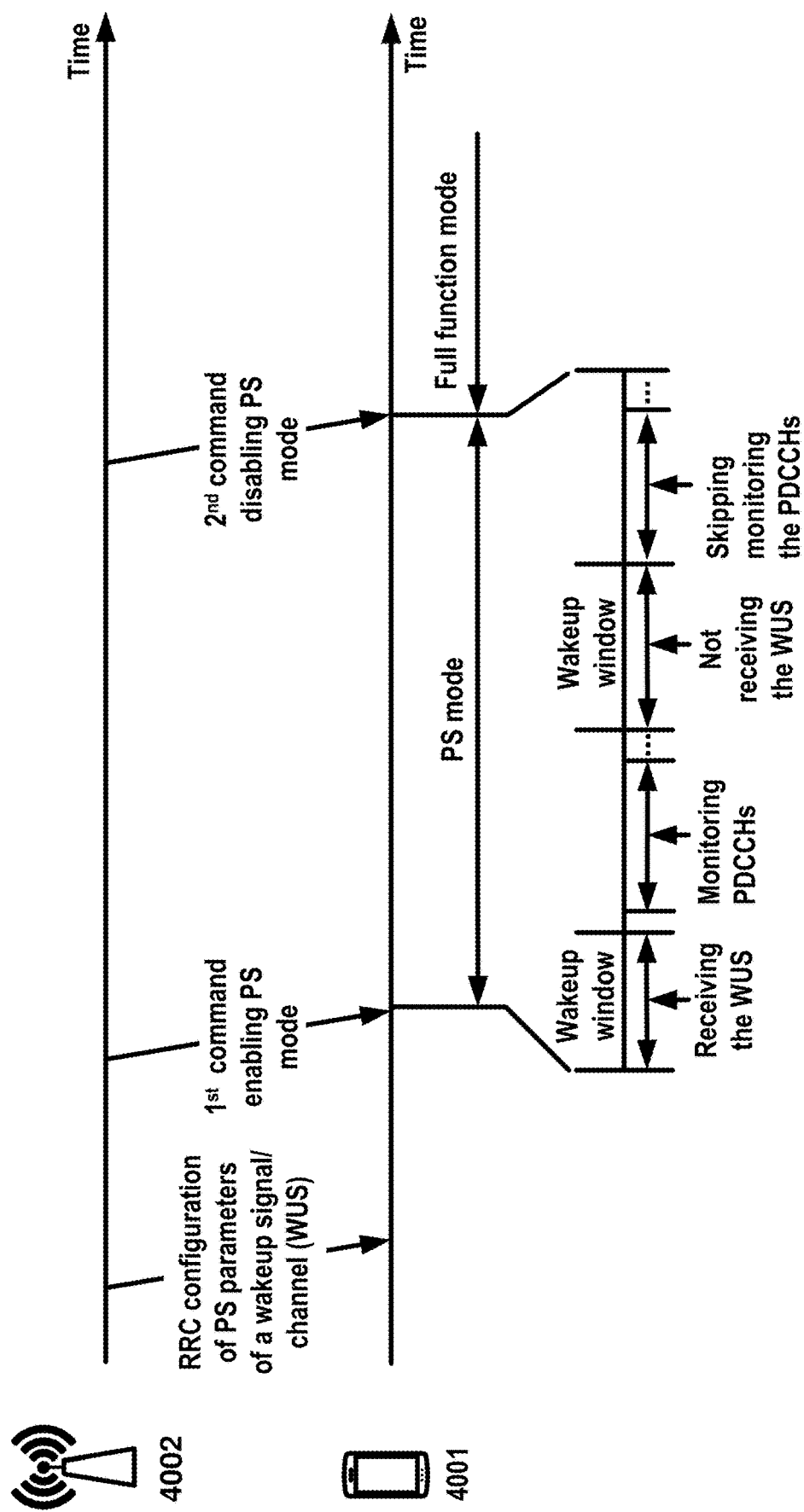
FIG. 40 shows an example diagram of a power saving mode.

FIG. 40 shows an example of dynamic activating/deactivating power saving mode. A base station (e.g., 4002 in FIG. 40) may transmit to a wireless device (e.g., 4001 in FIG. 40), one or more RRC messages comprising configuration parameters of a power saving (e.g., PS in FIG. 40) mode. The one or more RRC messages may comprise one or more cell-specific or cell-common RRC messages (e.g., ServingCellConfig IE, ServingCellConfigCommon IE, MAC-CellGroupConfig IE). The one or more RRC messages may comprise: RRC connection reconfiguration message (e.g., RRCReconfiguration); RRC connection reestablishment message (e.g., RRCRestablishment); and/or RRC connection setup message (e.g., RRCSetup). The cell may be a primary cell (e.g., PCell), a PUCCH secondary cell if secondary PUCCH group is configured, or a primary secondary cell (e.g., PSCell) if dual connectivity is configured. The cell may be identified by (or associated with) a cell specific identity (e.g., cell ID).

The configuration parameters may comprise parameters of at least one power saving mode configuration on the cell. Each of the at least one power saving mode configuration may be identified by a power saving mode configuration identifier (index, indicator, or ID).

A power saving mode of a power saving mode configuration may be based on a power saving signal (e.g., a wake-up signal as shown in FIG. 27A, and/or a go-to-sleep as shown in FIG. 27B). The parameters of a power saving signal-based power saving mode configuration may comprise at least one of: a signal format (e.g., numerology) of the power saving signal; sequence generation parameters (e.g., a cell id, a virtual cell id, SS block index, or an orthogonal code index) for generating the power saving signal; a window size of a time window indicating a duration if the power saving signal may be transmitted; a value of a periodicity of the transmission of the power saving signal; a time resource on which the power saving signal may be transmitted; a frequency resource on which the power saving signal may be transmitted; a BWP on which the wireless device may monitor the power saving signal; and/or a cell on which the wireless device may monitor the power saving signal. The power saving signal may comprise at least one of: a SS block; a CSI-RS; a DMRS; and/or a signal sequence (e.g., Zadoff-Chu, M sequence, or gold sequence).

A power saving mode may be based on a power saving channel (e.g., a wake-up channel (WUCH)). The power saving channel may comprise a downlink control channel (e.g., a PDCCH) dedicated for the power saving mode. The parameters of a power saving channel-based power saving mode configuration may comprise at least one of: a time window indicating a duration if the base station may transmit a power saving information (e.g., a wake-up information, or a go-to-sleep information) via the power saving channel; parameters of a control resource set (e.g., time, frequency resource and/or TCI state indication of the power saving channel); a periodicity of the transmission of the power saving channel; a DCI format of the power saving information; a BWP on which the wireless device may monitor the power saving channel; and/or a cell on which the wireless device may monitor the power saving channel.

The wireless device in an RRC connected state may communicate with the base station in a full function mode. In the full function mode, the wireless device may monitor PDCCHs continuously if a DRX operation is not configured to the wireless device. In the full function mode, the wireless device may monitor the PDCCHs discontinuously by applying one or more DRX parameters of the DRX operation if the DRX operation is configured (e.g., as shown in FIG. 25 or FIG. 26). In the full function mode, the wireless device may: monitor PDCCHs; transmit SRS; transmit on RACH; transmit on UL-SCH; and/or receive DL-SCH.

As shown in FIG. 40, the wireless device may communicate with the base station in the full function mode. The base station may transmit to the wireless device, a first command (e.g., 1st command in FIG. 40) indicating enabling a power saving (e.g., PS as shown in FIG. 40) operation, for example, if a data service is suitable for the PS mode, or the wireless device may work in the PS mode due to a reduced available processing power at the wireless device. The first command may be a DCI with a first DCI format (e.g., one of DCI format 0-0/0-1, 1-0/1-1, or 2-0/2-1/2-2/2-3 already defined in 3GPP NR specifications) or a second DCI format (e.g., a new DCI format to be defined in future). The first command may be a MAC CE, or an RRC message. The wireless device may, in response to receiving the first command, enable (or activate) the PS mode and/or switch to the PS mode from the full function mode. In the PS mode, the wireless device may: monitor for the PS signal/channel (e.g., WUS in FIG. 40); not transmit PUCCH/PUSCH/SRS/PRACH before detecting/receiving the PS signal/channel; not receive PDSCH before detecting/receiving the PS signal/channel; not monitor PDCCHs before detecting/receiving the PS signal/channel; and/or start monitoring the PDCCHs in response to detecting/receiving the PS signal/channel.

As shown in FIG. 40, in response to switching to the PS mode, the wireless device may monitor a PS signal/channel (e.g., WUS in FIG. 40) in a wakeup window. The PS signal/channel may be configured in the one or more RRC messages. The wakeup window may be configured in the one or more RRC messages. The wireless device may receive the PS signal/channel during the wakeup window. In response to receiving the PS signal/channel, the wireless device may monitor PDCCHs as configured (e.g., in RRC message or MAC CE) and transmit or receive data packets based on one or more DCIs via the PDCCHs. The wireless device may not receive the PS signal/channel during the wakeup window. In response to not receiving the PS signal/channel, the wireless device may skip monitoring PDCCHs. In the PS mode, the wireless device may repeat the monitoring the PS signal/channel in one or more wakeup windows which may periodically occur according to one or more configured parameter of the PS mode.

As shown in FIG. 40, the base station may transmit to the wireless device, a second command (e.g., 2nd command in FIG. 40) indicating disabling (or deactivating) the PS mode. The base station may transmit the second command in the wakeup window (e.g., which may periodically occur in time domain according to one or more configuration parameters of the PS mode). The wireless device may receive the second command if the wireless device monitors the PS signal/channel during the wakeup window. The second command may be a DCI with a first DCI format (e.g., one of DCI format 0-0/0-1, 1-0/1-1, or 2-0/2-1/2-2/2-3 already defined in 3GPP NR specifications) or a second DCI format (e.g., a new DCI format to be defined in future). The second command may be a MAC CE, or an RRC message. The wireless device may, in response to receiving the second command, disable (or deactivate) the PS mode and/or switch to the full function mode from the PS mode. In response to switching to the full function mode as shown in FIG. 40, the wireless device may monitor PDCCHs as configured. In response to switching to the full function mode, the wireless device may monitor PDCCHs for detecting DCIs with CRC bits scrambled by at least one of: C-RNTI; P-RNTI; SI-RNTI; CS-RNTI; RA-RNTI; TC-RNTI; MCS-C-RNTI; TPC-PUCCH-RNTI; TPC-PUSCH-RNTI; TPC-SRS-RNTI; INT-RNTI; SFI-RNTI; and/or SP-CSI-RNTI. In response to switching to the full function mode, the wireless device may transmit SRS; transmit on RACH; transmit on UL-SCH; and/or receive DL-SCH.

Figure 41:
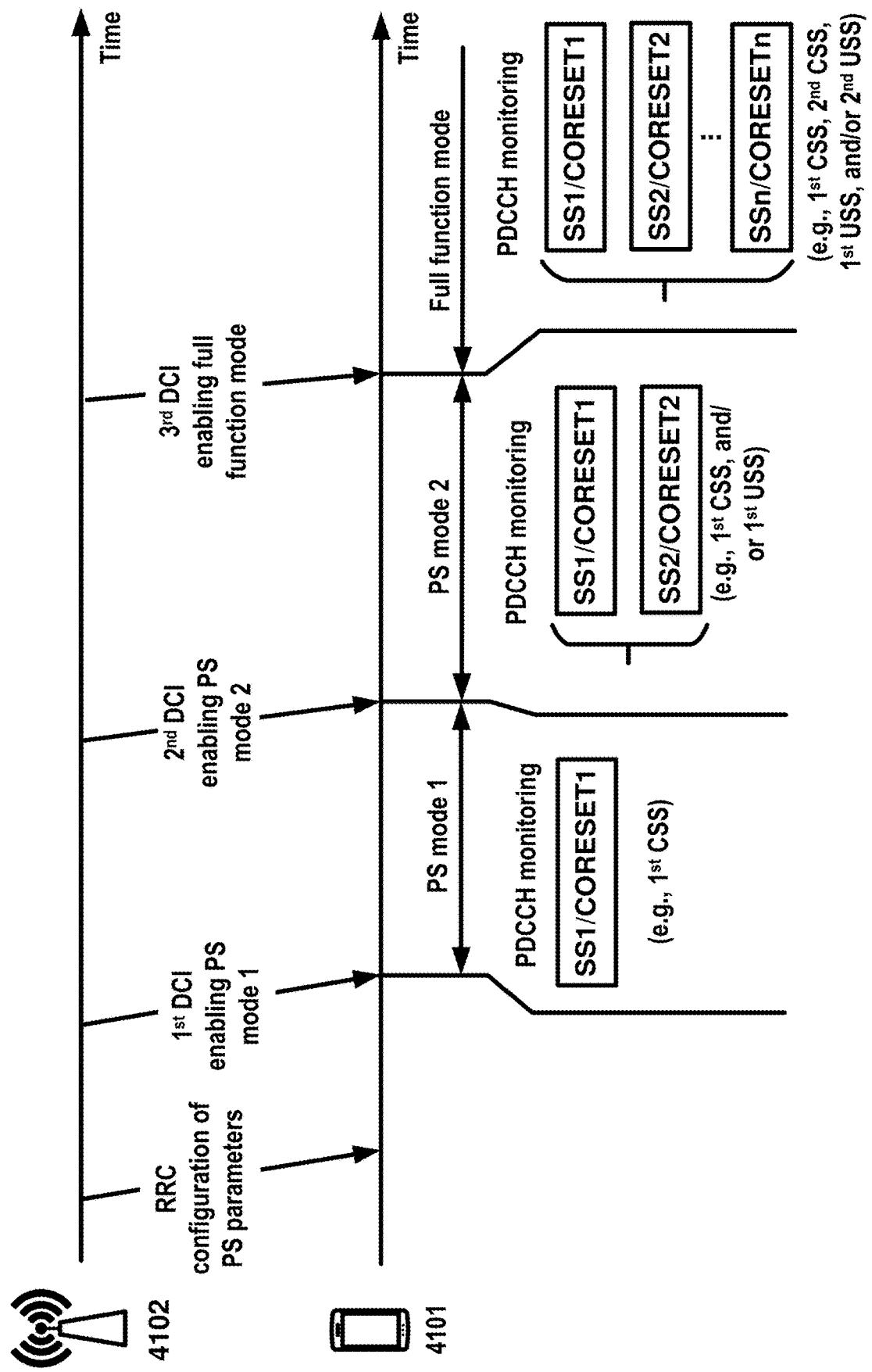
FIG. 41 shows an example diagram of a power saving mode.

FIG. 41 shows an example of power saving mechanism. A base station (e.g., 4102 in FIG. 41) may transmit to a wireless device (e.g., 4101 in FIG. 41), one or more RRC messages comprising first configuration parameters of a power saving (e.g., PS in FIG. 41) mode. The first configuration parameters may indicate one or more PS parameters of a plurality of power saving modes. The one or more PS parameters of a first power saving mode (e.g., PS mode 1 as shown in FIG. 41) may indicate at least one of: one or more first search spaces and/or one or more first control resource sets (e.g., SS1/CORESET1 in FIG. 41); one or more first DCI formats (e.g., DCI format 0-0, 1-0, or any other DCI format); and/or one or more first PS signal parameters (e.g., PS signal format; periodicity; time/frequency location). The one or more PS parameters of a second power saving mode (e.g., PS mode 2 as shown in FIG. 41) may indicate at least one of: one or more second search spaces and/or one or more second control resource sets (e.g., SS1/CORESET1 and SS2/CORESET2 as shown in FIG. 41); one or more second DCI formats; and/or one or more second PS signal parameters.

The one or more RRC messages may further comprise second configuration parameters indicating one or more third search spaces and one or more third control resource sets (e.g., SS1/CORESET1, SS2/CORSET2 . . . , and SSn/CORESETn as shown in FIG. 41); one or more third DCI formats.

The wireless device in an RRC connected state may communicate with the base station in a full function mode. In the full function mode, the wireless device may monitor PDCCHs for the one or more third DCI formats, on the one or more third search spaces of the one or more third control resource sets. In the full function mode, the wireless device may monitor the PDCCHs discontinuously by applying one or more DRX parameters of the DRX operation if the DRX operation is configured (e.g., as shown in FIG. 25 and/or FIG. 26). In the full function mode, the wireless device may: monitor PDCCHs; transmit SRS; transmit on RACH; transmit on UL-SCH; and/or receive DL-SCH.

As shown in FIG. 41, the wireless device may communicate with the base station in the full function mode. The base station may transmit to the wireless device, a first DCI (e.g., 1st DCI in FIG. 41) indicating enabling a first power saving mode (e.g., PS mode 1 as shown in FIG. 41), for example, if a data service is suitable for the first PS mode, or the wireless device may work in the first PS mode. The first DCI may be transmitted with a first DCI format (e.g., one of DCI formats 0-0/0-1, 1-0/1-1, or 2-0/2-1/2-2/2-3 already defined in 3GPP NR specifications) or a second DCI format (e.g., a new DCI format to be defined in future). In response to receiving the first DCI, the wireless device may enable (or activate) the first PS mode and/or switch to the first PS mode from the full function mode. As shown in FIG. 41, in the first PS mode, the wireless device may monitor a first PDCCH for at least one DCI with the one or more first DCI formats, on the one or more first search spaces of the one or more first control resource sets (e.g., SS1/CORESET1 as shown in FIG. 41). In the first PS mode, the wireless device may monitor the PS signal according to the one or more first PS signal parameters. In the first PS mode, the wireless device may not monitor PDCCHs on the one or more second search spaces of the one or more second control resource sets. In the first PS mode, the wireless device may not monitor PDCCHs on the one or more third search spaces of the one or more third control resource sets.

Similarly, as shown in FIG. 41, the base station may transmit to the wireless device, a second DCI (e.g., 2nd DCI in FIG. 41) indicating enabling (or activating) a second PS mode. (e.g., PS mode 2 as shown in FIG. 41). In response to receiving the second DCI, the wireless device may enable (or activate) the second PS mode and/or switch to the second PS mode from the first PS mode. As shown in FIG. 41, in the second PS mode, the wireless device may monitor a second PDCCH for at least one DCI with the one or more second DCI formats, on the one or more second search spaces of the one or more second control resource sets (e.g., SS1/CORESET1, SS2/CORESET2 as shown in FIG. 41). In the second PS mode, the wireless device may monitor the PS signal according to the one or more second PS signal parameters. In the second PS mode, the wireless device may not monitor PDCCHs on the one or more first search spaces of the one or more first control resource sets. In the second PS mode, the wireless device may not monitor PDCCHs on the one or more third search spaces of the one or more third control resource sets.

Similarly, as shown in FIG. 41, the base station may transmit to the wireless device, a third DCI (e.g., 3rd DCI in FIG. 41) indicating enabling (or activating) full function mode. In response to receiving the third DCI, the wireless device may disable (or deactivate) the first PS mode and the second PS mode. As shown in FIG. 41, in the full function mode, the wireless device may monitor a third PDCCH for at least one DCI with the one or more third DCI formats, on the one or more third search spaces of the one or more third control resource sets (e.g., SS1/CORESET1, SS2/CORESET2 . . . , SSn/CORESETn, as shown in FIG. 41). In the full function mode, the wireless device may not monitor PDCCHs on the one or more first search spaces of the one or more first control resource sets. In the full function mode, the wireless device may not monitor PDCCHs on the one or more second search spaces of the one or more second control resource sets.

Figure 42:
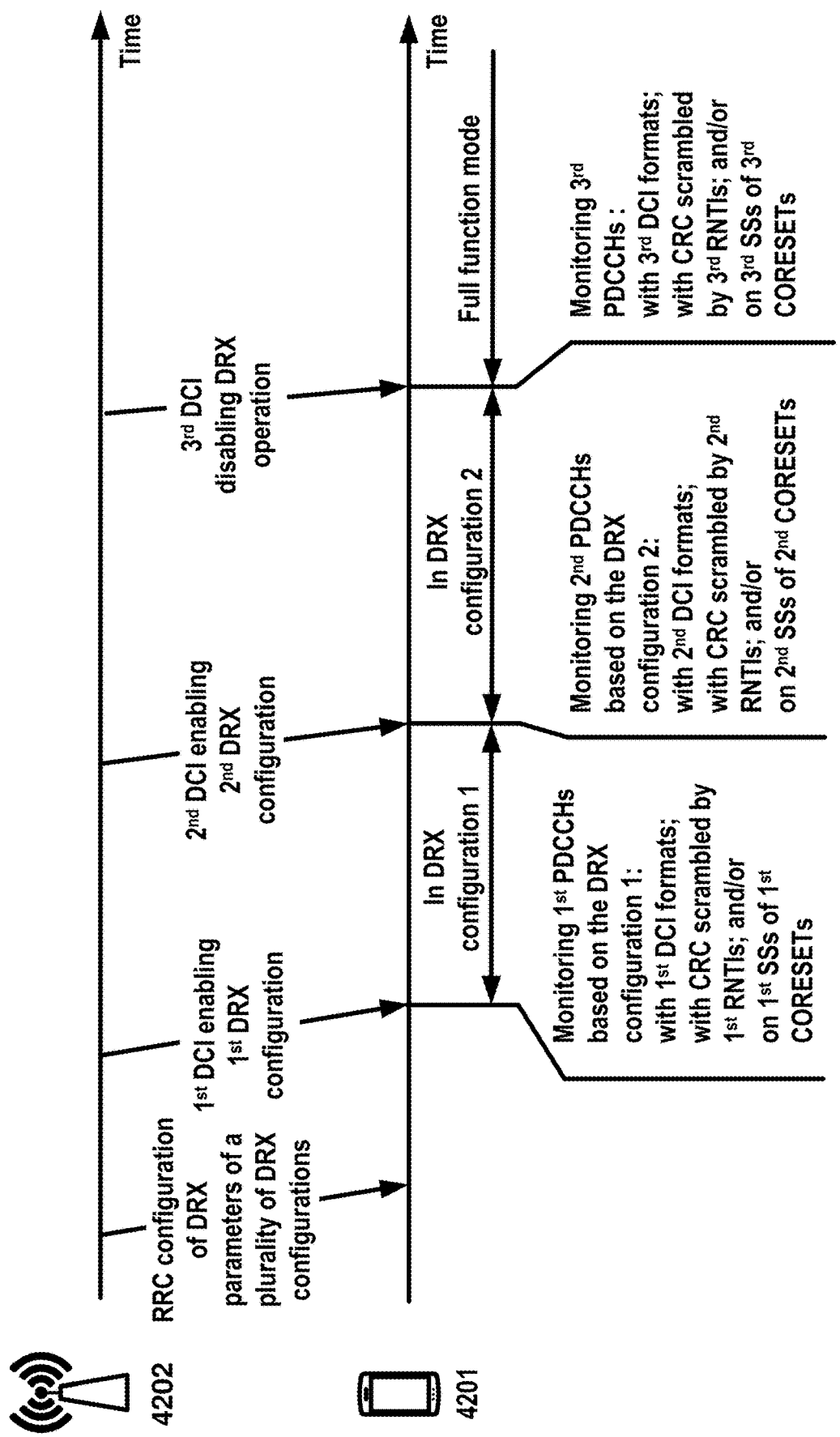
FIG. 42 shows an example diagram of a DRX-based power saving mode.

FIG. 42 shows an example of DRX based power saving mechanism. A base station (e.g., 4202 in FIG. 42) may transmit to a wireless device (e.g., 4201 in FIG. 42), one or more RRC messages comprising first configuration parameters of a plurality of DRX configurations. The first configuration parameters of a first DRX configuration (e.g., 1st DRX configuration as shown in FIG. 42) may indicate: one or more first search spaces (e.g., 1st SSs as shown in FIG. 42) and/or one or more first control resource sets (e.g., 1st CORESETs as shown in FIG. 42); one or more first RNTIs (e.g., 1st RNTIs as shown in FIG. 42) of PDCCH candidates monitoring; one or more first DCI formats (e.g., 1st DCI formats as shown in FIG. 42); one or more first DRX timers; and/or one or more first PS signal parameters. The first configuration parameters of a second DRX configuration (e.g., 2nd DRX configuration as shown in FIG. 42) may indicate: one or more second search spaces (e.g., 2nd SSs as shown in FIG. 42) and/or one or more second control resource sets (e.g., 2nd CORESETs as shown in FIG. 42); one or more second RNTIs (e.g., 2nd RNTIs as shown in FIG. 42) of PDCCH candidates monitoring; one or more second DCI formats (e.g., 2nd DCI formats as shown in FIG. 42); one or more second DRX timers; and/or one or more second PS signal parameters.

The one or more RRC messages may further comprise second configuration parameters indicating: one or more third search spaces (e.g., 3rd SSs as shown in FIG. 42) and one or more third control resource sets (e.g., 3rd CORESETs as shown in FIG. 42); one or more third DCI formats (e.g., 3rd DCI formats in FIG. 42); one or more third RNTIs (e.g., 3rd RNTIs as shown in FIG. 42) of PDCCH candidates monitoring.

As shown in FIG. 42, the wireless device may communicate with the base station in the full function mode. The base station may transmit to the wireless device, a first DCI (e.g., 1st DCI in FIG. 42) indicating enabling the first DRX configuration (e.g., 1st DRX configuration as shown in FIG. 42). In response to receiving the first DCI, the wireless device may enable (or activate) the first DRX configuration. As shown in FIG. 42, with the first DRX configuration, the wireless device may monitor a first PDCCH, based on one or more parameters of the first DRX configuration, for at least one DCI with the one or more first DCI formats based on the one or more first RNTIs, on the one or more first search spaces of the one or more first control resource sets. Similarly, as shown in FIG. 42, the base station may transmit to the wireless device, a second DCI (e.g., 2nd DCI in FIG. 42) indicating enabling the second DRX configuration (e.g., 2nd DRX configuration as shown in FIG. 42). In response to receiving the second DCI, the wireless device may enable (or activate) the second DRX configuration. As shown in FIG. 42, with the second DRX configuration, the wireless device may monitor a second PDCCH, based on one or more parameters of the second DRX configuration, for at least one DCI with the one or more second DCI formats based on the one or more second RNTIs, on the one or more second search spaces of the one or more second control resource sets.

Similarly, as shown in FIG. 42, the base station may transmit to the wireless device, a third DCI (e.g., 3rd DCI in FIG. 42) indicating enabling (or activating) full function mode. In response to receiving the third DCI, the wireless device may disable (or deactivate) the first DRX configuration and/or the second DRX configuration. As shown in FIG. 42, in the full function mode, the wireless device may monitor a third PDCCH, for at least one DCI with the one or more third DCI formats based on the one or more third RNTIs, on the one or more third search spaces of the one or more third control resource sets.

As shown in FIG. 41 and/or FIG. 42, search spaces, control resource sets, RNTIs, and/or DCI formats, with which a wireless device may monitor a PDCCH in power saving mode, may be different from (or independently/separately configured with) those search spaces, control resource sets, RNTIs and/or DCI formats with which the wireless device may monitor the PDCCH in full function mode (or not in power saving mode). As shown in FIG. 41 and/or FIG. 42, a first number of search spaces, control resource sets, RNTIs and/or DCI formats, with which a wireless device may monitor a PDCCH in power saving mode, may be less than a second number of search spaces, control resource sets, RNTIs and/or DCI formats with which the wireless device may monitor the PDCCH in full function mode (or not in power saving mode). By performing the above, a base station and/or a wireless device may control power consumption appropriately according to whether the wireless device is working in power saving mode or in full function mode.

Before a base station transmits a command indicating a wireless device switching to power saving mode (e.g., as shown in FIG. 40, FIG. 41 and/or FIG. 42), the wireless device may be in a process of a beam failure recovery (e.g., BFR) procedure. After a base station transmits a command indicating a wireless device switching to power saving mode (e.g., as shown in FIG. 40, FIG. 41 and/or FIG. 42), the wireless device may initiate a beam failure recovery (e.g., BFR) procedure. A wireless device may initiate a RA procedure for a BFR procedure for a cell if a number of beam failure instances (e.g. contiguous) are detected. The cell may be a PCell or a SCell. The cell may be a cell working in licensed band or a cell working in unlicensed band. A beam failure instance may occur if quality of a beam pair link is lower than a configured threshold. For example, a beam failure instance may occur if the RSRP value or SINR value of a beam pair link is lower than a first threshold, or the BLER (block error rate) of the beam pair link is higher than a second threshold. Sporadic beam failure instance may not necessarily trigger the RA procedure for the BFR procedure. The RA procedure may be a contention-based RA procedure or a contention-free RA procedure, or a combined contention-based and contention free RA procedure. In combined contention-based and contention free RA procedure, the wireless device may switch from contention-based RA procedure to contention-free procedure for the BFR procedure, if switching condition(s) is met. The switching conditions may comprise at least one of: candidate beam not being selected; and/or an expiry of a beam failure recovery timer.

Figure 43:
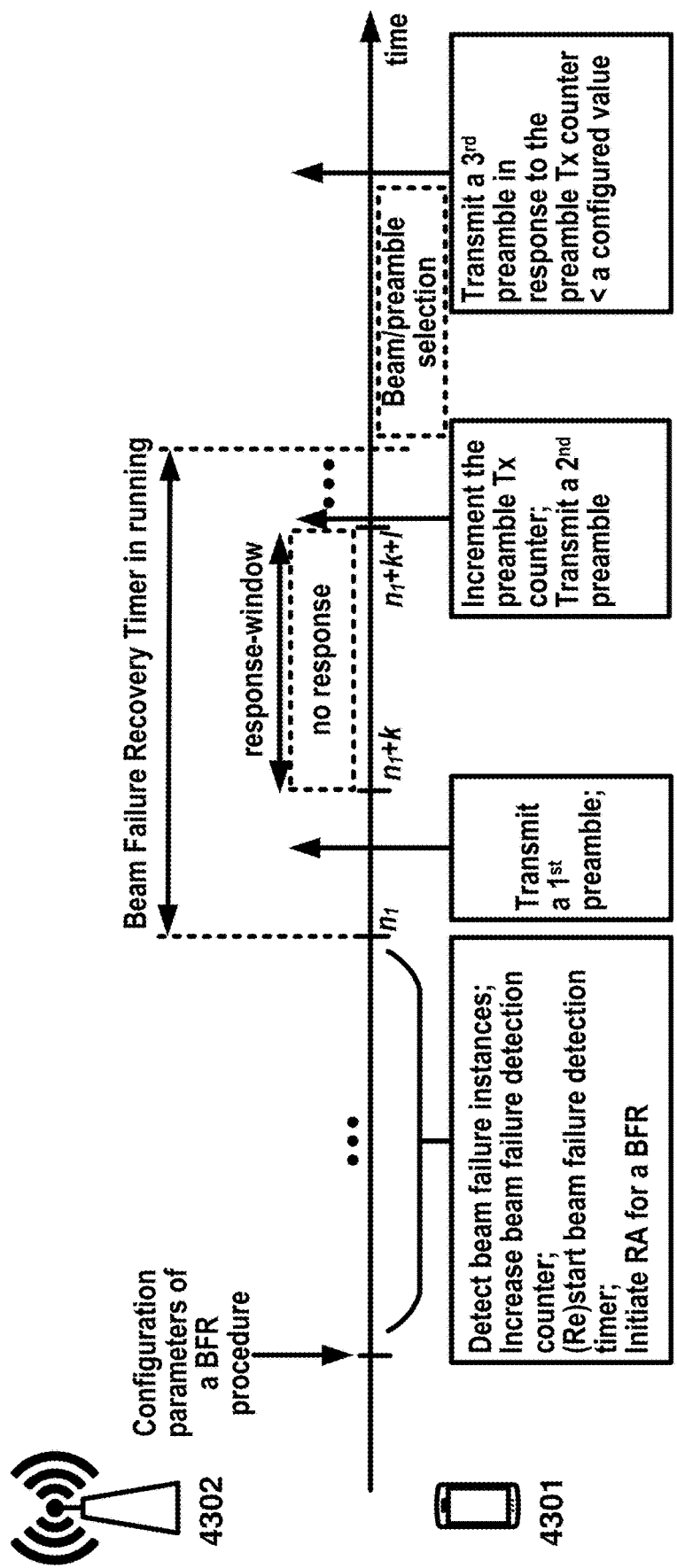
FIG. 43 shows an example diagram of beam failure recovery in power saving mode.

FIG. 43 shows an example of a BFR procedure. A wireless device (e.g., 4301 in FIG. 43) may receive from a base station (e.g., 4302 in FIG. 43), one or more RRC messages comprising one or more configuration parameters of a BFR procedure. The one or more configuration parameters of the BFR procedure may comprise at least a first threshold for beam failure detection; at least a second threshold for selecting a beam(s); a first control resource set (e.g., coreset) associated with (or dedicated to) the BFR procedure. The first coreset may comprise multiple RBs in the frequency domain, at least a symbol in the time domain. The first coreset may be associated with the BFR procedure. The wireless device may monitor at least a first PDCCH in the first coreset in response to transmitting a BFR signal indicating the beam failure. The wireless device may not monitor the first PDCCH in the first coreset in response to not transmitting the BFR signal. In The base station may not transmit a PDCCH in the first coreset if the base station does not receive the BFR signal on an uplink resource. The base station may transmit a PDCCH in a second coreset if the base station does not receive the BFR signal. The second coreset, in which the wireless device may monitor a PDCCH before the BFR procedure is triggered, is different from the first coreset.

The one or more configuration parameters of the BFR procedure may indicate a first set of RSs for beam failure detection; and/or one or more PRACH resources associated with a second set of RSs (beams) for candidate beam selection. The one or more PRACH resources may comprise at least one of: one or more preambles; and/or one or more time/frequency resources. Each RS of the second set of RSs may be associated with a preamble, a timer resource and/or a frequency resource of one of the one or more PRACH resources.

The one or more configuration parameters of the BFR procedure may indicate one or more PUCCH or scheduling request (SR) resources. The one or more PUCCH or SR resource may comprise at least one of: time allocation; frequency allocation; cyclic shift; orthogonal cover code; and/or a spatial setting.

The first set of RSs may be one or more first CSI-RSs or one or more first SSBs. The second set of RSs may be one or more second CSI-RSs or one or more second SSBs. A BFR signal may be a PRACH preamble transmitted via a time/frequency resource of a PRACH resource. A BFR signal may be a PUCCH/SR transmitted on a PUCCH/SR resource.

The one or more configuration parameters of the BFR procedure may comprise at least one of: a first number (e.g., beamFailureInstanceMaxCount) indicating a number of beam failure instances which may trigger a RA procedure for the BFR; a first timer value of a beam failure detection timer (e.g., beamFailureDetectionTimer), after an expiry of which, the wireless device may reset a beam failure detection counter (e.g., BFI_COUNTER); a second timer value of a beam failure recovery timer (e.g., beamFailureRecoveryTimer) indicating a duration during which a contention-free RA for the BFR procedure may be performed; a second number (e.g., preambleTransMax) indicating an allowed number of BFR signal transmissions; a third timer value of a response window (e.g., ra-ResponseWindow) indicating a duration during which the wireless device may receive a response from a base station.

The wireless device may perform beam failure detections, after receiving the RRC messages. The physical layer of the wireless device may measure the first set of RSs. The physical layer may indicate one or more beam failure instance or one or more beam non-failure instance periodically to the MAC entity of the wireless device, based on the at least first threshold. The physical layer may indicate a beam failure instance if the measured quality (e.g., RSRP or SINR) of at least one of the first set of RSs is lower than the at least first threshold. The physical layer may indicate a beam non-failure instance if the measured quality (e.g., RSRP or SINR) of at least one of the first set of RSs is equal to or higher than the at least first threshold. The physical layer may skip indicating a beam non-failure instance if the measured quality (e.g., RSRP or SINR) of at least one of the first set of RSs is equal to or higher than the at least first threshold. The periodicity of the indication may be a value configured by the base station or be same as the periodicity of transmission of the first set of RSs.

The MAC entity of the wireless device may set a beam failure detection counter (e.g., BFI_COUNTER) to a first value (e.g., one) in response to receiving a first beam failure indication from the physical layer. If receiving a contiguous second beam failure indication, the MAC entity may increment the beam failure detection counter (e.g., BFI_COUNTER) (e.g., by one). If receiving a third beam non-failure indication, the MAC entity may reset the beam failure detection counter (e.g., BFI_COUNTER) to a second value (e.g., zero).

If receiving a first beam failure indication from the physical layer, the MAC entity may start the beam failure detection timer (e.g., beamFailureDetectionTimer) based on the first timer value.

A timer (e.g., beamFailureDetectionTimer, beamFailureRecoveryTimer, or ra-ResponseWindow) may be running if it is started, until it is stopped or until it expires; otherwise the timer may not be running. A timer may be started if it is not running. A timer may be restarted if it is running. A timer may be started or restarted from its initial value. A timer may be implemented as a count-down timer from a first timer value down to a value (e.g., zero). The timer may be implemented as a count-up timer from a value (e.g., zero) up to a first timer value. The timer may be implemented as a down-counter from a first counter value down to a value (e.g., zero). The timer may be implemented as a count-up counter from a value (e.g., zero) up to a first counter value.

If receiving a second beam failure indication from the physical layer, the MAC entity may increment the beam failure detection counter (e.g., BFI_COUNTER) by a number (e.g., 1) and/or restart the beam failure detection timer. If the beam failure detection timer expires, the MAC entity may reset the beam failure detection counter (e.g., BFI_COUNTER) to an initial value.

As shown in FIG. 43, if the beam failure detection counter indicates a value equal to or greater than the first number (e.g., beamFailureInstanceMaxCount), the MAC entity may initiate a RA (e.g., contention-based or contention free) procedure for a BFR. If the beam failure detection counter indicates a value equal to or greater than the first number (e.g., beamFailureInstanceMaxCount), the MAC entity may start the beam failure recovery timer (e.g., beamFailureRecoveryTimer) based on the second timer value.

If initiating the RA procedure for the BFR, the MAC entity may perform at least one of: resetting the beam failure detection counter to an initial value (e.g., zero); resetting the beam failure detection timer; and/or indicating to the physical layer to stop beam failure instance indication. The MAC entity may ignore the beam failure instance indication, if triggering the RA procedure for the BFR.

The MAC entity may request the physical layer to indicate at least a beam and/or the quality of the at least beam, in response to starting the beam failure recovery timer or initiating the RA procedure for the BFR. The physical layer of the wireless device may measure at least one of the second set of RSs. The physical layer may select at least a beam based on the at least second threshold. The at least beam may be identified by a CSI-RS resource index, or an SSB index. The physical layer may select a beam if the measured quality (e.g., RSRP or SINR) of an RS associated the beam is greater than the at least second threshold.

As shown in FIG. 43, the MAC entity may select at least a BFR signal (e.g., 1st preamble as shown in FIG. 43), based on the at least beam and instruct the physical layer to transmit the at least BFR signal to a base station, in response to receiving the indication of the at least beam from the physical layer. The at least BFR signal may be a PRACH preamble associated with the at least beam. The at least BFR signal may be a PUCCH/SR signal.

The wireless device may start monitoring a PDCCH for receiving a DCI as a response to the transmitted BFR signal, at least in the first coreset, after a time period since transmitting the at least BFR signal. The time period (e.g., k as shown in FIG. 43) may be a fixed period (e.g., four slots), or a configured value by an RRC message. The wireless device may start the response window (e.g., ra-ResponseWindow or response-window as shown in FIG. 43) with a third timer value after the time period since transmitting the at least BFR signal. The wireless device may monitor the PDCCH in the first coreset during the response window.

The wireless device may receive a DCI via the PDCCH at least in the first coreset in the response window. The wireless device may consider the BFR procedure successfully completed in response to receiving the DCI via the PDCCH at least in the first coreset in the response window.

The wireless device may set a BFR transmission counter (e.g., PREAMBLE_TRANSMISSION_COUNTER) to a value (e.g., one) in response to an expiry of the response window and not receiving the DCI. In response to an expiry of the response window and not receiving the DCI, the wireless device may perform one or more actions comprising at least one of: transmitting at least a second BFR signal (e.g., 2nd preamble as shown in FIG. 43); starting the response window; and/or monitoring the PDCCH for a response to the at least second BFR signal; incrementing the BFR transmission counter (e.g., PREAMBLE_TRANSMISSION_COUNTER) by a number (e.g., one) in response to an expiry of the response window and not receiving the response. The wireless device may repeat the one or more actions until the BFR procedure is successfully completed, or the beam failure recovery timer expires. If the beam failure recovery timer expires, the wireless device may continue the BFR by implementing a contention-based RA procedure. A contention-based RA procedure may be implemented based on an example of FIG. 12. Based on one or more parameters of the contention-based RA procedure, the wireless device may transmit at least a third preamble (e.g., 3rd preamble in FIG. 43) in response to the BFR transmission counter (e.g., PREAMBLE_TRANSMISSION_COUNTER) less than or equal to the second number (e.g., preambleTransMax). The wireless device may consider the RA procedure for the BFR is unsuccessfully completed if the BFR transmission counter (e.g., PREAMBLE_TRANSMISSION_COUNTER) reaches a number greater than the second number (e.g., preambleTransMax).

A wireless device may be in a process of a BFR during which, the wireless device may receive from a base station a command indicating activation/enabling of a power saving mode. The command may be a downlink signal (e.g., a signal sequence), a DCI (e.g., transmitted via a PDCCH), a MAC CE, and/or an RRC message. The wireless device, by implementing existing power saving technologies, may miss detecting a response to a preamble transmitted by the wireless device. The wireless device, by implementing existing power saving technologies, may increase power consumption (e.g., trying to complete beam failure recovery procedure), although in a power saving mode. Existing power saving technologies and/or beam failure recovery technologies may increase power consumption of a wireless device and/or delay of a beam failure recovery. Existing power saving technologies and/or beam failure recovery technologies may cause misalignment between a wireless device and a base station regarding a power saving mode of the wireless device and/or a beam link status between the wireless device and the base station. Existing power saving technologies and/or beam failure recovery technologies may increase data transmission latency, and/or probability of communication link broken between a base station and a wireless device. At least some examples described herein may provide methods and mechanisms to improve power consumption of a wireless device, delay of a beam failure recovery, data transmission latency, system spectrum efficiency, and/or uplink interferences to other wireless devices. It should be noted that the term power saving mode may be referred to using other terminologies, such as power saving operation, power saving procedure, power saving state, etc. It should also be noted that technologies of the power saving mode in one or more examples may be different from a 3GPP Rel. 12 PSM technology. The 3GPP Rel. 12 PSM technology may be applied to a wireless device in RRC idle state, and may not be applied to the wireless device in RRC connected state. The technologies of the power saving mode in one or more examples may be applied to a wireless device in RRC connected state, RRC inactive state, and/or RRC idle state.

Figure 44:
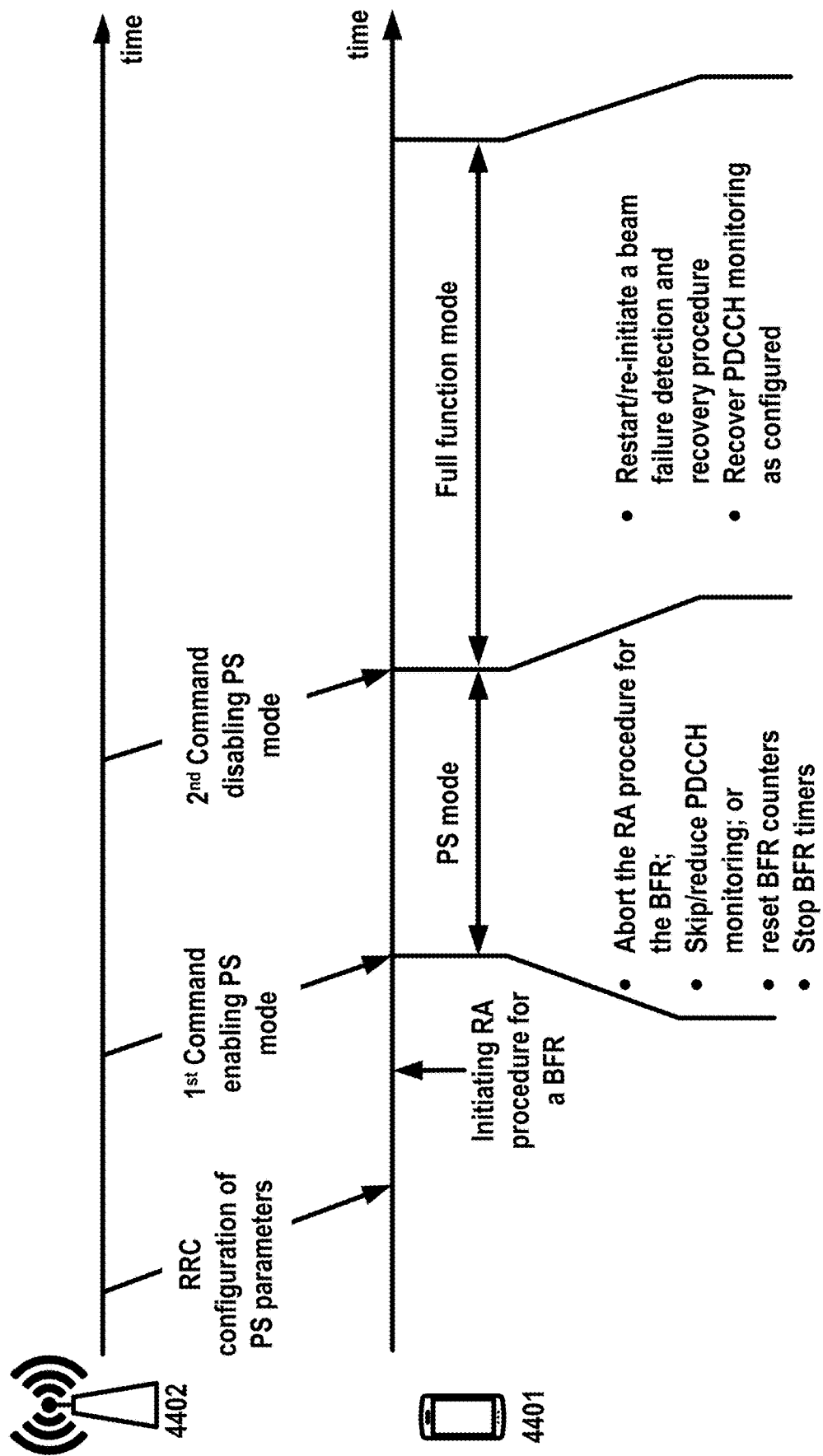
FIG. 44 shows an example diagram of beam failure recovery in power saving mode.

FIG. 44 shows an example of improved BFR procedure if power saving mode is supported. A base station (e.g., 4402 in FIG. 44) may transmit to a wireless device (e.g., 4401 in FIG. 44), one or more RRC messages comprising configuration parameters of a power saving mode (e.g., PS mode in FIG. 44). The one or more RRC messages may comprise one or more cell-specific or cell-common RRC messages (e.g., ServingCellConfig IE, ServingCellConfigCommon IE, MAC-CellGroupConfig IE). The one or more RRC messages may comprise: RRC connection reconfiguration message (e.g., RRCReconfiguration); RRC connection reestablishment message (e.g., RRCRestablishment); and/or RRC connection setup message (e.g., RRCSetup). The cell may be a primary cell (e.g., PCell), a PUCCH secondary cell if secondary PUCCH group is configured, or a primary secondary cell (e.g., PSCell) if dual connectivity is configured, or a secondary cell.

The configuration parameters may comprise parameters of at least one power saving mode configuration on the cell. Each of the at least one power saving mode configuration may be identified by a power saving mode configuration identifier (index, indicator, or ID).

A power saving mode of a power saving mode configuration may be based on a power saving signal (e.g., a wake-up signal as shown in FIG. 27A, and/or a go-to-sleep as shown in FIG. 27B). The parameters of the power saving mode configuration may comprise at least one of: a signal format (e.g., numerology) of the power saving signal; sequence generation parameters (e.g., a cell id, a virtual cell id, SS block index, or an orthogonal code index) for generating the power saving signal; a window size of a time window indicating a duration if the power saving signal may be transmitted; a value of a periodicity of the transmission of the power saving signal; a time resource on which the power saving signal may be transmitted; a frequency resource on which the power saving signal may be transmitted; a BWP on which the wireless device may monitor the power saving signal; and/or a cell on which the wireless device may monitor the power saving signal. The power saving signal may comprise at least one of: a SS block; a CSI-RS; a DMRS; and/or a signal sequence (e.g., Zadoff-Chu, M sequence, or gold sequence).

A power saving mode may be based on a power saving channel (e.g., a wake-up channel (WUCH)). The power saving channel may comprise a downlink control channel (e.g., a PDCCH) dedicated for the power saving mode. The parameters of the power saving mode configuration may comprise at least one of: a time window indicating a duration if the base station may transmit a power saving information (e.g., a wake-up information, or a go-to-sleep information) via the power saving channel; parameters of a control resource set (e.g., time, frequency resource and/or TCI state indication of the power saving channel); a periodicity of the transmission of the power saving channel; a DCI format of the power saving information; a BWP on which the wireless device may monitor the power saving channel; and/or a cell on which the wireless device may monitor the power saving channel.

A power saving mode may be implemented by dynamically changing PDCCHs monitoring, for example, a smaller number of search spaces/control resources sets/RNTIs/DCI formats being configured for PDCCH monitoring in a power saving mode than the case in full function mode, as shown in FIG. 41. A power saving mode may be implemented by dynamically activating/enabling different DRX configurations, as shown in FIG. 42.

The wireless device in an RRC connected state may communicate with the base station in a full function mode. It should be noted that the term full function mode may be referred to using other technologies, such as full function state, normal access mode, normal access state. In the full function mode, the wireless device may monitor PDCCHs continuously if a DRX operation is not configured to the wireless device. In the normal access mode, the wireless device may monitor the PDCCHs discontinuously by applying one or more DRX parameters of the DRX operation if the DRX operation is configured (e.g., as shown in FIG. 25 or FIG. 26). In the full function mode, the wireless device may: monitor PDCCHs; transmit SRS; transmit on RACH; transmit on UL-SCH; and/or receive DL-SCH. In the full function mode, the wireless device may perform beam failure detection and/or initiate a RA for a BFR if detecting a number of beam failure instance. The beam failure detection and the RA for the BFR may be implemented as shown in one or more examples of FIG. 38 and/or FIG. 43.

As shown in FIG. 44, the wireless device may initiate an RA for a BFR in response to a number of beam failure instances being detected. The wireless device may receive a first command indicating an activation (or enabling) of a power saving mode. The wireless device may receive a first command indicating an activation (or enabling) of a power saving mode of a plurality of power saving modes, if the plurality of power saving modes are configured. The first command may comprise at least one of: a downlink signal; a DCI transmitted via a PDCCH; a MAC CE; and/or an RRC message.

As shown in FIG. 44, in response to receiving the first command indicating an activation of a power saving mode, the wireless device may abort (or stop) an ongoing RA procedure for the BFR. The ongoing RA procedure for the BFR may be initiated for a first cell (e.g., a PCell), or a secondary cell (e.g., SCell). In response to receiving the first command, the wireless device may skip monitoring, for a response to a preamble for the BFR, a PDCCH on a search space/control resource set dedicated for the BFR. In response to receiving the first command, the wireless device may reset a beam failure detection counter (e.g., BFI-_COUNTER) to an initial value (e.g., 0). In response to receiving the first command, the wireless device may stop transmitting BFR signals for the BFR and/or may reset a preamble transmission counter (e.g., PREAMBLE-_TRANSMISSION_COUNTER) to an initial value (e.g., 0). In response to receiving the first command, the wireless device may stop one or more timers for the BFR. The one or more timers may comprise at least one of: a beam failure detection timer (e.g., beamFailureDetectionTimer); a beam failure recovery timer (e.g., beamFailureRecoveryTimer); and/or a beam failure recovery response window (e.g., ra-ResponseWindow). In response to receiving the first command, the wireless device may reduce PDCCH monitoring, for example by monitoring a smaller number of search spaces, control resource sets, RNTIs and/or DCI formats than the case in full function mode.

As shown in FIG. 44, the base station may transmit to the wireless device, a second command indicating disabling (or deactivation) of the power saving mode. As shown in FIG. 44, the wireless device may restart (or re-initiate) the RA for the BFR in response to receiving the second command. In response to receiving the second command, the wireless device may monitor, for a response to a preamble, a PDCCH on the search space/control resource set dedicated for the BFR. In response to receiving the second command, the wireless device may switch from the power saving mode to a full function mode. In the full function mode, the wireless device may: monitor PDCCHs as configured and/or required; transmit SRS; transmit on RACH; transmit on UL-SCH; and/or receive DL-SCH.

As shown in FIG. 44, a wireless device may abort a BFR procedure if the wireless device is indicated by a base station to switch to a power saving mode. Examples described herein may improve power consumption of a wireless device, delay of a beam failure recovery, data transmission latency, system spectrum efficiency, and/or uplink interferences to other wireless devices.

Figure 45:
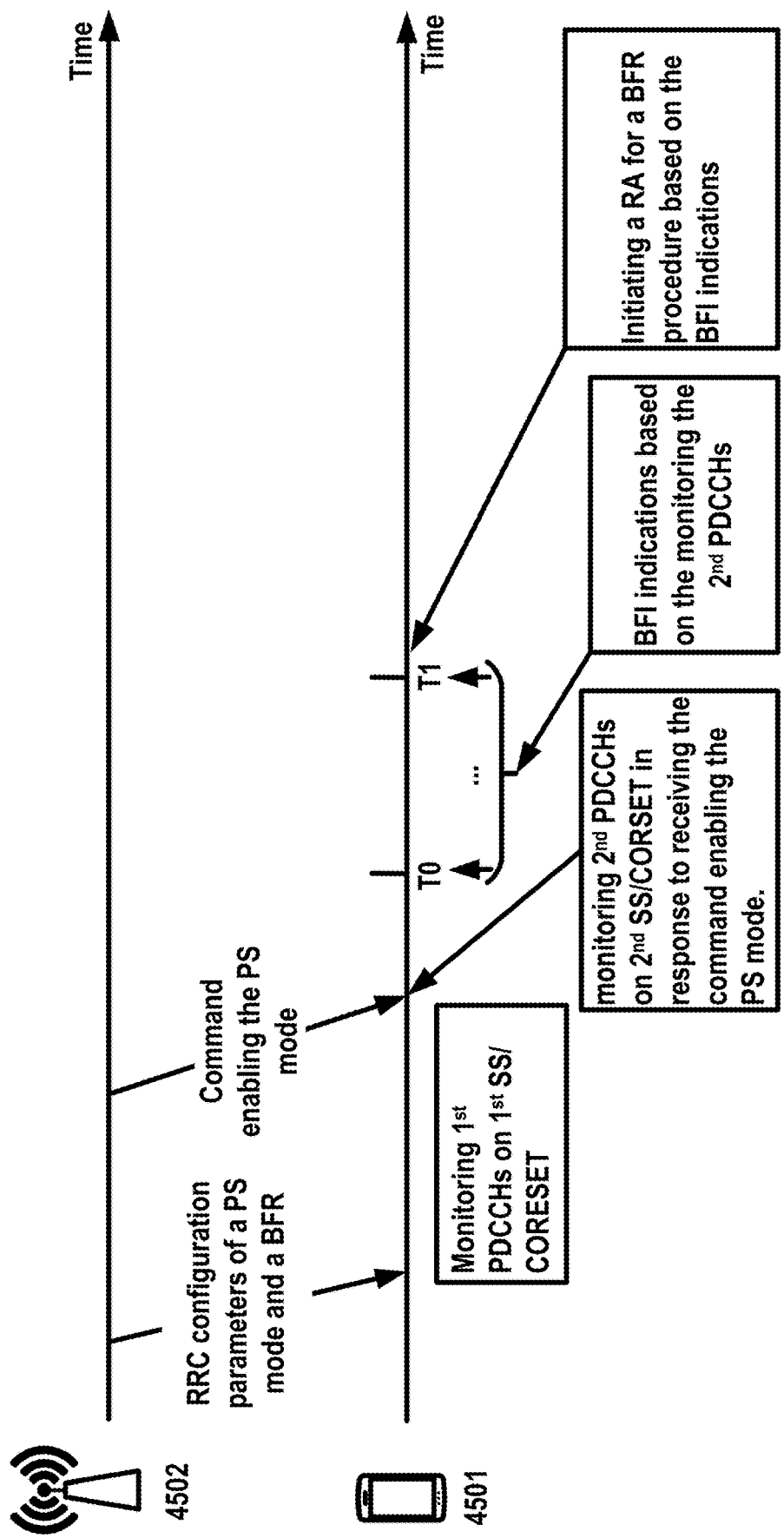
FIG. 45 shows an example diagram of beam failure recovery in power saving mode.

FIG. 45 shows an example of improved BFR procedure if power saving mode is supported. A base station (e.g., 4502 in FIG. 45) may transmit to a wireless device (e.g., 4501 in FIG. 45), one or more RRC messages comprising first configuration parameters of a power saving mode (e.g., PS mode in FIG. 45) and/or second configuration parameters of a beam failure recovery (e.g., BFR in FIG. 45). The cell may be a primary cell (e.g., PCell), a PUCCH secondary cell if secondary PUCCH group is configured, or a primary secondary cell (e.g., PSCell) if dual connectivity is configured, or a secondary cell.

The first configuration parameters for the power saving mode may be the same as or similar to one or more examples of FIG. 44. The power saving mode may be the same as or similar to the one or more examples of FIG. 44. The second configuration parameters for the BFR may be same or similar as one or more examples of FIG. 43 and/or FIG. 44.

As shown in FIG. 45, the wireless device may monitor first PDCCHs (e.g., 1st PDCCHs in FIG. 45) on first search spaces and/or first control resource sets (e.g., 1st SS/CORESET as shown in FIG. 45). The wireless device may perform a first beam failure detection based on the monitoring the first PDCCHs. The first beam failure detection based on the monitoring the first PDCCHs may be implemented based on one or more examples of FIG. 38 and/or FIG. 43. The wireless device may receive a command indicating enabling a power saving mode (e.g., PS mode in FIG. 45) before detecting a beam failure instance. In response to receiving the command, the wireless device may monitor second PDCCHs (e.g., 2nd PDCCHs in FIG. 45) on second search spaces and/or second control resource sets (e.g., 2nd SS/CORESET in FIG. 45). The wireless device may perform a second beam failure detection based on the monitoring the second PDCCHs. The second beam failure detection based on the monitoring the second PDCCHs may be implemented based on one or more examples of FIG. 38 and/or FIG. 43. First RSs for a first beam failure detection in a first mode (e.g., a full function mode, or a mode before receiving the command indicating an activation/enabling of a power saving mode) may be different from second RSs for a second beam failure detection in a second mode (e.g., a power saving mode, or a mode after receiving the command indicating an activation/enabling of a power saving mode).

As shown in FIG. 45, a physical layer of the wireless device may indicate a number of beam failure instance indications (e.g., BFI indications in FIG. 45) to a higher layer (e.g., a MAC layer and/or a layer 3) of the wireless device starting from T0. The number of beam failure instance indications may be based on the monitoring the second PDCCHs (e.g., or second RSs configured with the second PDCCHs for a BFR). If the number of beam failure instance indications is greater than a configured value (e.g., beamFailureInstanceMaxCount) at T1, the wireless device may initiate a RA for a BFR. The RA for the BFR may be implemented as one or more examples of FIG. 38 and/or FIG. 43.

As shown in FIG. 45, a wireless device may perform a BFR procedure if the wireless device is indicated by a base station to switch to a power saving mode. The BFR procedure in the power saving mode may be implemented based on one or more BFR parameters configured for the power saving mode. One or more first BFR parameters configured for a first BFR in the power saving mode may be independently or separately configured from one or more second BFR parameters for a second BFR in a full function mode. Examples described herein may improve delay of a beam failure recovery if a wireless device is working in a power saving mode.

Figure 46:
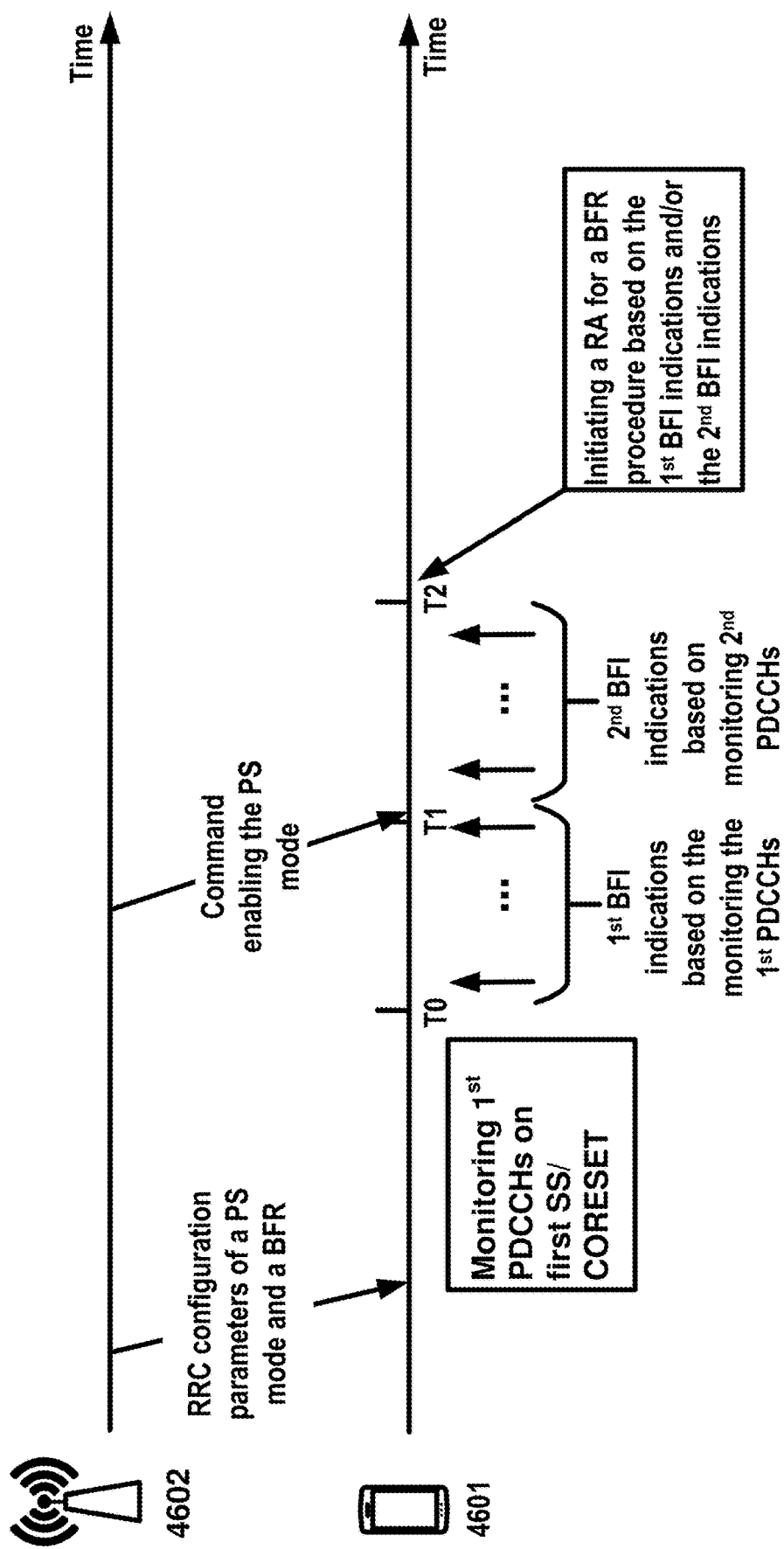
FIG. 46 shows an example diagram of beam failure recovery in power saving mode.

FIG. 46 shows an example of improved beam failure recovery procedure if a power saving mode is supported. A base station (e.g., 4602 in FIG. 46) may transmit to a wireless device (e.g., 4601 in FIG. 46), one or more RRC messages comprising first configuration parameters of a power saving mode (e.g., PS mode in FIG. 46) and/or second configuration parameters of a beam failure recovery (e.g., BFR in FIG. 46). The cell may be a primary cell (e.g., PCell), a PUCCH secondary cell if secondary PUCCH group is configured, or a primary secondary cell (e.g., PSCell) if dual connectivity is configured, or a secondary cell.

The first configuration parameters for the power saving mode may be the same as or similar to one or more examples of FIG. 44. The power saving mode may be the same as or similar to the one or more examples of FIG. 44. The second configuration parameters for the BFR may be the same as or similar to one or more examples of FIG. 43 and/or FIG. 44.

As shown in FIG. 46, the wireless device may monitor first PDCCHs (e.g., 1st PDCCHs in FIG. 46) on first search spaces and/or first control resource sets (e.g., 1st SS/CORESET as shown in FIG. 46). The wireless device may perform a first beam failure detection based on the monitoring the first PDCCHs (or first RSs configured with the first PDCCHs for a BFR). The first beam failure detection based on the monitoring the first PDCCHs (or may be implemented based on one or more examples of FIG. 38 and/or FIG. 43. A physical layer of the wireless device may indicate a first number of beam failure instance indications (e.g., 1st BFI indications in FIG. 46) to a higher layer (e.g., a MAC layer and/or a layer 3) of the wireless device, starting from T0.

As shown in FIG. 46, the wireless device may receive a command indicating enabling a power saving mode (e.g., PS mode in FIG. 46) at T1, wherein T1 occurs a number of symbols/slots/subframes after T0. In response to receiving the command, the wireless device may monitor second PDCCHs (e.g., 2nd PDCCHs in FIG. 46). The wireless device may perform a second beam failure detection based on the monitoring the second PDCCHs (or second RSs configured with the second PDCCHs for a BFR). The second beam failure detection based on the monitoring the second PDCCHs may be implemented based on one or more examples of FIG. 38 and/or FIG. 43. The physical layer of the wireless device may indicate a second number of beam failure instance indications (e.g., 2nd BFI indications in FIG. 46) to a higher layer (e.g., a MAC layer and/or a layer 3) of the wireless device, starting from T1.

As shown in FIG. 46, in response to receiving the command indicating an activation/enabling of a power saving mode, the wireless device may reset a beam failure detection counter (e.g., BFI_COUNTER) to an initial value and/or start counting the beam failure detection counter from an initial value based on the second beam failure detection. In response to receiving the command indicating an activation/enabling of a power saving mode, the wireless device may reset a beam failure detection timer (e.g., beamFailureDetectionTimer) to an initial value. In response to receiving the command indicating an activation/enabling of a power saving mode, the wireless device may keep running (or may not reset) the beam failure detection timer. In response to receiving the command indicating an activation/enabling of a power saving mode, the wireless device may keep counting (or may not reset) the beam failure detection counter (e.g., even if the first RSs for the first beam failure detection are different from the second RSs for the second beam failure detection). In response to receiving the command enabling the PS mode, the wireless device may keep monitoring the first RSs for the first beam failure detection and/or keep counting the beam failure detection counter based on the first RSs.

As shown in FIG. 46, the wireless device may initiate a RA for a BFR based on the first BFI indications and/or the second BFI indications. The first BFI indications may be based on the first beam failure detection. The second BFI indications may be based on the second beam failure detection. The RA for the BFR may be implemented based on one or more examples of FIG. 38 and/or FIG. 43.

As shown in FIG. 46, a wireless device may continue a BFR procedure if the wireless device is indicated by a base station to switch to a power saving mode from a full function mode. The BFR procedure in the power saving mode may be implemented based on one or more BFR parameters configured for the power saving mode. One or more first BFR parameters configured for a first BFR in the power saving mode may be independently or separately configured from one or more second BFR parameters for a second BFR in a full function mode. Examples described herein may improve delay of a beam failure recovery if a wireless device is working in a power saving mode.

Figure 47:
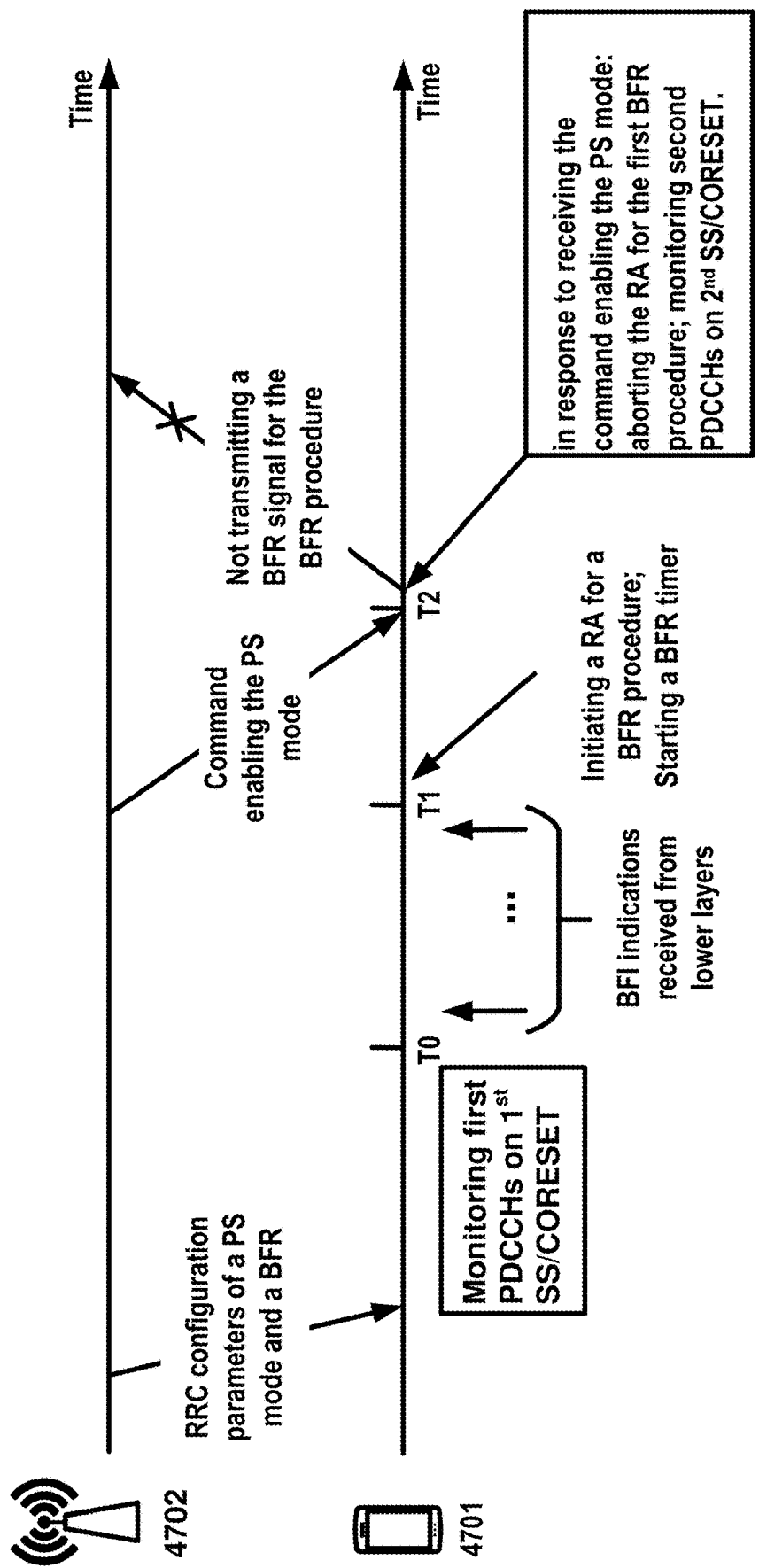
FIG. 47 shows an example diagram of beam failure recovery in power saving mode.

FIG. 47 shows an examples of improved BFR in power saving mode. A base station (e.g., 4702 in FIG. 47) may transmit to a wireless device (e.g., 4701 in FIG. 47), one or more RRC messages comprising first configuration parameters of a power saving mode (e.g., PS mode in FIG. 47) and/or second configuration parameters of a beam failure recovery (e.g., BFR in FIG. 47). The first configuration parameters for the power saving mode may be the same as or similar to one or more examples of FIG. 44. The power saving mode may be the same as similar to the one or more examples of FIG. 44. The second configuration parameters for the BFR may be the same as or similar to one or more examples of FIG. 43 and/or FIG. 44.

As shown in FIG. 47, the wireless device may monitor first PDCCHs (e.g., 1st PDCCHs in FIG. 47) on first search spaces and/or first control resource sets (e.g., 1st SS/CORESET as shown in FIG. 47). The wireless device may perform a beam failure detection based on the monitoring the first PDCCHs (or first RSs configured with the first PDCCHs for a BFR). The beam failure detection based on the monitoring the first PDCCHs (or may be implemented based on one or more examples of FIG. 38 and/or FIG. 43). A physical layer of the wireless device may indicate a number of beam failure instance indications (e.g., BFI indications in FIG. 47) to a higher layer (e.g., a MAC layer and/or a layer 3) of the wireless device, starting from T0.

As shown in FIG. 47, in response to the number of beam failure instance indications being equal to or greater than a configured value (e.g., beamFailureInstanceMaxCount), the wireless device may initiate a RA procedure for a BFR and/or start a beam failure recovery timer (e.g., beamFailureRecoveryTimer), at T1. T1 may occur a number of symbols/slots/subframes after T0. The wireless device may receive a command indicating enabling a power saving mode (e.g., PS mode in FIG. 47) at T2, wherein T2 occurs a number of symbol/slots/subframes after T1. The wireless device may receive a command indicating enabling a power saving mode, before the wireless device transmits a BFR signal for the BFR. In response to receiving the command, the wireless device may abort the RA for the BFR. In response to receiving the command, the wireless device may abort transmitting (or may skip transmitting) a BFR signal for the BFR. In response to receiving the command, the wireless device may stop the beam failure recovery timer. In response to receiving the command, the wireless device may monitor second PDCCHs on second search spaces/control resource sets (e.g., 2nd SS/CORESET in FIG. 47).

As shown in FIG. 47, a wireless device may abort a BFR procedure if the wireless device is indicated by a base station to switch to a power saving mode. Examples described herein may improve power consumption of a wireless device and/or uplink interferences to other wireless devices.

Figure 48:
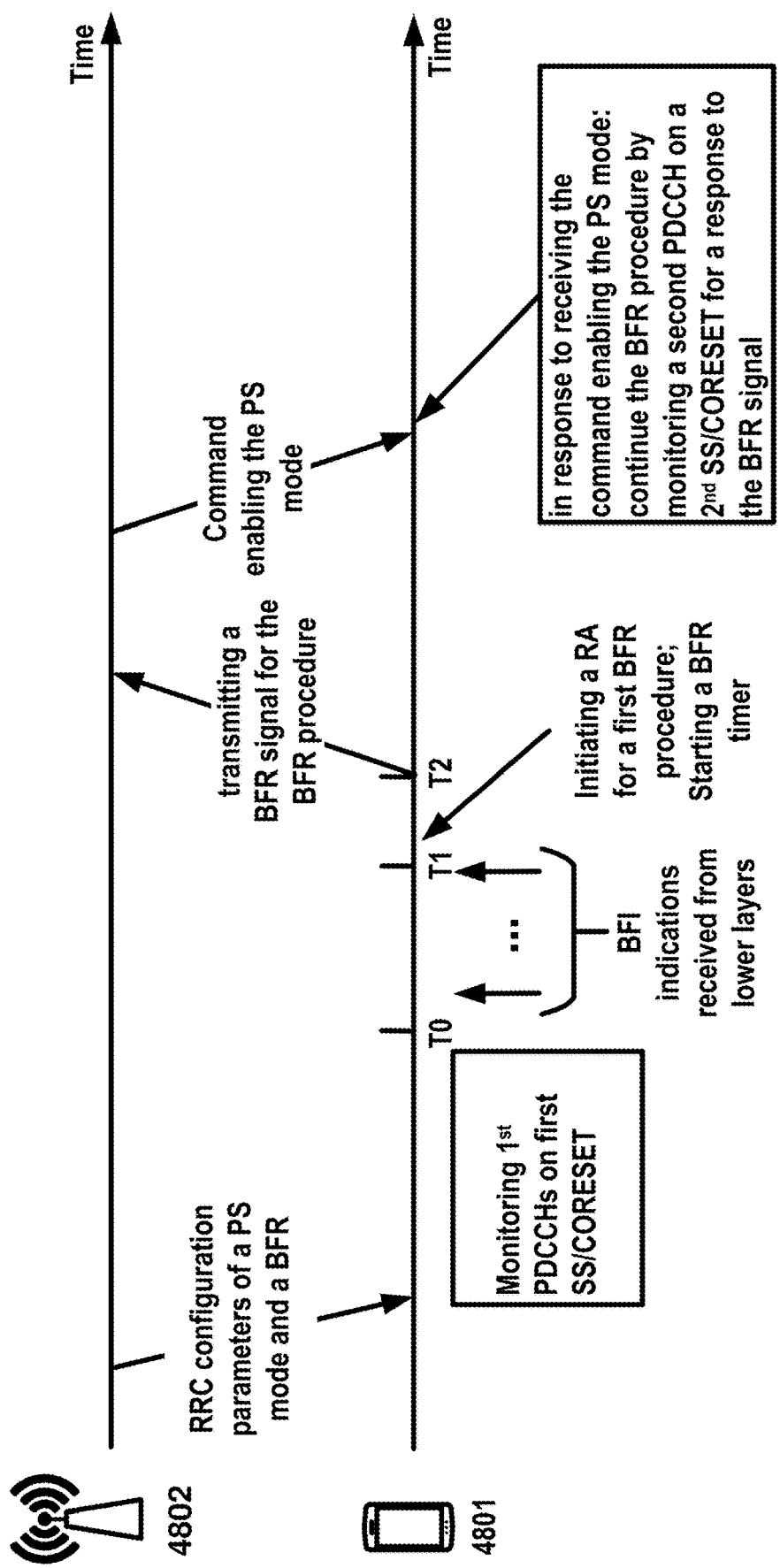
FIG. 48 shows an example diagram of beam failure recovery in power saving mode.

FIG. 48 shows an example of improved beam failure recovery if a power saving mode is supported. A base station (e.g., 4802 in FIG. 48) may transmit to a wireless device (e.g., 4801 in FIG. 48), one or more RRC messages comprising first configuration parameters of a power saving mode (e.g., PS in FIG. 48) and/or second configuration parameters of a beam failure recovery (e.g., BFR in FIG. 48). The first configuration parameters for the power saving mode may be the same as or similar to one or more examples of FIG. 44. The power saving mode may be the same as or similar to the one or more examples of FIG. 44. The second configuration parameters for the BFR may be the same as or similar to one or more examples of FIG. 43 and/or FIG. 44.

As shown in FIG. 48, the wireless device may monitor first PDCCHs (e.g., 1st PDCCHs in FIG. 48) on first search spaces and/or first control resource sets (e.g., 1st SS/CORESET as shown in FIG. 48). The wireless device may perform a beam failure detection based on the monitoring the first PDCCHs (or first RSs configured with the first PDCCHs for a BFR). The beam failure detection based on the monitoring the first PDCCHs (or may be implemented based on one or more examples of FIG. 38 and/or FIG. 43). A physical layer of the wireless device may indicate a number of beam failure instance indications (e.g., BFI indications in FIG. 48) to a higher layer (e.g., a MAC layer and/or a layer 3) of the wireless device, starting from T0.

As shown in FIG. 48, in response to the number of beam failure instance indications being equal to or greater than a configured value (e.g., beamFailureInstanceMaxCount), the wireless device may initiate a RA procedure for a BFR and/or start a beam failure recovery timer (e.g., beamFailureRecoveryTimer), at T1. T1 may occur a number of symbols/slots/subframes after T0.

As shown in FIG. 48, in response to initiating the RA for the BFR, the wireless device may transmit a BFR signal at T2. T2 may occur a number of symbols/slots/subframes after T1. The wireless device may monitor, for a response to the BFR signal, a second PDCCH on a second search space/control resource set (e.g., 2nd SS/CORESET as shown in FIG. 48) dedicated for the BFR.

As shown in FIG. 48, the wireless device may receive a command indicating enabling a power saving mode (e.g., PS mode in FIG. 48), after the wireless device transmits the BFR signal for the BFR. The wireless device may receive a command indicating enabling a power saving mode in a time period during which the wireless device is monitoring the second PDCCH for the response to the BFR signal. In response to receiving the command, the wireless device may ignore the command and/or may continue the BFR, for example, by keeping monitoring the second PDCCH for the response to the BFR signal. In response to receiving the command, the wireless device may switch to the power saving mode, except that the wireless device keeps monitoring the second PDCCH for the response to the BFR signal. In response to receiving the command, the wireless device may switch to the power saving mode, monitor a third PDCCH for the response to the BFR signal, and/or stop monitor the second PDCCH for the response to the BFR signal. The third PDCCH may be configured to be monitored by the wireless device in the power saving mode.

As shown in FIG. 48, a wireless device may continue a BFR procedure in a power saving mode if the wireless device is indicated by a base station to switch to the power saving mode. Examples described herein may improve delay of a beam failure recovery and power consumption of the wireless device.

Figure 49:
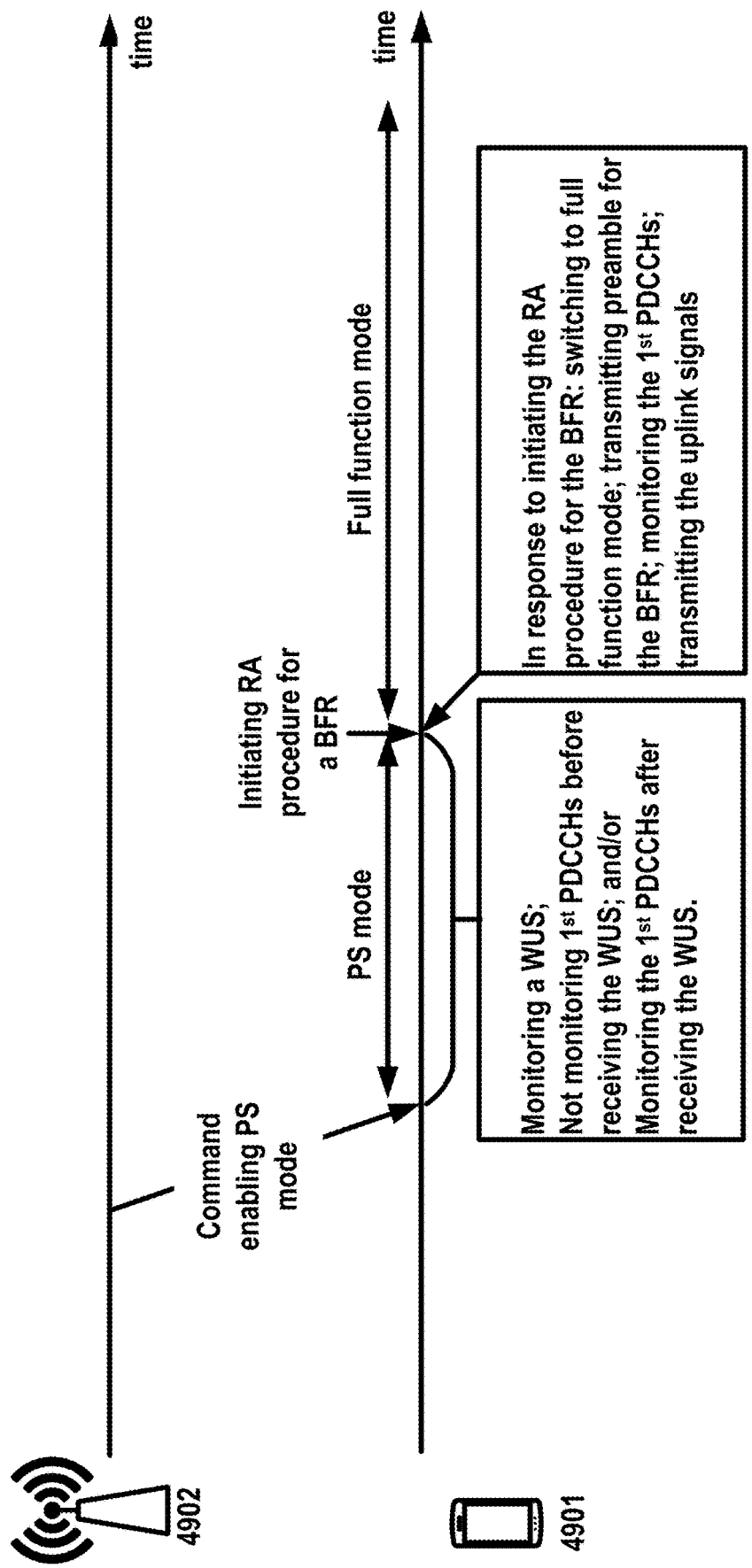
FIG. 49 shows an example diagram of beam failure recovery in power saving mode.

FIG. 49 shows an example of improved beam failure recovery if a power saving mode is supported. A wireless device (e.g., 4901 in FIG. 49) may receive a command indicating an activation/enabling of a power saving mode (e.g., PS mode in FIG. 49) from a base station (e.g., 4092). In response to receiving the command, the wireless device may switch to the power saving mode. The power saving mode may comprise a first power saving mode implemented based on one or more examples of FIG. 40. In the first power saving mode, the wireless device may: monitor a wakeup signal/channel (e.g., WUS in FIG. 49); not monitor first PDCCHs before receiving a wakeup signal or before receiving a wakeup command via the wakeup channel; monitor the first PDCCHs in response to receiving the wakeup signal or in response to receiving the wakeup command via the wakeup channel. The power saving mode may comprise second power saving mode by one or more examples of FIG. 41 and/or FIG. 42.

As shown in FIG. 49, the wireless device may initiate a RA procedure for a BFR in the power saving mode. In response to initiating the RA procedure for the BFR in the power saving mode, the wireless device may switch from the power saving mode to a full function mode. In response to switching to the full function mode, the wireless device may: monitor PDCCHs; transmit SRS; transmit on RACH; transmit on UL-SCH; and/or receive DL-SCH. In response to initiating the RA procedure for the BFR in the power saving mode, the wireless device may: transmit a BFR signal for the RA procedure for the BFR; monitoring, for a response to the BFR signal, a PDCCH on a search space/control resource set dedicated for the BFR.

As shown in FIG. 49, a wireless device may automatically switch to a full function mode if the wireless device initiates a RA for a BFR in a power saving mode. Examples described herein may improve delay of a beam failure recovery, data transmission latency, and/or system spectrum efficiency.

In response to receiving the command enabling the power saving mode, the wireless device may switch to the power saving mode. The wireless device, in response to receiving the command, may not perform a beam failure detection and/or may not initiate a RA for a BFR (e.g., for a PCell and/or a SCell). The wireless device, in response to receiving the command, may disable the beam failure detection and/or may disable the RA procedure for the BFR. BFR configuration parameters of a BFR may not be applied if the wireless device is in a power saving mode. Examples described herein may improve power consumption of a wireless device.

Figure 50:
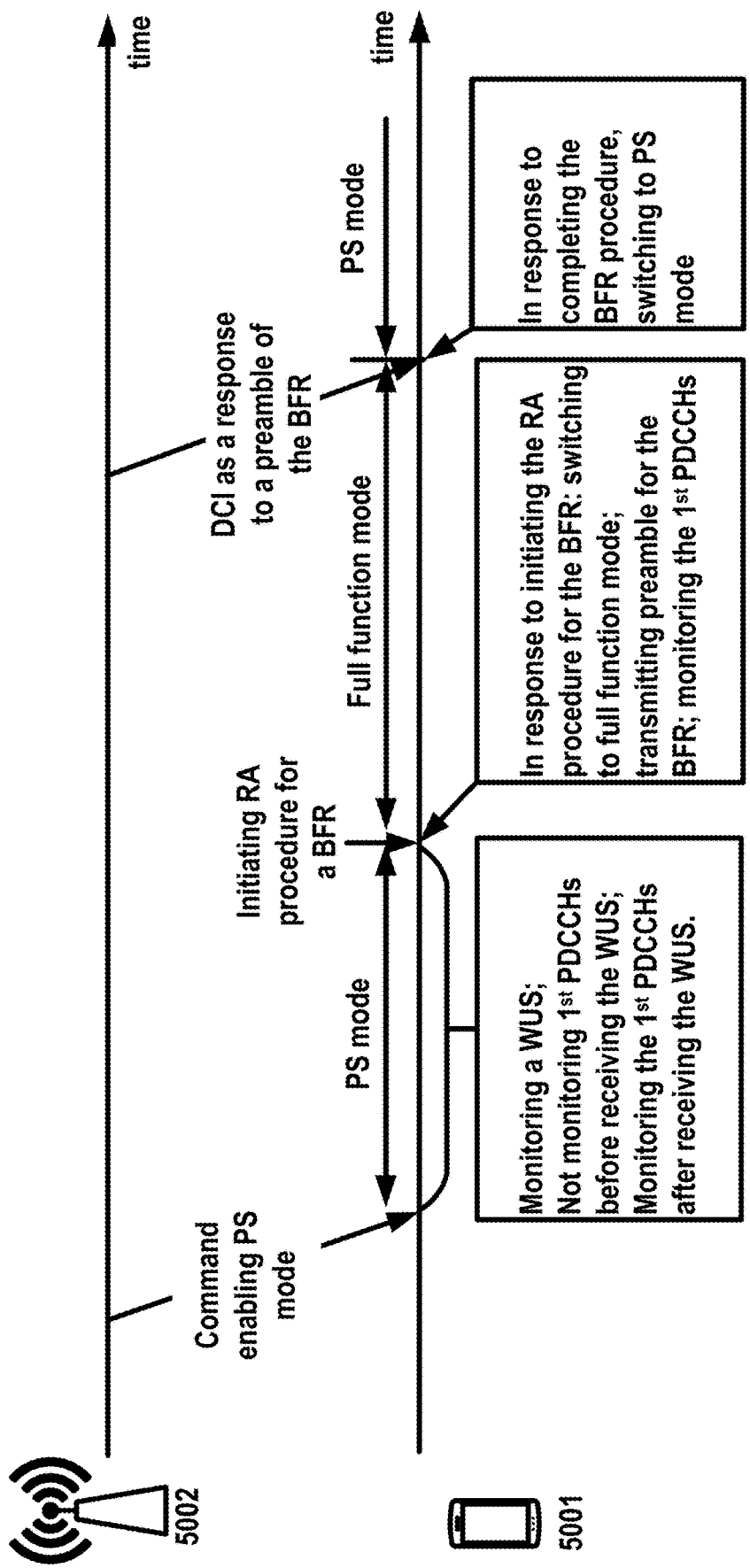
FIG. 50 shows an example diagram of beam failure recovery in power saving mode.

FIG. 50 shows an example of improved BFR procedure if a power saving mode is supported. A wireless device (e.g., 5001 in FIG. 50) may receive a command indicating an activation/enabling of a power saving mode (e.g., PS mode in FIG. 50) from a base station (e.g., 5002). In response to receiving the command, the wireless device may switch to the power saving mode. The power saving mode may comprise a first power saving mode implemented based on one or more examples of FIG. 40. The power saving mode may comprise second power saving mode by one or more examples of FIG. 41 and/or FIG. 42.

As shown in FIG. 50, the wireless device may initiate a RA procedure for a BFR in the power saving mode. In response to initiating the RA procedure for the BFR in the power saving mode, the wireless device may switch from the power saving mode to a full function mode. In response to switching to the full function mode, the wireless device may: monitor PDCCHs; transmit SRS; transmit on RACH; transmit on UL-SCH; and/or receive DL-SCH. In response to initiating the RA procedure for the BFR in the power saving mode, the wireless device may: transmit a BFR signal for the RA procedure for the BFR; monitoring, for a response to the BFR signal, a PDCCH on a search space/control resource set dedicated for the BFR.

As shown in FIG. 50, the wireless device may receive a DCI as the response to the BFR signal in a time period during which the wireless device is monitoring the PDCCH on the search space/control resource set dedicated for the BFR. In response to receiving the DCI, the wireless device may complete the BFR and may switch to the power saving mode (e.g., automatically). The power saving mode may comprise the first power saving mode and/or the second power saving mode. The first power saving mode may be implemented based on one or more examples of FIG. 40. The second power saving mode may be implemented based on one or more examples of FIG. 41 and/or FIG. 42.

As shown in FIG. 50, the wireless device may switch to a full function mode if the wireless device initiates a RA procedure for a BFR in a time period during which the wireless device is in a power saving mode. The wireless device may automatically switch to the power saving mode after the wireless device complete the RA procedure for the BFR. Examples described herein may improve delay of a beam failure recovery, power consumption of the wireless device, and/or downlink spectrum efficiency.

Figure 51:
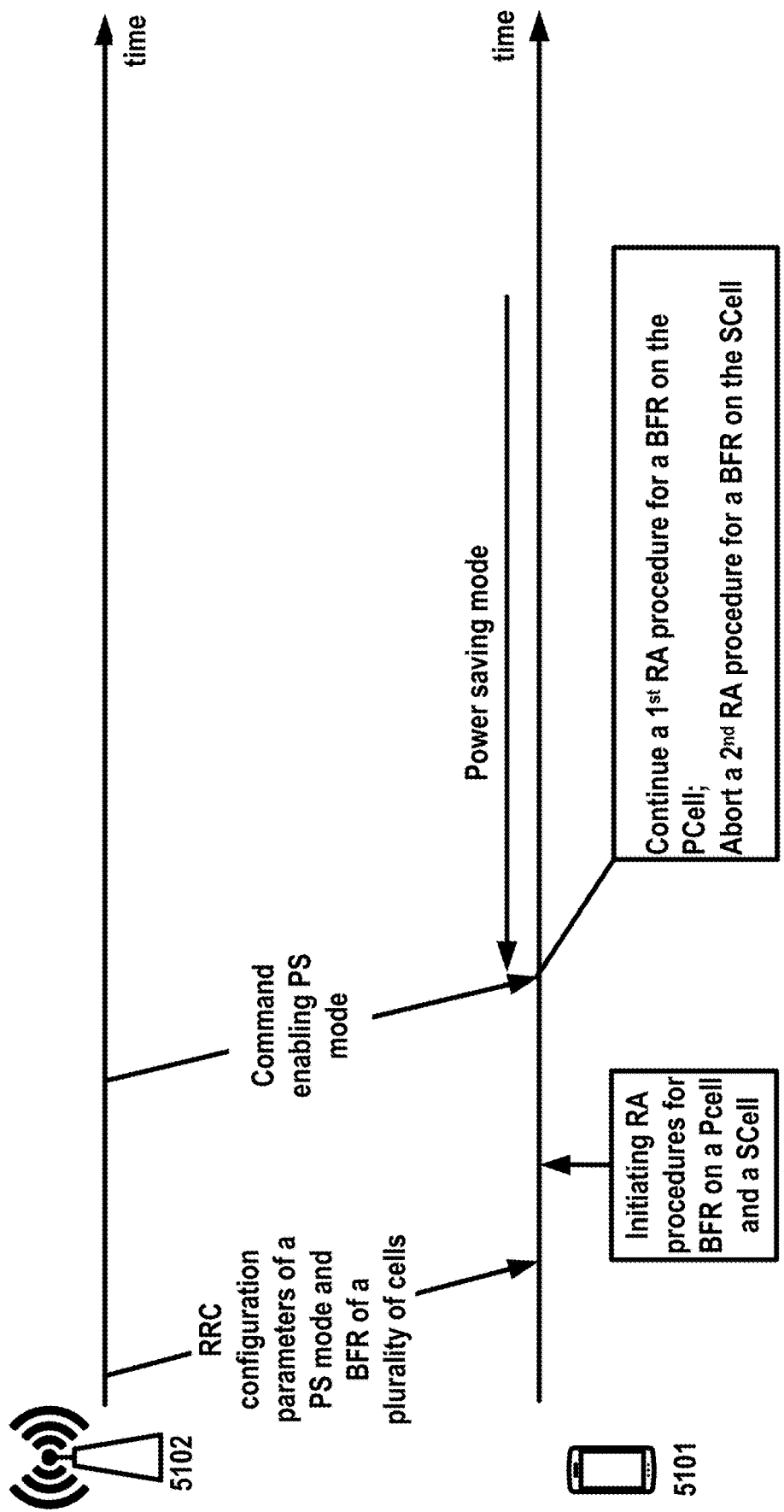
FIG. 51 shows an example diagram of beam failure recovery in power saving mode.

FIG. 51 shows an example of improved BFR if multiple cells are configured. A base station (e.g., 5102 in FIG. 51) may transmit to a wireless device (e.g., 5101 in FIG. 51), one or more RRC messages comprising first configuration parameters of a power saving mode (e.g., PS mode in FIG. 51). The one or more RRC messages may comprise: RRC connection reconfiguration message (e.g., RRCReconfiguration); RRC connection reestablishment message (e.g., RRCRestablishment); and/or RRC connection setup message (e.g., RRCSetup). The one or more RRC messages may comprise one or more cell-specific or cell-common RRC messages (e.g., ServingCellConfig IE, ServingCellConfigCommon IE, MAC-CellGroupConfig IE). The one or more RRC messages may comprise second configuration parameters of a first beam failure recovery (e.g., BFR in FIG. 51) for a first cell and a second BFR for a second cell. The first cell may be a primary cell (e.g., PCell), a PUCCH secondary cell if secondary PUCCH group is configured, or a primary secondary cell (e.g., PSCell) if dual connectivity is configured. The second cell may be a secondary cell.

As shown in FIG. 51, the wireless device may initiate, for the first cell, a first RA procedure for a first BFR, in response to detecting a first number of beam failure instances on the first cell. The first RA procedure may be performed on the first cell, for example, based on one or more examples of FIG. 44. The wireless device may initiate a second RA procedure for a second BFR for the second cell, in response to detecting a second number of beam failure instances on the second cell. The second RA procedure may be performed on the first cell and/or the second cell, for example, based on one or more examples of FIG. 44. The first RA procedure may overlap in time with the second RA procedure. The first RA procedure may not overlap in time with the second RA procedure.

As shown in FIG. 51, the wireless device may receive a command indicating an activation of a power saving mode. The command may comprise at least one of: a downlink signal sequence; a DCI transmitted on a PDCCH; a MAC CE; and/or an RRC message. The command may be transmitted on the first cell. The command may be transmitted on the second cell. In response to receiving the command, the wireless device may continue the first RA procedure for the first cell, if the first RA procedure is ongoing if the wireless device receives the command. The wireless device may continue the first RA procedure for the first cell by implementing one or more examples of FIG. 45, FIG. 46, FIG. 47, FIG. 48, FIG. 49 and/or FIG. 50. In response to receiving the command, the wireless device may abort the second RA procedure for the second cell, if the second RA procedure is ongoing if the wireless device receives the command.

The wireless device may receive the command indicating an activation of the power saving mode, before the wireless device initiates the first RA procedure for the first BFR for the first cell and/or the second RA procedure for the second BFR for the second cell. In response to receiving the command, the wireless device may switch to the power saving mode. In response to receiving the command, the wireless device may perform, for the first cell, a first beam failure detection and/or initiate, for the first cell, a first RA procedure for a first BFR if detecting a number of beam failure instances on the first cell. In response to receiving the command, the wireless device may disable beam failure recovery procedure for the second cell. In response to receiving the command, the wireless device may not perform, for the second cell, a second beam failure detection and/or may not initiate, for the second cell, a second RA procedure for a second BFR.

As shown in FIG. 51, a wireless device may perform beam failure recovery procedure on a PCell and may not perform beam failure recovery procedure on a SCell if the wireless device works in a power saving mode. Examples described herein may improve power consumption of a wireless device if: beam failure recovery procedures are configured on a PCell and a SCell; and a power saving mode is configured.

A wireless device may initiate a random access procedure for a beam failure recovery of a cell. The wireless device may transmit, in response to initiating the random access procedure for the beam failure recovery, a preamble via radio resource of a random access channel. In response to the transmitting, the wireless device may, monitor for a response to the preamble, first downlink control channel candidates in first search spaces of a first control resource set of the cell. The wireless device may receive a downlink signal indicating action of a power saving mode. The wireless device may, in response to receiving the downlink signal, activate the power saving mode. In response to activating the power saving mode, the wireless device may stop (or abort) the random access procedure for the beam failure recovery on the cell. In response to activating the power saving mode, the wireless device may stop monitoring the first downlink control channel candidates in the first search spaces of the first control resource set of the cell. In response to activating the power saving mode, the wireless device may monitor second downlink control channel candidates in second search spaces of a second control resource set. The wireless device may receive one or more first downlink control information on the second downlink control channel candidates. The wireless device may transmit or receive data packets based on the one or more first downlink control information.

A wireless device may initiate a random access procedure for a beam failure recovery of a cell. The wireless device may transmit, in response to initiating the random access procedure for the beam failure recovery of the cell, a preamble via radio resources of a random access channel. The wireless device may monitor, for a response to the preamble, first downlink control channel candidates in first search spaces of first control resource set of the cell. The wireless device may receive a downlink signal indicating activation of a power saving mode. If the power saving mode is activated, the wireless device may: stop the monitoring the first downlink control channel candidates in the first search spaces of the first control resource set; monitor second downlink control channel candidates in second search spaces of second control resource set of the cell. The wireless device may activate, in response to receiving the downlink signal, the power saving mode. In response to activating the power saving mode, the wireless device may: stop the random access procedure for the beam failure recovery of the cell; and monitor the second downlink control channel candidates in the second search spaces.

A wireless device may receive from a base station, a first downlink signal indicating activation of a power saving mode. The wireless device may activate, in response to the first downlink signal, the power saving mode, wherein the power saving mode comprise skipping monitoring downlink control channel candidates in first search spaces of a first control resource set of a cell. The wireless device may initiate a random access procedure for a beam failure recovery in response to detecting a number of beam failure instances. The wireless device may deactivate, in response to the initiating the random access procedure, the power saving mode. The wireless device may transmit, in response to deactivating the power saving mode and the initiating the random access procedure, a preamble for the beam failure recovery of the cell.

A wireless device may receive from a base station, configuration parameters indicating: a first random access procedure of a first beam failure recovery on a first cell; and a second random access procedure of a second beam failure recovery on a second cell. The wireless device may receive a first downlink signal indicating activation of a power saving mode. The wireless device may activate, in response to the first downlink signal, the power saving mode. In response to activating the power saving mode, the wireless device may: initiate the first random access procedure of the first beam recovery on the first cell, in response to detecting a number of beam failure instances on the first cell; and/or not initiate the second random access procedure of the second beam resource on the second cell in response to detecting a number of beam failure instances on the second cell.

A wireless device may receive, from a base station that may transmit, one or more messages comprising: first parameters of a first beam failure recovery procedure on a first cell; and second parameters of a second beam failure recovery procedure on a second cell. The wireless device may receive, from the base station that may transmit, a downlink signal indicating transitioning from a first power state to a second power state. The wireless device may transition to, in response to the downlink signal, the second power state. During the second power state, the wireless device may: continue a first beam failure recovery procedure on the first cell; and/or stop a second beam failure recovery procedure for the second cell. The first cell may be a primary cell. The second cell may be a secondary cell. The stopping the second beam failure recovery procedure may comprise stopping detecting beam failure instances on the second cell. The stopping the second beam failure recovery procedure may comprise stopping monitoring a downlink control channel for a response of a beam failure recovery request for the second cell. The stopping the second beam failure recovery procedure may comprise stopping transmitting a beam failure recovery request for the second cell. The beam failure recovery request may comprise at least one of: a preamble; and/or a scheduling request via an uplink control channel resource. The downlink signal may comprise a medium access control control element. The downlink signal may comprise a power saving indication via a power saving channel. The power saving channel may be on the first cell. The power saving channel may be on the second cell. The first power state may be a first time duration if the wireless device: monitors a first downlink control channel, on the first cell, for receiving a first downlink assignment or a first uplink grant; and/or monitors a second downlink control channel, on the second cell or for the second cell, for receiving a second downlink assignment or a second uplink grant. The second power state may be a second time duration if the wireless device: stops monitoring the first downlink control channel on the first cell; stops monitoring the second downlink control channel on the second cell or for the second cell; and/or monitors a power saving channel for receiving a power saving indication. The first parameters may comprise: a first number for detecting beam failure instances; configuration parameters of one or more random access channel resources for the first beam failure recovery procedure; and/or a first control resource set for reception of a response of a beam failure recovery request for the first beam failure recovery procedure in the first power state. The first parameters may comprise a second control resource set for reception of the response of the beam failure request for the first beam failure recovery procedure in the second power state. The wireless device may trigger the first beam failure recovery procedure on the first cell in response to detecting the first number of beam failure instances on the first cell. The wireless device may transmit a beam failure recovery request via a first one of the one or more random access channel resources; monitor a downlink control channel on the first control resource set for receiving a response for the transmission of the beam failure recovery request; and/or increment a beam failure recovery transmission counter in response to not receiving the response in a monitoring window. The continuing the first beam failure recovery procedure may comprise transmitting the beam failure recovery request via a second one of the one or more random access channel resources. The continuing the first beam failure recovery procedure may comprise monitoring a downlink control channel on the second control resource set for receiving a response for the transmission of the beam failure recovery request. The continuing the first beam failure recovery procedure may comprise incrementing the beam failure recovery transmission counter in response to not receiving the response in the monitoring window.

Additionally or alternatively, the wireless device may trigger a beam failure recovery procedure in response to detecting a number of beam failure instances on a cell in a first power state; transmit a beam failure recovery request in response to the triggering; monitor, on a first control resource set of the cell in the first power state, a first downlink control channel for receiving a response to the transmitting the beam failure recovery request; receive, via power saving channel, a power saving indication indicating a second power state of the cell; monitor, on a second control resource set of the cell in the second power state, a second downlink control channel for receiving the response to the transmitting the beam failure recovery request; and/or receive the response during the monitoring the second downlink control channel. The first power state may be a first time duration if the wireless device monitors a downlink control channel for receiving a downlink assignment or an uplink grant. The second power state may be a second time duration if the wireless device: stops monitoring the downlink control channel; and/or monitors a power saving channel for receiving a power saving indication. The wireless device may receive one or more configuration parameters of the beam failure recovery procedure. The configuration parameters may indicate: the first control resource set for the beam failure recovery procedure of the cell in the first power state; and/or the second control resource set for the beam failure recovery procedure of the cell in the second power state.

Additionally or alternatively, the wireless device may detect a beam failure instance based on a first reference signal of a cell in a first power state; increment a beam failure counter based on the detecting the beam failure instance; receive, via a power saving channel, a power saving indication indicating a second power state of the cell; increment the beam failure counter in response to detecting a beam failure instance based on a second reference signal of the cell in the second power state; trigger a beam failure recovery procedure based on the beam failure counter reaching a first value; and/or transmit a beam failure recovery request in response to the triggering the beam failure recovery procedure. The wireless device may receive one or more configuration parameters of the beam failure recovery procedure. The configuration parameters may indicate: the first reference signal for the beam failure recovery procedure of the cell in the first power state; and/or the second reference signal for the beam failure recovery procedure of the cell in the second power state.

Additionally or alternatively, the wireless device may trigger a beam failure recovery procedure in response to detecting a number of beam failure instances on a cell in a first power state; transmit a beam failure recovery request in response to the triggering the beam failure recovery procedure; receive a power saving indication indicating a second power state of the cell; monitor a downlink control channel for receiving a response to the transmitting the beam failure recovery request; receive the response during the monitoring the downlink control channel; and/or transition, based on the power saving indication and after the receiving the response, the cell from the first power state to the second power state. The first power state may be a first time duration when the wireless device monitors a downlink control channel for receiving a downlink assignment or an uplink grant. The second power state may be a second time duration if the wireless device: stops monitoring the downlink control channel; and/or monitors a power saving channel for receiving a power saving indication.

Additionally or alternatively, the wireless device may trigger a beam failure recovery procedure in response to detecting a number of beam failure instances on the cell in a first power state; switch, based on the triggering the beam failure recovery procedure, the cell from the first power state to the second power state; and/or transmit a beam failure recovery request via the cell in the second power state. The wireless device may monitor a downlink control channel for receiving a response to the transmitting the beam failure recovery request; and/or receive the response during the monitoring the downlink control channel. The first power state may be a first time duration if the wireless device: stops monitoring a downlink control channel; and/or monitors a power saving channel for receiving a power saving indication. The second power state may be a second time duration, for example, if the wireless device monitors the downlink control channel for receiving a downlink assignment or an uplink grant.

Figure 52:
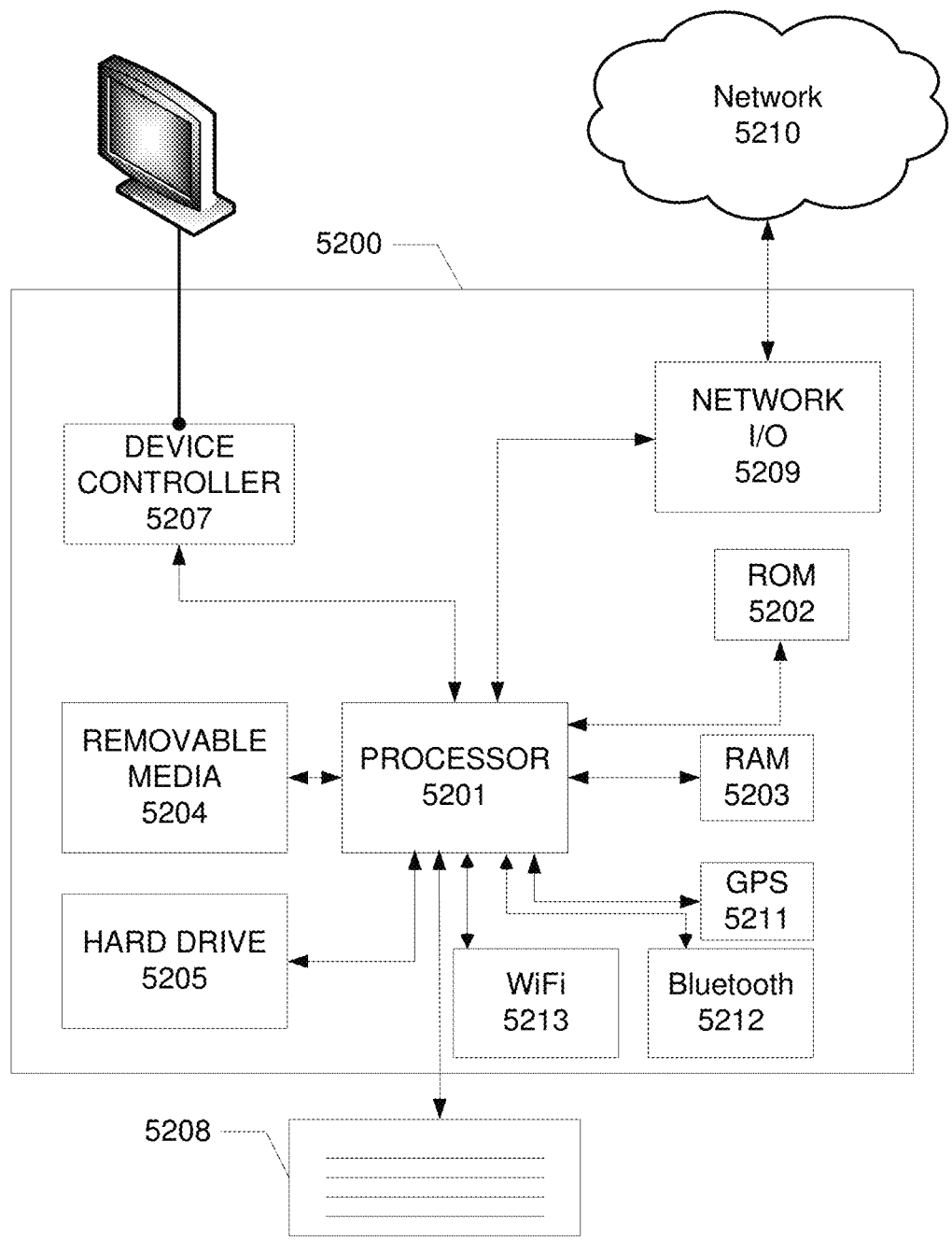
FIG. 52 shows example elements of a computing device that may be used to implement any of the various devices described herein.

FIG. 52 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 5200 may include one or more processors 5201, which may execute instructions stored in the random-access memory (RAM) 4103, the removable media 5204 (such as a Universal Serial Bus (USB) drive, compact disk (CD) or digital versatile disk (DVD), or floppy disk drive), or any other desired storage medium. Instructions may also be stored in an attached (or internal) hard drive 5205. The computing device 5200 may also include a security processor (not shown), which may execute instructions of one or more computer programs to monitor the processes executing on the processor 5201 and any process that requests access to any hardware and/or software components of the computing device 5200 (e.g., ROM 5202, RAM 5203, the removable media 5204, the hard drive 5205, the device controller 5207, a network interface 5209, a GPS 5211, a Bluetooth interface 5212, a WiFi interface 5213, etc.). The computing device 5200 may include one or more output devices, such as the display 5206 (e.g., a screen, a display device, a monitor, a television, etc.), and may include one or more output device controllers 5207, such as a video processor. There may also be one or more user input devices 5208, such as a remote control, keyboard, mouse, touch screen, microphone, etc. The computing device 5200 may also include one or more network interfaces, such as a network interface 5209, which may be a wired interface, a wireless interface, or a combination of the two. The network interface 5209 may provide an interface for the computing device 5200 to communicate with a network 5210 (e.g., a RAN, or any other network). The network interface 5209 may include a modem (e.g., a cable modem), and the external network 5210 may include communication links, an external network, an in-home network, a provider's wireless, coaxial, fiber, or hybrid fiber/coaxial distribution system (e.g., a DOCSIS network), or any other desired network. Additionally, the computing device 5200 may include a location-detecting device, such as a global positioning system (GPS) microprocessor 5211, which may be configured to receive and process global positioning signals and determine, with possible assistance from an external server and antenna, a geographic position of the computing device 5200.

The example in FIG. 52 may be a hardware configuration, although the components shown may be implemented as software as well. Modifications may be made to add, remove, combine, divide, etc. components of the computing device 5200 as desired. Additionally, the components may be implemented using basic computing devices and components, and the same components (e.g., processor 5201, ROM storage 5202, display 5206, etc.) may be used to implement any of the other computing devices and components described herein. For example, the various components described herein may be implemented using computing devices having components such as a processor executing computer-executable instructions stored on a computer-readable medium, as shown in FIG. 52. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
   receiving, by a wireless device, one or more messages comprising information indicating a plurality of downlink channels associated with a plurality of power saving configurations;
   receiving a first indication to activate a first power saving configuration of the plurality of power saving configurations;
   monitoring, based on activation of the first power saving configuration, a first downlink channel, of the plurality of downlink channels, corresponding to the first power saving configuration; and
   receiving, via the first downlink channel, a second indication to monitor a second downlink channel.

2. The method of claim 1, further comprising:
   receiving, based on monitoring the second downlink channel, downlink control information.

3. The method of claim 1, further comprising:
   receiving, based on monitoring the second downlink channel, a downlink assignment; and
   receiving, based on the downlink assignment, downlink transport blocks.

4. The method of claim 1, further comprising:
   receiving, based on monitoring the second downlink channel, an uplink grant; and
   transmitting, based on the uplink grant, uplink transport blocks.

5. The method of claim 1, wherein:
   the one or more messages comprise information associated with the first power saving configuration, wherein the information associated with the first power saving configuration comprises at least one of:
   a periodicity of the first downlink channel,
   a duration of the first downlink channel,
   a number of resource blocks in a frequency domain,
   a search space set, or
   a control resource set; and the monitoring the first downlink channel is based on at least one of the information associated with the first power saving configuration.

6. The method of claim 1, further comprising:
determining, based on receiving a second message, that a beam failure recovery procedure is ongoing on a cell associated with the first power saving configuration; and
based on the determining that the beam failure recovery procedure is ongoing on the cell:
continuing the beam failure recovery procedure, and delaying adjusting the cell into a power saving state.

7. The method of claim 1, further comprising, based on receiving the first indication, at least one of:
stopping a secondary cell deactivation timer of a cell associated with the first power saving configuration; or
stopping a bandwidth part inactivity timer of an active bandwidth part of the cell associated with the first power saving configuration.

8. A wireless device comprising:
one or more processors; and
memory storing instructions that, when executed by the one or more processors, configure the wireless device to:
receive one or more messages comprising information indicating a plurality of downlink channels associated with a plurality of power saving configurations;
receive a first indication to activate a first power saving configuration of the plurality of power saving configurations;
monitor, based on activation of the first power saving configuration, a first downlink channel, of the plurality of downlink channels, corresponding to the first power saving configuration; and
receive, via the first downlink channel, a second indication to monitor a second downlink channel.

9. The wireless device of claim 8, wherein the instructions, when executed by the one or more processors, further configure the wireless device to receive, based on monitoring the second downlink channel, downlink control information.

10. The wireless device of claim 8, wherein the instructions, when executed by the one or more processors, further configure the wireless device to:
receive, based on monitoring the second downlink channel, a downlink assignment; and
receive, based on the downlink assignment, downlink transport blocks.

11. The wireless device of claim 8, wherein the instructions, when executed by the one or more processors, further configure the wireless device to:
receive, based on monitoring the second downlink channel, an uplink grant; and
transmit, based on the uplink grant, uplink transport blocks.

12. The wireless device of claim 8, wherein:
the one or more messages comprise information associated with the first power saving configuration, wherein the information associated with the first power saving configuration comprises at least one of:
a periodicity of the first downlink channel,
a duration of the first downlink channel,
a number of resource blocks in a frequency domain,
a search space set, or
a control resource set; and
the instructions, when executed by the one or more processors, configure the wireless device to monitor the first downlink channel based on at least one of the information associated with the first power saving configuration.

13. The wireless device of claim 8, wherein the instructions, when executed by the one or more processors, further configure the wireless device to:
determine, based on receiving a second message, that a beam failure recovery procedure is ongoing on a cell associated with the first power saving configuration; and
based on determining that the beam failure recovery procedure being ongoing on the cell:
continue the beam failure recovery procedure, and delay adjusting the cell into a power saving state.

14. The wireless device of claim 8, wherein the instructions, when executed by the one or more processors, further configure the wireless device to, based on the first indication, perform at least one of:
stopping a secondary cell deactivation timer of a cell associated with the first power saving configuration, or
stopping a bandwidth part inactivity timer of an active bandwidth part of the cell associated with the first power saving configuration.

15. A non-transitory computer-readable medium storing instructions that, when executed, configure a wireless device to:
receive one or more messages comprising information indicating a plurality of downlink channels associated with a plurality of power saving configurations;
receive a first indication to activate a first power saving configuration of the plurality of power saving configurations;
monitor, based on activation of the first power saving configuration, a first downlink channel, of the plurality of downlink channels, corresponding to the first power saving configuration; and
receive, via the first downlink channel, a second indication to monitor a second downlink channel.

16. The non-transitory computer-readable medium of claim 15, wherein the instructions, when executed, further configure the wireless device to receive, based on monitoring the second downlink channel, downlink control information.

17. The non-transitory computer-readable medium of claim 15, wherein the instructions, when executed, further configure the wireless device to:
receive, based on monitoring the second downlink channel, a downlink assignment; and
receive, based on the downlink assignment, downlink transport blocks.

18. The non-transitory computer-readable medium of claim 15, wherein the instructions, when executed, further configure the wireless device to:
receive, based on monitoring the second downlink channel, an uplink grant; and
transmit, based on the uplink grant, uplink transport blocks.

19. The non-transitory computer-readable medium of claim 15, wherein:
the one or more messages comprise information associated with the first power saving configuration, wherein the information associated with the first power saving configuration comprises at least one of:
a periodicity of the first downlink channel,
a duration of the first downlink channel,
a number of resource blocks in a frequency domain,
a search space set, or a control resource set; and the instructions, when executed, configure the wireless device to monitor the first downlink channel based on at least one of the information associated with the first power saving configuration.

20. The non-transitory computer-readable medium of claim 15, wherein the instructions, when executed, further configure the wireless device to:

determine, based on receiving a second message, that a beam failure recovery procedure is ongoing on a cell associated with the first power saving configuration; and based on determining that the beam failure recovery procedure being ongoing on the cell:
  continue the beam failure recovery procedure, and
  delay adjusting the cell into a power saving state.

* * * * *